US007102700B1

(12) United States Patent
Pease et al.

(10) Patent No.: US 7,102,700 B1
(45) Date of Patent: Sep. 5, 2006

(54) LASER PROJECTION SYSTEM

(75) Inventors: Richard W. Pease, Osawatomie, KS (US); Jeffrey S. Pease, Osawatomie, KS (US); John P. Callison, Mission Hills, KS (US)

(73) Assignee: Magic Lantern LLC, Lenexa, KS (US)

( * ) Notice: Subject to any disclaimer, the term of this patent is extended or adjusted under 35 U.S.C. 154(b) by 875 days.

(21) Appl. No.: 09/654,246

(22) Filed: Sep. 2, 2000

(51) Int. Cl.
*H04N 5/74* (2006.01)

(52) U.S. Cl. ........................ 348/744; 348/750; 348/780
(58) Field of Classification Search ................ 348/744, 348/745, 750, 780, 781; 353/31, 37, 69; 349/7, 349/8; 359/443, 212, 216; 345/30
See application file for complete search history.

(56) References Cited

U.S. PATENT DOCUMENTS

| | | | |
|---|---|---|---|
| 3,507,984 | A | 4/1970 | Stavis |
| 3,567,847 | A | 3/1971 | Price |
| 3,569,988 | A | 3/1971 | Schmidt et al. |

(Continued)

| | | | | |
|---|---|---|---|---|
| 6,175,440 | B1 | * | 1/2001 | Conemac .................... 359/204 |

FOREIGN PATENT DOCUMENTS

| | | |
|---|---|---|
| WO | WO 94/18802 | 8/1994 |
| WO | WO 98/035504 | 8/1998 |
| WO | WO 02/021850 | 3/2002 |

OTHER PUBLICATIONS

"An Overview of Technology for Large Wall Screen Projection using Lasers as a Light Source", Richard W. Pease, MITRE Technical Report, The Mitre Corporation (Jul. 1990).

"Electro–Optic and Acousto–Optic Scanning and Deflection", Milton Gottlieb, Clive L. M. Ireland, John Martin Ley, Marcel Dekker, Inc., pp. 2–97; 159–175 (1983).

"Television Engineering Handbook", K. Blair Benson (ed.), McGraw–Hill Book Company, 1986, pp. 2.14–2.26.

"Useful Optics", Walter T. Welford, University of Chicago Press, 1991, Ch. 7, pp. 44–57.

"Provisional Instruction Manual, Model SD 270, Video Projector", Dwight Cavendish Displays, Ltd., 1985.

"Millenia—A New Class of High–Power Diode–PUmped CW Visible Lasers", LaserForefront, Spectra–Physics Lasers, Inc., 1996, No. 6.

"Silica Single Mode Fibers", 2000 Catalog, Thor Labs Inc., 2000, p. 242.

*Primary Examiner*—Victor R. Kostak
(74) *Attorney, Agent, or Firm*—Montgomery W. Smith

(57) ABSTRACT

A laser projection system preferably for use in commercial motion picture theaters and other large screen venues, including home theater, uses optical fibers to project modulated laser beams for raster scanning on the screen. The emitting ends of the optical fibers are arranged in an array such that red, green and blue spots are simultaneously scanned onto the screen in multiple lines spaced one or more than one scan line apart. The use of optical fibers for laser beam projection eliminates the need to use complex optics, and enables the scanning of small, high resolution spots on the screen. The use of optical fiber also permits convenient packaging and permits replacement, upgrading or modification of the system components. The scanning of multiple lines simultaneously is accomplished by reordering the video signal with a microprocessor controller component to write lines in a sequence after repeated vertical sweeps to form a complete picture. In a preferred embodiment, the video signal is reordered to scan different color beams at different times to render the desired composite of the red, green and blue spots at each dot location on the screen. Alternate embodiments are disclosed to illustrate the flexibility of the system for different optical fiber output head spacings, and for different types of laser, modulation, and scanning components.

165 Claims, 72 Drawing Sheets

U.S. PATENT DOCUMENTS

| | | |
|---|---|---|
| 3,699,242 A | 10/1972 | Price |
| 3,760,096 A | 9/1973 | Roth |
| 3,818,129 A | 6/1974 | Yamamoto |
| 3,864,730 A | 2/1975 | Roth |
| 3,892,468 A | 7/1975 | Duguay |
| RE29,094 E | 12/1976 | Price |
| 4,040,096 A | 8/1977 | Starkweather |
| 4,145,712 A | 3/1979 | Spooner et al. |
| 4,205,348 A | 5/1980 | DeBenedictus et al. |
| 4,297,723 A | 10/1981 | Whitby |
| 4,393,387 A | 7/1983 | Kitamura |
| 4,423,426 A | 12/1983 | Kitamura |
| 4,474,422 A | 10/1984 | Kitamura |
| 4,533,215 A | 8/1985 | Trias et al. |
| 4,613,201 A | 9/1986 | Shortle et al. |
| 4,689,482 A | 8/1987 | Horikawa et al. |
| 4,720,747 A | 1/1988 | Crowley |
| 4,796,964 A | 1/1989 | Connell et al. |
| 4,805,012 A | 2/1989 | Agostinelli et al. |
| 4,833,528 A | 5/1989 | Kobayashi |
| 4,835,601 A | 5/1989 | Kobayashi |
| 4,851,918 A | 7/1989 | Crowley |
| 4,871,231 A | 10/1989 | Garcia, Jr. |
| 4,884,857 A | 12/1989 | Prakash et al. |
| 4,892,371 A | 1/1990 | Yamada et al. |
| 4,930,849 A | 6/1990 | Tanaka |
| 4,931,874 A | 6/1990 | Grillon et al. |
| 4,978,202 A | 12/1990 | Yang |
| 4,979,030 A | 12/1990 | Murata |
| 4,992,880 A | 2/1991 | Trias |
| 5,015,064 A | 5/1991 | Detig et al. |
| 5,029,975 A | 7/1991 | Pease |
| 5,032,924 A | 7/1991 | Brown et al. |
| 5,051,834 A | 9/1991 | Matui et al. |
| 5,097,480 A | 3/1992 | Pease |
| 5,136,426 A | 8/1992 | Linden et al. |
| 5,136,674 A | 8/1992 | Kakiuchi et al. |
| 5,140,427 A | 8/1992 | Nakane et al. |
| 5,148,285 A | 9/1992 | Nakane et al. |
| 5,166,778 A * | 11/1992 | Beamon, III ............ 358/3 |
| 5,255,082 A | 10/1993 | Tamada |
| 5,311,321 A | 5/1994 | Crowley |
| 5,317,348 A | 5/1994 | Knize |
| 5,410,371 A * | 4/1995 | Lambert ............ 348/769 |
| 5,418,546 A | 5/1995 | Nakagakiuchi et al. |
| 5,424,771 A | 6/1995 | Yu |
| 5,440,352 A | 8/1995 | Deter et al. |
| 5,463,468 A | 10/1995 | Takanashi et al. |
| 5,534,950 A | 7/1996 | Hargis et al. |
| 5,577,148 A | 11/1996 | Kamatani |
| 5,596,339 A | 1/1997 | Furness, III et al. |
| 5,614,961 A | 3/1997 | Gibeau et al. |
| 5,708,747 A | 1/1998 | Danckwerth |
| 5,715,021 A | 2/1998 | Gibeau et al. |
| 5,715,337 A | 2/1998 | Spitzer et al. |
| 5,774,174 A | 6/1998 | Hardie |
| 5,818,546 A | 10/1998 | Opower et al. |
| 5,822,022 A | 10/1998 | Deter et al. |
| 5,828,424 A | 10/1998 | Wallenstein |
| 5,874,929 A | 2/1999 | Opower et al. |
| 5,920,361 A | 7/1999 | Gibeau et al. |
| 6,137,461 A | 10/2000 | Deter et al. |
| 6,154,259 A | 11/2000 | Hargis et al. |

* cited by examiner

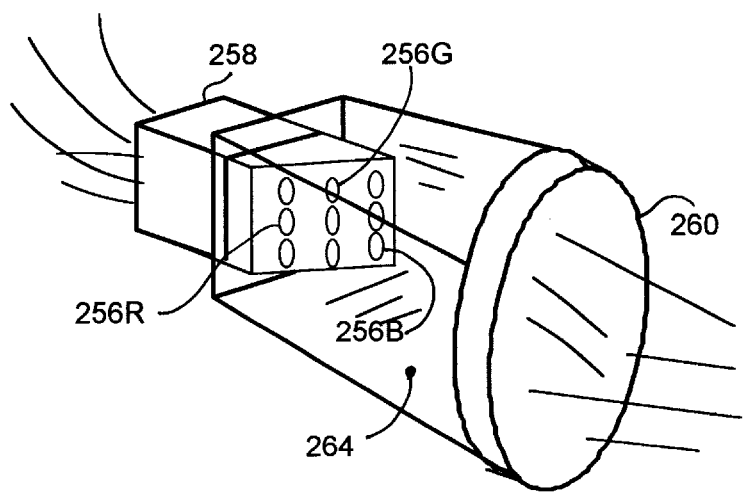
FIG. 11D
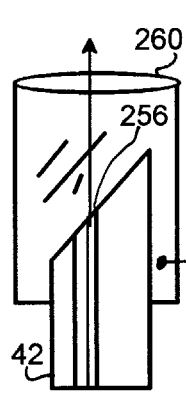 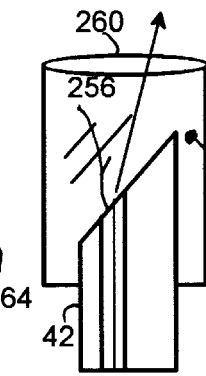 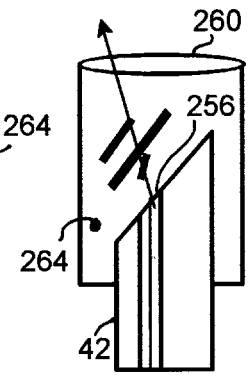 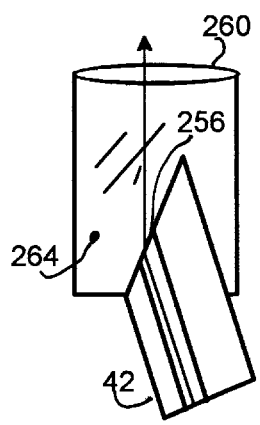
FIG. 11E   FIG. 11F   FIG. 11G   FIG. 11H × red   + green   ○ blue   ✻ red+green   ✺ red+green+blue ✕ red   + green   ◯ blue   ✳ red+green   ✱ red+green+blue

Scan Pass

| s1 | | s2 | | s3 | | s4 | | s5 | |
|---|---|---|---|---|---|---|---|---|---|
| | AAA | | AAA | | AAA | | | | |
| | | | | Line | ---- | Line | AAA | Line | AAA |
| | BBB | | BBB | 2 | BBB | 2 | BBB | 2 | BBB |
| | | | | | CCC | | CCC | | CCC |
| | | Line | | 4 | DDD | 4 | DDD | 4 | DDD |
| | | | ---- | | ---- | | ---- | | AAA |
| | | 2 | ---- | 6 | ---- | 6 | BBB | 6 | BBB |
| | CCC | | CCC | | CCC | | CCC | | CCC |
| Line | | 4 | DDD | 8 | DDD | 8 | DDD | 8 | DDD |
| | ---- | | ---- | | ---- | | ---- | | ---- |
| 2 | ---- | 6 | ---- | 10 | ---- | 10 | ---- | 10 | BBB |
| | ---- | | ---- | | ---- | | CCC | | CCC |
| 4 | DDD | 8 | DDD | 12 | DDD | 12 | DDD | 12 | DDD |
| | ---- | | ---- | | ---- | | ---- | | ---- |
| 6 | ---- | 10 | ---- | 14 | ---- | 14 | ---- | 14 | ---- |
| | ---- | | ---- | | ---- | | ---- | | CCC |
| 8 | ---- | 12 | ---- | 16 | ---- | 16 | DDD | 16 | DDD |
| | ---- | | ---- | | ---- | | ---- | | ---- |
| 10 | ---- | 14 | ---- | 18 | ---- | 18 | ---- | 18 | ---- |
| | ---- | | ---- | | ---- | | ---- | | ---- |
| 12 | ---- | 16 | ---- | 20 | ---- | 20 | ---- | 20 | DDD |
| | ---- | | ---- | | ---- | | ---- | | ---- |
| 14 | ---- | 18 | ---- | 22 | ---- | 22 | ---- | 22 | ---- |
| | ---- | | ---- | | ---- | | ---- | | ---- |
| 1080 | ---- | 1080 | ---- | 1080 | ---- | 1080 | ---- | 1080 | ---- |

FIG.17A   FIG.17B   FIG.17C   FIG.17D   FIG.17E

Scan Pass

| s269 | | s270 | | s271 | | s272 | | s273 | |
|---|---|---|---|---|---|---|---|---|---|
| Line | | Line | | Line | | Line | | Line | |
| 1060 | DDD | 1060 | DDD | 1064 | DDD | 1068 | DDD | 1072 | DDD |
| | AAA | | AAA | | AAA | | AAA | | AAA |
| 1062 | BBB | 1062 | BBB | 1066 | BBB | 1070 | BBB | 1074 | BBB |
| | CCC | | CCC | | CCC | | CCC | | CCC |
| 1064 | DDD | 1064 | DDD | 1068 | DDD | 1072 | DDD | 1076 | DDD |
| | ---- | | AAA | | AAA | | AAA | | AAA |
| 1066 | BBB | 1066 | BBB | 1070 | BBB | 1074 | BBB | 1078 | BBB |
| | CCC | | CCC | | CCC | | CCC | | CCC |
| 1068 | DDD | 1068 | DDD | 1072 | DDD | 1076 | DDD | 1080 | DDD |
| 1070 | ---- | 1070 | BBB | 1074 | BBB | 1078 | BBB | | BBB |
| | CCC | | CCC | | CCC | | CCC | | |
| 1072 | DDD | 1072 | DDD | 1076 | DDD | 1080 | DDD | | |
| 1074 | ---- | 1074 | ---- | 1078 | ---- | | CCC | | CCC |
| 1076 | DDD | 1076 | CCC | 1080 | CCC | | | | |
| | | | DDD | | DDD | | | | |
| 1078 | ---- | 1078 | ---- | | | | | | |
| 1080 | ---- | 1080 | DDD | | DDD | | DDD | | DDD |

```
         Scan Pass s3             Time t1                    Scan Pass s3              Time t3
Line      Dot              1   3   5                     Line    Dot             1   3   5   7
1                          o o o o o                     1                       o o o o o o o o
2                          o o o o o                     2                       o o o o o o o o
3    Ba         Ga      Ra o o o o o                     3   Ba        Ga     Ra o o o o o o o o
4                          o o o o o                     4                       o o o o o o o o
5                          o o o o o                     5                       o o o o o o o o
6         Bb        Gb   Rb o o o o                      6        Bb       Gb  Rb Rb Rb o o o o
7                          o o o o o                     7                       o o o o o o o o
8                          o o o o o                     8                       o o o o o o o o
9    Bc         Gc      Rc o o o o o                     9   Bc        Gc     Rc o o o o o o o
10                         o o o o o                     10                      o o o o o o o o
11                         o o o o o                     11                      o o o o o o o o
12        Bd        Gd   Rd o o o o                      12       Bd       Gd  Rd Rd Rd o o o o
13                         o o o o o                     13                      o o o o o o o o

FIG. 30A                                                 FIG. 30B

Scan Pass s3             Time t5                    Scan Pass s3              Time t11
Line      Dot              1   3   5   7   9             Line  1    3    5    7    9   11   13   15
1                          o o o o o o o o o             1     o o o o o o o o o o o o o o o o
2                          o o o o o o o o o             2     o o o o o o o o o o o o o o o o
3    Ba         Ga      Ra Ra Ra o o o o o o             3  B-R GR GR GR GR Ra Ra Ra Ra o o o o o o o
4                          o o o o o o o o o             4     o o o o o o o o o o o o o o o o
5                          o o o o o o o o o             5     o o o o o o o o o o o o o o o o
6         Bb           GR Rb Rb Rb Rb o o o o            6  B-R B-R B-R GR GR GR GR Rb Rb Rb Rb o o o o
7                          o o o o o o o o o             7     o o o o o o o o o o o o o o o o
8                          o o o o o o o o o             8     o o o o o o o o o o o o o o o o
9    Bc         Gc      Rc Rc Rc o o o o o o             9  B-R GR GR GR GR Rc Rc Rc Rc o o o o o o
10                         o o o o o o o o o             10    o o o o o o o o o o o o o o o o
11                         o o o o o o o o o             11    o o o o o o o o o o o o o o o o
12        Bd           GR Rd Rd Rd Rd o o o o            12 B-R B-R B-R GR GR GR GR Rd Rd Rd Rd o o o o
13                         o o o o o o o o o             13    o o o o o o o o o o o o o o o o

FIG. 30C                                                 FIG. 30D

Scan Pass s3             Time t1920                 Scan Pass s3              Time t1930
Line  1908 1910 1912 1914 1916 1918 1920                 Line     1918  1920
1     o o o o o o o o o o o o o o                        1     o o o o
2     o o o o o o o o o o o o o o                        2     o o o o
3  B-R B-R B-R GR GR GR GR Ra Ra Ra Ra o o               3  B-R B-R B-R B-R        Ga          Ra
4     o o o o o o o o o o o o o o                        4     o o o o
5     o o o o o o o o o o o o o o                        5     o o o o
6  B-R B-R B-R B-R B-R GR GR GR GR Rb Rb Rb Rb           6  B-R B-R B-R B-R    Bb          Gb         Rb
7     o o o o o o o o o o o o o o                        7     o o o o
8     o o o o o o o o o o o o o o                        8     o o o o
9  B-R B-R B-R GR GR GR GR Rc Rc Rc Rc o o               9  B-R B-R B-R B-R        Gc          Rc
10    o o o o o o o o o o o o o o                        10    o o o o
11    o o o o o o o o o o o o o o                        11    o o o o
12 B-R B-R B-R B-R B-R GR GR GR GR Rd Rd Rd Rd           12 B-R B-R B-R B-R    Bd          Gd         Rd
13    o o o o o o o o o o o o o o                        13    o o o o

| | s270 | | s271 | | s272 | | s273 | | s274 | | s277 | | s280 | | s281 |
|---|---|---|---|---|---|---|---|---|---|---|---|---|---|---|---|
| 1032 | DDDD<br>CCCC | 1036 | DDDD<br>CCCC | 1040 | DDDD<br>CCCC | 1044 | DDDD<br>CCCC | 1048 | DDDD<br>CCCC | 1060 | DDDD<br>CCCC | 1072 | DDDD<br>CCCC | 1076 | DDDD<br>CCCC |
| 1034 | BBBB<br>AAAA | 1038 | BBBB<br>AAAA | 1042 | BBBB<br>AAAA | 1046 | BBBB<br>AAAA | 1050 | BBBB<br>AAAA | 1062 | BBBB<br>AAAA | 1074 | BBBB<br>AAAA | 1078 | BBBB<br>AAAA |
| 1036 | DDDD<br>CCCC | 1040 | DDDD<br>CCCC | 1044 | DDDD<br>CCCC | 1048 | DDDD<br>CCCC | 1052 | DDDD<br>CCCC | 1064 | DDDD<br>CCCC | 1076 | DDDD<br>CCCC | 1080 | DDDD<br>o |
| 1038 | BBBB | 1042 | BBBB | 1046 | BBBB | 1050 | BBBB | 1054 | BBBB | 1066 | BBBB | 1078 | BBBB | | o |
| | ----- | | ----- | | ----- | | ----- | | ----- | | ----- | | ----- | | o |
| 1040 | DDDD<br>CCCC | 1044 | DDDD<br>CCCC | 1048 | DDDD<br>CCCC | 1052 | DDDD<br>CCCC | 1056 | DDDD<br>CCCC | 1068 | DDDD<br>CCCC | 1080 | DDDD<br>o | | o |
| 1042 | BBBB | 1046 | BBBB | 1050 | BBBB | 1054 | BBBB | 1058 | BBBB | 1070 | BBBB | | o | | o |
| | ----- | | ----- | | ----- | | ----- | | ----- | | ----- | | o | | o |
| 1044 | DDDD<br>CCCC | 1048 | DDDD<br>CCCC | 1052 | DDDD<br>CCCC | 1056 | DDDD<br>CCCC | 1060 | DDDD<br>CCCC | 1072 | DDDD<br>CCCC | | o | | o |
| 1046 | BBBB | 1050 | BBBB | 1054 | BBBB | 1058 | BBBB | 1062 | BBBB | 1074 | BBBB | | o | | o |
| | ----- | | ----- | | ----- | | ----- | | ----- | | ----- | | o | | o |
| 1048 | DDDD<br>CCCC | 1052 | DDDD<br>CCCC | 1056 | DDDD<br>CCCC | 1060 | DDDD<br>CCCC | 1064 | DDDD<br>CCCC | 1076 | DDDD<br>CCCC | | o | | o |
| 1050 | BBBB | 1054 | BBBB | 1058 | BBBB | 1062 | BBBB | 1066 | BBBB | 1078 | BBBB | | BBBB<br>o | | BBBB<br>o |
| 1052 | DDDD<br>CCCC | 1056 | DDDD<br>CCCC | 1060 | DDDD<br>CCCC | 1064 | DDDD<br>CCCC | 1068 | DDDD<br>CCCC | 1080 | DDDD | | o | | o |
| 1054 | ----- | 1058 | ----- | 1062 | ----- | 1066 | ----- | 1070 | ----- | | ----- | | o | | o |
| | | | | | | | | | | | | | o | | o |
| 1056 | DDDD<br>CCCC | 1060 | DDDD<br>CCCC | 1064 | DDDD<br>CCCC | 1068 | DDDD<br>CCCC | 1072 | DDDD<br>CCCC | | DDDD<br>CCCC | | o | | o |
| 1058 | ----- | 1062 | ----- | 1066 | ----- | 1070 | ----- | 1074 | ----- | | ----- | | o | | o |
| | | | | | | | | | | | | | o | | o |
| 1060 | DDDD<br>CCCC | 1064 | DDDD<br>CCCC | 1068 | DDDD<br>CCCC | 1072 | DDDD<br>CCCC | 1076 | DDDD<br>CCCC | | DDDD | | o | | o |
| 1062 | ----- | 1066 | ----- | 1070 | ----- | 1074 | ----- | 1078 | ----- | | | | o | | o |
| | | | | | | | | | | | | | o | | o |
| 1064 | DDDD<br>CCCC | 1068 | DDDD<br>CCCC | 1072 | DDDD<br>CCCC | 1076 | DDDD<br>CCCC | 1080 | DDDD<br>CCCC | | o<br>CCCC | | o<br>CCCC | | o<br>CCCC |
| 1066 | ----- | 1070 | ----- | 1074 | ----- | 1078 | ----- | | | | o | | o | | o |
| 1068 | DDDD | 1072 | DDDD | 1076 | DDDD | 1080 | DDDD | | o | | o | | o | | o |
| 1070 | ----- | 1074 | ----- | 1078 | ----- | | | | o | | o | | o | | o |
| 1072 | DDDD | 1076 | DDDD | 1080 | DDDD | | o | | o | | o | | o | | o |
| 1074 | ----- | 1078 | ----- | | | | o | | o | | o | | o | | o |
| 1076 | DDDD | 1080 | DDDD | | o | | o | | o | | o | | o | | o |
| 1078 | ----- | | o | | o | | o | | o | | o | | o | | o |
| 1080 | DDDD | | DDDD | | DDDD | | DDDD | | DDDD | | DDDD | | DDDD | | DDDD |
| | 33I | | 33J | | 33K | | 33L | | 33M | | 33N | | 33O | | 33P |

| s270 | s271 | s272 | s274 | s275 | s278 | s281 | s282 |
|---|---|---|---|---|---|---|---|
| 1026 AAAA BBBB 1030 CCCC 1028 DDDD 1032 | 1030 AAAA BBBB 1034 CCCC 1032 DDDD 1036 | 1034 AAAA BBBB 1038 CCCC 1036 DDDD 1040 | 1042 AAAA BBBB 1046 CCCC 1044 DDDD 1048 | 1046 AAAA BBBB 1050 CCCC 1048 DDDD 1052 | 1058 AAAA BBBB 1062 CCCC 1060 DDDD 1064 | 1070 AAAA BBBB 1074 CCCC 1072 DDDD 1076 | 1074 AAAA BBBB 1078 CCCC 1076 DDDD 1080 |
| 1030 AAAA BBBB 1034 CCCC 1032 DDDD 1036 | 1034 AAAA BBBB 1038 CCCC 1036 DDDD 1040 | 1038 AAAA BBBB 1042 CCCC 1040 DDDD 1044 | 1046 AAAA BBBB 1050 CCCC 1048 DDDD 1052 | 1050 AAAA BBBB 1054 CCCC 1052 DDDD 1056 | 1062 AAAA BBBB 1066 CCCC 1064 DDDD 1068 | 1074 AAAA BBBB 1078 CCCC 1076 DDDD 1080 | 1078 AAAA BBBB CCCC DDDD o |
| 1034 ----- BBBB 1038 CCCC 1036 DDDD 1040 | 1038 ----- BBBB 1042 CCCC 1040 DDDD 1044 | 1042 ----- BBBB 1046 CCCC 1044 DDDD 1048 | 1050 ----- BBBB 1054 CCCC 1052 DDDD 1056 | 1054 ----- BBBB 1058 CCCC 1056 DDDD 1060 | 1066 ----- BBBB 1070 CCCC 1068 DDDD 1072 | 1078 ----- BBBB CCCC DDDD 1080 | BBBB CCCC DDDD o o |
| 1038 ----- BBBB 1042 CCCC 1040 DDDD 1044 | 1042 BBBB 1046 CCCC DDDD 1048 | 1046 BBBB 1054 CCCC DDDD 1056 | 1054 BBBB 1058 CCCC DDDD 1060 | 1058 BBBB 1070 CCCC DDDD 1072 | BBBB CCCC DDDD | o o o | o o o |
| 1042 BBBB 1046 CCCC 1044 DDDD 1048 | 1046 BBBB 1050 CCCC 1048 DDDD 1052 | 1050 BBBB 1058 CCCC DDDD 1060 | 1058 BBBB 1062 CCCC DDDD 1064 | 1062 BBBB 1074 CCCC DDDD 1076 | 1074 BBBB CCCC DDDD | o o o | o o o |
| 1046 BBBB 1050 CCCC 1048 DDDD 1052 | 1050 BBBB 1054 CCCC 1052 DDDD 1056 | 1054 BBBB 1062 CCCC DDDD 1064 | 1062 BBBB 1066 CCCC DDDD 1068 | 1066 BBBB 1078 CCCC DDDD 1080 | 1078 BBBB CCCC DDDD | BBBB o o | BBBB o o |
| 1050 ----- 1054 CCCC 1052 DDDD 1056 | 1054 ----- 1058 CCCC 1056 DDDD 1060 | 1058 ----- 1066 CCCC DDDD 1068 | 1066 ----- 1070 CCCC DDDD 1072 | 1070 ----- CCCC DDDD | CCCC DDDD | o o o | o o o |
| 1054 ----- 1058 CCCC 1056 DDDD 1060 | 1058 ----- 1062 CCCC 1060 DDDD 1064 | 1062 ----- CCCC DDDD 1072 | 1070 ----- 1074 CCCC DDDD 1076 | 1074 ----- CCCC DDDD | CCCC | o o | o o |
| 1058 ----- 1062 CCCC DDDD 1064 | 1062 ----- 1066 CCCC DDDD 1068 | 1066 ----- 1074 CCCC DDDD 1076 | 1074 ----- 1078 CCCC DDDD 1080 | 1078 ----- CCCC DDDD | o o o | o o o | o o o |
| 1062 ----- CCCC 1064 DDDD 1068 | 1066 ----- CCCC 1072 DDDD | 1070 ----- CCCC 1080 DDDD | 1078 ----- CCCC DDDD | CCCC o | CCCC o | CCCC o | CCCC o |
| 1066 ----- 1070 DDDD 1072 | 1070 ----- 1074 DDDD 1076 | 1074 ----- DDDD | o o o | o o o | o o o | o o o | o o o |
| 1070 ----- 1074 DDDD 1076 | 1074 ----- 1078 DDDD 1080 | 1078 ----- DDDD | o o | o o | o o | o o | o o |
| 1074 ----- 1078 | 1078 ----- o | o o | o | o | o | o | o |
| 1076 DDDD 1080 | DDDD o | o | o | o | o | o | o |
| 1078 ----- | o | o | o | o | o | o | o |
| 1080 DDDD | DDDD | DDDD | DDDD | DDDD | DDDD | DDDD | DDDD |
| 34I | 34J | 34K | 34L | 34M | 34N | 34O | 34P |

| s1 | s2 | s3 | s4 | s5 | s6 | s7 | s8 |
|---|---|---|---|---|---|---|---|
| AAAA | AAAA | AAAA | AAAA | AAAA | AAAA | AAAA | 2 AAAA |
| o | o | o | o | o | o | o | 4 BBBB |
| o | o | o | o | o | o | 2 CCCC | 6 CCCC |
| o | o | o | o | o | o | 4 BBBB | 8 BBBB |
| o | o | o | o | o | 2 CCCC | 6 CCCC | 10 CCCC |
| o | o | o | o | o | 4 BBBB | 8 BBBB | 12 BBBB |
| BBBB | BBBB | BBBB | BBBB | BBBB | 4 BBBB | 8 BBBB | 12 BBBB |
| o | o | o | o | 2 CCCC | 6 CCCC | 10 CCCC | 14 CCCC |
| o | o | o | o | 4 DDDD | 8 DDDD | 12 DDDD | 16 DDDD |
| o | o | o | 2 CCCC | 6 CCCC | 10 CCCC | 14 CCCC | 18 CCCC |
| o | o | o | 4 DDDD | 8 DDDD | 12 DDDD | 16 DDDD | 20 DDDD |
| CCCC | CCCC | 2 CCCC | 6 CCCC | 10 CCCC | 14 CCCC | 18 CCCC | 22 CCCC |
| o | o | 4 DDDD | 8 DDDD | 12 DDDD | 16 DDDD | 20 DDDD | 24 DDDD |
| o | 2 | 6 | 10 | 14 | 18 | 22 | 26 |
| o | 4 DDDD | 8 DDDD | 12 DDDD | 16 DDDD | 20 DDDD | 24 DDDD | 28 DDDD |
| 2 | 6 | 10 | 14 | 18 | 22 | 26 | 30 |
| 4 DDDD | 8 DDDD | 12 DDDD | 16 DDDD | 20 DDDD | 24 DDDD | 28 DDDD | 32 DDDD |
| 6 | 10 | 14 | 18 | 22 | 26 | 30 | 34 |
| 8 | 12 | 16 | 20 | 24 | 28 | 32 | 36 |
| 37A | 37B | 37C | 37D | 37E | 37F | 37G | 37H |

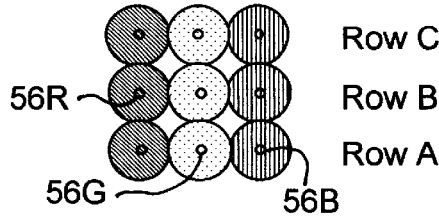

FIG. 39

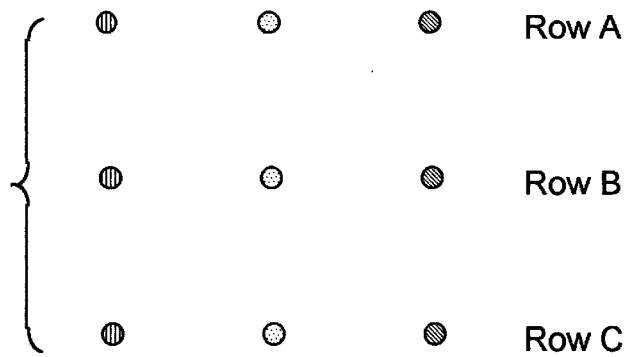

FIG. 39S

| s1 | s2 | s3 | s4 | s359 | s360 | s361 | s362 |
|---|---|---|---|---|---|---|---|
| AAAA | | | | 1066 AAAA | 1066 AAAA | 1068 CCCC | 1068 CCCC |
| o | | | | BBBB | BBBB | AAAA | AAAA |
| o | AAAA | | | 1068 CCCC | 1068 CCCC | 1070 BBBB | 1070 BBBB |
| o | o | | | AAAA | AAAA | CCCC | CCCC |
| BBBB | o | AAAA | AAAA | 1070 BBBB | 1070 BBBB | 1072 AAAA | 1072 AAAA |
| o | o | o | o | CCCC | CCCC | BBBB | BBBB |
| 2 ----- | 2 BBBB | 2 BBBB | 2 BBBB | 1072 ----- | 1072 AAAA | 1074 CCCC | 1074 CCCC |
| CCCC | CCCC | CCCC | CCCC | BBBB | BBBB | AAAA | AAAA |
| 4 ----- | 4 ----- | 4 ----- | 4 AAAA | 1074 CCCC | 1074 CCCC | 1076 BBBB | 1076 BBBB |
| | | BBBB | BBBB | | | CCCC | CCCC |
| 6 ----- | 6 CCCC | 6 CCCC | 6 CCCC | 1076 ----- | 1076 BBBB | 1078 ----- | 1078 AAAA |
| ----- | ----- | ----- | ----- | CCCC | CCCC | BBBB | BBBB |
| 40A | 8 ----- | 8 ----- | 8 BBBB | 1078 ----- | 1078 ----- | 1080 CCCC | 1080 CCCC |
| | 10 ----- | CCCC | CCCC | 1080 ----- | 1080 CCCC | o | o |
| | | 10 ----- | 10 ----- | 40E | 40F | o | BBBB |
| | 40B | 12 ----- | 12 CCCC | | | CCCC | o |
| | | ----- | ----- | | | 40G | o |
| | | 40C | 14 ----- | | | | CCCC |
| | | | 40D | | | | 40H |

Scan Pass s6                         time t1920

| Line | 1896 | 1898 | 1900 | 1902 | 1904 | 1906 | 1908 | 1910 | 1912 | 1914 | 1916 | 1918 | 1920 | | | | | | | | | | | | |
|---|---|---|---|---|---|---|---|---|---|---|---|---|---|---|---|---|---|---|---|---|---|---|---|---|---|
| 1 | ⊛ | ⊛ | ⊛ | ⊛ | ⊛ | * | * | * | * | × | × | × | × | ○ | ○ | ○ | ○ | ○ | ○ | ○ | ○ | ○ | ○ | ○ | ○ |
| 2 | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | * | * | * | * | × | × | × | × |
| 3 | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ |
| 22 | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ |
| 23 | ⊛ | ⊛ | ⊛ | ⊛ | ⊛ | * | * | * | * | × | × | × | × | ○ | ○ | ○ | ○ | ○ | ○ | ○ | ○ | ○ | ○ | ○ | ○ |
| 24 | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | * | * | * | * | × | × | × | × |
| 25 | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ |

FIG. 48F

Scan Pass s6                         time t1924

| Line | 1900 | 1902 | 1904 | 1906 | 1908 | 1910 | 1912 | 1914 | 1916 | 1918 | 1920 | | | | | | | | | | |
|---|---|---|---|---|---|---|---|---|---|---|---|---|---|---|---|---|---|---|---|---|---|
| 1 | ⊛ | ⊛ | ⊛ | ⊛ | ⊛ | * | * | * | * | × | × | × | × | ○ | ○ | ○ | ○ | ○ | ○ | ○ | ○ |
| 2 | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | * | * | * | ✕ |
| 3 | ○ | ○ | ○ | ○ | ○ | ○ | ○ | ○ | ○ | ○ | ○ | ○ | ○ | ○ | ○ | ○ | ○ | ○ | ○ | ○ | |
| 22 | ○ | ○ | ○ | ○ | ○ | ○ | ○ | ○ | ○ | ○ | ○ | ○ | ○ | ○ | ○ | ○ | ○ | ○ | ○ | ○ | |
| 23 | ⊛ | ⊛ | ⊛ | ⊛ | ⊛ | * | * | * | * | × | × | × | × | ○ | ○ | ○ | ○ | ○ | ○ | ○ | |
| 24 | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | * | * | * | ✕ |
| 25 | ○ | ○ | ○ | ○ | ○ | ○ | ○ | ○ | ○ | ○ | ○ | ○ | ○ | ○ | ○ | ○ | ○ | ○ | ○ | ○ | |

FIG. 48G

Scan Pass s6                         time t1928

| Line | 1904 | 1906 | 1908 | 1910 | 1912 | 1914 | 1916 | 1918 | 1920 | | | | | | | | | | |
|---|---|---|---|---|---|---|---|---|---|---|---|---|---|---|---|---|---|---|---|
| 1 | ⊛ | ⊛ | ⊛ | ⊛ | ⊛ | * | * | * | * | × | × | × | × | ○ | ○ | ○ | ○ | | |
| 2 | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | ✛ | ✕ |
| 3 | ○ | ○ | ○ | ○ | ○ | ○ | ○ | ○ | ○ | ○ | ○ | ○ | ○ | ○ | ○ | ○ | ○ | | |
| 22 | ○ | ○ | ○ | ○ | ○ | ○ | ○ | ○ | ○ | ○ | ○ | ○ | ○ | ○ | ○ | ○ | ○ | | |
| 23 | ⊛ | ⊛ | ⊛ | ⊛ | ⊛ | * | * | * | * | × | × | × | × | ○ | ○ | ○ | ○ | | |
| 24 | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | ⊛ | ✛ | ✕ |
| 25 | ○ | ○ | ○ | ○ | ○ | ○ | ○ | ○ | ○ | ○ | ○ | ○ | ○ | ○ | ○ | ○ | ○ | | |

FIG. 48H

Scan Pass s6                         time t1932

| Line | 1908 | 1910 | 1912 | 1914 | 1916 | 1918 | 1920 | | | | | | |
|---|---|---|---|---|---|---|---|---|---|---|---|---|---|
| 1 | ⊛ | ⊛ | ⊛ | ⊛ | ⊛ | * | * | * | * | × | × | × | × |
| 2 | ⊛ | ⊛ | ⊛ | ⊛ | ⊛ | ⊛ | ⊛ | ⊛ | ⊛ | ⊛ | ⊛ | ⊛ | ⊛ | ○ | ✛ | ✕ |
| 3 | ○ | ○ | ○ | ○ | ○ | ○ | ○ | ○ | ○ | ○ | ○ | ○ | ○ |
| 22 | ○ | ○ | ○ | ○ | ○ | ○ | ○ | ○ | ○ | ○ | ○ | ○ | ○ |
| 23 | ⊛ | ⊛ | ⊛ | ⊛ | ⊛ | * | * | * | * | × | × | × | × |
| 24 | ⊛ | ⊛ | ⊛ | ⊛ | ⊛ | ⊛ | ⊛ | ⊛ | ⊛ | ⊛ | ⊛ | ⊛ | ⊛ | ○ | ✛ | ✕ |
| 25 | ○ | ○ | ○ | ○ | ○ | ○ | ○ | ○ | ○ | ○ | ○ | ○ | ○ |

FIG. 48I

Scan Pass s6                         time t1940

| Line | 1916 | 1918 | 1920 | | | | | |
|---|---|---|---|---|---|---|---|---|
| 1 | ⊛ | ⊛ | ⊛ | ⊛ | ⊛ | ✛ | ✕ | |
| 2 | ⊛ | ⊛ | ⊛ | ⊛ | ⊛ | | | ○ | ✛ | ✕ |
| 3 | ○ | ○ | ○ | ○ | ○ | | | |
| 22 | ○ | ○ | ○ | ○ | ○ | | | |
| 23 | ⊛ | ⊛ | ⊛ | ⊛ | ⊛ | ✛ | ✕ | |
| 24 | ⊛ | ⊛ | ⊛ | ⊛ | ⊛ | | | ○ | ✛ | ✕ |
| 25 | ○ | ○ | ○ | ○ | ○ | | | |

FIG. 48J

| s1 | s2 | s3 | s4 | s5 | s216 | s217 | s218 | s219 | s220 |
|---|---|---|---|---|---|---|---|---|---|
| AAA | | | | | 1054 ---- | 1054 ---- | 1054 ---- | 1054 ---- | 1054 ---- |
| ∘ | | | | | ---- | ---- | ---- | ---- | ---- |
| ∘ | | | | | 1056 AAA | 1056 AAA | 1056 AAA | 1056 AAA | 1056 AAA |
| ∘ | | | | | BBB | BBB | BBB | BBB | BBB |
| ∘ | | | | | 1058 CCC | 1058 CCC | 1058 CCC | 1058 CCC | 1058 CCC |
| ∘ | AAA | | | | DDD | DDD | DDD | DDD | DDD |
| BBB | ∘ | | | | 1060 EEE | 1060 EEE | 1060 EEE | 1060 EEE | 1060 EEE |
| ∘ | ∘ | | | | ---- | AAA | AAA | AAA | AAA |
| ∘ | ∘ | | | | 1062 BBB | 1062 BBB | 1062 BBB | 1062 BBB | 1062 BBB |
| ∘ | ∘ | AAA | | | CCC | CCC | CCC | CCC | CCC |
| ∘ | BBB | ∘ | | | 1064 DDD | 1064 DDD | 1064 DDD | 1064 DDD | 1064 DDD |
| CCC | ∘ | ∘ | | | EEE | EEE | EEE | EEE | EEE |
| ∘ | ∘ | ∘ | | | 1066 ---- | 1066 ---- | 1066 AAA | 1066 AAA | 1066 AAA |
| ∘ | ∘ | ∘ | AAA | | ---- | BBB | BBB | BBB | BBB |
| ∘ | ∘ | ∘ | ∘ | | 1068 CCC | 1068 CCC | 1068 CCC | 1068 CCC | 1068 CCC |
| ∘ | ∘ | BBB | ∘ | | DDD | DDD | DDD | DDD | DDD |
| ∘ | CCC | ∘ | ∘ | | 1070 EEE | 1070 EEE | 1070 EEE | 1070 EEE | 1070 EEE |
| DDD | ∘ | ∘ | ∘ | | ---- | ---- | ---- | AAA | AAA |
| ∘ | ∘ | ∘ | ∘ | AAA | 1072 ---- | 1072 ---- | 1072 BBB | 1072 BBB | 1072 BBB |
| ---- | ---- | ---- | ---- | ∘ | ---- | CCC | CCC | CCC | CCC |
| 2 ---- | 2 ---- | 2 ---- | 2 BBB | 2 CCC | 1074 DDD | 1074 DDD | 1074 DDD | 1074 DDD | 1074 DDD |
| ---- | ---- | CCC | CCC | CCC | EEE | EEE | EEE | EEE | EEE |
| 4 ---- | 4 DDD | 4 DDD | 4 DDD | 4 DDD | 1076 ---- | 1076 ---- | 1076 ---- | 1076 ---- | 1076 AAA |
| EEE | EEE | EEE | EEE | EEE | ---- | ---- | ---- | BBB | BBB |
| 6 ---- | 6 ---- | 6 ---- | 6 ---- | 6 ---- | 1078 ---- | 1078 ---- | 1078 CCC | 1078 CCC | 1078 CCC |
| ---- | ---- | ---- | ---- | BBB | ---- | DDD | DDD | DDD | DDD |
| 8 ---- | 8 ---- | 8 ---- | 8 CCC | 8 CCC | 1080 EEE | 1080 EEE | 1080 EEE | 1080 EEE | 1080 EEE |
| ---- | ---- | DDD | DDD | DDD | ∘ | ∘ | ∘ | ∘ | ∘ |
| 10 ---- | 10 EEE | 10 EEE | 10 EEE | 10 EEE | 50F | ∘ | ∘ | CCC | BBB |
| ---- | ---- | ---- | ---- | ---- | | ∘ | DDD | ∘ | ∘ |
| 12 ---- | 12 ---- | 12 ---- | 12 ---- | 12 ---- | | EEE | ∘ | ∘ | ∘ |
| | | ---- | ---- | CCC | | | ∘ | ∘ | ∘ |
| 50A | 50B | 14 ---- | 14 DDD | 14 DDD | 50G | | ∘ | ∘ | CCC |
| | | EEE | EEE | EEE | | | EEE | DDD | ∘ |
| | | 16 ---- | 16 ---- | 16 ---- | | | | ∘ | ∘ |
| | | ---- | ---- | ---- | | | 50H | ∘ | ∘ |
| | | 18 ---- | 18 ---- | 18 ---- | | | | ∘ | DDD |
| | | ---- | ---- | DDD | | | | EEE | ∘ |
| | | 20 ---- | 20 EEE | 20 EEE | | | | | ∘ |
| | | ---- | ---- | ---- | | | | 50I | ∘ |
| | | 22 ---- | 22 ---- | 22 ---- | | | | | ∘ |
| | | | | ---- | | | | | EEE |
| | | 50C | 50D | 24 ---- | | | | | |
| | | | | EEE | | | | | 50J |
| | | | | 26 ---- | | | | | |
| | | | | ---- | | | | | |
| | | | | 50E | | | | | |

```
       Scan Pass s3              Time t1                    Scan Pass s3             Time t3
 Line        Dot              1   3                    Line       Dot             1   3   5
  1                           o o o                     1                         o o o o o
  2                           o o o                     2                         o o o o o
  3    Ba           Ra     Ga o o o                     3   Ba          Ra     Ga o o o o o
  4                           o o o                     4                         o o o o o
  5                           o o o                     5                         o o o o o
  6    Rb      Gb          Bb o o                       6   Rb      Gb        Bb Bb Bb o o
  7                           o o o                     7                         o o o o o
  8                           o o o                     8                         o o o o o
  9 Gc      Bc             Rc o o o                     9 Gc     Bc            Rc o o o o
 10                           o o o                    10                         o o o o o
 11                           o o o                    11                         o o o o o
 12    Rd          Gd     Bd o o                       12   Rd        Gd     Bd Bd Bd o o
 13                           o o o                    13                         o o o o o
```
FIG. 58A                                          # FIG. 58B

```
       Scan Pass s3              Time t5                    Scan Pass s3             Time t9
 Line        Dot            1   3   5   7              Line       Dot          1  3  5  7  9 11
  1                         o o o o o o o               1                      o o o o o o o o o o o
  2                         o o o o o o o               2                      o o o o o o o o o o o
  3    Ba           Ra   Ga Ga Ga o o o o               3  Ba              RGRG Ra Ga Ga Ga Ga o o o o
  4                         o o o o o o o               4                      o o o o o o o o o o o
  5                         o o o o o o o               5                      o o o o o o o o o o o
  6    Rb      Gb       Bb Bb Bb Bb Bb o o              6  Rb             Gb Bb Bb Bb Bb Bb Bb Bb Bb o o
  7                         o o o o o o o               7                      o o o o o o o o o o o
  8                         o o o o o o o               8                      o o o o o o o o o o o
  9 Gc      Bc          Rc Rc Rc o o o o                9 Gc    Bc         Rc Rc Rc Rc Rc Rc Rc o o o o
 10                         o o o o o o o              10                      o o o o o o o o o o o
 11                         o o o o o o o              11                      o o o o o o o o o o o
 12    Rd            Gd Bd Bd Bd Bd o o                12   Rd           GBGBGBGBGd Bd Bd Bd Bd o o o
 13                         o o o o o o o              13                      o o o o o o o o o o o
```
FIG. 58C                                          # FIG. 58D

```
       Scan Pass s3              Time t13                   Scan Pass s3             Time t15
 Line        1  3  5  7  9 11 13 15                    Line   1  3  5  7  9 11 13 15 17
  1          o o o o o o o o o o o o o o o               1   o o o o o o o o o o o o o o o o o
  2          o o o o o o o o o o o o o o o               2   o o o o o o o o o o o o o o o o o
  3  Ba  RGRGRGRGRGRG Ra Ga Ga Ga Ga o o o o             3 Ba RGRGRGRGRGRGRG Ra Ga Ga Ga Ga o o o o
  4          o o o o o o o o o o o o o o o               4   o o o o o o o o o o o o o o o o o
  5          o o o o o o o o o o o o o o o               5   o o o o o o o o o o o o o o o o o
  6     RbGBGBGBGb Bb Bb Bb Bb Bb Bb Bb Bb o o           6  X  X RbGBGBGBGb Bb Bb Bb Bb Bb Bb Bb Bb o o
  7          o o o o o o o o o o o o o o o               7   o o o o o o o o o o o o o o o o o
  8          o o o o o o o o o o o o o o o               8   o o o o o o o o o o o o o o o o o
  9 Gc  BRBR Bc Rc Rc Rc Rc Rc Rc Rc Rc o o o o          9 Gc BRBRBR Bc Rc Rc Rc Rc Rc Rc Rc Rc o o o o
 10          o o o o o o o o o o o o o o o              10   o o o o o o o o o o o o o o o o o
 11          o o o o o o o o o o o o o o o              11   o o o o o o o o o o o o o o o o o
 12     RdGBGBGBGBGBGBGBGd Bd Bd Bd Bd o o              12  X  X RdGBGBGBGBGBGBGBGd Bd Bd Bd Bd o o
 13          o o o o o o o o o o o o o o o              13   o o o o o o o o o o o o o o o o o
```
FIG. 58E                                          # FIG. 58F

```
  Scan Pass s3            Time t1920
Line  1904 1906 1908 1910 1912 1914 1916 1918 1920
 1     o    o    o    o    o    o    o    o    o
 2     o    o    o    o    o    o    o    o    o
 3     X    X    BaRGRGRGRGRGRGRGRG Ra Ga Ga Ga Ga  o  o
 4     o    o    o    o    o    o    o    o    o
 5     o    o    o    o    o    o    o    o    o
 6     X    X    X    X    RbGBGBGBGb Bb Bb Bb Bb Bb Bb Bb Bb
 7     o    o    o    o    o    o    o    o    o
 8     o    o    o    o    o    o    o    o    o
 9     X    X    GcBRBRBR Bc Rc Rc Rc Rc Rc Rc Rc Rc  o  o
10     o    o    o    o    o    o    o    o    o
11     o    o    o    o    o    o    o    o    o
12     X    X    X    X    RdGBGBGBGBGBGBGBGd Bd Bd Bd Bd
13     o    o    o    o    o    o    o    o    o
```

FIG. 59A

```
  Scan Pass s3            Time t1922
Line  1906 1908 1910 1912 1914 1916 1918 1920
 1     o    o    o    o    o    o    o    o
 2     o    o    o    o    o    o    o    o
 3     X    X    BaRGRGRGRGRGRGRG Ra Ga Ga Ga Ga
 4     o    o    o    o    o    o    o    o
 5     o    o    o    o    o    o    o    o
 6     X    X    X    X    RbGBGBGBGb Bb Bb Bb Bb Bb Bb   Bb
 7     o    o    o    o    o    o    o    o
 8     o    o    o    o    o    o    o    o
 9     X    X    GcBRBRBR Bc Rc Rc Rc Rc Rc Rc Rc Rc
10     o    o    o    o    o    o    o    o
11     o    o    o    o    o    o    o    o
12     X    X    X    X    RdGBGBGBGBGBGBGBGd Bd Bd   Bd
13     o    o    o    o    o    o    o    o
```

FIG. 59B

```
  Scan Pass s3            Time t1926
Line  1910 1912 1914 1916 1918 1920
 1     o    o    o    o    o    o
 2     o    o    o    o    o    o
 3     X    X    BaRGRGRGRGRGRGRG Ra           Ga
 4     o    o    o    o    o    o
 5     o    o    o    o    o    o
 6     X    X    X    X    RbGBGBGBGb Bb Bb                Bb
 7     o    o    o    o    o    o
 8     o    o    o    o    o    o
 9     X    X    GcBRBRBR Bc Rc Rc Rc Rc           Rc
10     o    o    o    o    o    o
11     o    o    o    o    o    o
12     X    X    X    X    RdGBGBGBGBGBGB Gd            Bd
13     o    o    o    o    o    o
```

FIG. 59C

```
  Scan Pass s3            Time t1930
Line  1914 1916 1918 1920
 1     o    o    o    o
 2     o    o    o    o
 3     X    X    BaRGRGRGRG        Ra          Ga
 4     o    o    o    o
 5     o    o    o    o
 6     X    X    X    X    RbGBGB        Gb                Bb
 7     o    o    o    o
 8     o    o    o    o
 9     X    X    GcBRBRBR Bc                    Rc
10     o    o    o    o
11     o    o    o    o
12     X    X    X    X    RdGBGB                Gd        Bd
13     o    o    o    o
```

FIG. 59D

```
  Scan Pass s3            Time t1932
Line  1916 1918 1920
 1     o    o    o
 2     o    o    o
 3     X    X    BaRGRG         Ra          Ga
 4     o    o    o
 5     o    o    o
 6     X    X    X    Rb          Gb              Bb
 7     o    o    o
 8     o    o    o
 9     X    X    GcBRBR Bc               Rc
10     o    o    o
11     o    o    o
12     X    X    X    Rd              Gd          Bd
13     o    o    o
```

FIG. 59E

```
  Scan Pass s3            Time t1934
Line  1918 1920
 1     o    o
 2     o    o
 3     X    X    Ba          Ra          Ga
 4     o    o
 5     o    o
 6     X    X    X    Rb          Gb              Bb
 7     o    o
 8     o    o
 9     X    X    Gc              Bc              Rc
10     o    o
11     o    o
12     X    X    X    Rd              Gd          Bd
13     o    o
```

FIG. 59F

Blue  Green  Red

Scan Pass s3                                                          Time t1920
Line Dot 1888 1890 1892 1894 1896 1898 1900 1902 1904 1906 1908 1910 1912 1914 1916 1918 1920
1        R  R  R  R  R  R  R  R  R  R  R  R  R  R  R  R  R  R  R  R  R  R  R  R  R  R  R  R  R  R  R  R  R Ra
2        G  G  G  G  G  G  G  G  G  G  G  G  G  G  G  G  G  G  G  G  G  G  G  G  G  G  G  G  G  G  G  G Ga  ∘  ∘  ∘
3        B  B  B  B  B  B  B  B  B  B  B  B  B  B  B  B  B  B  B  B  B  B  B  B  B  B  B  B  B  B  B Ba  ∘  ∘  ∘  ∘  ∘
4        R  R  R  R  R  R  R  R  R  R  R  R  R  R  R  R  R  R  R  R  R  R  R  R  R  R  R  R  R RRb ∘  ∘  ∘  ∘  ∘  ∘  ∘  ∘
5        G  G  G  G  G  G  G  G  G  G  G  G  G  G  G  G  G  G  G  G  G  G  G  G  G  G  G  GGb  ∘  ∘  ∘  ∘  ∘  ∘  ∘  ∘  ∘  ∘  ∘
6        B  B  B  B  B  B  B  B  B  B  B  B  B  B  B  B  B  B  B  B  B  B  B  B  B  BBb  ∘  ∘  ∘  ∘  ∘  ∘  ∘  ∘  ∘  ∘  ∘  ∘  ∘
7        R  R  R  R  R  R  R  R  R  R  R  R  R  R  R  R  R  R  R  R  R  R  R RRc  ∘  ∘  ∘  ∘  ∘  ∘  ∘  ∘  ∘  ∘  ∘  ∘  ∘  ∘  ∘
8        G  G  G  G  G  G  G  G  G  G  G  G  G  G  G  G  G  G  G  G  GGc  ∘  ∘  ∘  ∘  ∘  ∘  ∘  ∘  ∘  ∘  ∘  ∘  ∘  ∘  ∘  ∘  ∘
9        B  B  B  B  B  B  B  B  B  B  B  B  B  B  B  B  B  BBc  ∘  ∘  ∘  ∘  ∘  ∘  ∘  ∘  ∘  ∘  ∘  ∘  ∘  ∘  ∘  ∘  ∘  ∘  ∘
10       R  R  R  R  R  R  R  R  R  R  R  R  R  RRd  ∘  ∘  ∘  ∘  ∘  ∘  ∘  ∘  ∘  ∘  ∘  ∘  ∘  ∘  ∘  ∘  ∘  ∘  ∘  ∘  ∘  ∘
11       G  G  G  G  G  G  G  GGd  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘
12       Bd  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘
13       ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘  ∘

FIG. 70A

Scan Pass s3                      Time t1935
Line  1902 1904 1906 1908 1910 1912 1914 1916 1918 1920
1     R  R  R  R  R  R  R  R  R  R  R  R  R  R  R  R  R  R  R                        Ra
2     G  G  G  G  G  G  G  G  G  G  G  G  G  G  G  G  G  G                      Ga
3     B  B  B  B  B  B  B  B  B  B  B  B  B  B  B  B  B                    Ba
4     R  R  R  R  R  R  R  R  R  R  R  R  R  R  R  R  R                Rb
5     G  G  G  G  G  G  G  G  G  G  G  G  G  G  G  G           Gb
6     B  B  B  B  B  B  B  B  B  B  B  B  B  B  B BBb
7     R  R  R  R  R  R  R  R  R  R  R  R  R  RRc  ∘  ∘  ∘
8     G  G  G  G  G  G  G  G  G  G  G  GGc  ∘  ∘  ∘  ∘  ∘
9     B  B  B  B  B  B  B  B  BBc  ∘  ∘  ∘  ∘  ∘  ∘  ∘  ∘  ∘
10    R  R  R  R  R  RRd  ∘  ∘  ∘  ∘  ∘  ∘  ∘  ∘  ∘  ∘  ∘  ∘  ∘
11    G  G  GGd  ∘  ∘  ∘  ∘  ∘  ∘  ∘  ∘  ∘  ∘  ∘  ∘  ∘  ∘  ∘  ∘
12    Bd  ∘  ∘  ∘  ∘  ∘  ∘  ∘  ∘  ∘  ∘  ∘  ∘  ∘  ∘  ∘  ∘  ∘  ∘  ∘
13    ∘  ∘  ∘  ∘  ∘  ∘  ∘  ∘  ∘  ∘  ∘  ∘  ∘  ∘  ∘  ∘  ∘  ∘  ∘  ∘

FIG. 70B

Scan Pass s3          Time t1953
Line  1918 1920
1     R  R  R                                                Ra
2     G  G  G                                            Ga
3     B  B  B                                        Ba
4     R  R  R                                    Rb
5     G  G  G                                Gb
6     B  B  B                            Bb
7     R  R  R                        Rc
8     G  G  G                    Gc
9     B  B  B                Bc
10    R  R  R           Rd
11    G  G  G      Gd
12    B  BBd
13    ∘  ∘  ∘

Scan Pass s7 — Time t1

| Line | Dot | 1 | 2 | 3 | 4 | 5 | 6 | 7 | 8 | 9 |
|---|---|---|---|---|---|---|---|---|---|---|
| 1 | Ra | Ba | G | G | G | G | G | G | G | G |
| 2 | | X | X | X | X | X | X | X | X | X |
| 3 | | X | X | X | X | X | X | X | X | X |
| 4 | | G | G | G | G | G | G | G | G | G |
| 5 | Ga | ○ | ○ | ○ | ○ | ○ | ○ | ○ | ○ | ○ |
| 6 | | X | X | X | X | X | X | X | X | X |
| 7 | | G | G | G | G | G | G | G | G | G |
| 8 | | RB | RB | RB | RB | RB | RB | RB | RB | RB |
| 9 | Rb | Bb | G | G | G | G | G | G | G | G |
| 10 | | ○ | ○ | ○ | ○ | ○ | ○ | ○ | ○ | ○ |
| 11 | | RB | RB | RB | RB | RB | RB | RB | RB | RB |
| 12 | | G | G | G | G | G | G | G | G | G |
| 13 | Gb | ○ | ○ | ○ | ○ | ○ | ○ | ○ | ○ | ○ |
| 14 | | RB | RB | RB | RB | RB | RB | RB | RB | RB |
| 15 | | G | G | G | G | G | G | G | G | G |
| 16 | | ○ | ○ | ○ | ○ | ○ | ○ | ○ | ○ | ○ |
| 17 | Rc | Bc | ○ | ○ | ○ | ○ | ○ | ○ | ○ | ○ |
| 18 | | G | G | G | G | G | G | G | G | G |
| 19 | | ○ | ○ | ○ | ○ | ○ | ○ | ○ | ○ | ○ |
| 20 | | ○ | ○ | ○ | ○ | ○ | ○ | ○ | ○ | ○ |
| 21 | Gc | ○ | ○ | ○ | ○ | ○ | ○ | ○ | ○ | ○ |
| 22 | | ○ | ○ | ○ | ○ | ○ | ○ | ○ | ○ | ○ |

FIG. 77B

Scan Pass s7 — Time t4

| Line | Dot | 1 | 2 | 3 | 4 | 5 | 6 | 7 | 8 | 9 |
|---|---|---|---|---|---|---|---|---|---|---|
| 1 | Ra | BG | BG | BG | Ba | G | G | G | G | G |
| 2 | | X | X | X | X | X | X | X | X | X |
| 3 | | X | X | X | X | X | X | X | X | X |
| 4 | | G | G | G | G | G | G | G | G | G |
| 5 | | Ga | ○ | ○ | ○ | ○ | ○ | ○ | ○ | ○ |
| 6 | | X | X | X | X | X | X | X | X | X |
| 7 | | G | G | G | G | G | G | G | G | G |
| 8 | | RB | RB | RB | RB | RB | RB | RB | RB | RB |
| 9 | Rb | BG | BG | BG | Bb | G | G | G | G | G |
| 10 | | ○ | ○ | ○ | ○ | ○ | ○ | ○ | ○ | ○ |
| 11 | | RB | RB | RB | RB | RB | RB | RB | RB | RB |
| 12 | | G | G | G | G | G | G | G | G | G |
| 13 | | Gb | ○ | ○ | ○ | ○ | ○ | ○ | ○ | ○ |
| 14 | | RB | RB | RB | RB | RB | RB | RB | RB | RB |
| 15 | | G | G | G | G | G | G | G | G | G |
| 16 | | ○ | ○ | ○ | ○ | ○ | ○ | ○ | ○ | ○ |
| 17 | Rc | Bc | Bc | Bc | Bc | ○ | ○ | ○ | ○ | ○ |
| 18 | | G | G | G | G | G | G | G | G | G |
| 19 | | ○ | ○ | ○ | ○ | ○ | ○ | ○ | ○ | ○ |
| 20 | | ○ | ○ | ○ | ○ | ○ | ○ | ○ | ○ | ○ |
| 21 | | Gc | ○ | ○ | ○ | ○ | ○ | ○ | ○ | ○ |
| 22 | | ○ | ○ | ○ | ○ | ○ | ○ | ○ | ○ | ○ |

FIG. 77C

Scan Pass s7 — Time t7

| Line | 1 | 2 | 3 | 4 | 5 | 6 | 7 | 8 | 9 | 10 | 11 | 12 | 13 |
|---|---|---|---|---|---|---|---|---|---|---|---|---|---|
| 1 | RX | BG | BG | BG | BG | BG | Ba | G | G | G | G | G | G |
| 2 | X | X | X | X | X | X | X | X | X | X | X | X | X |
| 3 | X | X | X | X | X | X | X | X | X | X | X | X | X |
| 4 | G | G | G | G | G | G | G | G | G | G | G | G | G |
| 5 | Ga | Ga | Ga | Ga | ○ | ○ | ○ | ○ | ○ | ○ | ○ | ○ | ○ |
| 6 | X | X | X | X | X | X | X | X | X | X | X | X | X |
| 7 | G | G | G | G | G | G | G | G | G | G | G | G | G |
| 8 | RB | RB | RB | RB | RB | RB | RB | RB | RB | RB | RB | RB | RB |
| 9 | RX | BG | BG | BG | BG | BG | Bb | G | G | G | G | G | G |
| 10 | ○ | ○ | ○ | ○ | ○ | ○ | ○ | ○ | ○ | ○ | ○ | ○ | ○ |
| 11 | RB | RB | RB | RB | RB | RB | RB | RB | RB | RB | RB | RB | RB |
| 12 | G | G | G | G | G | G | G | G | G | G | G | G | G |
| 13 | Gb | Gb | Gb | Gb | ○ | ○ | ○ | ○ | ○ | ○ | ○ | ○ | ○ |
| 14 | RB | RB | RB | RB | RB | RB | RB | RB | RB | RB | RB | RB | RB |
| 15 | G | G | G | G | G | G | G | G | G | G | G | G | G |
| 16 | ○ | ○ | ○ | ○ | ○ | ○ | ○ | ○ | ○ | ○ | ○ | ○ | ○ |
| 17 | RB | Bc | Bc | Bc | Bc | Bc | Bc | ○ | ○ | ○ | ○ | ○ | ○ |
| 18 | G | G | G | G | G | G | G | G | G | G | G | G | G |
| 19 | ○ | ○ | ○ | ○ | ○ | ○ | ○ | ○ | ○ | ○ | ○ | ○ | ○ |
| 20 | ○ | ○ | ○ | ○ | ○ | ○ | ○ | ○ | ○ | ○ | ○ | ○ | ○ |
| 21 | Gc | Gc | Gc | Gc | ○ | ○ | ○ | ○ | ○ | ○ | ○ | ○ | ○ |
| 22 | ○ | ○ | ○ | ○ | ○ | ○ | ○ | ○ | ○ | ○ | ○ | ○ | ○ |

FIG. 77D

Scan Pass s7 — Time t13

| Line | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | RX | RX | RX | RX | RX | RX | RX | BG | BG | BG | BG | BG | Ba | G | G |
| 2 | X | X | X | X | X | X | X | X | X | X | X | X | X | X | X |
| 3 | X | X | X | X | X | X | X | X | X | X | X | X | X | X | X |
| 4 | G | G | G | G | G | G | G | G | G | G | G | G | G | G | G |
| 5 | Ga | Ga | Ga | Ga | Ga | Ga | Ga | Ga | Ga | Ga | ○ | ○ | ○ | ○ | ○ |
| 6 | X | X | X | X | X | X | X | X | X | X | X | X | X | X | X |
| 7 | G | G | G | G | G | G | G | G | G | G | G | G | G | G | G |
| 8 | RB | RB | RB | RB | RB | RB | RB | RB | RB | RB | RB | RB | RB | RB | RB |
| 9 | RX | RX | RX | RX | RX | RX | RX | BG | BG | BG | BG | BG | Bb | G | G |
| 10 | ○ | ○ | ○ | ○ | ○ | ○ | ○ | ○ | ○ | ○ | ○ | ○ | ○ | ○ | ○ |
| 11 | RB | RB | RB | RB | RB | RB | RB | RB | RB | RB | RB | RB | RB | RB | RB |
| 12 | G | G | G | G | G | G | G | G | G | G | G | G | G | G | G |
| 13 | Gb | Gb | Gb | Gb | Gb | Gb | Gb | Gb | Gb | Gb | ○ | ○ | ○ | ○ | ○ |
| 14 | RB | RB | RB | RB | RB | RB | RB | RB | RB | RB | RB | RB | RB | RB | RB |
| 15 | G | G | G | G | G | G | G | G | G | G | G | G | G | G | G |
| 16 | ○ | ○ | ○ | ○ | ○ | ○ | ○ | ○ | ○ | ○ | ○ | ○ | ○ | ○ | ○ |
| 17 | RB | RB | RB | RB | RB | RB | RB | Bc | Bc | Bc | Bc | Bc | Bc | ○ | ○ |
| 18 | G | G | G | G | G | G | G | G | G | G | G | G | G | G | G |
| 19 | ○ | ○ | ○ | ○ | ○ | ○ | ○ | ○ | ○ | ○ | ○ | ○ | ○ | ○ | ○ |
| 20 | ○ | ○ | ○ | ○ | ○ | ○ | ○ | ○ | ○ | ○ | ○ | ○ | ○ | ○ | ○ |
| 21 | Gc | Gc | Gc | Gc | Gc | Gc | Gc | Gc | Gc | Gc | Gc | ○ | ○ | ○ | ○ |
| 22 | ○ | ○ | ○ | ○ | ○ | ○ | ○ | ○ | ○ | ○ | ○ | ○ | ○ | ○ | ○ |

FIG. 78A

Scan Pass s7      Time t1920

| Line | 1906 | 1908 | 1910 | 1912 | 1914 | 1916 | 1918 | 1920 | | |
|---|---|---|---|---|---|---|---|---|---|---|
| 1  | Rx Rx Rx Rx Rx Rx Rx Rx Rx Bg Bg Bg Bg Rg | | | | | | | | Ba | |
| 2  | x x x x x x x x x x x x x x | | | | | | | | | |
| 3  | x x x x x x x x x x x x x x | | | | | | | | | |
| 4  | G G G G G G G G G G G G G G | | | | | | | | | |
| 5  | Ga Ga Ga Ga Ga Ga Ga Ga Ga Ga Ga Ga ○ ○ ○ | | | | | | | | | |
| 6  | x x x x x x x x x x x x x x | | | | | | | | | |
| 7  | G G G G G G G G G G G G G G | | | | | | | | | |
| 8  | RB RB RB RB RB RB RB RB RB RB RB RB RB RB | | | | | | | | | |
| 9  | Rx Rx Rx Rx Rx Rx Rx Rx Rx Bg Bg Bg Bg Bg Bb | | | | | | | | | |
| 10 | ○ ○ ○ ○ ○ ○ ○ ○ ○ ○ ○ ○ ○ ○ ○ ○ | | | | | | | | | |
| 11 | RB RB RB RB RB RB RB RB RB RB RB RB RB RB | | | | | | | | | |
| 12 | G G G G G G G G G G G G G G | | | | | | | | | |
| 13 | Gb Gb Gb Gb Gb Gb Gb Gb Gb Gb Gb Gb ○ ○ ○ | | | | | | | | | |
| 14 | RB RB RB RB RB RB RB RB RB RB RB RB RB RB | | | | | | | | | |
| 15 | G G G G G G G G G G G G G G | | | | | | | | | |
| 16 | ○ ○ ○ ○ ○ ○ ○ ○ ○ ○ ○ ○ ○ ○ ○ ○ | | | | | | | | | |
| 17 | RB RB RB RB RB RB RB RB RB Bc Bc Bc Bc Bc Bc | | | | | | | | | |
| 18 | G G G G G G G G G G G G G G | | | | | | | | | |
| 19 | ○ ○ ○ ○ ○ ○ ○ ○ ○ ○ ○ ○ ○ ○ ○ ○ | | | | | | | | | |
| 20 | ○ ○ ○ ○ ○ ○ ○ ○ ○ ○ ○ ○ ○ ○ ○ ○ | | | | | | | | | |
| 21 | Gc Gc Gc Gc Gc Gc Gc Gc Gc Gc Gc Gc ○ ○ ○ | | | | | | | | | |
| 22 | ○ ○ ○ ○ ○ ○ ○ ○ ○ ○ ○ ○ ○ ○ ○ ○ | | | | | | | | | |

FIG. 78B

Scan Pass s7      Time t1923

| Line | 1910 | 1912 | 1914 | 1916 | 1918 | 1920 | |
|---|---|---|---|---|---|---|---|
| 1  | Rx Rx Rx Rx Rx Rx Rx Rx Rx Bg Bg Bg | | | | | | Ba |
| 2  | x x x x x x x x x x x x | | | | | | |
| 3  | x x x x x x x x x x x x | | | | | | |
| 4  | G G G G G G G G G G G G | | | | | | |
| 5  | Ga Ga Ga Ga Ga Ga Ga Ga Ga Ga Ga Ga | | | | | | |
| 6  | x x x x x x x x x x x x | | | | | | |
| 7  | G G G G G G G G G G G G | | | | | | |
| 8  | RB RB RB RB RB RB RB RB RB RB RB RB | | | | | | |
| 9  | Rx Rx Rx Rx Rx Rx Rx Rx Rx Bg Bg Bg | | | | | | Bb |
| 10 | ○ ○ ○ ○ ○ ○ ○ ○ ○ ○ ○ ○ | | | | | | |
| 11 | RB RB RB RB RB RB RB RB RB RB RB RB | | | | | | |
| 12 | G G G G G G G G G G G G | | | | | | |
| 13 | Gb Gb Gb Gb Gb Gb Gb Gb Gb Gb Gb Gb | | | | | | |
| 14 | RB RB RB RB RB RB RB RB RB RB RB RB | | | | | | |
| 15 | G G G G G G G G G G G G | | | | | | |
| 16 | ○ ○ ○ ○ ○ ○ ○ ○ ○ ○ ○ ○ | | | | | | |
| 17 | RB RB RB RB RB RB RB RB RB Bc Bc Bc | | | | | | Bc |
| 18 | G G G G G G G G G G G G | | | | | | |
| 19 | ○ ○ ○ ○ ○ ○ ○ ○ ○ ○ ○ ○ | | | | | | |
| 20 | ○ ○ ○ ○ ○ ○ ○ ○ ○ ○ ○ ○ | | | | | | |
| 21 | Gc Gc Gc Gc Gc Gc Gc Gc Gc Gc Gc Gc | | | | | | |
| 22 | ○ ○ ○ ○ ○ ○ ○ ○ ○ ○ ○ ○ | | | | | | |

FIG. 78C

Scan Pass s7      Time t1924

| Line | 1910 | 1912 | 1914 | 1916 | 1918 | 1920 | |
|---|---|---|---|---|---|---|---|
| 1  | Rx Rx Rx Rx Rx Rx Rx Rx Rx Bg Bg | | | | | | Ba |
| 2  | x x x x x x x x x x x | | | | | | |
| 3  | x x x x x x x x x x x | | | | | | |
| 4  | G G G G G G G G G G G | | | | | | |
| 5  | Ga Ga Ga Ga Ga Ga Ga Ga Ga Ga Ga Ga | | | | | | |
| 6  | x x x x x x x x x x x | | | | | | |
| 7  | G G G G G G G G G G G | | | | | | |
| 8  | RB RB RB RB RB RB RB RB RB RB RB | | | | | | |
| 9  | Rx Rx Rx Rx Rx Rx Rx Rx Rx Bg Bg | | | | | | Bb |
| 10 | ○ ○ ○ ○ ○ ○ ○ ○ ○ ○ ○ | | | | | | |
| 11 | RB RB RB RB RB RB RB RB RB RB RB | | | | | | |
| 12 | G G G G G G G G G G G | | | | | | |
| 13 | Gb Gb Gb Gb Gb Gb Gb Gb Gb Gb Gb Gb | | | | | | |
| 14 | RB RB RB RB RB RB RB RB RB RB RB | | | | | | |
| 15 | G G G G G G G G G G G | | | | | | |
| 16 | ○ ○ ○ ○ ○ ○ ○ ○ ○ ○ ○ | | | | | | |
| 17 | RB RB RB RB RB RB RB RB RB Bc Bc | | | | | | Bc |
| 18 | G G G G G G G G G G G | | | | | | |
| 19 | ○ ○ ○ ○ ○ ○ ○ ○ ○ ○ ○ | | | | | | |
| 20 | ○ ○ ○ ○ ○ ○ ○ ○ ○ ○ ○ | | | | | | |
| 21 | Gc Gc Gc Gc Gc Gc Gc Gc Gc Gc Gc Gc | | | | | | |
| 22 | ○ ○ ○ ○ ○ ○ ○ ○ ○ ○ ○ | | | | | | |

FIG. 78D

Scan Pass s7      Time t1926

| Line | 1910 | 1912 | 1914 | 1916 | 1918 | 1920 | |
|---|---|---|---|---|---|---|---|
| 1  | Rx Rx Rx Rx Rx Rx Rx Rx Rx | | | | | | Ba |
| 2  | x x x x x x x x x | | | | | | |
| 3  | x x x x x x x x x | | | | | | |
| 4  | G G G G G G G G G | | | | | | |
| 5  | Ga Ga Ga Ga Ga Ga Ga Ga | | | | | | Ga |
| 6  | x x x x x x x x x | | | | | | |
| 7  | G G G G G G G G G | | | | | | |
| 8  | RB RB RB RB RB RB RB RB RB | | | | | | |
| 9  | Rx Rx Rx Rx Rx Rx Rx Rx Rx | | | | | | Bb |
| 10 | ○ ○ ○ ○ ○ ○ ○ ○ ○ | | | | | | |
| 11 | RB RB RB RB RB RB RB RB RB | | | | | | |
| 12 | G G G G G G G G G | | | | | | |
| 13 | Gb Gb Gb Gb Gb Gb Gb Gb Gb | | | | | | Gb |
| 14 | RB RB RB RB RB RB RB RB RB | | | | | | |
| 15 | G G G G G G G G G | | | | | | |
| 16 | ○ ○ ○ ○ ○ ○ ○ ○ ○ | | | | | | |
| 17 | BR BR BR BR BR BR BR BR BR | | | | | | Rc |
| 18 | G G G G G G G G G | | | | | | |
| 19 | ○ ○ ○ ○ ○ ○ ○ ○ ○ | | | | | | |
| 20 | ○ ○ ○ ○ ○ ○ ○ ○ ○ | | | | | | |
| 21 | Gc Gc Gc Gc Gc Gc Gc Gc Gc | | | | | | Gc |
| 22 | ○ ○ ○ ○ ○ ○ ○ ○ ○ | | | | | | |

| s1 | s2 | s3 | s4 | s269 | s270 | s271 | s272 |
|---|---|---|---|---|---|---|---|
| Rl | Rl | RlGhBd | RlGhBd | GlBhRd | GlBhRd | GlBhRd | GlBhRd |
| Rk | Rk | 2 RkGgBc | 2 RkGgBc | 1030 GkBgRc | 1030 GkBgRc | 1042 GkBgRc | 1054 GkBgRc |
| Rj | Rj | RjGfBb | RjGfBb | GjBfRb | GjBfRb | GjBfRb | GjBfRb |
| Ri | Ri | 4 RiGeBa | 4 RiGeBa | 1032 GiBeRa | 1032 GiBeRa | 1044 GiBeRa | 1056 GiBeRa |
| Bl | Bl | BlRhGd | BlRhGd | RlGhBd | RlGhBd | RlGhBd | RlGhBd |
| Bk | Bk | 6 BkRgGc | 6 BkRgGc | 1034 RkGgBc | 1034 RkGgBc | 1046 RkGgBc | 1058 RkGgBc |
| Bj | Bj | BjRfGb | BjRfGb | RjGfBb | RjGfBb | RjGfBb | RjGfBb |
| Bi | Bi | 8 BiReGa | 8 BiReGa | 1036 RiGeBa | 1036 RiGeBa | 1048 RiGeBa | 1060 RiGeBa |
| Gl | Gl | GlBhRd | GlBhRd | BlRhGd | BlRhGd | BlRhGd | BlRhGd |
| Gk | Gk | 10 GkBgRc | 10 GkBgRc | 1038 BkRgGc | 1038 BkRgGc | 1050 BkRgGc | 1062 BkRgGc |
| Gj | Gj | GjBfRb | GjBfRb | BjRfGb | BjRfGb | BjRfGb | BjRfGb |
| Gi | Gi | 12 GiBeRa | 12 GiBeRa | 1040 BiReGa | 1040 BiReGa | 1052 BiReGa | 1064 BiReGa |
| Gh | - - GhBd | - - GhBd | RlGhBd | GlBhRd | GlBhRd | GlBhRd | GlBhRd |
| Gg | 2 - - GgBc | 14 - - GgBc | 14 RkGgBc | 1042 GkBgRc | 1042 GkBgRc | 1054 GkBgRc | 1066 GkBgRc |
| Gf | - - GfBb | - - Gf Bb | RjGfBb | GjBfRb | GjBfRb | GjBfRb | GjBfRb |
| Ge | 4 - - GeBa | 16 - - GeBa | 16 RiGeBa | 1044 GiBeRa | 1044 GiBeRa | 1056 GiBeRa | 1068 GiBeRa |
| Rh | - - RhGd | - - RhGd | BlRhGd | - - GhBd | RlGhBd | RlGhBd | RlGhBd |
| Rg | 6 - - RgGc | 18 - - RgGc | 18 BkRgGc | 1046 - - GgBc | 1046 RkGgBc | 1058 RkGgBc | 1070 RkGgBc |
| Rf | - - RfGb | - - Rf Gb | BjRfGb | - - Gf Bb | RjGfBb | RjGfBb | RjGfBb |
| Re | 8 - - ReGa | 20 - - ReGa | 20 BiReGa | 1048 - - GeBa | 1048 RiGeBa | 1060 RiGeBa | 1072 RiGeBa |
| Bh | - - BhRd | - - BhRd | GlBhRd | - - RhGd | BlRhGd | BlRhGd | BlRhGd |
| Bg | 10 - - BgRc | 22 - - BgRc | 22 GkBgRc | 1050 - - RgGc | 1050 BkRgGc | 1062 BkRgGc | 1074 BkRgGc |
| Bf | - - BfRb | - - Bf Rb | GjBfRb | - - Rf Gb | BjRfGb | BjRfGb | BjRfGb |
| Be | 12 - - BeRa | 24 - - BeRa | 24 GiBeRa | 1052 - - ReGa | 1052 BiReGa | 1064 BiReGa | 1076 BiReGa |
| - - - - Bd | - - - - Bd | - - - - Bd | - - GhBd | - - BhRd | GlBhRd | GlBhRd | GlBhRd |
| 2 - - - - Bc | 14 - - - - Bc | 26 - - - - Bc | 26 - - GgBc | 1054 - - BgRc | 1054 GkBgRc | 1066 GkBgRc | 1078 GkBgRc |
| - - - - Bb | - - - - Bb | - - - - Bb | - - Gf Bb | - - Bf Rb | GjBfRb | GjBfRb | GjBfRb |
| 4 - - - - Ba | 16 - - - - Ba | 28 - - - - Ba | 28 - - GeBa | 1056 - - BeRa | 1056 GiBeRa | 1068 GiBeRa | 1080 GiBeRa |
| - - - - Gd | - - - - Gd | - - - - Gd | - - RhGd | - - - - Bd | - - GhBd | - - GhBd | Gh |
| 6 - - - - Gc | 18 - - - - Gc | 30 - - - - Gc | 30 - - RgGc | 1058 - - - - Bc | 1058 - - GgBc | 1070 - - GgBc | Gg |
| - - - - Gb | - - - - Gb | - - - - Gb | - - Rf Gb | - - - - Bb | - - Gf Bb | - - Gf Bb | Gf |
| 8 - - - - Ga | 20 - - - - Ga | 32 - - - - Ga | 32 - - ReGa | 1060 - - - - Ba | 1060 - - GeBa | 1072 - - GeBa | Ge |
| - - - - Rd | - - - - Rd | - - - - Rd | - - BhRd | - - - - Gd | - - RhGd | - - RhGd | Rh |
| 10 - - - - Rc | 22 - - - - Rc | 34 - - - - Rc | 34 - - BgRc | 1062 - - - - Gc | 1062 - - RgGc | 1074 - - RgGc | Rg |
| - - - - Rb | - - - - Rb | - - - - Rb | - - Bf Rb | - - - - Gb | - - Rf Gb | - - Rf Gb | Rf |
| 12 - - - - Ra | 24 - - - - Ra | 36 - - - - Ra | 36 - - BeRa | 1064 - - - - Ga | 1064 - - ReGa | 1076 - - ReGa | Re |
| - - - - - - | - - - - - - | - - - - - - | - - - - Bd | - - - - Rd | - - BhRd | - - BhRd | Bh |
| 14 - - - - - - | 26 - - - - - - | 38 - - - - - - | 38 - - - - Bc | 1066 - - - - Rc | 1066 - - BgRc | 1078 - - BgRc | Bg |
| - - - - - - | - - - - - - | - - - - - - | - - - - Bb | - - - - Rb | - - Bf Rb | - - Bf Rb | Bf |
| 16 - - - - - - | 28 - - - - - - | 40 - - - - - - | 40 - - - - Ba | 1068 - - - - Ra | 1068 - - BeRa | 1080 - - BeRa | Be |
| - - - - - - | - - - - - - | - - - - - - | - - - - Gd | - - - - - - | - - - - Bd | Bd | Bd |
| 18 - - - - - - | 30 - - - - - - | 42 - - - - - - | 42 - - - - Gc | 1070 - - - - - - | 1070 - - - - Bc | Bc | Bc |
| - - - - - - | - - - - - - | - - - - - - | - - - - Gb | - - - - - - | - - - - Bb | Bb | Bb |
| 20 - - - - - - | 32 - - - - - - | 44 - - - - - - | 44 - - - - Ga | 1072 - - - - - - | 1072 - - - - Ba | Ba | Ba |
| - - - - - - | - - - - - - | - - - - - - | - - - - Rd | - - - - - - | - - - - Gd | Gd | Gd |
| 22 - - - - - - | 34 - - - - - - | 46 - - - - - - | 46 - - - - Rc | 1074 - - - - - - | 1074 - - - - Gc | Gc | Gc |
| - - - - - - | - - - - - - | - - - - - - | - - - - Rb | - - - - - - | - - - - Gb | Gb | Gb |
| 24 - - - - - - | 36 - - - - - - | 48 - - - - - - | 48 - - - - Ra | 1076 - - - - - - | 1076 - - - - Ga | Ga | Ga |
| - - - - - - | - - - - - - | - - - - - - | - - - - - - | - - - - - - | - - - - Rd | Rd | Rd |
| 26 - - - - - - | 38 - - - - - - | 50 - - - - - - | 50 - - - - - - | 1078 - - - - - - | 1078 - - - - Rc | Rc | Rc |
| - - - - - - | - - - - - - | - - - - - - | - - - - - - | - - - - - - | - - - - Rb | Rb | Rb |
| 28 - - - - - - | 40 - - - - - - | 52 - - - - - - | 52 - - - - - - | 1080 - - - - - - | 1080 - - - - Ra | Ra | Ra |
| 87A | 87B | 87C | 87D | 87E | 87F | 87G | 87H |

FIGs. 87A-87H

LASER PROJECTION SYSTEM

FIELD OF THE INVENTION

This invention relates generally to high resolution video projection systems using visible laser beams as a possible light source. More particularly, this invention relates to a system for raster scanning light beams of one or more colors onto a surface to form a desired moving or still color or monochromatic image. Even more particularly, this invention relates to systems for projecting large color motion picture or video images onto a screen suitable for viewing at home, in a theater, at a concert, or other presentation or gathering.

BACKGROUND OF THE INVENTION

Large motion color images, such as displayed in movie theaters, are formed by projection of an image onto a separate front or rear projection screen. The images are usually formed by projecting light through individual film frames illuminating a full screen, with frames succeeding one another at 20 to 30 times a second.

Film projection technology is approaching the limit of its technological evolution. Film requires the frequent changing of bulky reels of film. Film image quality degrades with repeated showings. Film has reached the economic limit of its resolution capabilities. The vibrancy of its colors falls short of the colors visualized in the real world. Film projection frequently encounters registration problems, where the image jumps around on the screen. This contrasts with recent technological advances in digital image storage, manipulation and transmission, wherein complete movies can be digitally recorded on optical disks and other digital storage media. Digital storage and distribution should be relatively inexpensive, and the image source does not degrade with repeated showings or duplications. Thus, movie projection utilizing a digital, electronically scanned (termed "video" herein) image source is a desirable alternative to film, assuming such an image can be projected with sufficient brightness, resolution, color balance, registration, and lack of motion artifacts to equal or exceed the capabilities of film. Laser projection is believed by many to offer the most promising solution to the problems inherent with film projection.

Laser video projectors have been used for the display of electronic images since about 1980, with the first projector built in England by the Dwight Cavendish Company. This projector used an Argon ion laser and a dye laser to produce standard television resolution images up to about ten feet across in a darkened room. The projector was almost as large as its image and was difficult to operate. The Dwight Cavendish laser projector, and indeed any laser projector, required the following basic components to make a video image: (a) lasers to supply the light that is sent to the screen to form the image; (b) a method of controlling the intensity of the laser light for each portion of the image, often called "modulation"; and (c) a method of distributing the modulated light across the screen surface, often called "scanning".

An improved version of the Dwight Cavendish laser projector is described by Richard W. Pease in "An Overview of Technology for Large Wall Screen Projection using Lasers as a Light Source", MITRE Technical Report, The MITRE Corporation (July 1990). The projector described in the MITRE publication utilized the following components corresponding to the laser source, modulator and scanner described above. The laser sources included argon ion lasers to produce 454 to 476 nm blue and 514 nm green, and Rhodamine 6G dye laser pumped with an argon ion laser to produce 610 nm red. The system used acousto-optic modulators between the laser sources and the scanning component for the laser beam of each color, with the modulated beams later combined with dichroic mirrors and deflected and focused onto the scanning component. The scanning section included a rotating polygon mirror and galvanometer-controlled frame mirror, as further described below. The rotating polygon mirror had 25 mirror facets, each of which deflected the modulated beam horizontally across a predetermined angle onto a mirror tilted vertically by a galvanometer across a predetermined angle through lenses onto the screen.

Several problems in particular limit the ability of current large screen projection technology to produce movie theater quality laser images. Because such laser projection systems typically used complicated lens and mirror systems to combine modulated colored beams into a composite beam to be scanned, and to scan and focus beams onto a screen, much of the power of the laser beams was sapped away, making laser projection images substantially less bright than that produced by film projection. Further, because certain wavelengths, especially blue, have been difficult to produce at adequate power levels with lasers, brightness and color balance have been inadequate for large screen video applications.

Currently known laser video systems typically use an Argon ion laser to make blue and green, and a 'flowing jet dye' laser to make red. To provide some perspective, an Argon ion laser is 5 to 8 feet long, weighs 100 to 600 pounds and consumes from 15 to 75 kilowatts of electricity and two to five gallons per minute of cooling water. Such lasers cost $30,000 to $105,000 each. Several of these laser would be required for the optical power necessary to accomplish theater or large screen video display.

Known projection systems that used rotating polygon mirrors did not adequately address the problems of facet errors that would tend to slightly misdirect the beams, requiring complex optical or mirror array systems to compensate for the slight misdirections. The complex optics, facet error correction, and scanning systems also tended to cause color separation, causing the combined laser beams to diverge and degrade as they passed through these complicated optical paths.

Perhaps the most significant problem, however, with prior laser projections systems in comparison with film projection technology, is the lack of sufficient resolution. Attempts to increase resolution only exacerbate the other problems noted above. In order to effectively compete with or displace film projection, it is widely believed that laser projection systems must be capable of resolutions approaching 1900 by 1100 fully resolved pixels, or roughly the maximum resolution of the newly established HDTV standard of 1920×1080 p at 60 frames per second or more. HDTV is an acronym for "High Definition Television" and refers to an emerging standard for new home viewing and large image projection technology. While this standard addresses many formats, many believe that the highest resolution format, 1920×1080 pixels, especially in a "progressive" mode, defined herein (designated as "1920×1080 p"), represents more than sufficient resolution for theater displays. Standard television quality resolution, such as that projected by the Dwight Cavendish system, rarely exceeds 525 horizontal lines. For television to achieve this resolution, 525 horizontal lines of analog image data are scanned, roughly comparable to a digital pixel array of 525×525 pixels. Thus, television quality video would require, for a full frame rate of 30 frames per second, that a polygon mirror scan more than 945,000 lines per minute. For a 25 facet polygon mirror such as used in the Dwight Cavendish system, writing one line with each facet would require a rotation of more than 37,500 rpm. Because of centrifugal force limitations, rotational speeds this high limit the feasible size and/or number of the facets, thereby limiting resolution.

Moreover, the problems inherent in polygon mirrors frequently used in prior laser projection systems such as the Dwight Cavendish system are exacerbated when attempting to scan 1920×1080 HDTV quality video or better resolution video. The threefold or greater horizontal resolution mandates a larger facet size, yet the increased number of lines per frame mandates either an increase in the number of facets or substantially increased polygon mirror rotational speeds. For example, a 25 facet polygon mirror would have to have facets more than three times greater in width resulting in a polygon more than three times greater in diameter. For HDTV 1920×1080 p resolution at a full frame rate of at least 60 frames per second, this polygon of much larger facet widths would have to scan more than 3.8 million lines per minute, or achieve a rotational speed of more than 150,000 rpm. A polygon mirror assembly capable of these facet rates would be structurally difficult to manufacture and operate, and extremely expensive. Due to centrifugal force limitations referenced above, one cannot increase the number of facets per second simply by increasing the number of facets of the same size on the polygon.

Another significant problem confronting prior laser projection systems attempting to produce the high resolution required to compete with film technology is the inadequacy of prior art modulation technology. Each laser beam of the three primary colors must be modulated to produce a different color intensity for each pixel being scanned. For standard television resolution, more than 250,000 modulations must occur for each frame for each color or laser, or a total of 7.5 million modulations per second for 30 frames per second. For high resolution, at 1920×1080 p, more than 2 million modulations must occur for each color or laser to scan each frame, or a total of at least 120 million modulations per second per color for 60 frames per second. For desired non-interlaced (progressive) imagery having even greater resolution, such as 3000×2000 pixels, the rate is above 360 million modulations per second. Current modulation technology is not capable of modulating the laser beams, especially powerful laser beams, at a sufficient rate to enable the generation of the number of discreet pixels required for even film-quality digital resolution.

There are other inadequacies in the existing technology that are not addressed in detail here, but there are significant challenges, including complexity of optics, brightness, resolution, contrast and image stability.

SUMMARY OF THE INVENTION

As of yet, nothing in the prior art has provided a laser projection system that combines sufficient resolution, brightness and color for large screen projection, such as in a movie theater, to rival or exceed that of film. Our invention uses a novel approach to scanning laser beams onto a screen that facilitates the use of many simple, proven laser projection components to produce a bright, color saturated, high resolution large screen image at a reasonable cost.

Before further summarizing our invention, it is necessary to define and place in context several terms and concepts to be utilized in describing the projection of laser beams on a screen. As noted in greater detail in the Detailed Description herein, video images projected by our preferred system according to our invention are formed by raster scanning. Raster scanning, the process used by our invention as well as television and many (but not all) other video display techniques, is a process where a flying spot of illumination scans across the image surface or viewing surface or screen forming an image line, repeating the process lower, until scanned lines fill the entire viewing surface. A completely scanned image is called a "frame". Continuous raster scanning is a process of scanning a pre-determined pattern of lines within a display space wherein the scanning motion, in both directions of traverse is continuous or nearly continuous, although probably at different rates. The lines will be parallel in most instances.

The locations and values of the separate elements of a frame of video data are referred to as "pixels" herein that is, pixels will always be referred to in connection with the video data used to drive the projection system, not in connection with the laser beams or locations on the screen. The manifestation of the modulated laser beam on a screen that is visually apparent to the viewer is referred to as a "spot", that is, the visible illumination resulting from reflection of laser beam from the screen shall be considered a "spot". A location on the screen corresponding to the same relative position of a particular pixel in the video data is referred to herein as a "dot". A "line" shall herein be considered to refer to the horizontal (in most cases) row of individual dots. A "frame" shall be regarded as a series of contiguous lines forming a complete image. Frames are repeated many times per second in all video images. A "subframe" shall be regarded as a group of lines in which the drawing of another group of lines in different locations at a later time is required to draw a complete desired image or frame. An example is the two subframes of lines required with interlaced scanning to form a complete frame, such as in standard television.

As previously noted, frames are produced many times per second to form moving pictures. The eye will not separately detect the sequential illumination of the frames on the screen if each frame is updated more frequently than the time it takes for the eye to respond to changes in intensity, about 20 to 25 milliseconds. Therefore, at raster refresh rates above approximately 50 frames or subframes per second, the persistence of the observer's vision causes his or her eye and brain to integrate the motion into a smoothly moving image.

In the National Television Standards Committee (NTSC) television system used in the United States, one-half frame is scanned about every ¹⁄₆₀th second, with odd lines scanned in one subframe and even lines scanned in the next (termed "interlaced scanning" herein) thereby effectively repeating or updating each full frame 30 times a second. We define "refresh rate" as in the television industry where the refresh rate refers to the number of sweeps down the screen, in this case 60 per second. Others define the rate at which all of the information is completely updated, in this case 30 times per second. In many computer monitors, the image is progressively scanned, that is all lines of each frame are scanned in one pass, at a refresh rate of 60 or more times per second. The size of the pixel arrays range from the equivalent of 525×525 i, where "i" refers to the interlaced raster scanning method used in the scanning of typical television image frames using a first subframe scanning odd lines and a second subframe scanning even lines, to 1920×1080 p in the most demanding high definition television (HDTV) resolution standard. Thus, between 15,000 and 65,000 horizontal lines, or between 8.3 and 124.0 million pixels, are scanned each second at a refresh rate of 60 frames per second.

A laser projection system according to our invention preferably utilizes optical fibers to transmit modulated laser beams in the three primary colors, red, blue and green, from high power laser sources. This effectively preserves the point source characteristics of narrow focus beams exiting from the laser sources which can be directed through the scanning component to the screen without complex and expensive optics used in prior art systems. The use of optical fibers for laser beam transmission also facilitates packaging of the system. Further, problems with divergence and degradation of laser beams transmitted through mirrors and other optics for scanning are reduced by the use of optical fibers, which act as point sources, so that the laser beams arrive at the scanning component as though they originated from infinitely small point sources, and are projected on the screen as smaller, more resolved spots.

A laser projection system according to our invention also preferably uses the beams emitted from the emitting ends of three or more optical fibers, with each fiber transmitting one of the primary colors (red, green, blue), to draw a line of spots. Instead of combining the three primary color beams before transmitting the beams to the scanning apparatus as in prior systems, our invention permits the individually modulated laser beams of each color to form spots that are transmitted at different times to strike a particular dot location on the screen and create a composite color having a value corresponding to the pixel data color values. The use of the emitting ends of the optical fibers to direct the beams to the scanning apparatus, with the reordering or time combining of the actual illumination of each dot location with each color beam avoids the complicated optics of prior systems which combined the various beams before projection onto a dot location.

For example, in a preferred form of our invention, a horizontally oriented row of emitting ends is mounted in an output head, with the red, green and blue emitting fibers spaced adjacent to each other. If the spacing of the fiber emitting ends results in the beams directed at the screen at a given time striking dot locations that are four dots apart, then a red spot would be illuminated at the first dot location at the beginning of a line, and the green and blue spots would not be activated. After the red beam sequentially illuminated red spots at the second, third and fourth dot locations with the green and blue beams still inactivated, the red beam would then illuminate a red spot at the fifth dot location according to the video input data and the green beam would illuminate a green spot at the first dot location at the desired intensity. Similarly, after the red and green beams sequentially illuminated red and green spots at the sixth and second, seventh and third, and eighth and fourth dot locations, respectively, with the blue beam inactivated, the red beam would then illuminate a red spot at the ninth dot location, the green beam would illuminate a green spot at the fifth dot location and the blue beam would illuminate a blue spot at the first dot location. Note that at this point the red, green and blue beams have illuminated red, green and blue spots at the first dot location with spot color values that together form the composite color value corresponding to the color value specified for that dot location in the pixel data. Thereafter, sequential illumination of further dot locations will result in a complete line being drawn. Of course, at the end of the line, after the red beam illuminated the last dot location, only the green and blue beams would be activated. After continued scanning occurred such that the green beam illuminates the last dot location, thereafter the green and red beams would be inactivated and the remaining dot locations sequentially illuminated by the blue beam.

In most instances, the color required for a specific dot location on the screen will be some combination of appropriately modulated red, green and blue spots. In a preferred laser projection system according to our invention, this requires appropriate delays in timing of beam activation and modulation, so that the appropriately modulated beam is activated at the appropriate time. This is a consequence of the emitting ends being spaced a finite distance apart.

Further examples of this reordering, which may also be characterized as time delaying, time combining or time shifting, as well as the presentation of lines, presentation of colors and/or rearranging of the sequence in which the video data is originally input, are more specifically described in the Detailed Description section hereof.

It should be understood that the term "horizontal" to describe the scanning of lines and the term "vertical" to describe the adjustment of the position of horizontal lines in the frame, are for convenient reference only. Those familiar with raster scanning in televisions and CRTs, such as computer monitors, will understand that this illustrative system could be rotated 90°, so that lines would be scanned vertically and adjustments in the frame made horizontally. Further, scanning diagonally, and in a spiral from the center of the frame, or in from the outer edge, have been known in other applications. Given the flexibility afforded by our invention in accommodating various scanning systems and laser and modulator configurations, other scanning regimes could be utilized to effect. In some cases, we use the terms "sweeping direction" or "swept" to more generically describe the direction in which lines are scanned along desired paths on the screen or viewing surface, analogous to the horizontal scans described at length herein, without restricting the direction of the sweeping of the paths to any particular orientation. In such cases, we may also use the term "frame direction" or "moved" or "adjusted" to more generically describe the direction in which the position of the lines or desired sweep paths are offset, analogous to the vertical scans or adjustments also described at length herein, without restricting that direction to any particular orientation, or indeed any orientation.

Our innovation using optical fibers frees high power laser video projection from constraints on the method of modulation or a particular laser source. Indeed, our system can be easily adapted to any suitable laser source or modulation component. Expensive, power-sapping components to combine the three primary colors into a single beam for transmission to the scanning component after modulation of individual colored laser beams can be eliminated, and the individual colored laser beams scanned independently.

A laser projection system according to our invention further preferably utilizes a plurality of point sources, such as fiber emitting ends arranged in an array, to project a pattern of spots on a screen. For convenient reference, we prefer to call the horizontally aligned fiber emitting ends used to draw a line of spots on the screen a "row" of fiber emitting ends. As described below, a row may also comprise one or more beams or spots of a pattern of beams or spots projected on a screen. Such array of fiber emitting ends in our preferred embodiment may be effectively arranged in vertically spaced rows of emitting ends to project and scan a two dimensional pattern of spots along more than one horizontal line at a time. Such multiple line scanning according to our invention provides a method of achieving high resolution with current scanning, modulation and laser components otherwise not capable of producing high resolution video images, as described above.

Thus, our system realizes several advantages of scanning more than one line per horizontal sweep. One advantage includes an ability to use simpler, less expensive scanning components, such as a polygon mirror having a more common number of facets and operating at a conventional rotational speed for high resolution raster scanning. For example, with the projection system described in the Background of the Invention section, for 1920×1080 p or better quality resolution, a 25 facet polygon mirror scanning one line per facet at a full frame rate of 60 frames per second would have to scan more than 3.8 million lines per minute at more than 150,000 rpm. Scanning four lines per facet would reduce that rotational speed by a factor of four, to about 37,500 rpm, which is within manageable limits for existing polygon mirror technology.

Another advantage is the reduction in modulation speed achieved by individually modulating, in the foregoing example, four rows of laser beams and scanning them simultaneously. The modulation of the individual beams is thus reduced by a factor of four at the desired resolution. For the example identified in the Background of the Invention section, modulation is required at 124 million modulations per second to scan each pixel or spot at a rate of one line per scan, whereas scanning four lines per horizontal scan reduces this requirement to approximately 30 million modulations per second, again within the capabilities of current acousto-optic modulation technology.

Our invention helps to ameliorate other problems associated with the large laser power requirements for large screen projection at acceptable levels of brightness. Laser beams of large screen projection systems must have power sufficient to illuminate each dot location on a screen with a minimum desired illumination 60 or more times per second. By scanning multiple lines in accordance with our invention, each line may be scanned at a slower rate, which results in each dot location in the multiple lines being illuminated for a corresponding longer time. The viewer perceives the light on the screen produced by a single laser beam of a prior system at one power per second as equal to that produced by multiple laser beams having the same power in the aggregate. However, the modulator for the prior system must handle the total power for the single beam, whereas for a multi-line scanning system according to our invention such power is divided among the multiple beams and modulators. The high power laser beam required for such prior laser projection systems produces a power density in the modulator crystal that current acousto-optic modulators simply cannot handle. The division of the modulation tasks among multiple modulators in accordance with our invention, such as four times as many modulators with our preferred embodiment, reduces the power load that must be handled by each modulator by that multiple, or by a factor of four with our preferred embodiment, more within the capacity of current acousto-optic modulators.

The other problem caused by the need to use high power laser beams is in the use of optical fibers. Even if, hypothetically, a prior designer of a laser projection system were to attempt to use optical fibers to transmit the laser beams to the scanning components, the high power density would exceed the fiber's damage threshold. As described for modulation requirements, dividing the laser power between multiple fibers to transmit the same effective power to the screen as prior art systems reduces the power density each individual fiber must handle, permitting the use of currently available optical fibers in a system according to our invention.

The use of optical fibers in our preferred system is enabling of multi-line scanning. If multi-line scanning in accordance with our invention were attempted without using fibers, the complexity and expense of the necessary optics to perform such scanning would be multiplied many times. Additionally, in the absence of optical fibers used in accordance with our invention, the problems associated with accurately positioning multiple separate composite beams in a vertical spacing suitable for multi-line scanning with prior technology is for all practical purposes insurmountable.

Yet another advantage of multiple line scanning is the ease of using of multiple lasers for each color. In some cases, it may be more economical or otherwise more effective to use several small lasers, such as one laser per color per row, than it is to use one large laser for each color where the output is split, or divided, among the several rows. This is especially important when one considers that combining the beams of several small lasers into one coherent diffraction limited beam (defined more closely herein) is not feasible. Our invention uniquely allows for this use of multiple lower power laser beam sources in a raster scanning environment.

One factor in our ability to provide economical high resolution digital video theater laser projection is the availability of fast, high capacity microprocessors and associated electronics, such as used in personal computers and video games, to permit the manipulation of very high resolution video images with off-the-shelf components.

As noted above, our system may employ a reordering of digital video signals to produce a high resolution laser image. Although more detailed examples of the effect of this reordering may be found in the Detailed Description section herein, the following example illustrates such reordering, and assumes a resolution of 1920×1080 p. Further, it assumes that when projected through the scanning system to the screen, that the rows of spots are five lines apart. It should also be noted that with the single lens or focusing optic of our preferred embodiment, the orientation of the array shown in FIG. 5 will be reversed vertically and horizontally as shown in FIG. 5S, i.e., the red beam emitted from the left end of the top row "D" of emitting ends of the array of the emitting head will be projected on the facet and thence on the screen at the right end of the bottom row of spots on the screen. As more fully described in the Detailed Description with regard to FIG. 17, we refer to the spacing of the rows of spots on the screen projected by the beams emitted from adjacent rows of emitting ends as the "effective row spacing", e.g., for a five line effective row spacing, there would be four lines of dot locations between the two rows of spots.

At this resolution and with the emitting end arrangement and spot pattern shown in FIGS. 5 and 5S, respectively, we prefer to use a four line vertical adjustment after each horizontal pass. The first pass would write frame line L4 with the bottom-most row ("RowD") of spots. After the preferred four line vertical adjustment, the second pass would write frame lines L8 and L3 with RowD and the mid-bottom row ("RowC") of spots, respectively. After another four line adjustment, the third pass would write frame lines L12, L7 and L2 with RowD, RowC and the mid-upper row ("RowB") of spots, respectively. After yet another four line adjustment, the fourth pass would write lines L16, L11, L6 and L1 with RowD, RowC, RowB and the upper row ("RowA") of spots, respectively. Note that, for this simplified example, by the fourth pass, lines L1–4 have been scanned, albeit out of the order in which the pixel data is presented in the original video data. Continuing on in this fashion we would scan each appropriate line with all three colors exactly once in only one pass. Because the scan of a full frame occurs at more than 60 times per second, the eye perceives all of the scan lines, regardless of actual order of scanning, as a complete image.

The availability of high speed computing equipment enables the processing of a video signal to write multiple lines simultaneously and to write lines of a frame out of sequence. This ability is embedded in our preferred video controller which controls the modulation of the individual laser beams.

A major advantage of our invention is the ability to use a single lens to direct the beams from the array of fiber emitting ends through the scanning components and thence on the screen. This avoids the use of complicated optical systems common to prior laser projection systems, such as disclosed in Linden, U.S. Pat. No. 5,136,426. Our preferred use of a single lens helps to effect the greatest possible resolution of the laser beam on the screen by producing the smallest feasible spot and by avoiding the degradation in beam quality that results from multiple optical elements in a complex optical path. The resulting increased optical efficiency permits lower power lasers, because more of the laser power reaches the screen than with complex optical arrays. The simple achromat lens preferred for our preferred system according to our invention is significantly less expensive than the multiple, and typically more complex, lenses and mirrors used in prior laser projection systems. Lastly, the use of a simple lens simplifies manufacture, setup, repair and adjustment of the preferred laser projection system.

The use of a rotating mirror polygon in preferred embodiments of our invention introduces problems, some of which are well known. Because of the precision required for directing the laser beam onto the screen when reflected from each facet, each facet should reflect the beams at exactly the same vertical angle from facet to facet. However, such precision in manufacturing mirror polygons is not practical. Previous laser projection systems using mirror polygons used a system of lenses or moving mirrors to correct these vertical facet errors. The Dwight Cavendish laser projection system used cylindrical optics to correct for the error in each facet. Unfortunately, the use of such optics results in color separation, and tends to degrade the image quality and resolution. Other systems used moving mirrors, controlled by galvanometer or piezo-electric crystals, to tilt a mirror to make this correction. This technique, however, is not fast enough for high resolution video projection purposes. Our preferred system uses optical fiber emitting ends arranged in an array in a block, or output head, which permits error correction by physically moving the output head holding the emitting ends, and therefore the beams emitted therefrom, with respect to the polygon mirror facet. We prefer to accomplish this adjustment by electrically expanding and contracting a piezo electric crystal or other electronically controllable movement device as part of the mounting of the block of emitting ends.

Our preferred apparatus and method for correcting horizontal facet errors is to delay the initiation of a line scan by a facet sweeping past the impact point of the beams from the emitting ends until the particular facet has been optically determined to be in the correct position to accurately scan the line on the screen, thus compensating for horizontal facet error. This means that the interval between horizontal scans may not be exactly constant. Although not our most preferred solution for correcting horizontal facet errors, a second piezo electric crystal may be placed horizontally on the block holding the emitting ends to implement correction for horizontal error of each mirror polygon facet.

Accordingly, it is the principle object of the present invention to provide a projection system suitable for displaying video images on a screen.

It is another object of the present invention to provide a laser projection system suitable for displaying high resolution digital video images on a screen that will accommodate different predetermined resolutions and digital formats as input data.

A further object of the present invention is to provide a digital video laser projection system in which one or more of the laser sources and/or modulation components can be upgraded or modified without the need for substantial modification of the scanning component.

Another object of the present invention is to provide a laser projection system for scanning color moving images onto a screen using a digital video source in a brightness, resolution and color balance exceeding that of conventional theater-quality film projection systems.

It is still another object of the present invention to provide a laser projection system for scanning color moving images onto a screen suitable for small screen and home use.

Another important object of the present invention is to provide a method of simultaneously scanning a pattern of spots onto a screen in multiple vertically spaced lines to form a complete image.

It is a further object to provide a method of sequentially scanning beams projecting spots of different colors along a line path or different line paths to form a composite color image having a desired color balance and intensity at each single dot location on a screen.

It is an additional object to provide a method and apparatus for raster scanning a two-dimensional spot pattern on a viewing surface, more particularly wherein such spots are visible light, and still more particularly wherein such spots are formed by laser beams.

It is a further object to provide a method and apparatus for projecting a high resolution image at least equivalent to 1920×1080 pixels.

These and other objects of the present invention are realized in a presently preferred embodiment thereof, described by way of example and not necessarily by way of limitation, which provides for a laser projection system suitable for use in a large screen commercial motion picture theater and other large or small screen venues using digital video and having levels of brightness, resolution and color balance exceeding that of film.

Additional objects, advantages and novel features of the invention will be set forth in the description which follows, and will become apparent to those skilled in the art upon examination of the following more detailed description and drawings in which like elements of the invention are similarly numbered throughout.

BRIEF DESCRIPTION OF THE DRAWINGS

FIG. 11D is a diagram of an output head similar to that shown in FIG. 11C, having an output interface capsule similar to that shown in FIG. 7.

FIG. 11E is a section view of a fiber emitting end with an index matching interface fluid between the lens and emitting end of FIG. 11D, illustrating the correction of the angle of emission.

FIG. 11F is a section view of the fiber emitting end shown in FIG. 11E, wherein the index matching has a lower index and the beam is misdirected at an angle from the axis of the fiber.

FIG. 11G is a section view of the fiber emitting end shown in FIG. 11E, wherein the index matching has a higher index and the beam is misdirected at an angle from the axis of the fiber that is different from that shown in FIG. 11F.

FIG. 11H is a section view of the fiber emitting end shown in FIG. 11E, showing the rotation of the emitting end to correct misalignment of the fiber face for a different color from that emitted in FIG. 11E.

FIGS. 17A through 17E are time sequence diagrams illustrating the out-of-order illumination of frame lines for scan passes at the beginning of the frame with vertically spaced rows of the spot pattern shown in FIG. 5S, showing blanking of rows of spots not within the frame.

FIGS. 18A through 18E are time sequence diagrams illustrating the out-of-order illumination of frame lines for scan passes at the end of the frame with vertically spaced rows of the spot pattern shown in FIG. 5S, showing blanking of rows of spots not within the frame.

FIGS. 29A through 29H are time sequence diagrams for Example 1, illustrating line reordering for the 4×3 spot pattern of FIG. 28S having an effective row spacing of three lines and vertical adjustment between scan passes of four lines.

FIGS. 30A through 30F are time sequence diagrams illustrating the time shifting of spots of each primary color in a row of a pattern of spots of FIG. 28S to form a composite spot at each dot location of a line of a frame.

FIGS. 31A through 31D are time sequence diagrams for Example 2, illustrating the ineffective line reordering for a 4×3 spot pattern similar to FIG. 28S having an effective row spacing of four lines and a vertical adjustment between scan passes of four lines.

FIGS. 32A through 32D are time sequence diagrams for Example 3, illustrating the ineffective line reordering for a 4×3 spot pattern similar to FIG. 28S having an effective row spacing of four lines and a vertical adjustment between scan passes of five lines.

FIGS. 33A through 33P are time sequence diagrams for Example 4, illustrating line reordering for 4×3 spot pattern similar to that of FIG. 28S having an effective row spacing of 15 lines and a vertical adjustment between scan passes of four lines.

FIGS. 34A through 34P are time sequence diagrams for Example 5, illustrating line reordering for 4×3 spot pattern similar to that of FIG. 28S having an effective row spacing of 17 lines and a vertical adjustment between scan passes of four lines.

FIGS. 35A through 35H are time sequence diagrams for Example 6, illustrating line reordering for 4×3 spot pattern similar to that of FIG. 28S having an effective row spacing of 9 lines and a vertical adjustment between scan passes of four lines.

FIGS. 36A through 36H are time sequence diagrams for Example 7, illustrating line reordering for 4×3 spot pattern similar to that of FIG. 28S having an effective row spacing of 11 lines and a vertical adjustment between scan passes of four lines.

FIGS. 37A through 37H are time sequence diagrams for Example 8, illustrating the ineffective line reordering for 4×3 spot pattern similar to that of FIG. 28S having an effective row spacing of 10 lines and a vertical adjustment between scan passes of four lines.

FIGS. 38A through 38H are time sequence diagrams for Example 9, illustrating line reordering for a 4×3 spot pattern similar to that of FIG. 28S having an effective row spacing of 49 lines and a vertical adjustment between scan passes of four lines.

FIG. 39 is a diagram for Examples 10 and 11, showing a 3 row by 3 emitting end per row array of an alternate output head for use in the system of FIG. 1.

FIG. 39S is a diagram of the pattern of spots projected on a screen using the array shown in FIG. 39.

FIGS. 40A through 40H are time sequence diagrams for Example 10, illustrating line reordering for a 3×3 spot pattern of FIG. 39S having an effective row spacing of 4 lines and a vertical adjustment between scan passes of 3 lines.

FIGS. 43A through 43H are time sequence diagrams for Example 12, illustrating line reordering for a 2×3 spot pattern of FIG. 42S having an effective row spacing of 3 lines and a vertical adjustment between scan passes of 2 lines.

FIGS. 44A through 44H are time sequence diagrams for Example 13, illustrating line reordering for a 2×3 spot pattern similar to that of FIG. 42S having an effective row spacing of 9 lines and a vertical adjustment between scan passes of 2 lines.

FIGS. 45A through 45H are time sequence diagrams for Example 14, illustrating line reordering for a 4×3 spot pattern similar to that of FIG. 28S having an effective row spacing of 11 lines between RowA and RowB, 10 lines between RowB and RowC, and 13 lines between RowC and RowD, and a vertical adjustment between scan passes of 4 lines.

FIGS. 47A through 47H are time sequence diagrams for Example 15, illustrating the line reordering of the pattern of spots shown in FIG. 46S.

FIGS. 48A through 48J are time sequence diagrams for Example 15, illustrating line reordering for a 4×3 spot pattern of FIG. 46S having an effective row spacing of 1 line between RowA and RowB, 21 lines between RowB and RowC, and 1 line between RowD and RowD, and a vertical adjustment between scan passes of 4 lines.

FIGS. 50A through 50J are time sequence diagrams for Example 16, illustrating line reordering for a 5×3 spot pattern of FIG. 49S having an effective row spacing of 6 lines and a vertical adjustment between scan passes of 5 lines.

FIGS. 51A through 51J are time sequence diagrams for Example 17, illustrating line reordering for a 5×3 spot pattern similar to that of FIG. 49S having an effective row spacing of 24 lines and a vertical adjustment between scan passes of 5 lines.

FIGS. 52A through 52J are time sequence diagrams for Example 18, illustrating line reordering for a 5×3 spot pattern similar to that of FIG. 49S having an effective row spacing of 11 lines between RowA and RowB and between RowD and RowE and of 36 lines between RowB, RowC and RowD, and a vertical adjustment between scan passes of 5 lines.

FIGS. 58A through 58F are time sequence diagrams for Example 21, illustrating the time shifting of spots of each primary color at the beginning of scan pass s3 for the pattern of spots shown in FIG. 57.

FIGS. 59A through 59F are time sequence diagrams for Example 21, illustrating the time shifting of spots of each primary color at the end of scan pass s3 for the pattern of spots shown in FIG. 57.

FIGS. 68A through 68H are time sequence diagrams for Example 24, illustrating line reordering for a linear spot pattern similar to that of FIG. 67S having an effective row spacing of 1 line and a vertical adjustment between scan passes of 4 lines.

FIGS. 69A through 69C are time sequence diagrams for Example 24 illustrating the time shifting of spots of each primary color at the start of scan pass s3 for a pattern of spots shown in FIG. 67S.

FIGS. 70A through 70C are time sequence diagrams for Example 24 illustrating the time shifting of spots of each primary color at the end of scan pass s3 for a pattern of spots shown in FIG. 67S.

FIGS. 72A through 72H are time sequence diagrams for Example 25, illustrating line reordering for a linear spot pattern similar to that of FIG. 71S having an effective row spacing of 1 line and a vertical adjustment between scan passes of 4 lines.

FIGS. 73A through 73C are time sequence diagrams for Example 25 illustrating the time shifting of spots of each primary color at the start of scan pass s3 for a pattern of spots shown in FIG. 71S.

FIGS. 74A through 74C are time sequence diagrams for Example 25 illustrating the time shifting of spots of each primary color at the end of scan pass s3 for a pattern of spots shown in FIG. 71S.

FIGS. 76A through 76H are time sequence diagrams for Example 26, illustrating line reordering for the spot pattern of FIG. 75S having an effective row spacing of 4 lines and a vertical adjustment between scan passes of 3 lines.

FIGS. 77A through 77D are time sequence diagrams for Example 26 illustrating the time shifting of spots of each primary color at the start of scan pass s7 for a pattern of spots shown in FIG. 75S.

FIGS. 78A through 78D are time sequence diagrams for Example 26 illustrating the time shifting of spots of each primary color at the end of scan pass s7 for a pattern of spots shown in FIG. 75S.

FIGS. 79A through 79H are time sequence diagrams for Example 28, illustrating line reordering during Subframe A using interlaced scanning for a linear spot pattern similar to that of FIG. 67S, having an effective row spacing of 2 lines and a vertical adjustment between scan passes of 8 lines.

FIGS. 80A through 80H are time sequence diagrams for Example 28, illustrating line reordering during Subframe B using interlaced scanning for the linear spot pattern employed in FIGS. 79A–79H.

FIGS. 81A through 81H are time sequence diagrams for Example 29, illustrating line reordering during Subframe A using interlaced scanning for a linear spot pattern similar to that of FIG. 28S, having an effective row spacing of 9 lines and a vertical adjustment between scan passes of 8 lines.

FIGS. 82A through 82H are time sequence diagrams for Example 29, illustrating line reordering during Subframe B using interlaced scanning for the linear spot pattern employed in FIGS. 81A–81H.

FIGS. 83A through 83H are time sequence diagrams for Example 30, illustrating line reordering during Subframe A using interlaced scanning for a linear spot pattern similar to that of FIG. 28S, having an effective row spacing of 10 lines and a vertical adjustment between scan passes of 8 lines.

FIGS. 84A through 84H are time sequence diagrams for Example 30, illustrating line reordering during Subframe B using interlaced scanning for the linear spot pattern employed in FIGS. 83A–83H.

FIGS. 87A through 87H are time sequence diagrams for Example 31, illustrating line reordering for a linear spot pattern similar to that of FIG. 86 having an effective row spacing of 1 line and a vertical adjustment between scan passes of 12 lines.

DETAILED DESCRIPTION

Figure 1:
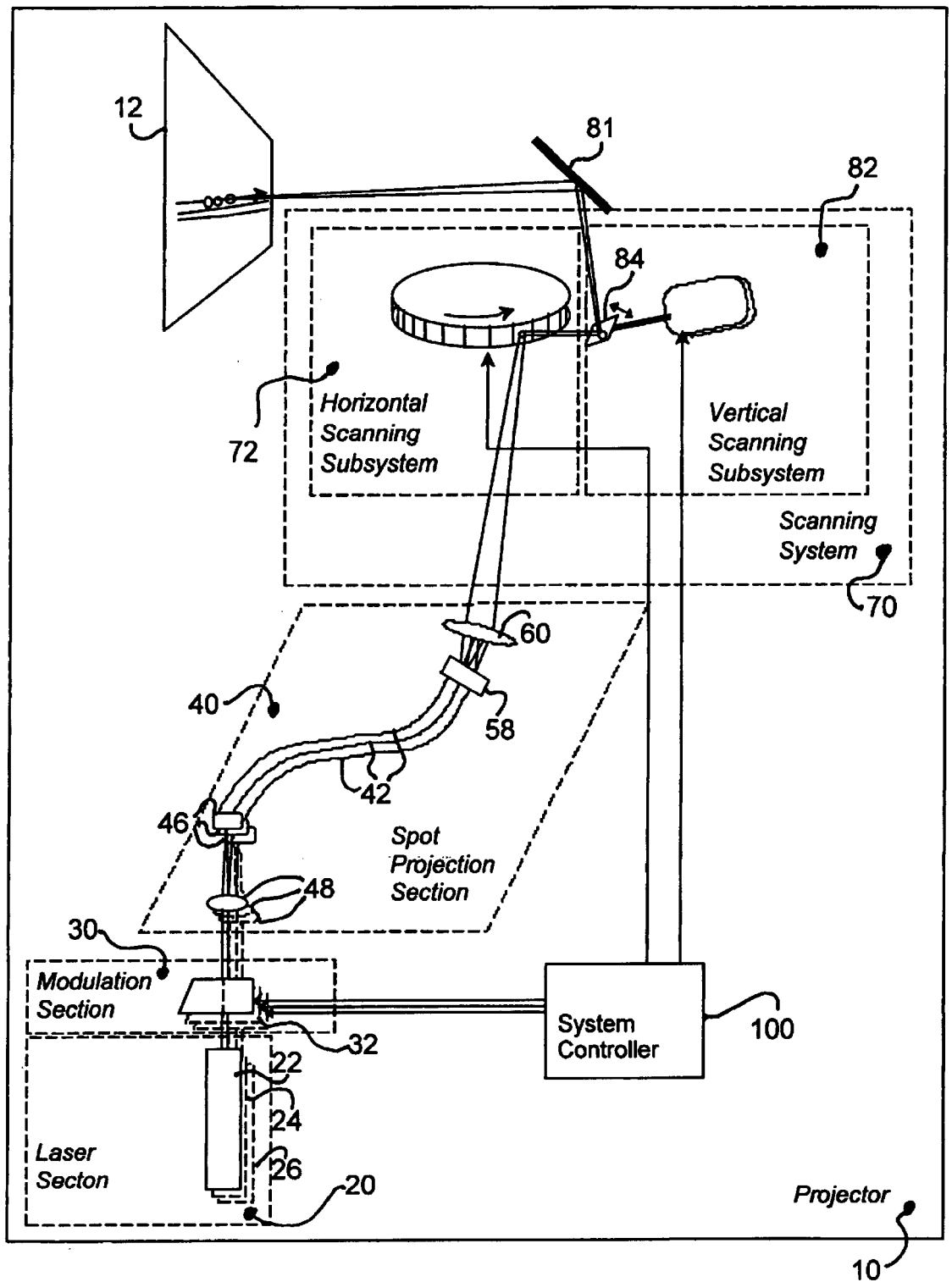
FIG. 1 is a schematic representation of a laser projection system of a first embodiment of our invention.

Because the detailed description of the preferred and alternate embodiments is rather extensive, for ease of reference, we have included herein subheadings descriptive of the content appearing thereafter. These subheadings should not be considered as limiting the scope of the material identified thereby, but are provided merely for convenient reference to the subject matter of the detailed description.

Foundations of Technological Discussion

Before addressing the descriptive embodiments of our invention, it is important to establish a frame of reference to basic laser projection technology. Laser light is preferable to other forms of illumination to project an image in motion picture theaters and other venues for the following reasons. First, the coherence of laser light, given the same optics, allows it to be focused to a smaller spot on the screen when compared to non-coherent light, allowing the generation of much more detail on the screen. Second, light emitted from lasers is very pure in color. This produces vibrant colors, while incandescent projection using non-laser light sources generates colors by filtering out unwanted wavelengths. In order to obtain adequate intensity of color in non-laser light, a relatively wide band of colors must be allowed through the filter, thus muddying the color's pureness. Third, with the Diode Pumped Solid State ("DPSS") lasers preferred for our invention, it is now possible to exceed the intensity of non-laser light in a video application, and to do it with less electrical power and less installation infrastructure.

As noted in the Background section, to make a color video image, three basic components are typically needed: (a) at least three beams, each corresponding to one of the three primary colors (red, blue, green); (b) a method of controlling the intensity of each beam, called "modulation"; and (c) a method of distributing the light as modulated across the screen surface, called "scanning". The modulation and the scanning of the beam are synchronized, such that when dot locations corresponding to a particular image pixel is to be illuminated, the beam or beams are modulated to produce the desired color and intensity as the beams are directed toward the screen or viewing surface.

Color images are typically formed by three spots for each pixel, with each spot corresponding to one of the three primary colors. There are three basic techniques for combining primary colors in a dynamic display device. They are:

1. The primary colors in small spots adjacent to each other
2. The primary colors on top of each other
3. The primary colors shown at different times.

As discussed in greater detail herein regarding the laser section of our preferred embodiments, many combinations of source colors may be employed, including the three primary colors mentioned above. Specific wavelengths of colors in each of the red, green and blue ranges are more specifically detailed herein in connection with large screen projection. However, the words "primary colors" shall be understood to mean colors of appropriate laser beam wavelengths, such that when combined at a dot location on a screen at the appropriate intensity, the color resulting from such combination will have the color characteristics desired for most colors. We also contemplate the use of a single color for monochrome projection, or two colors, or more than three colors in combination to enhance the range of available composite colors, to accomplish the objectives of different projection systems.

For cathode ray tubes, such as used in color television and computer monitors, the screen is a curved plate of glass having an array of phosphor-coated dots, with three different phosphors at each location, one for each primary color. (Thus, each of our "dot" locations has three phosphor dots.) The phosphor dots of color are typically spaced sufficiently close together so that the eye of the viewer will not discern the light emitted from individual phosphor dots. Rather, the eye merges the light emitted from the individual phosphor dots into the desired composite color. The image is formed by an electron beam that is directed to discretely excite each of the phosphor dots in a combination corresponding to the desired color value of the relevant pixel in the video data. The brightness of the color generated by the phosphor is controlled by modulating the intensity of the electron beam striking the phosphor. The screen is sometimes masked by a grid to insure that phosphor dots are not excited by the electron beam striking an adjacent dot. As noted above, the video information is synchronized with the scanning of the beam to a desired dot location and the modulation of the beam intensity to generate the desired color brightness.

Successful color video displays are known where the three colors actually occur on top of each other. Examples of this include the currently available three-gun CRT projectors, colloquially known as "rear projection television", that simultaneously scan each of the three colors which are then projected as overlapping spots on a screen.

Early televisions used a color wheel to sequentially scan a full frame in each primary color. Our process of displaying colors involves a form of time combining, but where the time separation is very short and the colors appear substantially on top of each other.

Description of Preferred System

Referring to FIG. 1, a laser projection system 10 according to our invention may be seen to include: laser section 20 supplying light beams in three primary colors (red, green and blue) that will be directed toward a screen 12; modulation section 30 controlling the intensity of each light beam according to the pixel information; spot projection section 40 for forming the spots of light on the screen 12; scanning section 70 to distribute the spots of light projected by a horizontal scanning subsystem 72 in lines across the width of the screen 12, each traverse referred to herein as a "scan pass", and a vertical scanning subsystem 82 that vertically repositions the scanned beams after each scan pass to different specific vertical locations on the screen, traversing the height of the screen 12; and system controller section 100 which converts the pixel data representing the image into signals that are used by the modulation and scanning sections 30 and 70, respectively, to illuminate the image indicated in the image data. The controller section 100 also reformats the image into buffers suitable for our display, controls the timing of the horizontal and vertical scanning subsystems 72 and 82, respectively, stabilizes the image, reworks the incoming color values to suit the laser sources, selects and stages the video presentation, and performs diagnostics and keeps usage and diagnostic records.

Advantages of Using Optical Fibers

Figure 2:
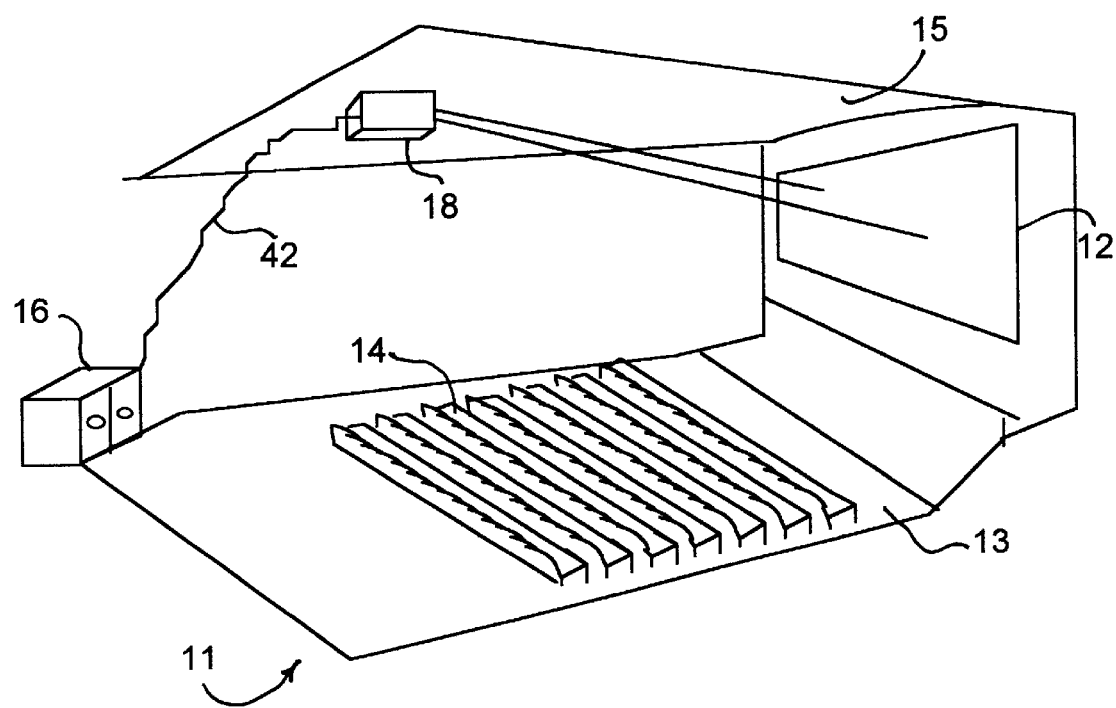
FIG. 2 is a diagram of a theater in which the system of FIG. 1 may be employed.

The flexible optical fibers 42 permit an arrangement of the lasers of the laser section 20 that is convenient for the particular packaging of the preferred laser projection system 10 as a whole. The flexibility afforded by the transmission of the modulated laser beams to the scanning section 70 permits the placement of the laser and modulation sections 20 and 30, respectively, at locations remote from the scanning component. For example, as shown in FIG. 2 showing a schematic perspective view of a commercial theater 11, having the large screen 12, floor 13, seats 14 and ceiling 15. In the theater shown in FIG. 2, the laser, modulation and controller sections 20, 30 and 100, respectively, are located in closet 16 or other convenient location, and fibers 42 extend from the closet 16 to scanning module 18 containing the scanning section 70 positioned on the ceiling 15 or other desirable location at the desired throw distance from the screen 12.

The laser and modulation sections 20 and 30, respectively, preferred for anticipated initial commercial embodiments of our invention will be more particularly described herein. However, as we noted previously in the Summary of the Invention section hereof, significant advantages are separately and synergistically realized by our use of a spot projection system 40 using multiple optical fibers, for convenience referred to herein as fiber 42 to conduct multiple separately modulated laser beams to be emitted to the scanning section 70 in a closely spaced array of substantially parallel beams to form a desired spot pattern on the screen 12. While considering the various embodiments of the spot projection scanning and controller sections 40, 70 and 100, respectively, of our invention described later herein, it should be remembered that a significant advantage of a laser projection system according to our invention is that the use of the fibers 42 enables the use of practically any appropriate laser and modulator components in the laser and modulation sections 20 and 30, respectively. Our invention permits modifications and upgrades of initial laser and modulation components, and even wholesale changes to substantially different laser and modulator components, without substantial changes to the spot projection, scanning and controller sections 40, 70 and 100, respectively. Improvements in laser and modulator technology, particularly in the development of high power lasers in colors and beam quality suitable for our application, will reduce the size and cost of these components. Our invention thus allows purchasers of our systems to easily and economically take advantage of such upgrades and enhancements.

The use of the fibers 42 to transmit the laser beams to the scanning module 18 also enhances the utility and user-friendliness of the system according to our invention, in that the laser sources, modulators, scanning components, and controller electronics may be separately replaced, upgraded or modified without the need to alter the remaining components.

Basic Description of Spot Projection Section

Figure 3:
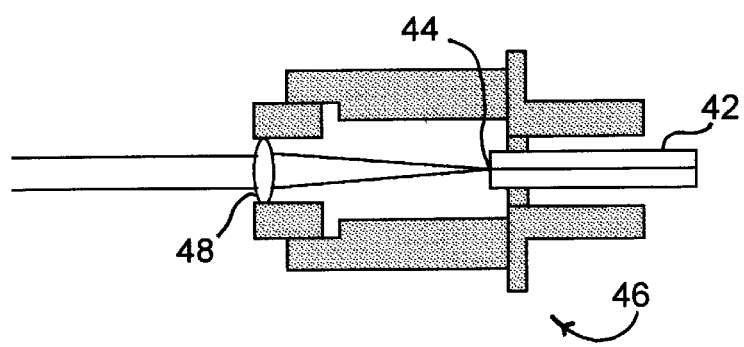
FIG. 3 is a schematic representation of the lens used to insert the modulated beam into the fiber in the spot projecting section of the system shown in FIG. 1.
Figure 4A:
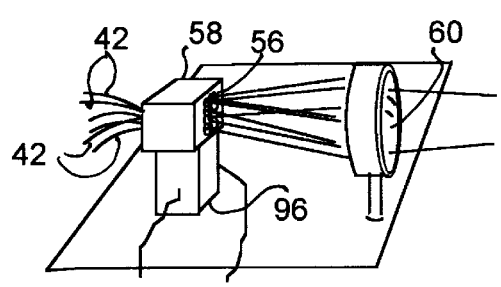
FIG. 4A is a schematic representation of the output head of fiber emitting ends and output lens portion of the spot projecting section of the system shown in FIG. 1, with a piezo electric actuator mounted to move the output head.
Figure 4B:
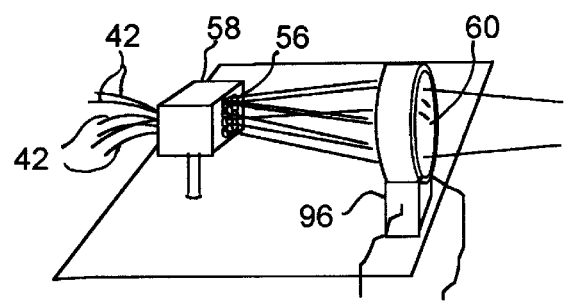
FIG. 4B is a schematic representation similar to that of FIG. 4A, except that the piezo electric actuator is instead mounted to move the output lens.
Figure 4C:
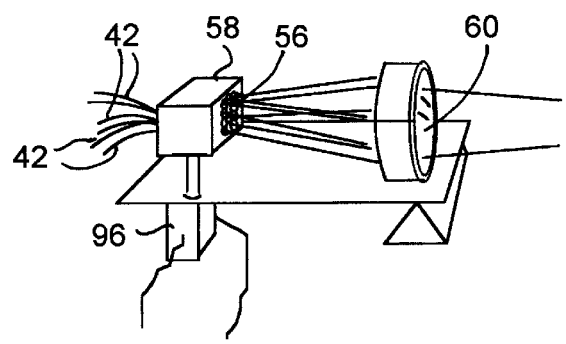
FIG. 4C is a schematic representation similar to that of FIGS. 4A and 4B, with a piezo electric actuator mounted to move both the output head and the output lens as an output assembly.

Referring again to FIG. 1, in the spot projection section 40 of the system 10 according to our invention the modulated beams are inserted into optical fibers, referred to herein as fibers 42, and emitted in a pattern that is projected through the scanning section 70 and thence to the screen 12. Each of the fibers 42 has an insertion end 44 and an emitting end 56. Referring to FIG. 3, associated with each insertion end 44 of the spot projection section 40 is a fiber input head 46 securing and positioning each insertion end 44 with respect to input optics or lens 48 corresponding to each insertion end 44. The technology for inserting laser beams into optical fiber is well known. We prefer to use beam inserter lens manufactured by Thor Laboratories, Model No. C170TM-A. FIGS. 4A–4C each show the fiber emitting ends 56 of all of the fibers 42 mounted in a desired array in output head 58, preferably in the form of an epoxy block fixed to a chassis in a desired position with respect to an output lens 60. It should be understood that FIG. 1 shows only three modulators, fibers 42, fiber input heads 46 and input lenses 48 to avoid unnecessarily cluttering the drawing, and that in our preferred system, twelve separate modulators, fibers 42, input heads 46 and input lenses 48 would be employed.

Figure 5:
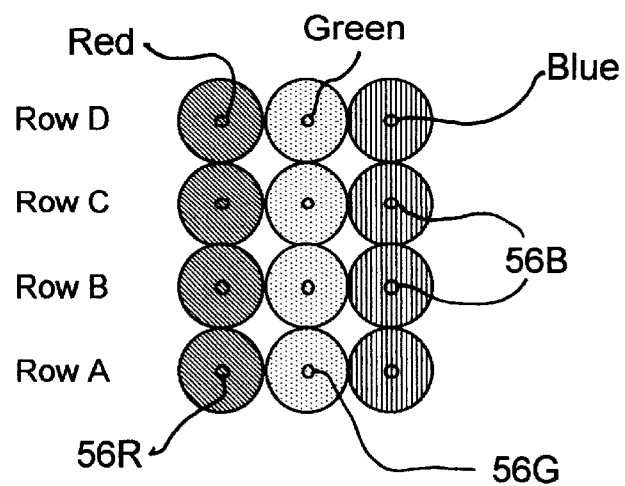
FIG. 5 is a diagram of the array of fiber emitting ends in an output head of the system of FIG. 1.

FIG. 5 shows an exemplary arrangement of the fiber emitting ends 56 in an array or configuration of four rows of emitting ends having three emitting ends per row such that four rows of spots, with each row having each of the three primary colors, are projected to the screen 12 by laser beams emitted from the emitting ends 56 of the fibers 42. It is not possible with conventional reflective and refractive optics to make a large diffuse spot of light or an array of spots into an infinitely small spot. An image of the source must be formed. By using each of the fiber emitting ends 56 as the image forming or relay or spot projection device for transmission of a single color spot, we form an image of the array of emitting ends 56 as a pattern of spots on the screen 12. Each individual spot can be diffraction limited in size, as discussed in greater detail herein.

Since the spots are traveling along the same desired path across the screen 12, and striking the same apparent dot location at different times but within the time limit for integration by the eye, we can make the desired composite color at a particular dot location by timing the modulation of each separate color beam at the necessary intensity to occur when each color beam arrives at the desired dot location.

Figure 5S:
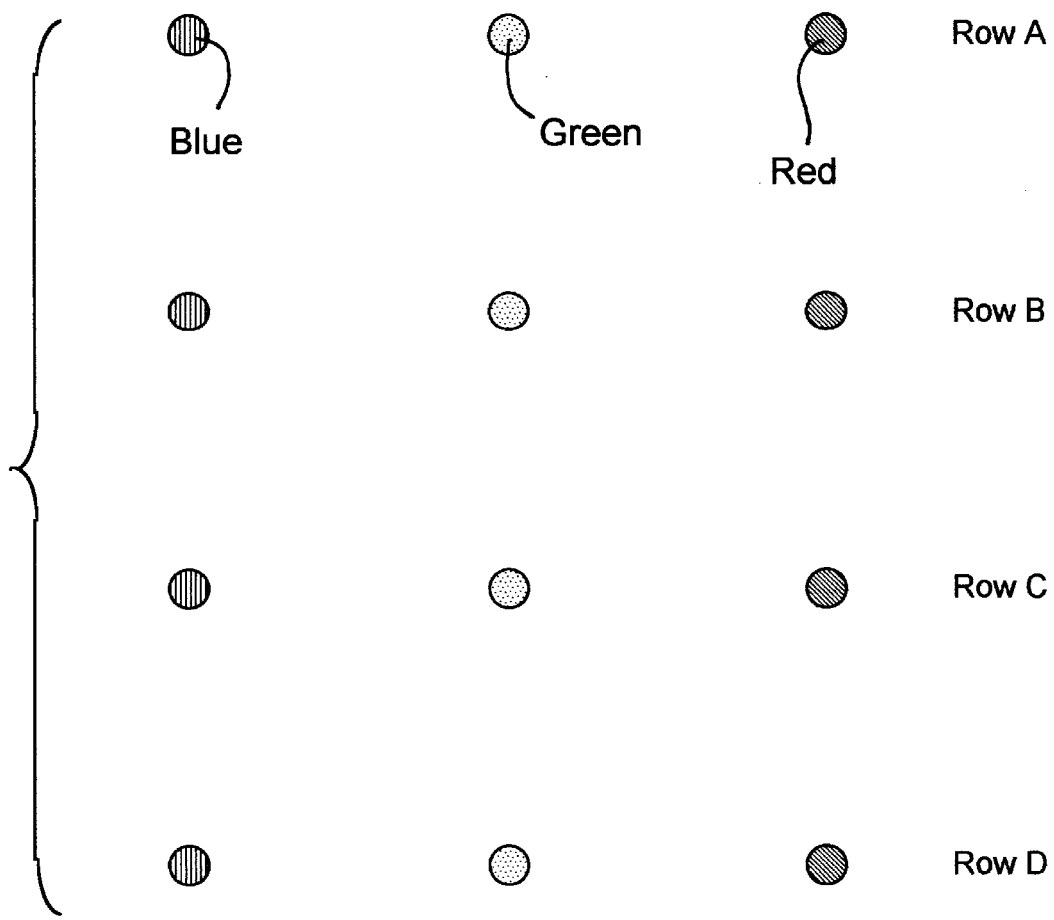
FIG. 5S is a diagram of the pattern of spots projected on a screen using the array shown in FIG. 2.

Referring again to FIG. 5, the pattern of spots thus formed by the array of fiber emitting ends 56 is preferably (but not necessarily according to our invention) comprised of more than one laser beam or more than one row of horizontally aligned beams. In our preferred embodiment, four rows of beams emitted from four rows of emitting ends 56 are preferably vertically spaced apart to scan four distinct lines of spots onto the screen 12. At no time or position are the several separate beams or horizontally aligned rows of beams coaxial even though the axes of the beams may cross at a position beyond the output lens 60. In the embodiment shown in FIG. 1 and further described herein one modulated beam is used for each color in each row of fibers 42. Four rows of three beams are scanned in a pattern of spots together to form four spaced apart lines with each horizontal scan pass. For this configuration, this requires three colors times four lines, or twelve separate fibers 42. Thus, the modulated spot projection section 40 of the theater laser projection system 10 preferably includes twelve fibers 42, emitting twelve separately modulated laser beams from twelve emitting ends 56 as shown in FIG. 5 to produce twelve spots on the screen in a pattern of 4 rows of 3 spots per row, as shown in FIG. 5S. For consistency, in the remaining figures describing the preferred array of emitting ends and alternate arrays, we will sometimes describe instead the pattern of spots produced by the laser beams emitted from, and conforming to, the array of emitting ends 56. It should be understood that because of the lens used in our preferred system, the actual position of the spots is reversed on the screen 12 from the position of their corresponding emitting ends in the array, albeit in the same relative pattern. As described in more detail later herein, we refer to the rows of emitting ends from bottom to top as RowA, RowB, RowC and RowD. Using this convention, it may be seen that the lens inverts the image about the axis of the lens, such that the beam emitted from the left-most emitting end of the bottom RowA of the emitting end array will be projected as the right-most spot in the top RowA of the corresponding spot pattern projected on the screen.

Any focusing optic may be used in place of the preferred single achromat output lens 60 illustrated herein, such as a focusing mirror, other suitable lens or lens combination, or holographic element. Such focusing optic should preferably result in the light beams emitted from the emitting ends being substantially parallel when leaving the focusing optic, such as illustrated in FIG. 83, to produce a pattern of spots corresponding to the configuration of the emitting ends.

Description of Optical Fibers of Spot Projection Section

After insertion into a fiber 42, the light travels along the fiber 42 to a bend, where the difference in optical density between the fiber 42 and its cladding (if any) causes the light to reflect without loss to the next edge of the fiber 42. However, if the size of the fiber 42 is only a few times the wavelength of the light, then the light travels as if it were in a waveguide and does not actually bounce off the walls, but is guided along, bending with the fiber 42, preserving the beam quality. This is called a "single mode" fiber. When the diameter of the fiber increases beyond the single mode range, then the light emits from the emitting end 56 in luminous patches rather than a single patch, whatever the "quality" of the inserted beam, with more and smaller patches as the relative diameter increases. The beam emitting from a single mode fiber is equally as focusable as a TEM00 laser beam, i.e., a beam having a cross-beam power profile in the shape of a Gaussian bell curve, known as TEM00. We refer to a beam of a less pure quality as "multimode". Multimode beams from a given laser are usually higher power but do not focus to as small a spot as single mode (TEM00) beams given the same focusing optics. If possible, we prefer a TEM00 laser beam emitting from the emitting ends 56. However, a TEM00 laser beam would be required for efficient insertion into a single mode fiber. Fortunately, a slightly larger than single mode fiber nearly preserves the point source characteristics of a TEM00 laser beam. Moreover, slightly larger than single mode fibers can also be used with somewhat less perfect than TEM00 laser beams and still achieve nearly the same benefits, namely a high order of focusability and high insertion efficiency. This results in a spot scanned to the screen that is sufficiently small for high resolution large screen laser projection. Our preferred fiber for such a larger-than-single-mode fiber 42 is an SMF-28 8.5 micron fiber from Corning Glass Works, or equivalent. This fiber is only slightly larger than the 4 to 5 micron diameter required for preserving a single mode beam with visible light. With this fiber, the beam image is more than adequate at high resolution, despite not being the ideal theoretically possible. Our invention may also use to advantage almost any other "light pipes" other than the single mode or nearly single mode step-index optical fibers described previously herein. These alternates may, especially with further advances in optical fiber transmission, include fibers such as gradient index (GRIN) fibers where the change in index between the core and cladding is not practically instantaneous as with the step-index fibers, but rather increases or decreases gradually from center to external surface of the cladding. We may also include hollow glass tubes or hollow tubes made of other materials.

In addition to preferring nearly single mode fibers for the reasons set forth above, we further prefer such fibers 42 to have a narrow cone angle of acceptance, also known as numerical aperture. The cone angle at which the light enters and leaves the ends of the fiber 42 (assuming a very long fiber) is determined by the differences in optical density. The preferred fiber having a narrow cone angle will cause the light emitting from the fiber 42 at the emitting ends 56 to be at a correspondingly narrow cone angle that can be directed at the screen 12 with a simpler output lens 60 and, as described later herein, smaller polygon mirror facet size than would otherwise be required. Our preferred Corning Glass Works fiber described above has such a narrow cone angle or small numerical aperture.

In our preferred fiber output head 58 assembly shown in FIG. 5, with the fibers adjacent to one another, the spacing between the centers of the fiber emitting ends 56 is between 70 and 125 microns. Again referring to FIGS. 4A–4C, the output lens 60 is preferably a ¼ inch or larger diameter simple two-element achromat of 12.5 to 25 mm focal length. For our preferred system 10 shown in FIGS. 1 and 4, the lens 60 is positioned at a distance from the emitting ends 56 that is appropriate, in consideration of the throw distance from the emitting ends 56 to the screen 12, to focus the beams to produce a pattern of spots, such as shown in FIG. 5S, having the desired resolution on the screen 12 without an intermediate focal point.

The emitting ends 56 are secured within the output head 58, and are preferably arranged in the output head 58 in the configuration shown in FIG. 5 in a rectangular array or pattern four fibers high and three fibers wide, with one laser beam in each of the three primary colors issuing from one of the emitting ends in each row. At the emitting ends 56, the light emits from the fibers 42 and all of the individual beams travel through a single output lens 60. However, it should be understood that our invention should not be limited to this particular pattern, as a multitude of patterns could be employed, as described herein. Further, arrays having two, three or more than four vertically spaced rows of fibers 42 and more or less than three fibers 42 per row could be employed. We have selected the four row by three fibers per row array for the sake of economy and performance, based on the criteria discussed previously herein, and described in more detail herein.

The use of high power laser beams for projection presents several problems in the insertion of the beam into the insertion ends 44. At the point where the beam is focused into the fiber insertion end, the laser beam has considerable energy. One problem with the high energy is with heating of the air or the cladding of the fiber 42 in the vicinity of the insertion end and at the emitting end. If the focused beam is powerful enough, which is possible at the powers required for theater projection, the air can become ionized and cause dust to be attracted to the space near the fiber insertion end 44 and near the emitting end 56. The dust in the paths of the beam near the insertion and emitting ends and the insertion and output lenses absorbs light energy, explodes, and dirties the face of the respective ends of the fibers 42 and the lenses which then absorbs more light, and the fiber 42 melts or vaporizes or the surface of the lens is pitted or etched.

Further, the transition from glass to air at the emitting end and from air to glass at the fiber 42 insertion ends 44 tends to result in Fresnel reflection losses of beam strength, necessitating even higher power laser energy at the source to make up for any such losses.

In order to avoid these problems, we prefer to use similar but different solutions for different segments of a system 10 according to our invention. For the segment of the system including the output head 58 of emitting ends and the output lens of the spot projection section 40 shown in FIGS. 4A–4C, and the components of the scanning section 70, such as would be in the ceiling-mounted scanning module 18 shown in FIG. 2, we prefer to employ a circulated or forced air system to move ambient air through HEPA-quality filters which removes substantially all dust and other particulates that might degrade the beams and be exploded to dirty the faces of the optical elements of this segment of the system. For the segment including the laser and modulation sections 20 and 30, and the input heads of insertion ends 44 shown in FIG. 3, and input lenses 48, such as in the closet 16 of the theater 11 of FIG. 2, we prefer to employ a fluid tight enclosure containing these components and inert gas, preferably helium. In addition to the benefits of eliminating dust and particles from the beam path to solve the foregoing problems, enclosing the components of the laser and modulation sections 20 and 30, respectively, provides a convenient and effective means of cooling these components. Although not preferred, one alternative to a helium atmosphere to contain the beam paths is another inert gas, such as argon. Further, a circulated ambient air system with HEPA-quality filters to remove substantially all dust and other particulates could be employed for this segment of the system, as with the emitting end/scanning segment. A substantial reason, in addition to being simpler and requiring less maintenance, for employing the ambient air with HEPA filter approach for the scanning component is that the preferred polygon mirror assembly uses an air-friction bearing for the high speed polygon, which may be incompatible with the noble gas alternative.

Figure 6:
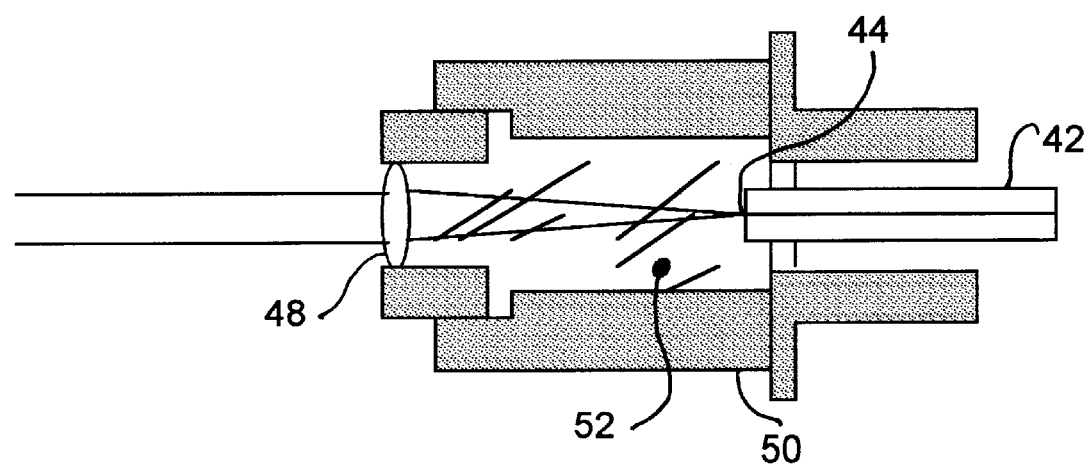
FIG. 6 is a schematic representation of the input lens and fiber input head portion shown in FIG. 3, with an input interface capsule enveloping the space between the insertion end and input lens.

An alternative to enveloping the beam paths in a gas, that also minimizes the adverse effects of the dust and reflection losses at the fiber insertion point is to immerse the space between each input lens 48 and its associated insertion end 44 in an index matching fluid 52, as shown in FIG. 6. The fluid does several things: (a) it absorbs and disperses any unwanted heat from the stray beam, absorbed beam, or unaligned modulated beam; (b) it prevents ionization and dust; and (c) it index-matches the back of the lens 48 with the front or insertion end 44 of the fiber 42, decreasing Fresnel reflections and increasing efficiency. This may also be accomplished with an index matching glue or other polymer fixing the input lens 48 at a desired distance and alignment to the insertion end 44. Further, it may be preferable to take advantage of the index-matching properties of such glue or polymer interface in the enveloping gas embodiment described above. For this alternative embodiment shown in FIG. 6, the spot projection section 40 also includes an input interface capsule 50 enclosing the space between each of the input lenses 48 and its corresponding insertion end 44, and input-interface fluid 52 within the input interface capsule 50.

Figure 7:
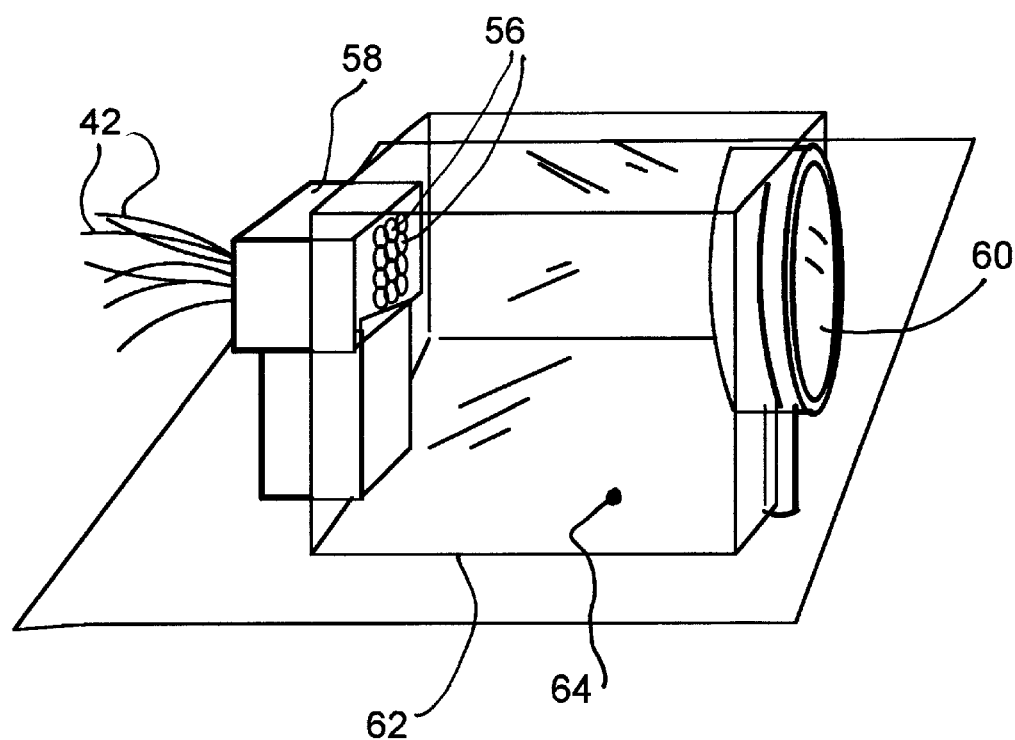
FIG. 7 is a schematic representation of the output head of fiber emitting ends and output lens portion shown in FIG. 4, with an output interface capsule enveloping the space between the emitting end and output lens.

FIG. 7 shows the components illustrated in FIGS. 4A–4C, namely the output head 58 of 12 emitting ends 56 and output lens 60, with the addition of output interface capsule 62 containing interface fluid 64, substantially similar to that enclosing the insertion ends of the fibers. However, the use of an interface fluid, or the alternative glue or other index matching polymer, in the output portion of the spot projection section 40 poses special problems addressed later herein.

Spot Projection Section Configurations

Figure 8:
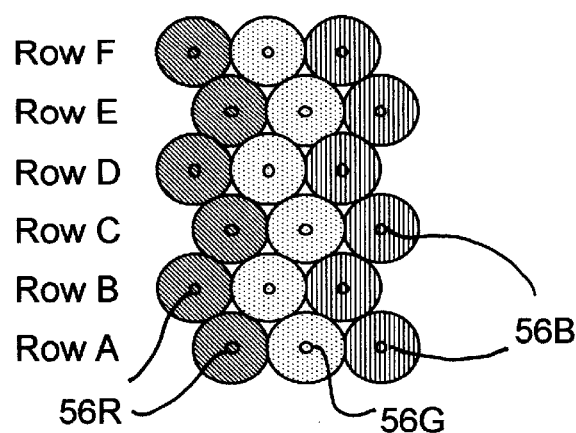
FIG. 8 is a diagram of a six row by three emitting ends per row array of an output head of a system similar to that shown in FIG. 1.
Figure 8S:
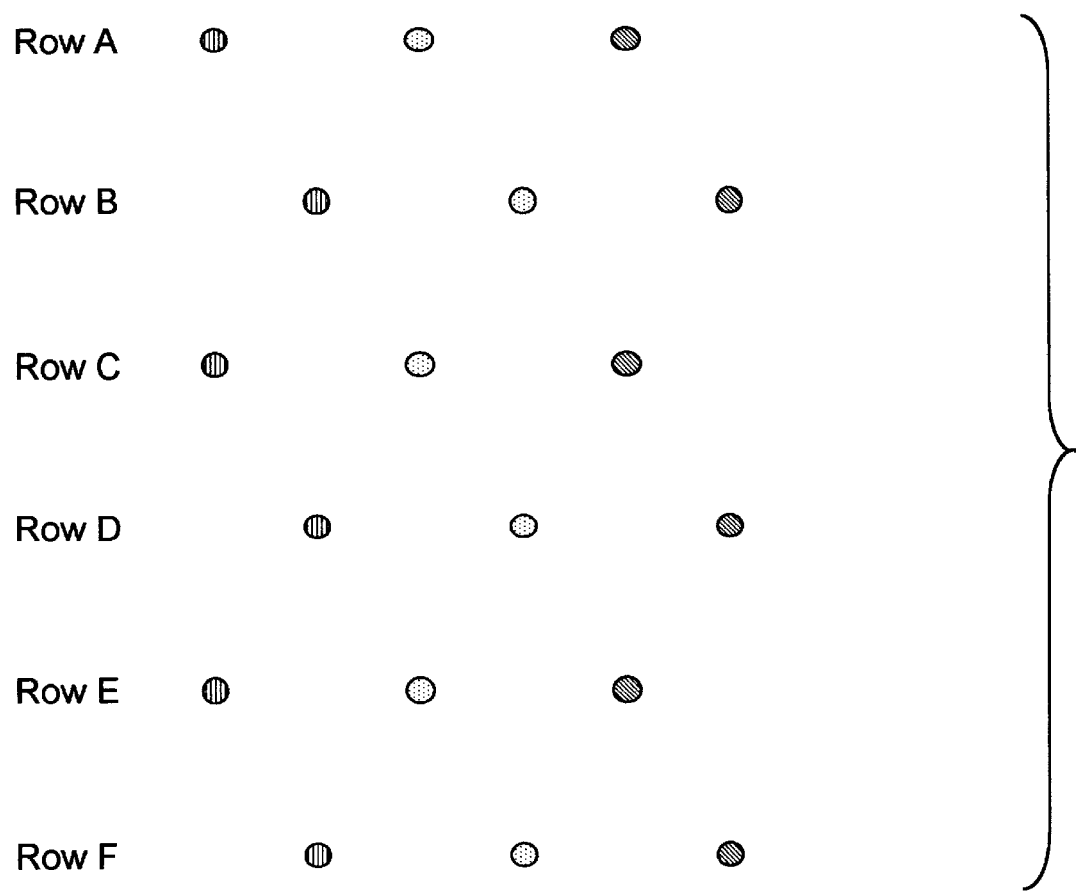
FIG. 8S is a diagram of the pattern of spots projected on a screen using the array shown in FIG. 8.

It will be understood that alternate patterns, arrangements and numbers of emitting ends for producing spots of different colors or multiples of colors could be employed and be within the scope of our invention. Although it is not feasible in this context to provide a comprehensive catalog of the possible patterns and arrangements of fibers, modulators and lasers, the following examples, and additional examples described in connection with alternative spot patterns, illustrate the wonderful flexibility and power our use of fibers and multiple line scanning affords laser projection system technology. For a first example, in order to achieve our most preferred resolution of 3000×2000 p, it may be necessary, for example, to add two additional rows of emitting ends for a configuration of 6×3 fiber emitting ends as shown in FIG. 8, to project a spot pattern of 6 rows of 3 spots per row as shown in FIG. 8S, or 18 fibers or spots in total. The additional rows permit scanning of more lines and spots, while continuing to realize the benefits of our invention with respect to modulation rate for each modulator of the system, and to keep the scanning system components within acceptable economy and resolution capabilities. It should be understood that such a fiber emitting end pattern could be employed with our preferred system in place of the 4 row by 3 emitting ends per row array shown in FIG. 5, although this configuration requires additional modulators, lasers and other components. Therefore, our preferred system represents a reasonable balance between system cost and performance for the resolution available at present.

Figure 9:
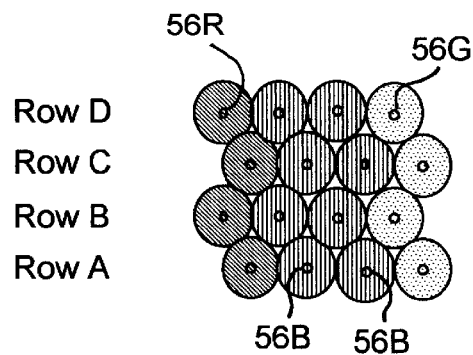
FIG. 9 is a diagram of a four row by four emitting ends per row array of an output head of a system similar to that shown in FIG. 1, having two blue beams assigned to each row of emitting ends.
Figure 9S:
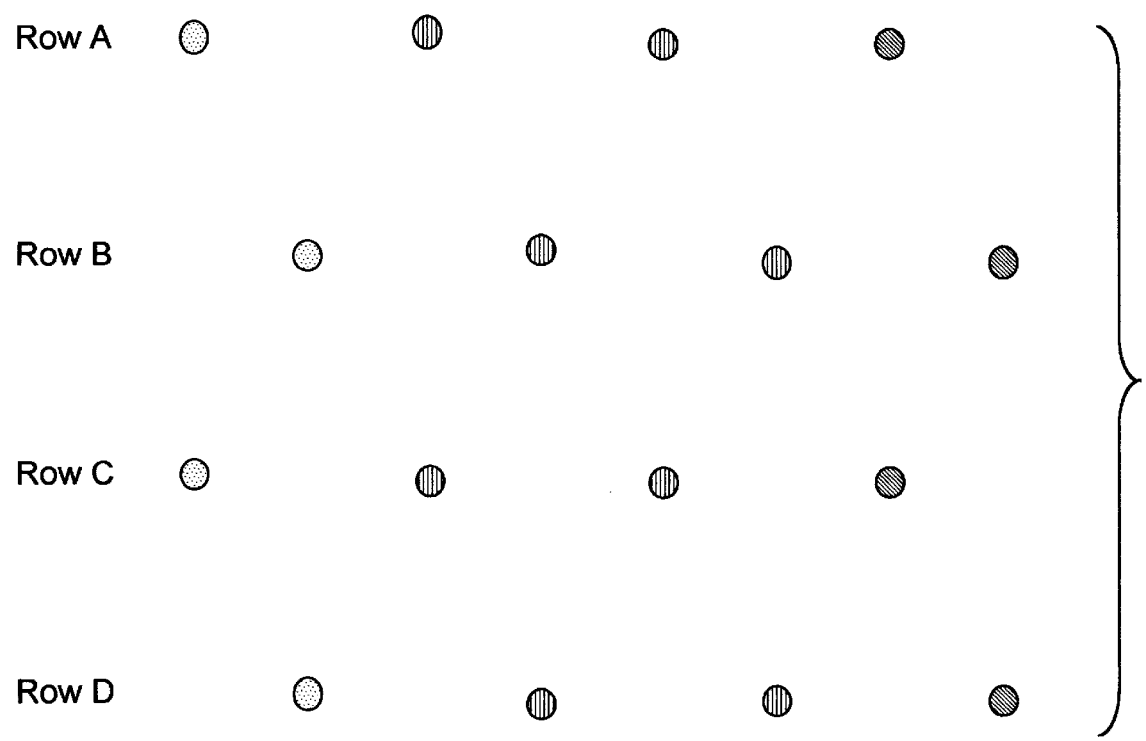
FIG. 9S is a diagram of the pattern of spots projected on a screen using the array shown in FIG. 9.
Figure 10:
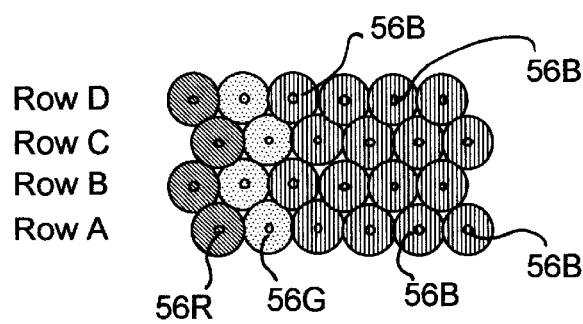
FIG. 10 is a diagram of a four row by six emitting ends per row array further described in connection with Example 19.
Figure 10S:
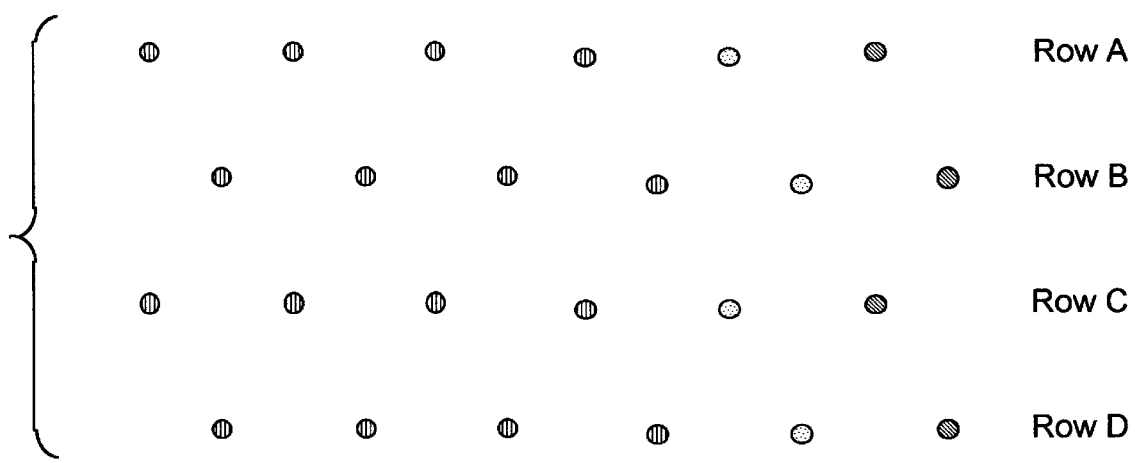
FIG. 10S is a diagram of the pattern of spots projected on a screen using the array shown in FIG. 10.

Different emitting end arrays producing various corresponding spot patterns may also be employed to take advantage of availability of different laser sources. For example, as shown in FIG. 9 and 10, it may be possible to use two or more less powerful blue lasers for each row (rather than one per row as in FIGS. 1 and 5) to produce the desired intensity of blue spots on the screen without using combining optics by using a 4×4 (FIG. 9), 4×5 or 4×6 (FIG. 10) emitting end configuration illustrated by the 4×4 and 4×6 spot patterns show in FIGS. 9 and 10, respectively, such that in each row of emitting ends, one emitting end emits a red laser beam, one emits a green laser beam, and the other two or more emitting ends 56 emit blue laser beams, each having a portion of the total power desired for blue.

A 4×4 emitting end configuration producing a 4×4 spot pattern could also be used for a different reason, namely the use of four different wavelengths to form the composite color at each dot location. Examples of the wavelengths that might be suitably employed are a red in the 605 nm range, a green in a 530 nm range, a blue in the 470 range, and another red in the 660 nm range. As described in more detail later herein, the color values for each pixel of video data could be suitably converted to the four color scheme by an appropriate color lookup table in the controller section 100, in a manner familiar to anyone skilled in the art. For example, the red in the 660 nm wavelength might be activated when a deep red is needed, while the photoptically more efficient red at the 605 nm wavelength is utilized to form most composite colors and the less deep red colors.

It would also be possible to employ our invention by combining two laser beams of different wavelengths, such as a red beam in the 605 nm wavelength and a red beam in the 660 nm wavelength, after their separate modulation and prior to insertion into a single fiber, thereby emitting a beam of both separately modulated wavelengths from a single emitting end of the fiber. Similarly, it would be possible employing our invention to combine the separately modulated beams of two different primary colors for transmission through a single fiber. This arrangement would enable transmission of the wavelengths requiring the highest power levels for photoptic perception through single fibers, while other colors requiring less power could be separately modulated and combined for insertion into and emission from the emitting end of a single fiber. In this way, a 4×3 or 4×4 emitting end output head configuration could accommodate a combination of laser beams of 4, 5, 6 or more separate wavelengths needed to form a composite spot at dot locations on the screen to produce particular combined color.

As described later herein in more detail in Example 21 employing a 4×6 output head configuration, for a 4 row by 6 spots per row spot pattern shown in FIG. 10, six beams are reordered or time shifted so that the blue beams strike those dot locations in each line that require a blue component. Thus, instead of having to combine the beams of more than two blue laser per row with optics that degrade and attenuate the laser beams, our invention permits the simple addition of the number of necessary fibers and emitting ends to produce the desired color intensity with the lasers available or desired.

It should further be understood that fibers may be used to transmit the modulated laser beams to the scanning components without employing multiple line scanning especially in monochrome applications, either with one color or with black and white, where a single emitting end directs the beam to the scanning components. Further, a single row of emitting ends may be employed to advantage without multiple line scanning, especially with scanning components having a greater scanning capability than the economical and simple scanning components employed with our preferred system shown in FIGS. 1, 3 and 4A–4C, or where resolution requirements are lesser.

It should further be understood that multiple line scanning, though technically challenging, is enabled by, but is not dependent on the use of fibers for beam transmission, or on rows of emitting ends. The combination of multiple line scanning, rows of emitting ends, and fiber do, however, enable a laser projection system that is less expensive, less complicated, and capable of substantially enhanced resolution than prior systems, notably standard film projection. It is the simultaneous scanning of multiple lines that allows us to use fewer and larger facets and a slower modulation speed. Our invention provides the unique ability to form a high resolution image with a variety of configurations of multiple emitting ends and/or multiple lasers.

Spot Projection Section Optical Components

As schematically shown in FIGS. 1, 3 and 4A–4C, the spot projection section 40 of this embodiment further preferably includes a single output lens 60 to focus all of the beams emitted from each of the emitting ends 56 onto the screen 12 through the scanning section 70. Given that the fiber emitting ends 56 are placed as close together as feasible, preferably as shown in FIG. 5, then the single output lens 60 will give "diffraction limited" spots at the distant target on the theater screen 12 as shown in FIG. 5S. At the target there will be an enlarged image of the pattern of the twelve (actual count depends on number of fibers 42 in the output head 58) fiber emitting ends 56. The individual spots on the distant target, e.g., screen 12, will each be at or near the diffraction limit for the wavelength and the diameter of the beam on the output lens 60 of the fiber emitting ends 56, given that the fibers 42 are preferably of the single mode or near single mode type. A complete discussion of the theory of diffraction limits, that is, of how spot size at the final focusing optic and wavelength affects the spot size at a distant target is given in any modern text on Gaussian beam optics, such as "Useful Optics", Walter T. Welford, University of Chicago Press, 1991, Ch. 7, pp. 44–57. The emitting ends 56 are close enough together that the beams from each travel, nearly enough for our purposes, but not exactly, on the axis of the output lens 60. This means that the output lens 60 can be, for example, a simple best form laser aspheric or a spherical singlet (both with a single element), or a simple achromat doublet or triplet. The use of a single output lens 60 also avoids complex optics and alignment problems inherent in using a separate output lens for each fiber emitting end 56, for each row as a whole or for all ends of each color. For convenience, we refer herein to the beams representing the pattern of spots projected by the array emitting ends onto the facet of the polygon mirror and thereafter the screen, as the "aggregate beam".

We wish to note that while we have mentioned lenses for beam shaping, we do not exclude, within the realm of our invention, the use of curved mirrors, holographic optical elements and other elements adapted to deflect or refract the laser beams in a desired manner.

Laser Beam Insertion and Emission with Optical Fibers

There is a difference between the insertion and emitting ends 56 of the fibers 42. As described above, for the insertion end 44 of each fiber 42 there will be one beam and one lens 48 for each fiber 42, whereas for the output end there will be twelve fibers 42, in different colors, preferably in vertically stacked rows of three emitting ends per row. All twelve beams will each travel through one of the twelve fibers, be emitted from an emitting end 56 of each fiber 42 and thence as an aggregate beam through a single output lens 60. If the beams are different colors and the emitting ends 56 are equidistant from the output lens 60 as shown in FIG. 4, then with a simple lens as the output lens 60, the focal length of the output lens 60 may be different for each color. Only one color would then be in exact focus on the screen 12, and the other two will be out of focus to an unacceptable extent. Although our use of an achromat lens as the output lens 60 in the preferred embodiment satisfactorily (although not totally) resolves this problem, an alternate solution for this problem is to manufacture an output head 158 such as that shown in FIG. 11A, where the emitting ends 156 of the fibers 42 to which the red, green, and blue wavelengths have been respectively assigned are positioned at different distances from output lens 160, ideally in the configuration shown in FIG. 11A, where the emitting ends 156 are squared off normal to the path of the beam and are staggered with respect to the output lens 160 so that the focus of the beam emitted in each color (as shown in FIG. 11A, wherein the red beam is emitted from emitting end 158R, the green beam from emitting end 158G and the blue beam from emitting end 158B) is at substantially the same point with respect to the output lens 160.

Figure 11A:
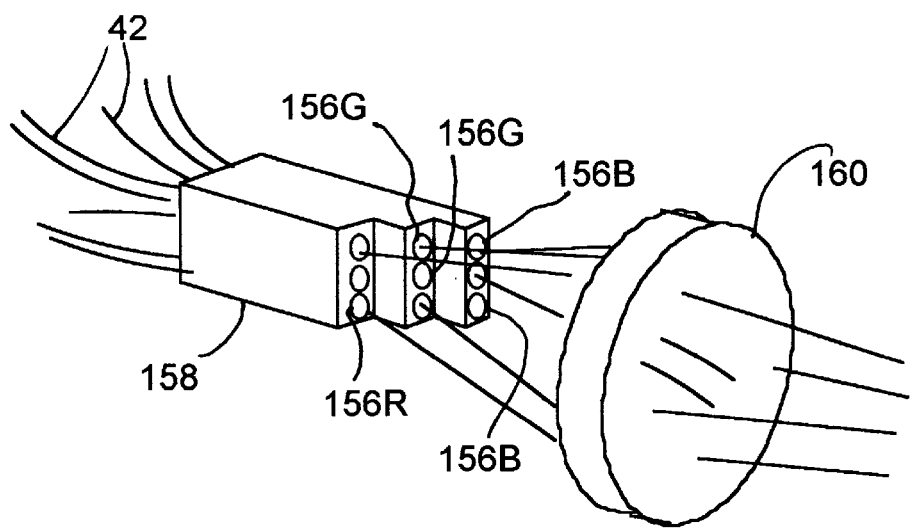
FIG. 11A is a diagram of an output head similar to that of FIG. 4, with the emitting ends assigned to each color staggered at different distances from the output lens and having squared off faces.
Figure 11B:
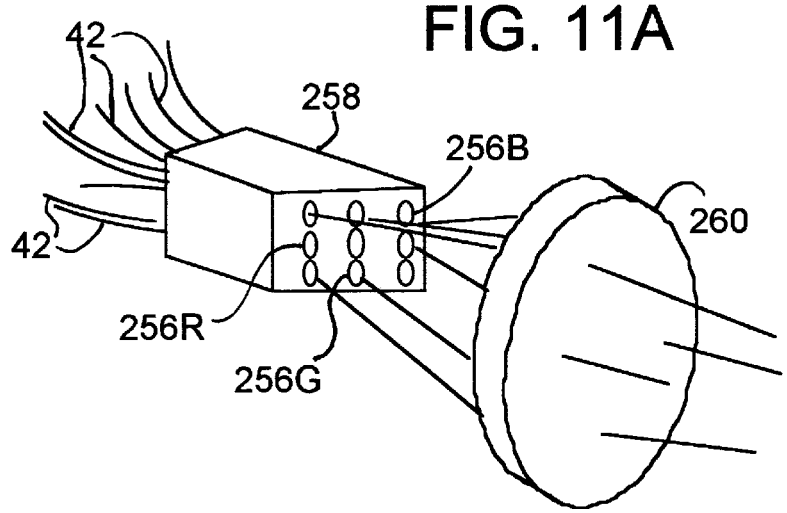
FIG. 11B is a diagram of an output head similar to that shown in FIG. 11A, having slanted faces.
Figure 11C:
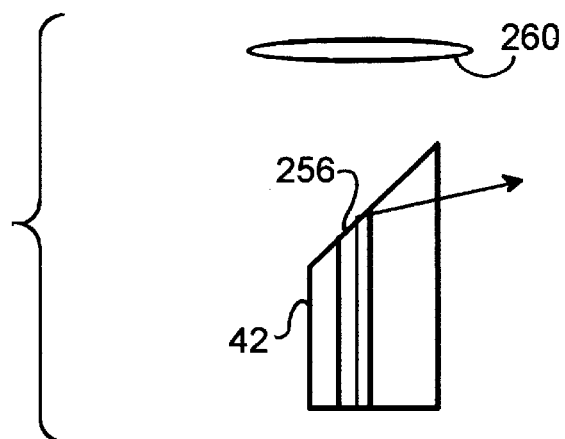
FIG. 11C is a section view of a fiber emitting end having an angled face such as shown in FIG. 11B, illustrating the angle of emission according to Snell's Law.

However, given the small diameter of the preferred slightly-greater-than-single mode fibers 42 and the consequent close tolerances in manufacture of the output head to obtain a uniformly spaced emitting end array for the desired spot pattern, a more practical production fabrication technique would be that shown in FIG. 11B, where the output head 258 at the fiber ends is slanted to effectively position the emitting ends 256 (red—256R; green—256G; blue—256B) at the equal focus positions shown in FIG. 11A. However, the problem with this second approach of FIG. 11B is that the angle required for the cut would be about 60 degrees, and light will not pass out through glass, or the emitting ends 256R, 256G, and 256B, at that angle because of Snell's law. The maximum angle for ordinary glass is about 42 degrees if the other side of the surface is air. Any angle greater than that and we would have total internal reflection and the light would simply go out the side of the head as shown in FIG. 11C. Snell's law describes the optical angle between two optical media, that angle beyond which one gets total internal reflection. Referring to FIG. 11D, if we use an index matching fluid 264, similar to that shown in and described with FIG. 7, between the angle cut emitting ends 256 and the output lens 260 as shown in FIG. 11D, and the refractive index of the fluid exactly matches the refractive index of the fiber core (not the cladding), then it is as if the cut wasn't there at all, as shown in FIG. 11E. However, if the fluid's index is off by as little as .005, then the light will exit the fiber 42 many degrees out of line, such as indicated in FIG. 11F for fluid having a lesser index and in FIG. 11G for fluid having a greater index.

Another solution of our invention is to adjust the angle of the beam emitted from the output head 258 by rotating the output head 258 away from the output lens 260 as shown in FIG. 11H, in combination with the index matching fluid. We prefer to use glycerin (1,2,3 propanetriol) as the index matching output interface fluid 264, because its index can be tuned by adding water.

Scanning Section Components

The function of the preferred scanner or scanning section 70 according to our invention is to sweep the laser spots across the screen 12 in a vertical succession of horizontal lines. Thus, the scanner is positioned to deflect the light beam emitted from the emitting end of each of said fibers to simultaneously illuminate separate locations on the viewing surface. In the scanning section 70 of the projection system 10 shown in FIGS. 1 and 12, two scanning components are employed. One is called the "line scanner", or horizontal "line" scanning sub-system 72, since it scans the spots produced by the beams in horizontal lines in a sweeping or line direction along dot locations across the screen 12. We prefer a type of mechanical line scanner such as rotating polygon mirror 74 shown in FIGS. 1 and 12, having between 24 and 60 mirrored facets 76, but most preferably 28 facets. It is possible to replace the mirrored facets 76 by small lenses or by holographic material, but these solutions tend to increase the cost of the line scanning components and introduce other issues. The polygon mirror 74 is rotated by polygon mirror motor 78 in a range of 25,000 to 50,000 rpm. The speed of the polygon mirror motor 78 is preferably controlled by polygon mirror controller 80. As noted in the Summary of the Invention section, our invention facilitates the use of a lower cost off-the-shelf line scanner in the form of the polygon mirror 74, such as in our preferred motor/polygon mirror and driver assembly similar to Model No. 1-2-2693-601-34 manufactured by Lincoln Laser of Phoenix, Ariz.

Again referring to FIG. 12, the other scanning component of the scanning section 70 is called the "frame scanner", or vertical frame scanning sub-system 82, since it vertically displaces the projected lines, causing successive scans to move down the screen 12. The frame scanner cycles 50 to 120 times a second in keeping with the desired refresh rate. A preferred form of frame scanner is the galvanometer driven mirror 84 shown in FIG. 12. The mirror 84 is mounted with a galvanometer motor 86 that pivots the mirror 84 to reflect the projected lines from the top to the bottom of the screen 12 during one frame. This form of frame scanner is relatively inexpensive, and our invention facilitates its use in a video laser projection system. We prefer to use a galvanometric frame scanner manufactured by Cambridge Technology, Model No. 6860M, having a mirror 0.940 inches by 0.40 inches, capable of continuous positioning in a 40 degree mechanical range, with an accuracy of 8 microradians.

This preferred continuous adjustment mirror actually constantly moves the spots forming the lines down the screen to accomplish continuous raster scanning as previously described and tends to produce slightly slanted lines from strict horizontal. Given the large number of lines being written at the desired resolutions, this slight slant is not noticeable to the viewer, being approximately 0.8 inch from one side of a typical movie theater screen to the other, and avoids the complicated and more expensive stepped adjusting, non-continuous raster scanning, galvanometer mirror necessary to adjust each line discretely. Further, if the discrete adjustments of a stepped adjusting mirror are not consistent or quick enough, i.e., aren't completed between the end of one line and the beginning of the next, undesirable image artifacts may be introduced which, at the current level of technology, cannot be eliminated.

The preferred galvanometer mirror 84 has a recovery rate from the bottom of the frame to the top of the next frame of less than one millisecond. This recovery rate is adequate for the purposes of this system. Other frame scanning apparatus, such as large rotating polygon mirrors, acousto-optic techniques, and resonant mirrors may be used within the contemplated scope of the present invention.

In the scanning section 70, in order to facilitate packaging of the scanning components preferably within the scanning module 18 mounted on the ceiling 15 of the theater 11 shown in FIG. 2, and in order to place the respective scanning components close to each other and to the emitting ends to minimize beam defocusing and degradation, although not required, we further prefer to employ a relay mirror 81 to reflect the aggregate beam from the galvanometer mirror 84 in the appropriate path to the screen 12.

It should be understood that the left to right line scanning, and top to bottom frame scanning, of our preferred embodiment was selected for convenience. With the processors employed in our controller section 100, reordering and time resequencing of the video data to write frames by scanning from bottom to top, and/or to scan lines from right to left, could be easily accommodated, and may be necessary for rear screen projection. Alternatively, in appropriate applications of our invention, scans could be performed diagonally from upper left to lower right, or even spirally from center to periphery of the screen, or practically any other scanning regime. At times we refer to the aggregate of the scanning system components, both the line scanner and frame scanner, as the "scanner". Such scanner performs the basic scanning functions to produce a raster scan, or other scan appropriate for use with our invention.

Figure 85:
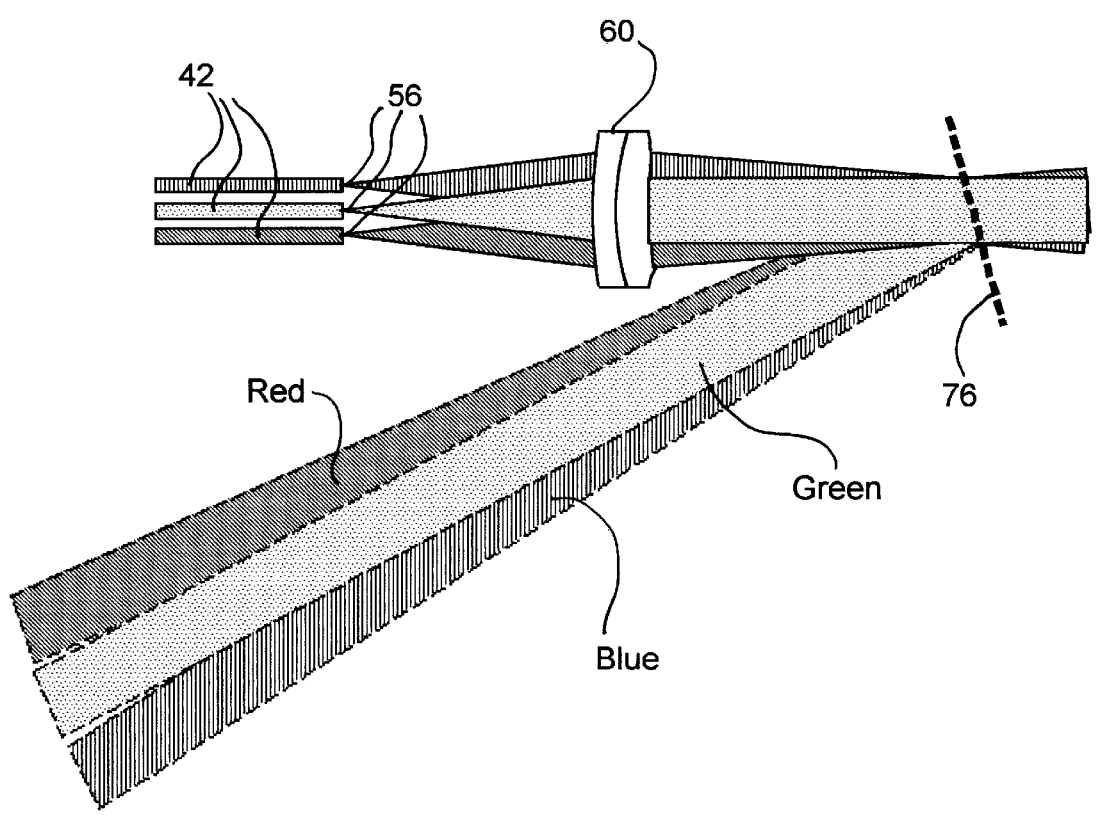
FIG. 85 is a diagram of the beam paths from the emitting ends to the facet of the mirror polygon.

FIG. 85 illustrates the paths of beams from their emission from three of the emitting ends through the output lens 60 to their substantially focussed position on the mirror facet 76 of the polygon 74. The single achromat output lens 60 enables the location of the emitting ends and lens 60 in a position to focus the collective beams to form the minimum size of aggregate spot on the facet 76 for reasons described below. In our preferred system, the size of the mirrors in each of the galvanometer mirror 84 and polygon mirror facets 76 must be larger than the "aggregate spot" image reflected from the facet 76 by the pattern of beams directed from the output lens to the polygon mirror facet 76 and thence to the galvanometer mirror 84. The size of the galvanometer mirror 84 must be large enough to contain the pattern of beams or aggregate spot when its incidence is at an angle in one axis, and to contain the beam on the other axis as it is swept from side to side by the polygon mirror facet 76. As previously noted, the beams and the pattern of spots are blanked between the end of a scan pass and the time required for the next polygon mirror facet to rotate into position.

Figure 12:
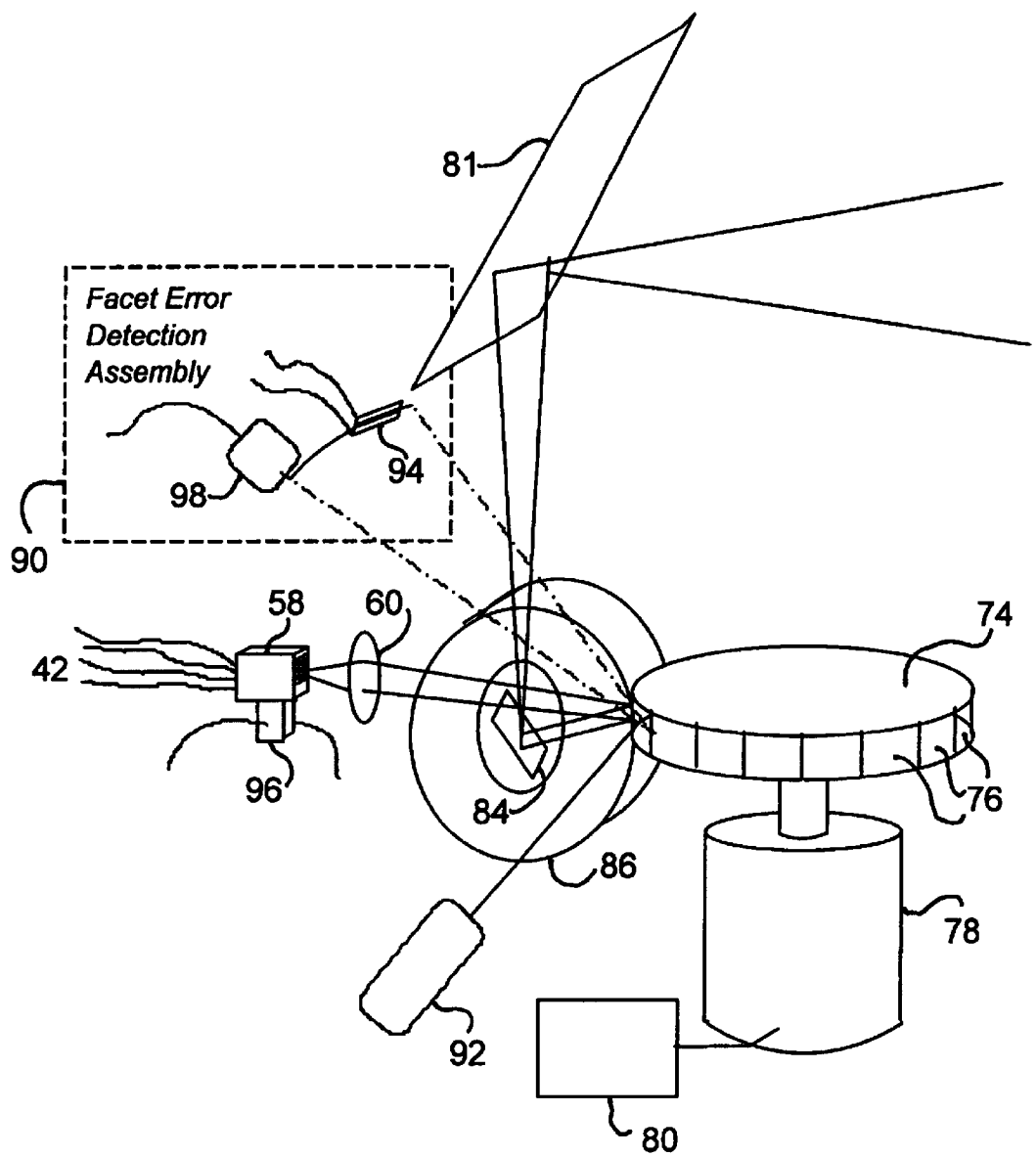
FIG. 12 is a schematic diagram of the scanning section of our preferred system of FIG. 1.

Referring to FIGS. 12 and 85, the minimum height and width dimensions of the facets of the polygon mirror 74 depends directly on the size of the pattern of aggregate spots directed onto the facet by the output head 58 through the output lens 60. In most cases, the height should not be critical, since off-the-shelf polygon mirrors have sufficient height (as opposed to diameter or circumference) to accommodate the preferred beam pattern or aggregate spot. The facet height of our preferred polygon mirror is about 10 mm.

The facet width is more problematic for off-the-shelf polygon mirrors that are not prohibitively expensive for our purposes. Aluminum material is preferred in the mirror polygon industry because it can be highly polished to form an optically suitable mirror reflective surface that is also relatively accurately oriented. However, the use of this material imposes limitations on the centrifugal force, and hence the diameter and maximum rpm the polygon mirror can accept before it distorts or ultimately flies apart. The wider the facet, the fewer the number of facets that can be accommodated on the polygon mirror of the same diameter. However, if the number of facets is reduced, the number of scan passes per polygon mirror revolution, and therefore the number of lines that can be scanned per second at the maximum rpm of the polygon mirror is also reduced, thereby reducing the available resolution at a given number of lines per scan pass. Therefore, due to centrifugal force and the facet width necessary to produce the desired resolution, there is a limit for the speed at which the polygon mirror 74 turns.

Figure 13A:
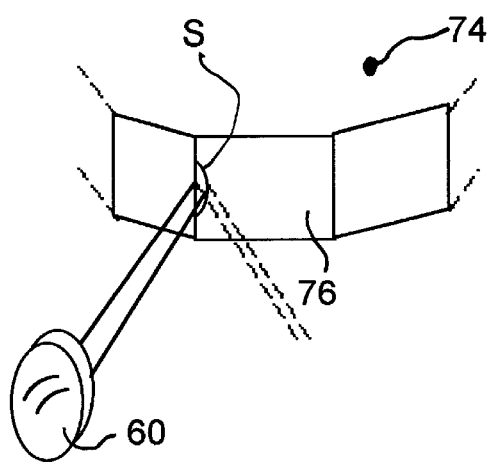
FIGS. 13A through 13D are schematic diagrams of the polygon mirror of the scanning section shown in FIG. 12, illustrating the vignetting of the beam spot on the polygon mirror facet at beginning and end of a scan pass.
Figure 13B:
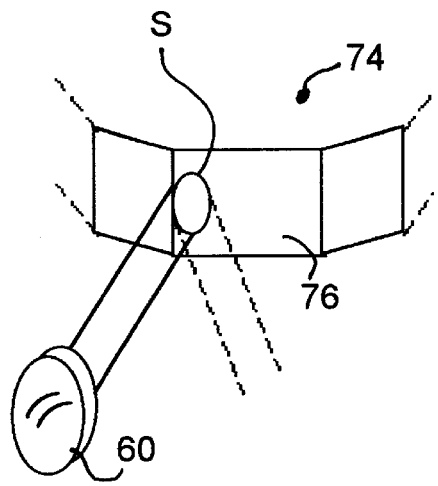
Figure 13C:
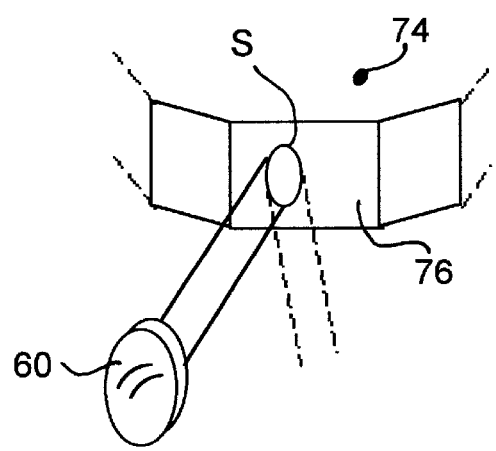
Figure 13D:
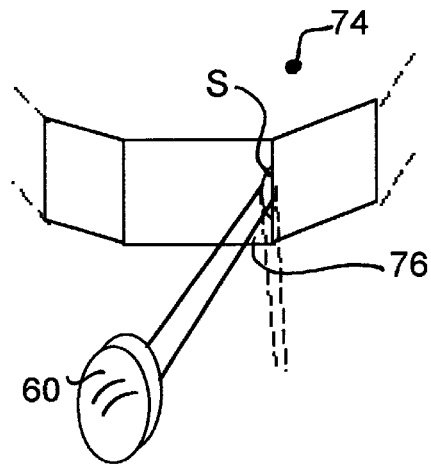

FIGS. 13A, 13B, 13C and 13D show facets 76 with the aggregate area illuminated by the beams on the facet 76, also referred to above as an aggregate spot, and identified by "S" in FIGS. 13A–13D. The aggregate spot of an appropriate and desired size is formed by the output lens 60 focusing the beams emitted from the emitting ends 56 to such aggregate spot on the facet 76 that is a significant fraction of the facet 76 width, and illustrates the vignetting that occurs. As the mirror facets 76 sweep past the point at which the aggregate beam is directed by the emitting ends to form the aggregate spot S, the aggregate spot S of finite diameter will be vignetted at the beginning of the scan line as shown in FIG. 13A and at the end of the scan line as shown in FIG. 13D. As the area between the edges of the facets 76 traverses the beam as shown in FIGS. 13B and 13C, respectively, traversing from the vignetted position of FIG. 13A, the entire aggregate spot is conveyed to the screen. The beam may be blanked between the facet position at the end of the scan pass shown in FIG. 13D and the position of the facet 76 shown in FIG. 13A.

Since the actual duty cycle of the light on the screen 12 for subsequent lines in video is about 80%, then the mirror facet should be ideally on the order of five times the width of the pattern emitted from the output head 58. However, for our preferred off-the-shelf type of polygon mirror, a facet of this width or about 11 mm, would result in only 14 facets for an economically desirable polygon mirror. At the maximum reliable speed of 50,000 rpm, this provides for a maximum of about 11,600 facets per second, far short of the 77,000+ facets or scan passes per second required for 1920×1080 p resolution at the preferred 72 frames per second refresh rate without multi-line scanning according to our invention, and still short of the 17,000+ facets per second needed when using multi-line scanning and an emitting end array of four rows according to our invention at the less demanding 60 frames per second refresh rate.

As the ideal facet size described above is not practicable, we have determined that a facet 76 width about 2.5 times the aggregate spot diameter on the facet 76 is adequate for our uses. Our preferred aluminum polygon mirror 74, which is similar to an off-the-shelf motor/polygon mirror assembly, has a facet 76 size adequate for high resolution, or 5.4 mm wide by 10 mm tall.

Figure 14:
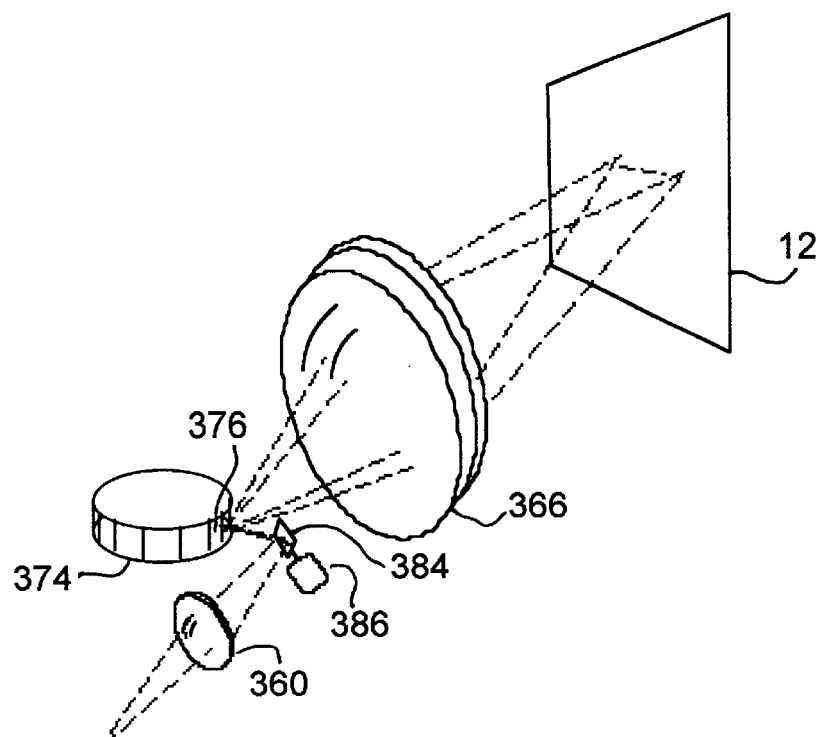
FIG. 14 is a schematic diagram of an alternate scanning section wherein the output lens is focussed near to the polygon mirror facet and a complex relay lens focusses the pattern of beams onto the screen.

As an alternative to the simple output lens 60 described above, we may narrow the aggregate spot on a facet 376 of a polygon mirror 374 similar to the polygon mirror 74 by changing the focus of an output lens 360 as shown in FIG. 14, causing the beam from the polygon mirror facet 376 to expand, and then focusing the consequently wider pattern of aggregate beams reflected from the polygon facet 376 again with a complex lens 366, such as an F-Theta lens, onto the screen 12. This approach allows for smaller facets 376 because the pattern is focussed to a smaller area of the polygon mirror facets, but requires the complicated lens array 360 and 366. Conversely, in the preferred system shown in FIG. 1, we allow the aggregate beam emitted from the output head 58 to be reflected onto the polygon mirror facet 76 so that the aggregate beam escapes from the facet almost parallel, focusing on the screen 12. Thus, the aggregate spot is almost exactly the same size on the polygon mirror 74 as the aggregate spot is as it emerges from the output lens 60, and no further focusing lens, especially no complicated lens arrangement as in the system of FIG. 14, is required. From the foregoing alternatives, it may be understood that our simple output lens 60 and avoidance of focusing lens 366 after the horizontal and vertical scanning subsystems 72 and 82, are major factors in avoiding image artifacts and in attaining high resolution and high optical efficiency in our preferred system. Thus, our system uses a greater proportion of the power generated by the laser sources, because less laser beam power is sapped by complex optics. This optical efficiency allows our system to employ lower wattage lasers than would be required with prior laser projection systems for large screen projection.

Figure 15:
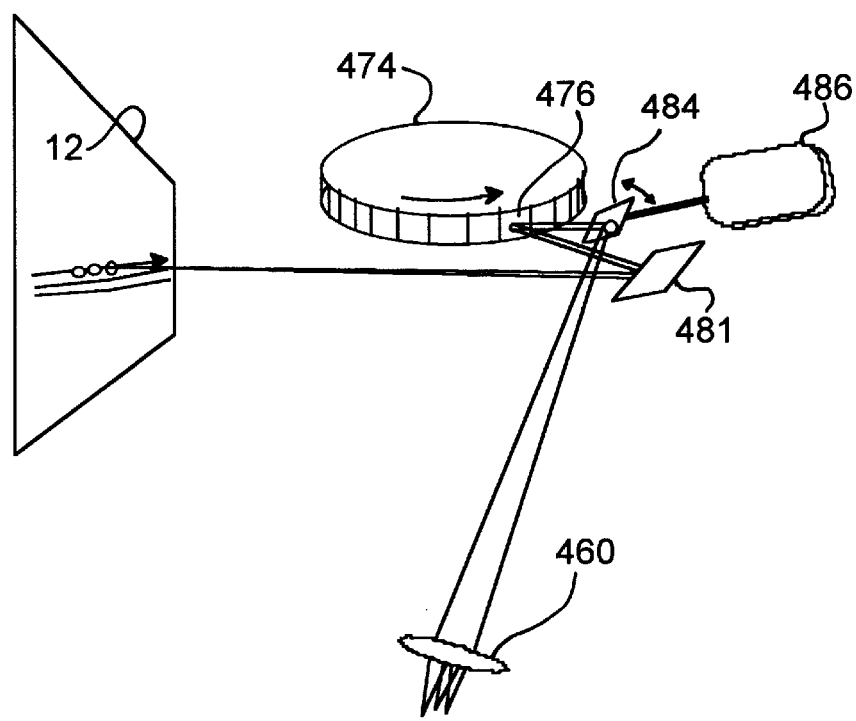
FIG. 15 is a schematic diagram of a system similar to that shown in FIG. 1, except that the aggregate beam is first directed to the galvanometer.

Our preferred implementation shown in FIGS. 1 and 12 calls for the image beam to strike the polygon mirror facet 76 first and then the galvanometer mirror 84. Alternatively, as shown in FIG. 15, with a taller facet 476 of polygon mirror 474, the opposite order of horizontal and vertical mirror reflection may be implemented allowing for a smaller galvanometer mirror 484 and galvanometer transducer 486. Either vertical or horizontal scanning component order, or any other scanning technique that moves a beam for that matter, falls within the purview of the present invention.

Line Scanning Component Facet Error Correction

As previously noted, referring again to FIGS. 1 and 12, the rotating polygon mirror 74 we prefer to use is relatively inexpensive. However, while it is possible with diamond turning to create mirror facets 76 in such a polygon mirror that are optically indistinguishable, it is not possible to fabricate those facets 76 so that their vertical and horizontal pointing accuracy is sufficiently accurate for this application. Some consideration in the system design must be made to compensate for the inaccuracies, at least at the resolutions desired. Vertical facet errors cause uneven spacing between the horizontal lines drawn on the screen 12. If each scan line, or in the case of multiple line scanning, each set of scan lines, has its own facet 76 (resulting, for example, from having the total number of scan lines in a frame, or sets of scan lines, being an exact multiple of the number of facets 76) then such variations introduce static image distortion. However, if an exact multiple of the number of facets 76 is not used, then the distance variation flows through the image as subsequent frames are scanned, and causes a rippling appearance to the image, called "waterfall" effect.

Continuing to refer to FIG. 12, the utilization of a fiber head as the image source of our invention provides the basis for our novel solution of the problems caused by vertical facet errors. The vertical facet error of each facet can be measured by passing a low power laser beam from facet detection laser 92 reflected from a facet 74 to a facet error detection assembly 90. We further prefer to position the laser 92 and detection assembly 90 so that the facet reflecting the facet detection beam from the laser 92 is the "active" facet, that is the facet that is in position to reflect the beams to the desired dot locations on the screen 12 during the current scan pass. The beam from the detection laser is reflected from the active facet across two very closely spaced facet detection photodetectors 94, known as a bi-cell, which would give a quantitative vertical error signal specific to that active facet, indicating the amount by which the facet-detection beam reflected from the active facet is too high or too low. Referring to FIGS. 4A and 12, we prefer to position a piezo-electric crystal as a vertical error corrector 96 preferably mounted within the output head 58. This crystal is electrically expanded and contracted to effect error correction in proportion to the quantitative vertical error signal from the bi-cell detector 94.

As an alternative, the vertical error corrector 96 could be advantageously mounted on the output lens 60 as shown in FIG. 4B to effect the same change in relationship between the output head 58 and the output lens 60, thereby effecting the same correction as above. Further, the vertical error corrector 96 could also be mounted as a single unit or output assembly as shown in FIG. 4C such that the lens 60 and output head 58 retain their relative positions, but are pivoted in the dimension of correction (vertical) such that the line being written strikes the mirror polygon facet an appropriate amount higher or lower then nominal.

In our preferred embodiment, the system 10 would calibrate the controller section 100 upon startup of the polygon mirror 74, by determining the error for each particular facet 76 as described above, and corrective movement of the output head 58 by the piezo-electric crystal 96 would be performed automatically hereafter to the extent calibrated for each facet 76 each time that facet 76 is rotated into horizontal line scanning or line sweeping position. The advantage of using this technique is that because the fiber head 58 is very light, this technique allows for response rates to many tens of kilohertz, adequate for our purposes in the present invention. Although less preferred, the facet error signals could also be detected periodically or continuously during polygon operation for a dynamic error correction. Because the facet error of each facet will probably vary little during operation, the error correction could also be calibrated for each system at the factory prior to shipment to the installation site.

The vertical facet errors between adjacent facets is small compared to the range of errors for all facets due to the machining process used to make the facets. Also, the progression of the errors tends to form a curve that can be approximated by a sine wave. Substantial correction of the vertical facet errors can be accomplished simply by supplying a correction signal to the piezo electric crystal based on a sine wave curve of appropriate amplitude and frequency. This method of correction reduces the effect of "waterfall" to an acceptable level for some applications and images.

It is also possible to use the galvanometer to affect this gross correction using a sine wave adjustment to the vertical sweep of the raster.

However, it is also possible to use a combination of gross correction using the galvanometer and simultaneous fine correction using the piezo electric actuator described herein.

One calibration scheme might be to minimize the gross vertical facet errors using input from the bi-cell detector described herein, applying corrections to the galvanometer. Once accomplished, the galvanometer corrections are applied while the remaining errors are calibrated for correction using the piezo electric actuator.

In addition to vertical facet errors, our invention also includes correction of horizontal facet errors. It is possible that the preferred use of a polygon mirror 74 may introduce horizontal facet errors. Referring again to FIG. 12, this error is preferably corrected with another component of the facet error detection assembly 90, which optically detects on a continuous basis when each facet 76 is in fact in the correct position to initiate scanning of the line at the appropriate dot location on the screen. This detection is accomplished by sensing the low power laser beam from the facet detection laser 92 with a photodetector 98 positioned such that when the active facet 76 is in the exact position for initiation of a line. Thus, the horizontal error is corrected by shifting the timing of release of data to initiate the projection of spots by the modulated laser beams incident on the facet 76 so that the beam writes spots from appropriate data pixels at the appropriate position on the facet and consequently on the screen, thereby automatically correcting the horizontal facet error.

An alternative approach to horizontal error correction is similar to the vertical facet error correction configuration described above. With this approach, a controller is used that initiates the scanning of lines on a constant basis at the speed maintained by the polygon mirror assembly. Horizontal facet errors would be corrected using a second piezoelectric crystal or horizontal corrector (not shown in the figures, but similar to the first vertical error correction piezo-electric crystal 96) on the output head 58. The horizontal corrector would move the output head 58 horizontally to implement this correction for horizontal facet errors in lieu of, or possibly in combination with, the horizontal error correction by altering the timing of line release described herein.

Scanning Section Optical Configurations

There are two basic configurations of optics for image scanning systems, pre-scan optics and post-scan optics. Almost all laser based imagers that use polygon mirrors use pre-scan optics similar to that shown in FIG. 14, where the lens comes after the scanning optics (so-named because the scanning occurs BEFORE the lens), because of some of the following advantages: the output field can be made flat, the final focusing optic that determines the resolution is closer to screen, and barrel or pincushion distortions may be introduced or eliminated to compensate for non-ideal screen surface profiles. However, pre-scan optics have the following disadvantages: color separation, uneven focus center-to-corner, uneven brightness center-to-corner, complex lenses, especially for color images and high resolution, a lower resolution limit and greater lens size. All commercial laser projectors using polygon mirrors of which we are aware use pre-scan optics. One advantage of using pre-scan optics is that it allows the use of known methods other than that of our invention for vertical facet error correction.

While pre-scan optics may be used with embodiments of our invention, we prefer to use a post-scan optical configuration (again so-named because the scanning occurs AFTER the lens, if any, in question), such as shown in FIG. 1. Post-scan optics give better resolution and brightness, and avoid the image degradation and power losses typically resulting from complex optics. However, the use of post-scan optics in systems such as the embodiments described herein would not be as desirable without the vertical facet error correction of our invention exemplified above. The use of the simple optics of our preferred post-scan system, in conjunction with a fiber head according to our invention make small spots and high resolution feasible.

Reordering of Video Data for Multiple Spot Projection

The scanning components in our preferred embodiment determine the manner in which the four spaced apart rows of three spaced apart color spots are reordered in accordance with our invention. The closest feasible spacing of the emitting ends 56 in the output head 58 of our preferred embodiment shown in FIGS. 1 and 5, assuming a desired resolution of 1920×1080 p, produces an effective vertical row spacing of approximately ten or more lines, and a horizontal spacing between red, blue and green color spots of approximately 10 or more dot locations. Although we later provide examples of such spacing, the following illustrations of this data reordering assume a vertical spacing of five lines (4 lines of dot locations between rows of spots of the spot pattern on the screen) and a horizontal spacing of five dot locations within a row (four dot locations between each spot of a row of the spot pattern on the screen).

As noted previously, this requires a re-ordering of the video data, which typically and according to anticipated standards for HDTV digital and compatible analog video data specifies that each frame is comprised of three color values per individual pixel, specified per line in sequence from one side of the frame to the other, and from top to bottom. FIGS. 16A through 16J and 17A through 17E illustrate the effect of reordering the writing of lines and dot locations within lines for the first embodiment of our invention, as briefly described in the Summary of the Invention section hereof, assuming a frame scan top to bottom, line scan left to right, and an effective row spacing of five lines and a horizontal spacing of five dot locations between spots within a row. In FIGS. 16A through 16J, the composite color for each pixel is written at the appropriate dot location by scanning the image formed by the emitting ends 56 of the fibers 42 in one horizontal row of the output head 58. In the exemplary order, the dot location is first written by a red spot represented by "x", then by a green spot represented by "+", and by a blue spot represented by "○". A green spot overwriting a dot location already written with a red spot is shown by "*" and a blue spot overwriting a dot location already written by red and green spots is shown by "✺". In FIGS. 16A–16J the dot location currently written by a spot at a particular time t during a particular scan pass is indicated by boldfacing, and a spot that is blanked because it will not at that time write a location within the frame on the screen is indicated by outlining.

For convenience in describing the time reordering, also referred to as time combination or time combining, of the color values of the pixel data for a particular dot location, we refer to the time at which each adjacent dot is illuminated by the spot of the laser beam emitted by the appropriate emitting end, starting with the dot location at the beginning of the frame line, as time t1, t2, t3, . . . . For example, at time t1, the first dot location of a line is written, at time t2 the second dot location of a line is written. For the preferred 1920×1080 p resolution, the time will range at least from time t1 to time t1920, and possibly to time t1921 and further, depending upon the amount of overscan necessitated by the dot spacing between spots in a row of the array.

Time Combining of Multiple Spots During Line Scanning

Figure 16A:
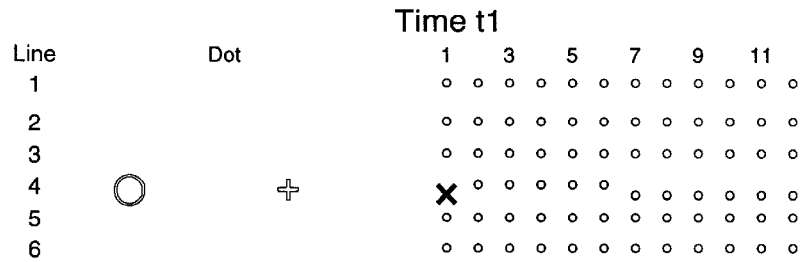
FIGS. 16A through 16H are time sequence diagrams illustrating the time shifting of spots of each primary color in a row of a pattern of spots shown in FIG. 5S to form composite spots at dot locations of a line of a frame.
Figure 16B:
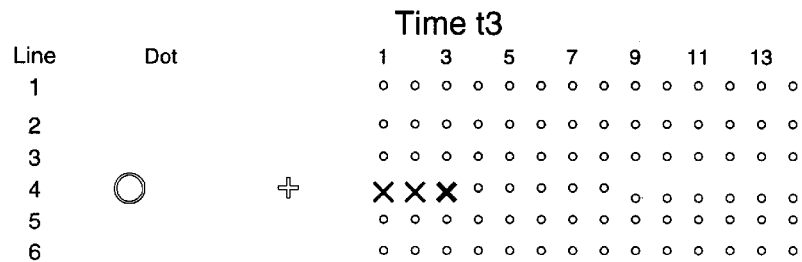
Figure 16C:
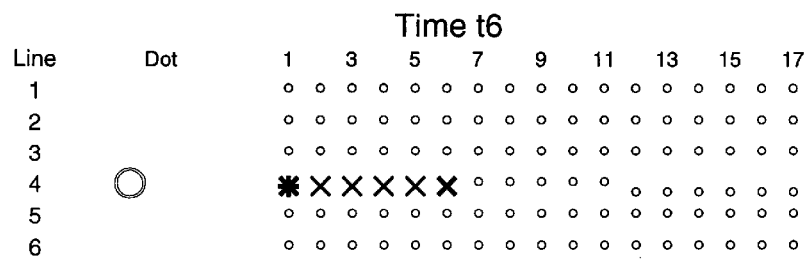
Figure 16D:
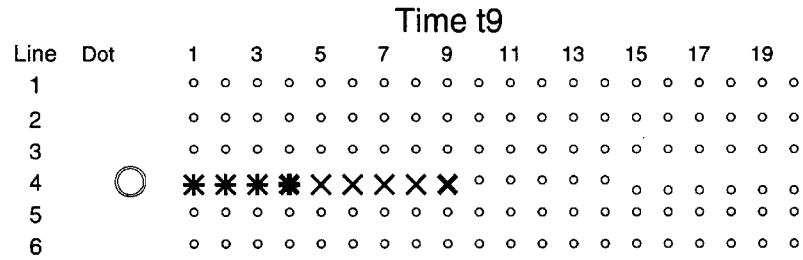
Figure 16E:
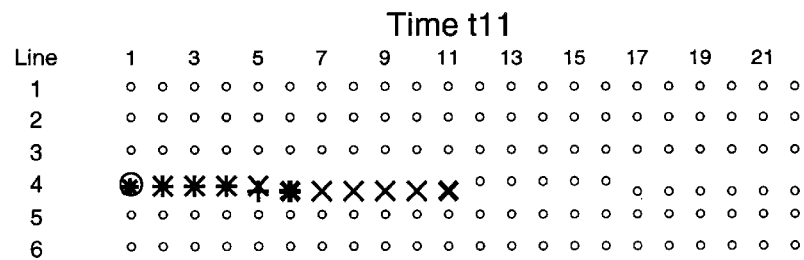

As shown in FIGS. 17A through 17E to be discussed in more detail later herein, the 4 row by 3 spot per row array projected by the preferred embodiment preferably writes the fourth line of the frame on the first scan pass s1. Consistent with FIG. 16A, in the scanning of this line with the bottom row of spots, at time t1 of the first scan pass the first pixel in the fourth line is written by the red×beam modulated for the value of the red color assigned to that pixel in the video data, while the green and blue beams, which if activated would write pixels to the left of the frame (shown with outlined, lighter figures) are not yet activated (also referred to herein as "blanked" and sometimes identified by "b" in the Tables below) by their respective modulators. Continued rotation of the polygon mirror 74 successively positions the spot produced by the red beam at the locations of the second, third, fourth and fifth dots, which are respectively written at times t2, t3 (shown in FIG. 16B), t4, and t5 with the values of red assigned thereto in the pixel data, and the green and blue beams are still blanked. As shown in FIG. 16C, further rotation of the polygon mirror 74 positions the red×spot at the sixth dot location, and the first and sixth dots are respectively written at time t6 by red×and green+spots having the values of red and green respectively assigned thereto, with the blue spot still blanked. Continued rotation of the polygon mirror 74 successively positions the red×and green+beams at the locations of the seventh, eighth, ninth (shown in FIG. 16D) and tenth dots, and at the second, third, fourth (FIG. 16D) and fifth dots, respectively, which are respectively written at times t7, t8, t9 (FIG. 16D) and t10 with red×and green+spots having the values of red and green respectively assigned thereto, and the blue beam remains blanked because it is not yet in position to be written within the frame. As shown in FIG. 16E, still further rotation of the polygon mirror 74 positions the red×beam at the location of the eleventh dot, and the first, sixth and eleventh dots are written at time t11 by the red×, green+and blue ○ beams with the values of red, green and blue respectively assigned thereto. Still continued rotation of the polygon mirror 74 successively positions the red×, green+and blue○ beams at the locations of the remaining dots in the fourth row of the frame with the values of red, green and blue respectively assigned thereto.

It is apparent from the illustration of FIGS. 16A–16E that with this method according to our invention, a spot of each color modulated for the value of that pixel in the image data is projected for every dot in that line. The time between the sequential arrival of each of the color spots emitted from a row of the output head at a single dot location on the screen is on the order of one microsecond (1 μs).

Figure 16F:
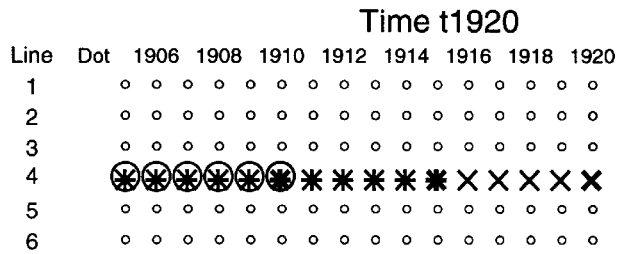
Figure 16G:
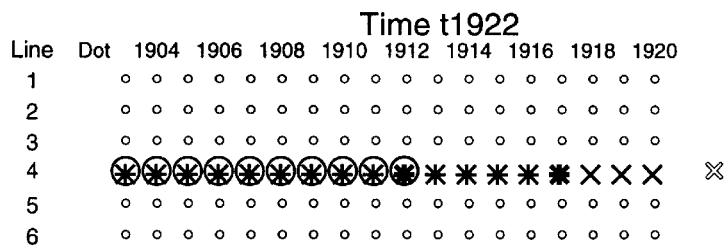
Figure 16H:
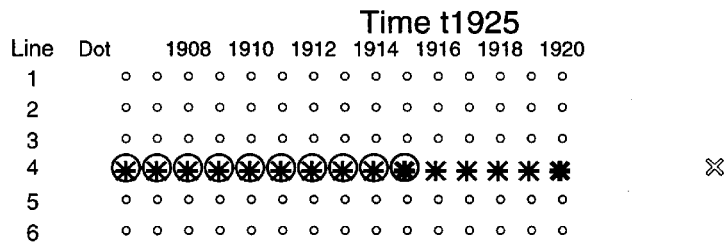
Figure 16I:
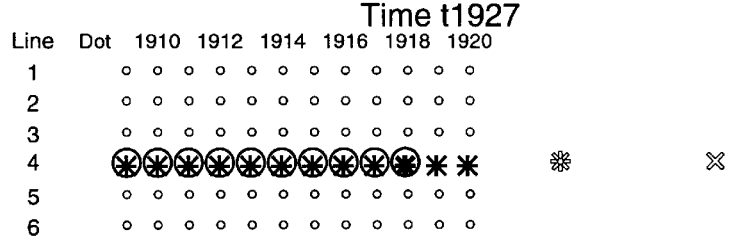
Figure 16J:
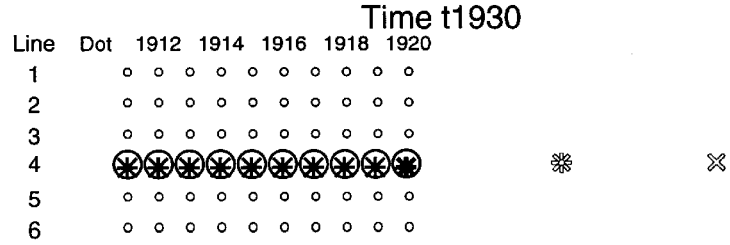

Referring now to FIG. 16F, at the end of the first scan pass s1, the last dot 1920 in the line will be written at time t1920 with the appropriate red×value, and the dots 1915 and 1910 with green and blue spots, respectively. Referring to FIG. 16G, continued rotation of the polygon mirror 74 will at time 1921 write dots 1916 and 1911 for green and blue, respectively, with the red beam blanked. The process repeats until, as shown in FIG. 16H, at time t1925 the green×spot writes the last dot location in the line. As shown in FIG. 16I, continued rotation at time t1926 will write dot location 1916 with the blue ○ spot, and the green and red spots are blanked. Finally, at time t1930 the blue ○ spot writes dot location 1915, which has already been written at times t1920 and t1925 by the red and green beams, respectively, and at such time t1930 the red and green beams remain blanked, whereupon the fourth line of the frame has been completely scanned. After the generation of the fourth line, the galvanometer mirror 84 adjusts, or has adjusted downward a spacing equivalent to four lines from the beginning of the last set of lines, and the next facet 76 of the polygon mirror 74 is in position to begin writing the next set of four lines at scan pass s2.

In our preferred implementation the galvanometer mirror 84 may actually move continuously so that all of the lines forming the image slant a minute amount, and consequently the spots arrive four lines down at the start of the next line scan pass as if the galvanometer mirror 84 had moved all at once between lines.

It should be considered that the positioning of separate color emitting ends 56 for each row of the output head 58 projecting a pattern of spots such that they are separated on the screen by more than one dot location is preferred for ease of fabrication of the output head 80. However, it is possible, as described for an alternate embodiment herein to combine the different colored beams prior to insertion into the insertion ends of the fibers 42, such that four vertically adjacent single emitting ends emit spots of composite color. These composite color spots would be directed to the scanning components and thence to the screen, thereby obviating the need for the reordering of horizontal pixels of each line. However, the combining optics to create these composite beams degrade the laser beams and sap power.

It should also be understood that the adjustment of the time at which a beam of a desired color and intensity strikes a particular dot location on the screen within each line, and as shown in later embodiments within different lines, is a factor of data manipulation by the controller section. Hence, the assignment of colors to the emitting ends within each row, and as described later the relative position of emitting ends within rows, may differ from row to row of emitting ends. Thus, a system according to our invention may perform the required time combination within rows differently for each row. In summary, the time combination during a horizontal scan to produce composite color spots in a line of spots on the screen is independent as to rows. That is, the time combination used to write the line of spots projected by the beams from one row is not necessarily that same as that required to write the line of spots projected by the beams emitted to any other row of the output head array of emitting ends.

Reordering of Multiple Rows of Spots During Frame Scanning

Referring again to FIGS. 17A–17J, although not restricted to such a scheme, for the first embodiment of our invention described herein, each vertical adjustment of the preferred galvanometer mirror 84 is four scan lines, equal to the number of rows of emitting ends of the output head 58. For purposes of illustration in connection with the first embodiment, the effective row spacing between each row of the emitting ends 56 in the output is five lines. Unlike the reordering required to write a beam for each emitting end 56 of a row on the same spot, for vertical scanning it is desired to write each unique line with only one of the rows of the output head 58. Thus, when the frame is complete, each row of the output head 58 will have written a unique set of lines, and all of the lines in the frame will have been written once each.

For convenient reference herein in describing line reordering, we refer to the rows of spots projected from the emitting ends of the output head of the preferred embodiment from top to bottom as rows "RowA", "RowB", "RowC", and "RowD", respectively. Further, for each of the figures involving the 4 row by 3 emitting ends per row output head configuration, for each scan s(x), where x is the sequential number of horizontal scans (e.g., for the preferred 1920×1080 p resolution, s1 at the first scan pass at x=1, s2 at the second scan pass at x=2, and s273 at the last scan pass at x=273). Lines written by RowD, RowC, RowB, RowA of spots written by the beams emitted from the emitting ends are indicated by "DDD", "CCC", "BBB", "AAA", respectively. As with FIGS. 16A–16J, for FIGS. 17A–17E, currently written lines of the frame are indicated by boldfacing ("AAA", "BBB", "CCC" and/or "DDD", and blanked lines are indicated by outlined "AAA", etc.

For the example of the preferred embodiment in FIG. 1, 5 and 5S, the first line written at scan pass s1 is preferably the fourth line from the top of the frame (line L4) with the spots (one of each color) of the bottom row RowD, collectively shown by the boldfaced DDD in FIG. 17A, while RowC, RowB, and RowA of spots are blanked as shown by the outlined CCC, BBB, and AAA in FIG. 17A. After the entire line L4 is scanned by rotation of one of the polygon mirror facets 76, the galvanometer mirror 84 will preferably have adjusted downward a distance equivalent to four frame lines, and scan pass s2 will be initiated when the next succeeding facet 76 is in position. Because of the effective five line row spacing (or 4 lines of dot locations between rows of spots) of the rows of spots as noted previously, lines L8 and L3 of the frame are written as shown in FIG. 17B during scan pass s2 by the spots of RowD and RowC (boldfaced DDD and CCC in FIG. 17B), while RowB and RowA of spots remain blanked (outlined BBB and AAA in FIG. 17B). Note that the non-boldfaced DDD in line L4 of the frame at scan s2 shown in FIG. 17B, and in all of the remaining figures relating to similar line reordering, denotes that those frame lines were previously written, in this case during scan pass s1 shown in FIG. 17A.

By the time of scan pass s3 shown in FIG. 17C, the galvanometer mirror 84 will again have adjusted downward by a distance equal to four lines, lines L12, L7 and L2 will be written by the spots of RowD, RowC and RowB (boldfaced DDD, CCC and BBB in FIG. 17C) and the spots of RowA are still blanked (outlined AAA in FIG. 17C). At scan pass s4 shown in FIG. 17D, lines L16, L11, L6 and L1 are written by the spots of RowD, RowC, RowB and RowA. At scan pass s5 shown in FIG. 17E, lines L20, L15, L10 and L5 are written by the spots of RowD, RowC, RowB and RowA. Thus, it can be seen from this illustration that by the end of scan pass s4, lines L1–L4 of the frame have all been written, albeit out of order; of the next four lines, only lines L6, L7 and L8 have been written; and of the following four lines, only lines L11 and L12 have been written, and of the fourth set of four lines, only line L16 has been written. The not-yet-written lines will be written on subsequent passes.

As shown in FIGS. 18A, 18B, 18C and 18D, assuming a resolution of 1920×1080 p, continued regular downward adjustment of the galvanometer mirror 84 will eventually result in writing lines L1065, L1070, L1075, and L1080 of the frame with spots from all of RowA, RowB, RowC and RowD, respectively, at time s(1080/4), or scan pass s270. At scan pass s271, lines L1069, L1074 and L1079 will be written by spots of RowA, RowB and RowC, and RowD will be blanked. At scan pass s272, lines L1073 and L1078 will be written by spots of RowA and RowB, and RowC and RowD will be blanked. At scan pass s273, line L1077 will be written by spots of RowA, and RowB, RowC and RowD will be blanked. After line L1077 is written, the frame is complete, and the galvanometer mirror 84 is adjusted to the top of the frame and the next frame is commenced. Thus, there will be three scan passes at both the top and bottom of the frame where at least one row of spots is blanked. Alternate embodiments having different reordering sequences are disclosed herein.

Based on the foregoing examples, a primary function performed by the controller section 100 may be more generally described as controlling the reordering of the digital input signals required for our invention. In the case of the first embodiment, the controller section 100 must provide the pixel data to the modulator section so that the beams inserted into each fiber are modulated to produce a color of the desired intensity at each dot location on the screen 12 at the time the scanning section 70 is in a position to illuminate that particular dot location. It should be understood that different spacings of the rows of emitting ends is possible, and even desirable. Several examples of such different row spacings, and of alternate head configurations, are described later herein.

Our preferred embodiment specifically addresses theater applications, and therefore has some specific characteristics. Referring to FIG. 2, the throw distance, that is the distance between the scanning section 70, or in FIG. 2 the scanning module 18, and the screen 12, is fixed and is determined by the angle between facets 76 on the polygon mirror 74 and the desired image size. Our preferred system for the motion picture theater application does not require changes in throw distance or a variable throw distance. In other manifestations of the projector, as in home, convention, gathering, and performance display, it may be necessary to vary the throw distance. Currently available optics used in other image projection equipment could then be used as an option.

It should be noted at this point that the HDTV resolution of which the preferred embodiments described herein are capable is NOT the upper limit, but is an intermediate implementation constructed because of the availability of HDTV signals in the near future. However, as the available resolution of video sources increases, our invention will facilitate the use of such enhanced sources for laser projection.

Alternative Scanning Components from Preferred Embodiment

Continuing with the foregoing discussion of the scanning section, although we prefer to use moving mirrors in the form of a rotating polygon mirror 74 with multiple facets 76 for horizontal scanning and a galvanometer mirror 84 for vertical adjustment, our invention may facilitate the use of alternative scanning methods and components. Some of these include using two pivoting or tilting mirrors moving by galvanometers or resonance scanners, acousto-optic beam steering, digitally controlled chip-mounted mirrors, piezo electrically controlled vertical and horizontal mirrors, or holographic beam steering replacing the polished facets 76 of the polygon mirror 74 of the first embodiment.

Two Pivoting Oscillating Galvanometer Mirrors

Figure 19:
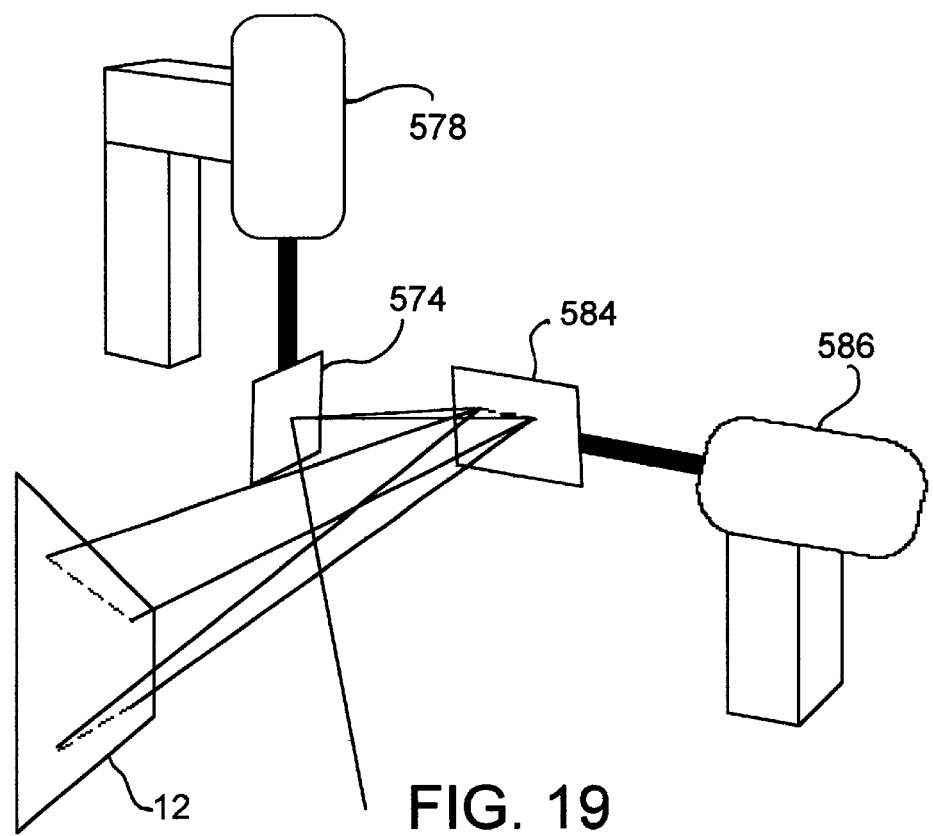
FIG. 19 is a schematic diagram of an alternate scanning section including two pivoting mirrors as the horizontal and vertical scanning subsystems.

In the first alternative, illustrated in FIG. 19, two mirrors 574 and 584 are each pivotable about separate axes oriented at ninety degrees (90°) to each other. The mirrors 574 and 584 are respectively movable by small actuators, such as galvanometers 578 and 586, piezo-electric crystals or resonance scanners. These mirrors oscillate back and forth to direct the beam along the desired horizontal and vertical paths. Galvanometers or motors that cause the mirror to resonate through a cycle could be used. This would be the preferred technique if it were fast enough. The technique is used for laser light shows, where the image itself is drawn with the beam of light, a much less stringent requirement than filling a screen with scan lines. Resonant scanner mirrors have approached the cycle rate appropriate for use with embodiments of our invention, but the mirror is very small. Very small mirrors do not allow for the full resolution to be developed at the screen 12 due to diffraction effects explained herein. Also, significant potential laser power would be lost during the time the mirrors are retracing to their starting point, or through compensation for non-linear motion velocities of resonant scanners. However, further advances in the technology relating to these scanners to make the cycling capabilities faster, coupled with our multi-line scanning, could make this alternative the preferred technique.

Acousto-optic Beam Steering

Figure 20:
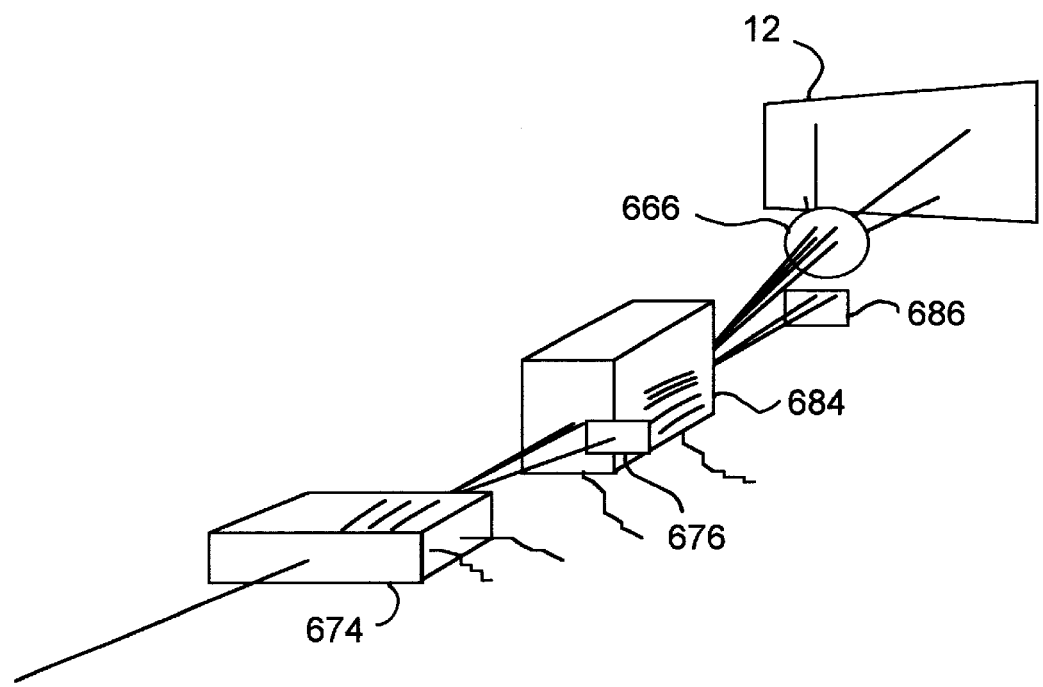
FIG. 20 is a schematic diagram of another scanning section including two acousto-optic beam deflectors as the horizontal and vertical scanning subsystems.

The second alternative shown in FIG. 20 could employ acousto-optic beam steering, wherein the diffraction of an aggregate beam by sound in a horizontal scanning crystal 674 deflects the aggregate beam in the horizontal direction with the undeflected beams absorbed by beam block 676. The aggregate beam is deflected in a vertical direction by vertical scanning crystal 684 with the undeflected beam absorbed by beam block 686. This concept is similar to the acousto-optic modulator described elsewhere herein, but instead of varying the sound intensity for modulation, the frequency of the sound in the crystal would be varied. With this use of acousto-optic crystals, the degree of deflection would change linearly with changes in sound frequency in the crystals 674 and/or 684. The concept of acousto-optic beam steering of laser beams is described in Gottlieb, Ireland, Ley, pp 158–174, albeit not in connection with a projection system similar to our invention. This technique would seem to be the fastest available, but the laser beam must be a finite size, and it takes a significant amount of time for new frequencies of sound to fill the beam within the crystal, thus reducing resolution. Also, the smaller the beam, the larger the spot is on the screen due to diffraction considerations. Thus, this technique is currently limited to about 500 pixels on each axis. Another problem is that the scan angle change is never more than one degree or so, and the optics necessary to bend such a scan angle across a screen are difficult and potentially expensive. Acousto-optic beam steering is rarely as much as 15% efficient in preserving the original optical power. However, if advances in technology solve these problems, the insertion of multiple spaced apart lines of laser beams from the imaging fiber output head 58 into the acousto-optic beam steering crystal for simultaneous deflection of the multiple beams would reduce the vertical cycle time, and thereby reduce the demands on the beam steering component for vertical scanning, thereby reducing cost and complexity.

Tilting Mirror

Figure 21:
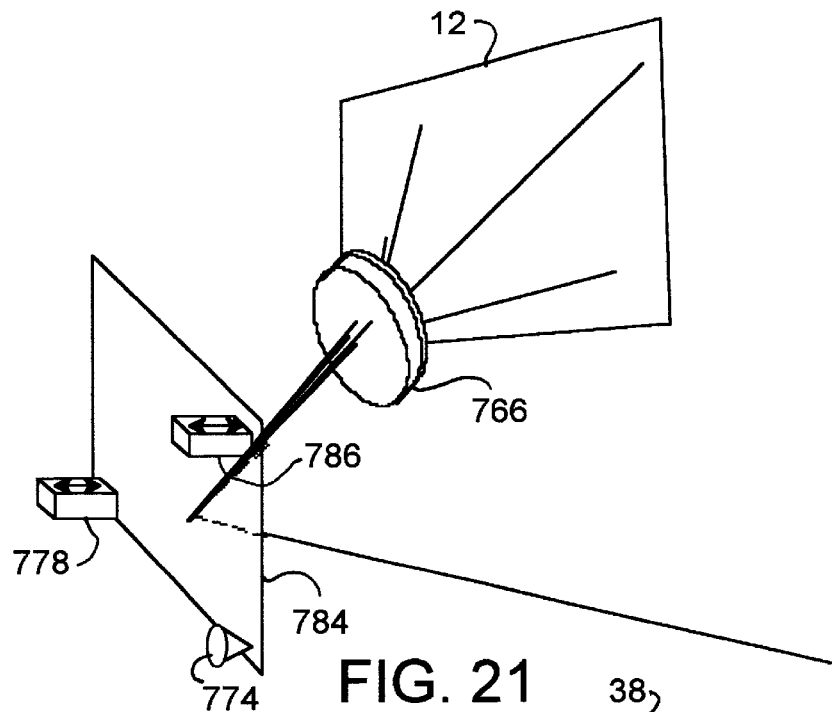
FIG. 21 is a schematic diagram of an alternate scanning section including a single tilting mirror as the horizontal and vertical scanning subsystems.

In a third alternative shown in FIG. 21, a pivoted mirror 784 can be controlled by two small piezo-electric actuators tilting the mirror 784 at appropriate angles with respect to pivot 774 to scan an image with a pattern of spots according to our invention. The actuators may be piezo-electric crystals such as horizontal piezo-actuator 778 and vertical piezo-actuator 786. Piezo-electric motion can be controlled in the 60 to 80 KHz range, but as in acousto-optic beam steering, the scan angle is very small. However, these speeds are only achievable with very small mirrors, eliminating any opportunity for high resolution. Assuming the angles produced by piezo-electric motion can be increased by further advances in this technology, the scanning of spaced-apart laser beams to write multiple lines per horizontal pass could be used to minimize cycle times required for these scanning components.

Holographic Beam Steering

In a fourth alternative, called holographic beam steering, transmissive holograms replace the mirror facets in an arrangement much like the rotating polygon mirror 74 shown in FIGS. 1 and 12. With holographic beam steering as currently practiced, no real gain is achieved, because the holographic material is not as mechanically strong as the solid aluminum mirrors, and cannot be spun as fast for a particular spot size (which determines the resolution). Also, the holograms do not sweep the various colors through the same arc, so three separate paths must be used, one for each color; and they are also not nearly as efficient in the amount of light that gets diffracted to the screen. Quality control of the holograms is a significant problem, where each holographic element must treat the direction and sweep angle exactly the same as all others in the disk. However, resolution of these technical problems would result in the same kinds of advantages for this type of scanning section 70 as with the first embodiment disclosed in FIGS. 1 and 2 using the polygon mirror 74 with polished aluminum facets 76.

Modulation Section

Within our preferred embodiment, and at exemplary resolutions, refresh rate and emitting end configurations, each beam must be continuously modulated to assure as many as 30 million values per second. In the modulation section 30 schematically shown in FIGS. 1 and 22, we prefer to utilize an acousto-optic crystal for the modulator 32, such as shown in FIG. 23. Referring again to FIG. 22, in a simple form, an acousto-optic modulator divides the laser beam by deflecting part of the laser beam toward the components of the scanning section 70 while the remainder is directed to a light absorbing beam block 38. The extent to which the modulator 32 deflects the light toward the scanning component depends upon the intensity of an electronic signal directed to the modulator 32. A typical acousto-optic modulator 32 shown in FIG. 23 uses an acousto-optic medium positioned within the path of the laser light beam. Within an acousto-optic modulator, the amount of light deflected is proportional to the instantaneous strength of the acoustic field, thus by controlling the strength of the RF signal on a continuous basis, we can select any intensity we wish. This is in contrast to many other light modulating techniques, where the beam is simply either on or off. The pixel data is converted by a driver to an RF signal. This RF signal is then converted by a piezo-electric crystal to a sound energy field that is introduced into the acousto optic medium. In the absence of an acoustic signal propagating through the acousto-optic medium, the entire beam passes through the medium undeflected. However, when sound propagates through the medium, part of the incident laser beam is deflected at a fixed angle, approximately 1° to 2°, which is dependent upon the wavelengths of the sound and of the light in the crystal, toward the fiber inserter and thence to the scanning component. In its simplest form, an acousto optic modulator 32 utilizes a single frequency of sound. For our preferred implementation, this sound varies in intensity according to how much light is to be deflected, but the frequency does not change ("amplitude modulation"). The modulator 32 is positioned between each primary color laser light source and the spot projection section. Each of the beams thus directed by its modulator 32 through the spot projection section towards the scanning beam projection component flows through to a particular point on the screen 12. This action occurs exactly when the pixel information indicates that such spot on the screen 12 is to be illuminated.

Also, since acousto-optic modulators 32 only deflect the light if there is sound energy in response to a signal from the controller 106, the potential contrast ratio (the ratio on the screen between the amount of light in the brightest and darkest areas) is very high. Thus, in contrast to other projection techniques, if there is no signal and therefore no sound, then no light is transmitted, and the dot location is black, instead of the gray common with film and other projection techniques. We prefer the 200 MHZ Tellurium Dioxide # 3200–120 and 3200–121 modulator for the modulators 32 and the 200 MHZ 1200–100 modulator driver for the modulator controller 34, both from Crystal Technologies, but other modulators with frequencies from 80 to 200 MHZ from others such as Crystal Technology, IntraAction, Isomet, and NEOS, may be used.

Figure 22:
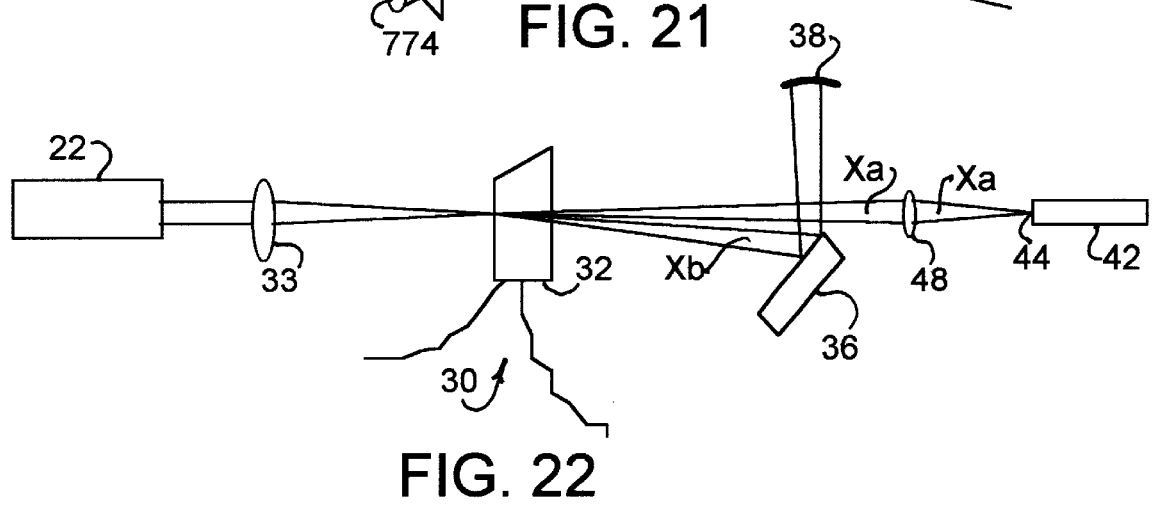
FIG. 22 is a schematic diagram of the modulation section of the preferred laser projection system of FIG. 1.
Figure 23:
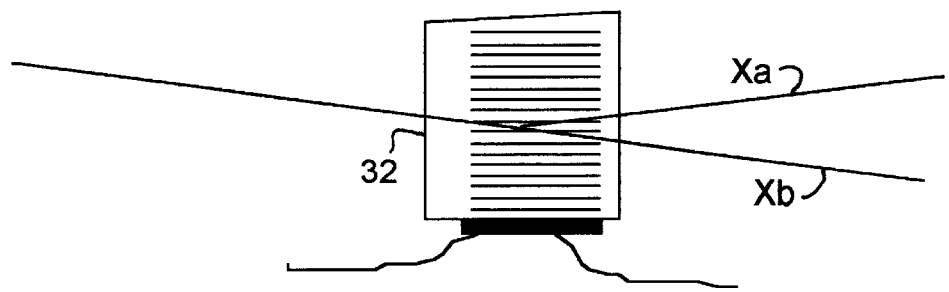
FIG. 23 is a schematic diagram of the acousto-optic modulator of FIG. 22.

As shown in FIG. 22 each beam from the laser sources is focused by modulator lens 33 into the modulator 32 to reduce the dispersion of the beam within the acousto-optic modulator 32. As the light leaves the modulator 32 in two beams, one deflected (or modulated) beam labeled "Xa" in FIGS. 22 and 23, and the other not deflected (or not modulated) beam labeled "Xb" in FIGS. 22 and 23. However, the beams overlap for a considerable distance, as they are only separated in angle by a degree or two. The beam may travel 50 to 100 mm before the modulated and un-modulated beams become distinctly separate. The separation must be complete because we intend to insert only the modulated beam into fiber 42. At the power levels we prefer to use, the un-modulated beam, called the "zero order" beam, may contain significant energy and could damage the fiber 42 tip. Thus, the zero order beam must be disposed of before it comes near the fiber 42 tip, preferably before it enters the fiber-insertion focusing lens 48. As shown in FIG. 22, this is usually done by reflecting the zero order beam by the edge of a mirror 36 into a beam block 38 made of light absorbing material. The modulated beam ("first order" beam), thus separated from the zero order beam, is then focused into a fiber 42, as described previously herein.

As noted previously, additional techniques for modulating laser beams have been used with varying success in other applications, which could take advantage of our invention. With further technological advances, these additional techniques could be used to advantage in further possible embodiments of our laser projection system 10.

The input power to the laser itself can be varied as required for each pixel. At present this technique only works for diode lasers, because other lasers do not react linearly or in a timely fashion to changes in power, in some lasers requiring several seconds or minutes to turn on and off. Diode lasers that can be modulated by direct power control at appropriate speeds are presently of much too low power for laser video use in theaters or other large screen applications. Also, it is difficult to operate these diode lasers in a continuously variable fashion. However, in the infrared wavelengths, modulation rates of several gigahertz are common in optical fiber communications applications with low power infrared on-and-off diode lasers. While it would seem tempting to use infrared diode lasers that are power-modulated to excite visible lasers, at this time there are too many non-linearities, inefficiencies and delays in the response of the excited laser to make such a process practical for commercial use with our invention. However, if suitable advances in this laser technology are accomplished, our invention could provide a cost effective means of employing such lasers. Instead of using an array of such lasers to form all or a large portion of a line to be scanned, continuously variable laser beams from such lasers could be inserted into the fibers 42 of our system 10 and scanned with the scanning sub-system of our first embodiment. Such a system would have much reduced size, as the larger, more expensive laser and modulation components could be uniquely replaced in a system 10 according to our invention by such newly developed continuously modulatable diode lasers.

Another means of modulation, called electro-optic modulation, is to rotate the plane of polarization of the laser light using electric charges or magnetic fields, using the Kerr effect or the Pockels effect, as generally described in "Electro-optic and Acousto-optic Scanning and Deflection", Gottlieb, Ireland, Ley, pp 2–97. The laser light is transmitted through a polarizing filter that allows only the light through that is polarized on a particular plane. This technique is relatively efficient from an optical standpoint, but does require polarized beams. Appropriate lossless polarizers are quite expensive, especially those capable of withstanding the power levels required for a projector. The major problem with this technique is that while it is possible to switch the beam on or off in a few nanoseconds using the Kerr or Pockels effects, hundreds of volts or strong magnetic fields are needed. It is not possible with present technology to repeat changes this abrupt more than a few times a second. However, advances in this technology that enable continuously variable modulation could enable faster rates and substantially increased resolution using arrays of optical fibers in an imaging head in accordance with our invention.

Laser Section - Wavelengths of Colored Beams

Figure 24:
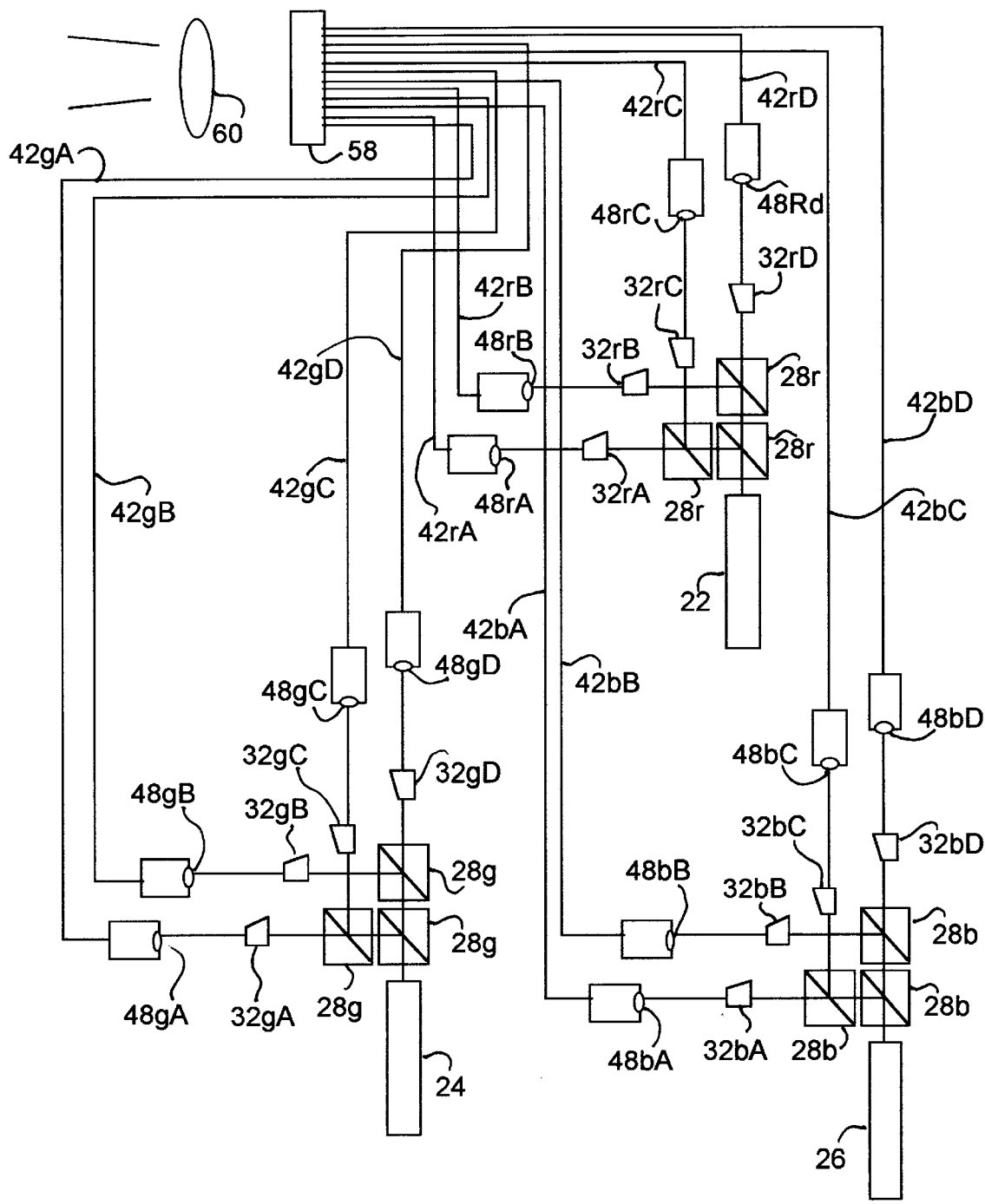
FIG. 24 is a schematic diagram of the laser section of the preferred laser projection system of FIG. 1 having one laser of each color.

The laser section 20 shown as a block in the diagram of FIG. 1, and shown in more detail in FIG. 24, supplies the light beams in the three primary colors to be eventually directed toward the screen 12, preferably includes red lasers 22, green lasers 24 and blue lasers 26. These lasers must have appropriate wavelengths so that all, or almost all, visible hues can be made up by combining various intensity of these primary wavelengths. In the anticipated commercial systems embodying our invention, at least three primary colors are required to make a full color display. Although more than three colors may be used to produce colors of the desired hues, the use of more than three colors complicates the spot projection and scanning sub-systems and adds only a very small range of potential hues not available using just three colors. It is also most likely that all video formats would be in a three-color format, and this signal would have to be converted to a four or more color format, introducing additional processing requirements. Therefore, we prefer to use three colors for our preferred embodiments.

The primary colors necessary for accurate production of composite colors in video images is described in the Television Enaineerina Handbook, K. Blair Benson, section 2.3, CIE color space diagram (1986). According to the CIE color space diagram, if the three colors vary significantly from those listed below, then some hues cannot be reproduced. It is our experience that the most preferred colors are:

Red. Red light from 635 to 670 nm in wavelength is preferred. Television and previous laser projectors use a red at about 605 to 610 nm, but this red is really an orange, and such systems cannot show a deep red.

Green. Green light from 515 to 545 nm in wavelength is preferred.

Blue. Blue from about 440 nm to 476 nm in wavelength is preferred.

Although the foregoing wavelengths are preferred, it will be understood that using different wavelengths for each color will produce different composite or aggregate colors when superimposed at a particular dot location on the screen. However, in most applications of our invention, the different colors will approximate the wavelengths of the primary colors or some combination of colors to approximate composite colors needed to project the desired color balance of the image. However, it should also be understood that there are applications for our invention wherein relatively small changes or differences in wavelength and color may be significant.

Laser Section - Quality of Beams

There are specific requirements for the lasers to be used in our preferred theater application. For example, the light output, in addition to having to be in or near TEM00 in transverse mode, must either be continuous wave or pulsed at a very fast rate. Of the common pulse generation techniques, Q-switching produces too few pulses per second for our use, but mode-locking, which produces a train of evenly spaced pulses at 70 to 200 (or more) million pulses per second, may be used in our invention. However, within our invention, any laser whatever may be used, as long as it meets beam quality, pulsing, color, and power requirements, as described herein.

Laser Section - Laser Configurations

We prefer to employ diode-pumped solid state (DPSS) lasers for reasons of economy, reliability, size, packaging considerations and infrastructure requirements. DPSS lasers have been commercially available since the late 1980's, although visible DPSS lasers in the colors and power range required for preferred embodiments of our laser projection system 10 are just now being developed. However, we also anticipate the possibility that Argon and Krypton ion, flowing jet dye, semiconductor, diode, or any other suitable lasers could be used to advantage. Optical fiber lasers, i.e., lasers wherein the optical fiber itself is the lasing material, with improvement could also be used. Fiber lasers could be particularly useful with our invention if they could be internally modulated, so as to replace both the laser and modulation sections.

The ability to combine multiple lasers to produce an image on a large screen 12 of acceptable brightness illustrates another advantage of our invention. When attempting the use of multiple lasers prior to our invention, elaborate, complicated and expensive arrays of mirrors and lenses were required to combine beams from separate lasers for projection onto a screen 12. However, with the projection of multiple beams with the emitting ends of our invention, multiple lasers having reduced power in comparison to the total power needed to provide acceptable brightness can be combined to advantage.

Thus, given the foregoing requirements and constraints on the wavelengths, beam quality and power of the laser beams needed for use in our preferred embodiment, we prefer at the current stage of development of the preferred projection system 10 to use lasers having the following specifications and general characteristics. Laser units, at least one each of red, green and blue, that each balance to white and are collectively 13–15 watts in output (assuming the red laser beam is 620–640 nm, as further described below). The following powers and wavelengths of each respective laser unit are preferred:

Green: 514 to 535 nm (527 nm is preferred). Aggregate minimum power of 4 watts at 527 nm.

Blue: 460 to 473 nm (465 nm is preferred). Aggregate minimum power of 4 watts at 465 nm.

Red: 620 to 640 nm. Aggregate minimum power of 5–6 watts at most preferred 635 nm. Wavelengths up to 660 rm could be used, although substantially greater power output would be required.

Each laser unit should preferably be true continuous wave, or be mode-locked with a pulse rate faster than 70 MHZ. Each unit should produce a beam of sufficient quality for insertion into a 8.5 micron optical fiber with at least 85% efficiency, with very low insertion loss variation. The beam should be at TEM00 or an M square of not more than 1.2. Further, the pointing stability of the laser unit must be consistent with efficient beam insertion into a 8.5 micron optical fiber. The power stability of each unit is preferably five percent (5.0%) over 16 hours, 0.5% at one second, and 0.2% at less than one second. Repeating variations or power instabilities in the realms of 60–70 Hz and 15,000–40,000 Hz should be minimized or negligible.

Referring again to FIG. 24, although not as yet commercially available, our preferred laser section would employ one each of solid state red, green and blue lasers producing the wavelengths and powers described above. However, a laser section utilizing currently available laser components although too expensive for production of a commercial laser projection system, would employ an argon ion laser manufactured by Spectra Physics Lasers, Inc., Coherent, or other vendors for green and blue beams, and use such argon ion laser to pump a flowing jet dye laser manufactured by the same vendors for the red beams. The beam from each laser 22, 24, 26 would be divided by staged beam splitters 28 as shown in FIG. 24 into four separate beams each, which as described above are separately directed to the modulators 32. Specifically, the beam from laser 22 is split into four red beams by the dividers 28, which are directed to modulators 32; the beam from laser 24 is split into four green beams by the dividers 28, which are directed to modulators 32; and the beam from laser 26 is split into four blue beams by the dividers 28, which are directed to modulators 32. The beams from the modulators 32 are respectively directed to the input lenses 48 for insertion into the insertion ends of the fibers 42.

Figure 25:
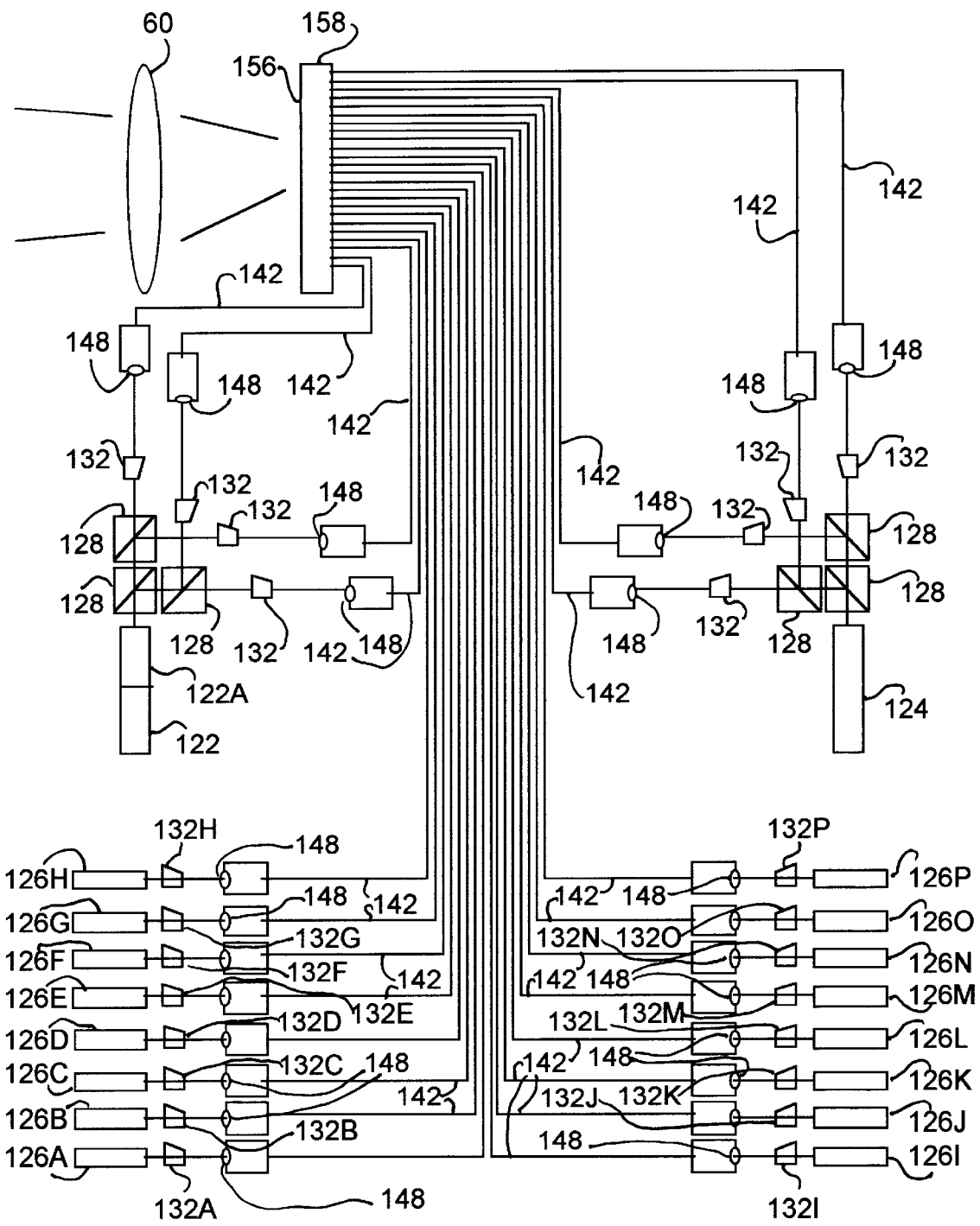
FIG. 25 is a schematic diagram of an alternate laser section for use in a system similar to that shown in FIG. 1 having one red laser, one green laser and sixteen blue lasers.

Referring to FIG. 25, an alternate laser section configuration for use with the 4 row by 6 spots per row output head configuration shown in FIG. 10, would preferably employ a Millennia 10 watt green DPSS laser 122 manufactured by Spectra Physics Lasers, Inc. pumping a model 375 dye laser 122A also manufactured by Spectra Physics Lasers, Inc. for producing the red laser beam, split into four beams with beam splitters 128 for insertion into the fibers 42. Such an alternative laser section could further use a Millennia 5 watt green DPSS laser 124 manufactured by Spectra Physics Lasers, Inc. for producing the green laser beam, split into four green beams with beam splitters 128 for insertion into the fibers 42, and sixteen blue DPSS lasers, model 58BLD605 manufactured by Melles-Griot, mounted to respectively insert the blue beam from each blue laser 126 directly into the insertion end of the remaining sixteen fibers 42.

A variety of possible combinations of the blue beams may be employed to produce the desired intensity of blue at a specific dot location in the line. Unless an excess of laser power is available, which is unlikely, dot locations requiring full intensity would require all four beams at full intensity. In our preferred system illustrated previously in FIG. 1 and in Example 19 later herein, we refer to modulate all four blue beams within a particular row at one-fourth the required aggregate intensity. An alternative system could modulate one or more blue beams at full intensity, and modulate a remaining blue beam at the differential intensity to produce the required total intensity after time combining of the modulated beams.

Figure 26:
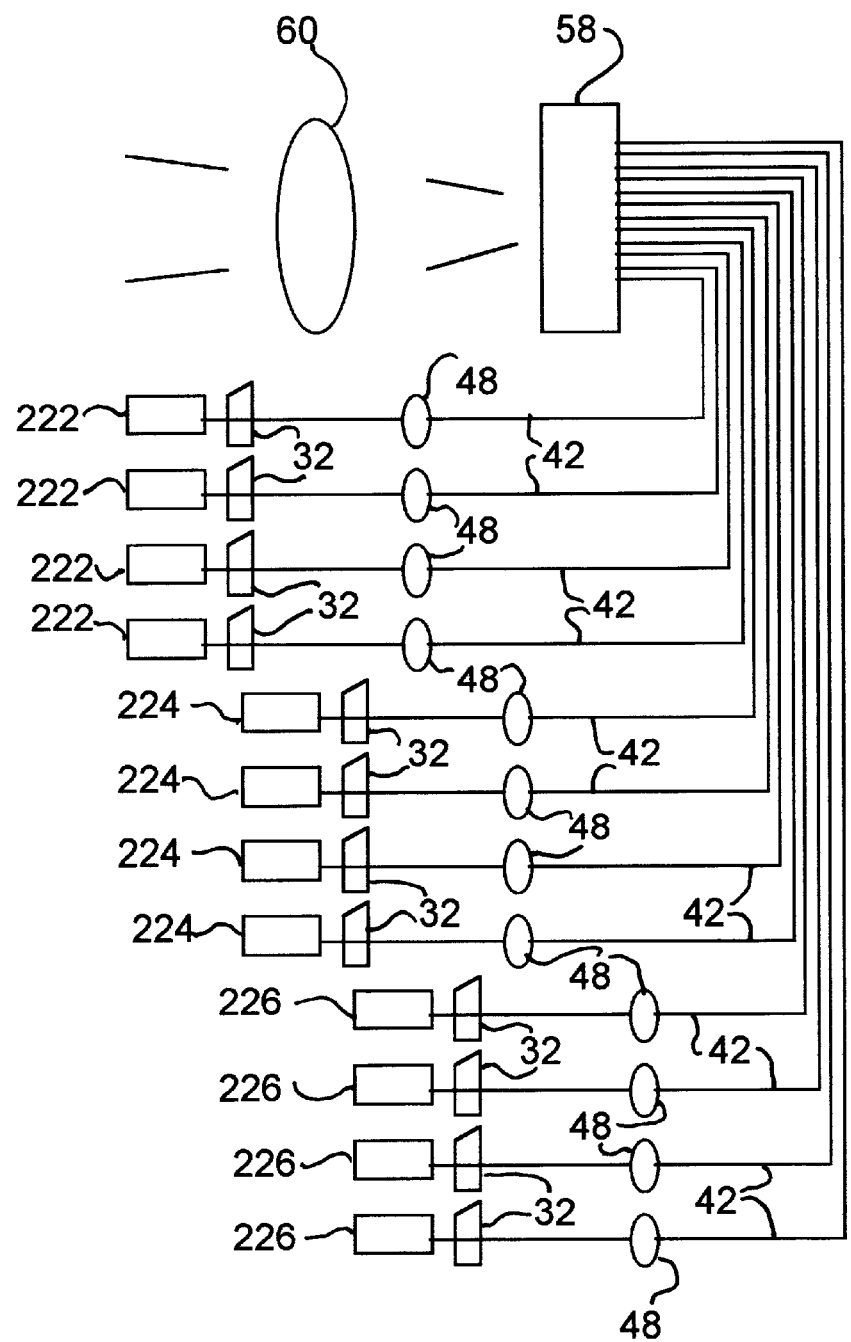
FIG. 26 is a schematic diagram of another laser section for use in a system similar to that shown in FIG. 1 having four lasers of each color.

FIG. 26 shows the use of twelve separate lasers 222, 224 and 226 to produce the respective red, green and blue beams independently respectively inserted through modulators 222 and input lenses 248 into each fiber 242 to emit from the output head of FIG. 5 for a 4 row by 3 spots per row pattern of spots shown in FIG. 5S. This laser configuration could be employed if reasonable lower power lasers were available to produce each color instead of more expensive more powerful laser needed to produce beams split into multiple beams for insertion into the fibers.

Controller Section

Figure 27:
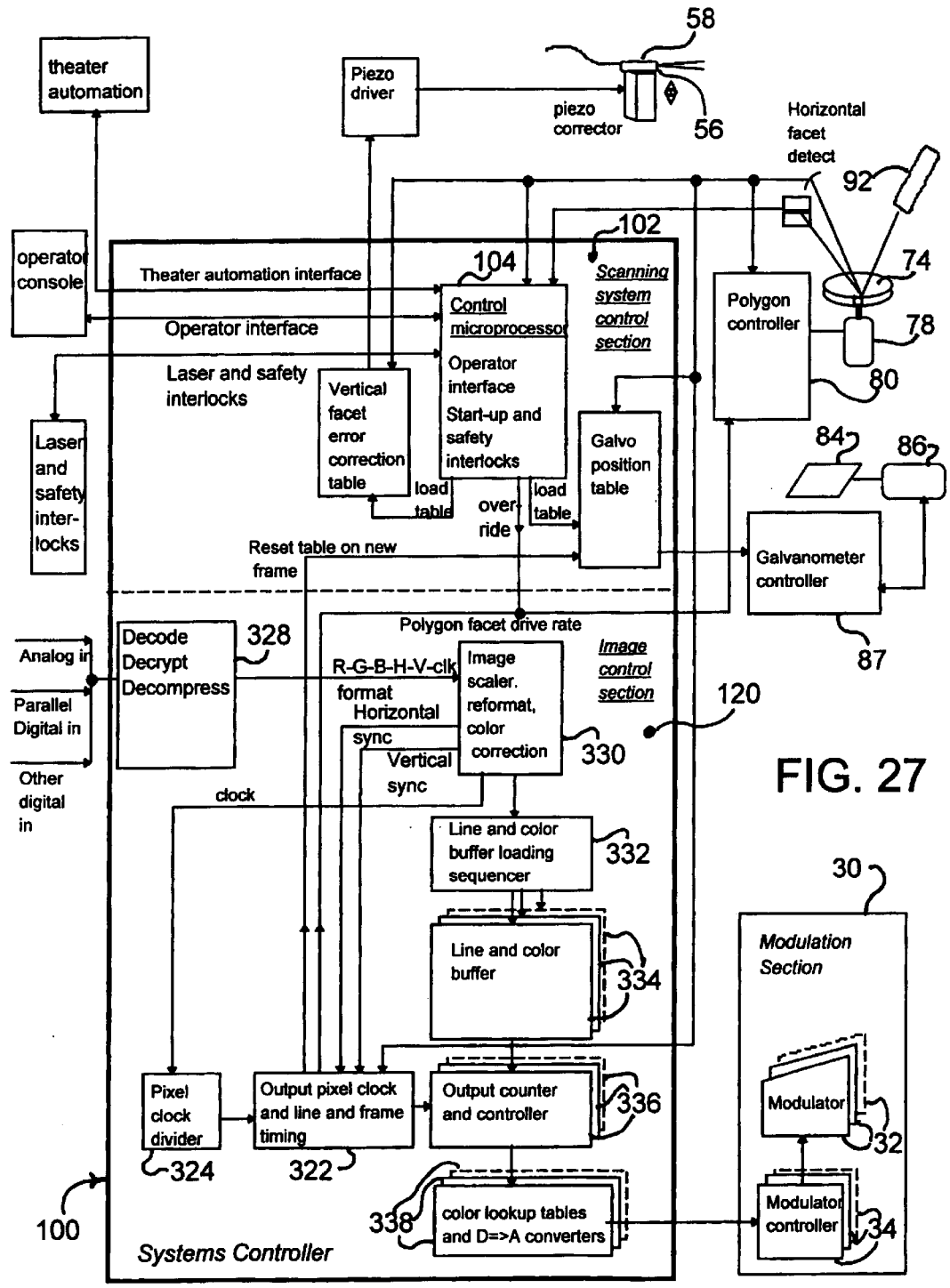
FIG. 27 is a block diagram of a controller section of the preferred laser projection system of FIG. 1.

FIG. 27 shows a block diagram of the controller section 100 of the first embodiment of our preferred theater laser projection system 10. The controller section 100 receives the video input, processes and presents the image data to the scanning and modulation components, and controls the overall operation of the projection system.

The controller section 100 has two functional areas, the scanning control section 102 and the image control section 120. The image control section 120 handles all of the functions directly related to acquiring the source image data and processing it for delivery to the modulator section 30, as well as sending certain signals, including synchronization signals, to the scanning control section 102. The scanning control section 102 performs all other control and operational requirements, including, most particularly, control of the components of the scanning section 70, providing certain data and signals to the image control section 120 particularly during initialization, receiving and executing all external commands, such as from the operator terminal of a theater control system, and providing data to such external systems or terminals, including diagnostics and record-keeping.

The scanning control section 102 includes a control microprocessor 104 that controls operation of the other components of the scanning system control section 102, interfaces with external terminals and systems, manages safety and start-up inter-locks, and routes or processes certain signals for the use by the image control section 120.

The scanning control section 102 also includes a vertical facet error correction mechanism which controls the position of the piezo-electric driver of the vertical facet error corrector 90 by sending it a calibrated signal peculiar to the facet which is then being presented to the aggregate beam for scanning. This signal is taken from a table of vertical facet error correction values which are derived from quantitative vertical facet error signals generated for each facet of the polygon mirror 74. In our preferred embodiment these vertical facet error signals are generated upon projector system start-up by using the facet detection laser 92 and the bi-cell detector 94, as described in more detail elsewhere herein. Alternatively, the vertical facet error table and associated piezo-electric control signal table may be generated at the factory or even on a dynamic basis during projection system operation.

The scanning control section 102 further includes the galvanometer position control function. The galvanometer is controlled by providing regularly updated position signals to the galvanometer driver which correspond to a constant vertical traverse of the screen 12 at a rate appropriate to the frame rate and desired image format. Based upon a signal from the image control section that a complete frame has been written, this function also causes the galvanometer controller 87 to return the galvanometer mirror 84 to where it is in position to begin scanning the next frame.

The scanning control section 102 also controls the speed of the polygon mirror 74 by signals to the polygon mirror controller 80. An initial signal corresponding to the desired output scan rate is sent to the driver by the microprocessor 104 and updated thereafter based upon signals from the output pixel clock and line and frame timing subsection 322 (described in more detail later herein) of the image control section 120. Externally, dynamic adjustments are made by a feedback loop within the polygon mirror controller 80 based on the feedback of the "facet pulse", which has been described in detail elsewhere herein for its additional use in delaying the release of a line of image data until the facet is in the correct position. The microprocessor 104 also includes limits and inter-locks that ensure that the polygon mirror 74 does not go too fast or slow upon input signal loss, scan rate changes or other discontinuities.

The scanning control section 102 also initiates all start-up, shut down and emergency procedures, as well as managing all necessary interlocks. Start-up functions include initializing all data tables, including those in the image control section 120, ensuring that all scanning components are in position to make the first scan pass and identifying for the image control section key parameters related to the source image data, e.g., format and frame rate, and the desired image output.

The image control section 120 receives image data signals, both analog and digital, in a variety of formats and processes the data as necessary to create analog signals for the individual modulator controllers 34 to scan the images in the desired resolution and format. This may include changing the frame rate as well. In our preferred embodiment for theater projectors the output resolution, format and frame rate are fixed. The image control section 120 also provides horizontal and vertical synchronization signals to the scanning control section 102 which are used, among other purposes, for controlling polygon speed.

Our preferred embodiment will accept image data signals of at least the following types and formats: parallel digital, RGBHV (similar to the XVGA format of computer monitors) and other analog signals, serial digital (such as SEMPTE 292), and HDTV.

The input decode, decrypt and decompress sub-section 328 converts all input image data into uncompressed, decrypted "parallel digital" data. In the case of analog data this accomplished by an analog to digital converter, perhaps after decoding, depending upon format. In the case of digital input this involves decompression, decryption and "decoding" (conversion) if the data is serial and not parallel. In our preferred embodiment decompression will be done external to our projection system. Decryption of various standard encryption formats will be done by the input decode, decrypt and decompress sub-section 328 using widely available or licensed commercial algorithms. The image data leaving the input decode, decrypt and decompress sub-section 328 will retain certain of its original characteristics, such as pixel count and rate, line count and rate, frame rate and aspect ratio.

The image scaler 330 takes the parallel digital output of the input decode, decrypt and decompress sub-section 328 and reformats it to the desired line rate, line count, pixel count, pixel rate, frame rate and aspect ratio in a manner familiar to anyone skilled in the art of video electronics. Further, the image scaler also generates a timing signal for use in outputting the reformatted image data to the modulator controllers 34 in the form of a "pixel clock", as well as horizontal and vertical synchronization pulses. The "new" pixel clock and horizontal synchronization pulses are modified by pixel clock divider 324 and the output pixel clock and line and frame timing subsection 322, respectively, to reflect the simultaneous scanning of multiple lines.

The image data leaving the image scaler 330 now enters the buffer loading sequencer 332 which distributes the image pixel data by color and line to buffers or FIFOs 334 to accomplish the reordering and time delays as required for the particular emitting end configuration of the output head 58. In our preferred embodiment having an emitting end configuration of four rows by three emitting ends per row, there would be twelve separate buffers, with the data corresponding to all the red values for each pixel in the line to scanned in the next scan pass by the upper-most row of emitting ends, or bottom-most row of spots of the corresponding spot pattern, being loaded into buffer 334, the data corresponding to all the green values being loaded into buffer 334, and the data corresponding to all the blue value being loaded into buffer 334. The values for the line to be scanned in that scan pass by the next-to-upper-most row of emitting ends, or the next-to-bottom-most row of spots of the corresponding spot pattern, will similarly be loaded into buffers 334. Similarly for the lines to be scanned by the other two rows of the emitting end configuration, the appropriate values for each row will be loaded into buffers 334. This loading of the buffers is performed by a "sequencer" which in our preferred embodiment may be incorporated in a programmable gate array. Note that in the first scan passes at least one row of emitting ends, and therefore spots, will be blanked. In our preferred embodiment this will be accomplished by time delays for the lines to be blanked.

Each buffer 334 is uniquely associated with a modulator 32 and its associated modulator controller 34 and with a fiber emitting end 56. For example, buffer 334 would be associated with modulator 32 and its modulator controller 34 schematically shown in FIG. 25, and buffer 334 would be associated with modulator 32 and its modulator controller 34. Each buffer 334 also has a programmed time delay associated with it and its eventual output to the modulator and fiber. Each delay is necessary to scan the reformatted data into the desired image, measured in either full or partial pixel counts and described more fully elsewhere herein, is necessary to accomplish time combining and is implemented within each of the output counter and controller 336. In certain circumstances, including the initial scan passes and certain emitting head configurations, as will be described herein, this delay may be as long as several lines of pixels. Each buffer 334 also has its own output counter and controller 336 and digital-to-analog converter 338.

Once the output of a line of buffer data is triggered by a facet pulse, the output continues for each buffer of a given line until all of the pixels for that line are displayed. Each modulator controller 34 is signaled to reset its modulator 32 to black, until the next line is ready. The number of pixels that comprise a particular line will preferably be indicated to the output counter and controller 336 by an additional bit in the color data indicated line start or, alternatively, a pixel count per line will be set by the sequencer and initialized by the scanning control section microprocessor 104.

Lastly, in subsection 338, color corrections are applied, preferably by means of a color look-up table, the function of which is familiar to anyone skilled in the art, and the digital data is converted to an analog signal suitable for use by the modulator controllers that we prefer.

For the sake of flexibility, we prefer to use a combination of software programming and hardware in the processor to accomplish the described functions, although the functions could be performed with appropriate integrated circuits.

Alternative Spot Patterns and Consequent Differences in Reordering and Time Combination The foregoing descriptions of the spot projection, scanning and controller sections 40, 70 and 100, respectively, of the first embodiment have assumed an output head 58 having a 4×3 emitting end 56 configuration projecting a 4 row by 3 spots per row spot pattern. This configuration is the one preferred for the commercial versions of our theater laser projection system 10. However, the following alternate embodiments of these sections describe different configurations, and the advantages derived therefrom.

As noted previously, an output head according to our invention is not limited to four rows of emitting ends, and encompasses five or more, or three or less, rows of emitting ends. Five rows of emitting ends will write five lines per scan pass, reducing the number of scan passes required per frame, for the same image and resolution as discussed with the four row embodiment, with advantages in increased degree similar to those described for the first embodiment, but at the increased expense of additional modulators, lasers and/or splitters. As noted elsewhere, five rows can also be used to increase resolution. Three rows of emitting ends, while again straightforward, will result in a lesser expense, primarily by avoiding the inclusion of expensive modulators and splitters and perhaps lasers, but will realize the advantages of the first embodiment to a lesser degree. The pattern of spots resulting from these different output head configurations or emitting end arrays must be taken into consideration when determining how to reorder the digital signal.
Description of Examples of Alternate Spot Patterns In the description of each of the following Examples 1–25, for the sake of conciseness and clarity, we have included Tables EX-1 through EX-27(A,B,C) in lieu of the detailed verbal description of the timing and location of the reordering of lines during frame scanning based on the number of, and the relative effective spacing of, the rows of spots projected on the screen, and/or of the time combining of dot locations during line scanning based on the number of, and the relative effective dot spacing of, the spots projected on the screen. These Tables EX-1 through EX-27 include a listing of the assumed number of rows, number of spots per row, special configurations involving more than one spot of a particular color, or a special arrangement of color positions in the array, and the relevant Figures. The body of each Table includes values for scan pass "s" during frame scanning or time "t" during line scanning or between the beginning of scan passes, the number of the line or dot location on the screen, the row identification (e.g., AAA, BBB, CCC, DDD or AAAA, BBBB, CCCC, DDDD) et seq.) or spot color (R,G,B) corresponding to the time written and location on the screen, and whether the row of spots or spot in a row is activated or blanked ("b"). The following Table EX indexes the pertinent parameters of each of the examples, where the vertical adjustment for each embodiment, except as noted in the Description column, is assumed to be equal to the number of rows.

One of the considerations in the use of a multiline scanning optical fiber head in the spot projection section 40 is the diameter of the optical fiber core and cladding, and the resulting minimum vertical distance between the beams emitted therefrom. For example, in the example described in the Summary of the Invention section, and hereinbefore in this section, the effective row spacing was five lines. However, it should be understood that the physical distance between emitting ends, and therefore the physical distance between rows of spots on the screen remained constant, despite changes in aspect ratio or resolution. However, changes in throw distance, aspect ratio and/or resolution may alter the effective row spacing, or number of lines of dots between rows of spots projected on the screen, and the effective spot spacing, or number of dot locations between spots within a row of spots. Therefore, it should be kept in mind while considering the disclosure appearing herein that a preferred resolution of 1920×1080 p and aspect ration of 16:9 are assumed for the sake of simplicity and convenience. However, the

TABLE EX

| Example Number | Rows × Spots perRow | Effective RowSpacing | Description | Tables | FIGS. |
|---|---|---|---|---|---|
| 1 | 4/3 | 3 | Log Spot Pattern | EX-1 | 28–30 |
| 2 | 4/3 | 4 | IneffectiveRowSpacing | EX-2 | 31 |
| 3 | 4/3 | 4 | IneffectiveRowSpacing (5 LineVerticalAdjstmt) | EX-3 | 32 |
| 4 | 4/3 | 15 | Log Spot Pattern | EX-4 | 33 |
| 5 | 4/3 | 17 | Log Spot Pattern | EX-5 | 34 |
| 6 | 4/3 | 9 | Log Spot Pattern | EX-6 | 35 |
| 7 | 4/3 | 11 | Log Spot Pattern | EX-7 | 36 |
| 8 | 4/3 | 10 | IneffectiveRowSpacing | EX-8 | 37 |
| 9 | 4/3 | 49 | LargeFiberOutputHead | EX-9 | 38 |
| 10 | 3/3 | 4 | Brick Spot Pattern | EX-10 | 39, 40 |
| 11 | 3/3 | 17 | Brick Spot Pattern | EX-11 | 39, 41 |
| 12 | 2/3 | 3 | Brick Spot Pattern | EX-12 | 42, 43 |
| 13 | 2/3 | 9 | Brick Spot Pattern | EX-13 | 42, 44 |
| 14 | 4/3 | 11-10-13 | Unequal Row Spacing | EX-14 | 28, 45 |
| 15 | 4/3 | 1-21-1 | Special Output Head | EX-15 | 46–48 |
| 16 | 5/3 | 6 | Brick Spot Pattern | EX-16 | 49, 50 |
| 17 | 5/3 | 24 | Brick Spot Pattern | EX-17 | 49, 51 |
| 18 | 5/3 | 11-36-36-11 | Unequal Row Spacing | EX-18 | 49, 52 |
| 19 | 4/6 | 11 | 4red, 4green, 16blue spots 3 spot spacing w/I row | EX-19 | 53–55 |
| 20 | 4/3 | 5 | Misalignment w/I row | — | 56 |
| 21 | 4/3 | 4 | NonuniformSpcng w/I row | EX-21 | 57–59 |
| 22 | 4/3 | 1 | Step Spot Pattern | EX-22 | 60–62 |
| 23 | 4/3 | ~1 | Linear Spot Pattern | — | 63–64 |
| 24 | 4/3 | ~1 | Linear Spot Pattern w/ modified emitting ends | — | 65–66 |
| 25 | 12/1 | 1 | Ramp Configuration in 4 RGB Groups | EX-25 | 67–70 |

TABLE EX-continued

| Example Number | Rows × Spots perRow | Effective RowSpacing | Description | Tables | FIGS. |
|---|---|---|---|---|---|
| 26 | 12/1 | 1 | Ramp Spot Pattern in RRRR-GGGG-BBBB Groups | EX-26 | 71–74 |
| 27 | 6/2-1 | 4 | Totem Pole Spot Pattern | EX-27 | 75–78 |
| 28 | 12/1 | 1 | Ramp Interlaced | EX-28 | 79, 80 |
| 29 | 4/3 | 9 | Log Interlaced | EX-29 | 81, 82 |
| 30 | 4/3 | 10 | Log Interlaced | EX-30 | 83, 84 |
| 31 | 3/12 | 1 | Three Ramp | EX-31 | 86, 87 | principles of our invention, and its adaptation to different resolutions and aspect ratios, remain applicable for innumerable different combinations and permutations of different variables of projection systems.

One can conclude from the foregoing that only certain line spacings would be acceptable given a screen size and desired line configuration. For example, if the image is to have 1080 lines vertically spaced over the full height of a theater screen that is 18 feet tall, the spacing of the dot locations would be about 0.2 inches. Assuming that the actual spacing between rows of the pattern of spots on the screen is 2.28 inches, this would result in an effective row spacing of 11.4, which is not an appropriate multiple of the line spacing on the screen. One could preferably move the projector closer or further from the screen (or adjust a prescan zoom output lens or select a different fixed output lens) so that the effective row spacing is appropriate, such as 11.0 or 12.0 for the example, and then adjust the galvanometer sweep so that the 1080 lines again fills the screen.

If this adjustment adversely affects the aspect ratio of the image to the point of being unacceptable for the operators of the particular installation, the horizontal range of the output pixels can be adjusted by changing the frequency of the output clock that releases the pixels, or by remapping the input into a slightly larger or smaller number of pixels. It should be noted that the adjustments described herein are not required for image quality reasons, but are merely needed when a particular theater installation must exactly fill the entire screen. For instance, the difference in frame height for the foregoing example at effective row spacings of 12 versus 11.4 for the same actual line spacing of dot locations on the screen are respectively 17.1 feet versus 18.0 feet.

In the 4 row by 3 emitting ends per row arrangement shown in FIG. 5, as stated previously, the effective row spacing of five lines assumed for the preferred embodiment in actual practice may not be feasible at this time. In actual practice, we have determined that the closest effective row spacing physically possible without custom configurations of the fiber cladding, using a single lens to focus the beams onto the screen 12 through the facets 76 of the polygon mirror 74, could be more than 10 lines, or even more in other configurations. At present levels of technology, closer spot spacings are not feasible for our application. However, after numerous examples illustrating the effect of these different effective row spacings and output head configurations of emitting ends, we describe several possible solutions of our conception that may enable closer effective row spacing.

For each of the following examples, all system sections and components are the same as with the preferred embodiment of FIG. 1, except for the output head 58 (spot pattern) configuration and the consequent different reordering performed by the controller section 100. For reasons more fully described below, for each of these examples the effective row spacing of the scanned lines must not be an exact multiple of the number of rows of emitting ends in the output head 58 array. A basic goal and assumption is that each line is written by all colors exactly once per frame.

EXAMPLE 1

Figure 28:
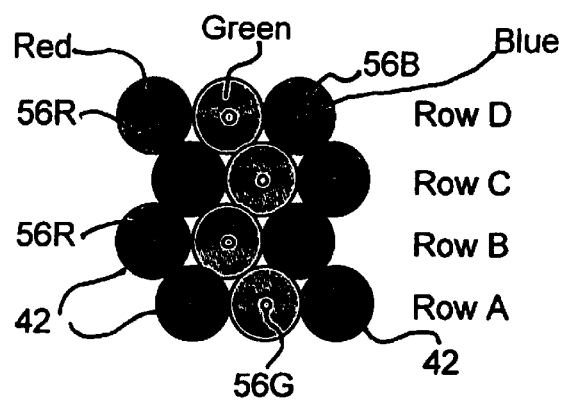
FIG. 28 is a diagram of a 4 row by 3 emitting end per row array of an alternate output head for use in the system of FIG. 1, having fibers of adjacent rows offset for a reduced effective row spacing, referred to as a "log" array.
Figure 28S:
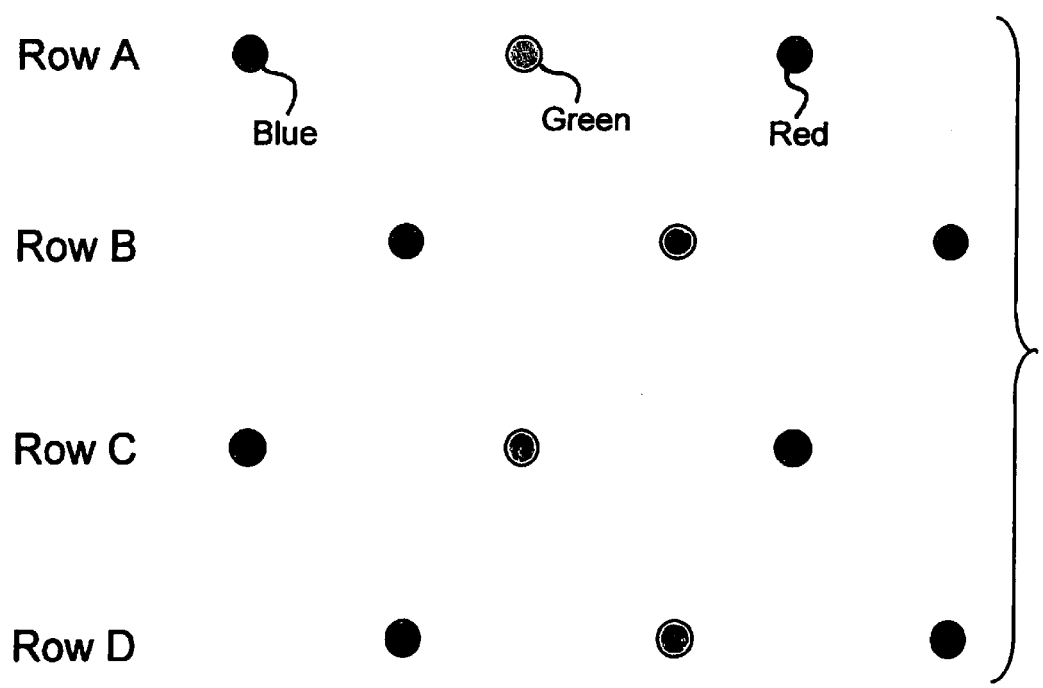
FIG. 28S is a diagram of the pattern of spots projected on a screen using the "log" array shown in FIG. 28.

Example 1 illustrates reordering of the video signal to scan complete frames with an emitting end array shown in FIG. 28 and a corresponding spot pattern shown in FIG. 28S of 4 rows by 3 spots per row, with the assumptions shown in Tables EX-1A through EX-1C. FIGS. 29A–29H and Table EX-1A describe the lines written at each scan pass s1, s2, s3, . . . . We further assume a uniform or equal physical distance between rows of emitting ends in the output head 58, which is not necessarily required, as described later herein in

TABLE EX-1A

Output Head Configuration (spot pattern)—Rows: 4  Spots/Row: 3
Corresponding Figure: FIG. 28, 29
Vertical Adjustment: 4 lines
Effective Row Spacing: 3 lines

| | Lines Written by Respective Rows of Emitting Ends | | | |
|---|---|---|---|---|
| Scan Pass | RowA | RowB | RowC | RowD |
| 1 | b | b | 1 | 4 |
| 2 | b | 2 | 5 | 8 |
| 3 | 3 | 6 | 9 | 12 |
| 4 | 7 | 10 | 13 | 16 |
| 5 | 11 | 14 | 17 | 20 |
| . | . | . | . | . |
| . | . | . | . | . |
| . | . | . | . | . |
| 270 | 1071 | 1074 | 1077 | 1080 |
| 271 | 1075 | 1078 | b | b |
| 272 | 1079 | b | b | b | connection with other examples. Further, for FIGS. 29A–29H, lines written by RowD, RowC, RowB, RowA of emitting ends are indicated by DDDD, CCCC, BBBB, AAAA, respectively.

FIGS. 5, 5S, 16A–16J, 17A–17E and 18A–18E have already illustrated an effective row spacing of 5 lines with a 4 row by 3 spots per row output head configuration with a four line vertical adjustment. For this Example 1, as shown by FIGS. 29A through 29D and described in Table EX-1A, the effective row spacing of 3 lines writes the first four lines of the frame during scan passes s1, s2 and s3 in a 4+,1,2,3 order, instead of the 4,3,2,1 order produced by the 5 line effective row spacing shown in FIGS. 17A–17E. FIGS. 29E through 29H show and Table EX-1A describes the reordering of the pixel information to write lines at the bottom of the frame during scan passes s269–s272 and thereafter, with appropriate blanking of rows when out-of-frame. Thus, for the spot pattern of Example 1,

TABLE EX-1B

Output Head Configuration (spot pattern)—Rows: 4  Spots/Row: 3
Corresponding Figures: FIGS. 28, 30  Vertical Adjustment: 4 lines
Pattern of Spots: Log  Effective Row Spacing (all rows): 3 lines
Scan Pass: 3  Blank = b  Spot Spacing within Row: 4 dots

| | RowA | | | RowB | | | RowC | | | RowD | | |
|---|---|---|---|---|---|---|---|---|---|---|---|---|
| | Blue | Grn | Red | Blue | Grn | Red | Blue | Grn | Red | Blue | Grn | Red |
| Line | time t1 | | | | | Dot Locations | | | | | | |
| 3 | b | b | b | | | | | | | | | |
| . | | | | | | | | | | | | |
| 6 | | | | b | b | 1 | | | | | | |
| . | | | | | | | | | | | | |
| 9 | | | | | | | b | b | b | | | |
| . | | | | | | | | | | | | |
| 12 | | | | | | | | | | b | b | 1 |
| Line | time t2 | | | | | Dot Locations | | | | | | |
| 3 | b | b | b | | | | | | | | | |
| . | | | | | | | | | | | | |
| 6 | | | | b | b | 2 | | | | | | |
| . | | | | | | | | | | | | |
| 9 | | | | | | | b | b | b | | | |
| . | | | | | | | | | | | | |
| 12 | | | | | | | | | | b | b | 2 |
| Line | time t3 | | | | | Dot Locations | | | | | | |
| 3 | b | b | 1 | | | | | | | | | |
| . | | | | | | | | | | | | |
| 6 | | | | b | b | 3 | | | | | | |
| . | | | | | | | | | | | | |
| 9 | | | | | | | b | b | 1 | | | |
| . | | | | | | | | | | | | |
| 12 | | | | | | | | | | b | b | 3 |
| Line | time t5 | | | | | Dot Locations | | | | | | |
| 3 | b | b | 3 | | | | | | | | | |
| . | | | | | | | | | | | | |
| 6 | | | | b | 1 | 5 | | | | | | |
| . | | | | | | | | | | | | |
| 9 | | | | | | | b | b | 3 | | | |
| . | | | | | | | | | | | | |
| 12 | | | | | | | | | | b | 1 | 5 |
| Line | time t11 | | | | | Dot Locations | | | | | | |
| 3 | 1 | 5 | 9 | | | | | | | | | |
| . | | | | | | | | | | | | |
| . | | | | | | | | | | | | |
| . | | | | | | | | | | | | |

TABLE EX-1B-continued

Output Head Configuration (spot pattern)—Rows: 4  Spots/Row: 3
Corresponding Figures: FIGS. 28, 30  Vertical Adjustment: 4 lines
Pattern of Spots: Log  Effective Row Spacing (all rows): 3 lines
Scan Pass: 3  Blank = b  Spot Spacing within Row: 4 dots

| | RowA | | | RowB | | | RowC | | | RowD | | |
|---|---|---|---|---|---|---|---|---|---|---|---|---|
| | Blue | Grn | Red | Blue | Grn | Red | Blue | Grn | Red | Blue | Grn | Red |
| 6 | | | | 3 | 7 | 11 | | | | | | |
| . | | | | | | | | | | | | |
| . | | | | | | | | | | | | |
| . | | | | | | | | | | | | |
| 9 | | | | | | | 1 | 5 | 9 | | | |
| . | | | | | | | | | | | | |
| . | | | | | | | | | | | | |
| . | | | | | | | | | | | | |
| 12 | | | | | | | | | | 3 | 7 | 11 | having an effective row spacing of 3 lines, a complete frame is written in 272 scan passes.

TABLE EX-1C

Output Head Configuration (spot pattern)—Rows: 4  Spots/Row: 3
Corresponding Figures: FIGS. 28, 30  Vertical Adjustment: 4 lines
Pattern of Spots: Log  Effective Row Spacing (all rows): 3 lines
Scan Pass: 3  Blank = b  Spot Spacing within Row: 4 dots

| | RowA | | | RowB | | | RowC | | | RowD | | |
|---|---|---|---|---|---|---|---|---|---|---|---|---|
| | Blue | Grn | Red | Blue | Grn | Red | Blue | Grn | Red | Blue | Grn | Red |
| Line | time t1920 | | | | | Dot Locations | | | | | | |
| 3 | 1910 | 1914 | 1918 | | | | | | | | | |
| . | | | | | | | | | | | | |
| . | | | | | | | | | | | | |
| . | | | | | | | | | | | | |
| 6 | | | | 1912 | 1916 | 1920 | | | | | | |
| . | | | | | | | | | | | | |
| . | | | | | | | | | | | | |
| . | | | | | | | | | | | | |
| 9 | | | | | | | 1910 | 1914 | 1918 | | | |
| . | | | | | | | | | | | | |
| . | | | | | | | | | | | | |
| . | | | | | | | | | | | | |
| 12 | | | | | | | | | | 1912 | 1916 | 1920 |
| Line | time t1921 | | | | | Dot Locations | | | | | | |
| 3 | 1911 | 1915 | 1919 | | | | | | | | | |
| . | | | | | | | | | | | | |
| . | | | | | | | | | | | | |
| . | | | | | | | | | | | | |
| 6 | | | | 1913 | 1917 | b | | | | | | |
| . | | | | | | | | | | | | |
| . | | | | | | | | | | | | |
| . | | | | | | | | | | | | |
| 9 | | | | | | | 1911 | 1915 | 1919 | | | |
| . | | | | | | | | | | | | |
| . | | | | | | | | | | | | |
| . | | | | | | | | | | | | |
| 12 | | | | | | | | | | 1913 | 1917 | b |
| Line | time t1922 | | | | | Dot Locations | | | | | | |
| 3 | 1912 | 1916 | 1920 | | | | | | | | | |
| . | | | | | | | | | | | | |
| . | | | | | | | | | | | | |
| . | | | | | | | | | | | | |
| 6 | | | | 1914 | 1918 | b | | | | | | |
| . | | | | | | | | | | | | |
| . | | | | | | | | | | | | |
| . | | | | | | | | | | | | |

TABLE EX-1C-continued

Output Head Configuration (spot pattern)—Rows: 4  Spots/Row: 3
Corresponding Figures: FIGS. 28, 30  Vertical Adjustment: 4 lines
Pattern of Spots: Log  Effective Row Spacing (all rows): 3 lines
Scan Pass: 3  Blank = b  Spot Spacing within Row: 4 dots

|   | RowA | | | RowB | | | RowC | | | RowD | | |
|---|------|---|---|------|---|---|------|---|---|------|---|---|
|   | Blue | Grn | Red | Blue | Grn | Red | Blue | Grn | Red | Blue | Grn | Red |
| 9 | | | | | | | 1912 | 1916 | 1920 | | | |
| . | | | | | | | | | | | | |
| 12 | | | | | | | | | | 1914 | 1918 | b |

| Line | time t1924 | | | | | | Dot Locations | | | | | |
|---|---|---|---|---|---|---|---|---|---|---|---|---|
| 3 | 1914 | 1918 | b | | | | | | | | | |
| . | | | | | | | | | | | | |
| 6 | | | | 1916 | 1920 | b | | | | | | |
| . | | | | | | | | | | | | |
| 9 | | | | | | | 1914 | 1918 | b | | | |
| . | | | | | | | | | | | | |
| 12 | | | | | | | | | | 1916 | 1920 | b |

| Line | time t1930 | | | | | | Dot Locations | | | | | |
|---|---|---|---|---|---|---|---|---|---|---|---|---|
| 3 | 1920 | b | b | | | | | | | | | |
| . | | | | | | | | | | | | |
| 6 | | | | b | b | b | | | | | | |
| . | | | | | | | | | | | | |
| 9 | | | | | | | 1920 | b | b | | | |
| . | | | | | | | | | | | | |
| 12 | | | | | | | | | | b | b | b |

In the emitting end array shown in FIG. 5 and the resulting spot pattern shown in FIG. 5S, the emitting ends (spots) of the rows are horizontally centered on the spot in the row above and/or below, referred to herein as a "rectangular" array or pattern. In such a pattern, during each scan pass, the right-most spots of all rows of the rectangular spot pattern will write the first dot locations in their respective lines, as shown in FIGS. 16A–16H, at approximately the same time. However, FIG. 28S shows a different arrangement, in which the emitting ends, and therefore the spots, in each row are offset such that the emitting ends and spots in alternate rows fit in the valleys between the obverse rows, termed herein for convenience the "log" array or pattern, as shown in FIGS. 28 and 28S. As shown in FIG. 30A and Table EX-1B for the 4 row by 3 spots per row pattern of spots of this Example 1 with the log pattern, and assuming a spacing between spots within rows of 4 dot locations, at time t1 during scan pass s3, dot location 1 in lines L6 and L12 will be illuminated by the red spots of RowB and RowD while the green and blue spots of RowB and RowD, and all spots of RowA and RowC will be blanked. As shown by FIGS. 30B through 30F and described in Table EX-1B, for the remaining times t2–t11 of the illustrative scan pass s3, at time t11 all spots will illuminate dot locations at an appropriately modulated intensity (which may be zero). It should be noted that the color spots need not be in the same order for all rows, as will be described in more detail herein. Table EX-1C illustrates the timing of the dot illumination for scan pass s3 for times t1920–1930 at the end of the line and scan pass prior to initiating the next scan pass s4 shown in FIG. 29D.

EXAMPLE 2

Example 2, described in Table EX-2 below and schematically shown in a typical frame format in FIGS. 5S and 31A through 31D is an example of how an effective row spacing that is an even multiple of the number of rows of emitting ends or spots (in this Example 2, an effective row spacing of 4) with a vertical line adjustment between scan passes equal to the number of rows of emitting ends or

TABLE EX-2

Output Head Configuration (spot pattern)—Rows: 4  Spots/Row: 3
Corresponding Figure: FIG. 31
Vertical Adjustment: 4 lines
Effective Row Spacing: 4 lines Lines Written by Respective Rows of Emitting Ends

| Scan Pass | RowA | RowB | RowC | RowD |
|---|---|---|---|---|
| 1 | b | b | b | 4 |
| 2 | b | b | 4 | 8 |
| 3 | b | 4 | 8 | 12 |
| 4 | 4 | 8 | 12 | 16 |
| 5 | 8 | 12 | 16 | 20 |
| . | . | . | . | . |
| . | . | . | . | . |
| . | . | . | . | . |
| 270 | 1068 | 1072 | 1076 | 1080 |
| 271 | 1072 | 1076 | 1080 | b |
| 272 | 1076 | 1080 | b | b | spots (in this Example 2, a vertical adjustment of 4 lines) is not effective in the exemplary system. Referring to Table EX-2 and FIG.

TABLE EX-3

Output Head Configuration (spot pattern)—Rows: 4  Spots/Row: 3
Corresponding Figure: FIG. 32
Vertical Adjustment: 5 lines
Effective Row Spacing: 4 lines Lines Written by Respective Rows of Emitting Ends

| Scan Pass | RowA | RowB | RowC | RowD |
|---|---|---|---|---|
| 1 | b | b | b | 4 |
| 2 | b | 1 | 5 | 9 |
| 3 | 2 | 6 | 10 | 14 |
| 4 | 7 | 11 | 15 | 19 |
| 5 | 12 | 16 | 20 | 24 |
| . | . | . | . | . |
| . | . | . | . | . |
| . | . | . | . | . |
| 216 | 1067 | 1071 | 1075 | 1079 |
| 217 | 1072 | 1076 | 1080 | b |
| 218 | 1077 | b | b | b |

FIGS. 31A–31D, it may be seen that lines L1, L2 and L3; L5, L6, L7; L9, L10, L11; and so forth will not be written during a top to bottom series of scan passes.

EXAMPLE 3

Similarly, Example 3, described in Table EX-3 and schematically shown in a typical frame format in FIGS. 32A through 32D, it may be seen that changing the line adjustment for the four line effective row spacing output head to a five line adjustment still fails to write lines 3, 8, . . . , etc.

EXAMPLE 4

For Example 4, described in Table EX-4 and schematically shown in FIGS. 33A–33H, we assume an effective row spacing of about 15

TABLE EX-4

Output Head Configuration (spot pattern)—Rows: 4  Spots/Row: 3
Corresponding Figure: FIG. 33
Vertical Adjustment: 4 lines
Effective Row Spacing (all rows): 15 lines Lines Written by Respective Rows of Emitting Ends

| Scan Pass | RowA | RowB | RowC | RowD |
|---|---|---|---|---|
| 1 | b | b | b | 4 |
| 2 | b | b | b | 8 |
| . | . | . | . | . |
| . | . | . | . | . |
| . | . | . | . | . |
| 4 | b | b | 1 | 16 |
| 5 | b | b | 5 | 20 |
| . | . | . | . | . |
| . | . | . | . | . |
| . | . | . | . | . |
| 8 | b | 2 | 17 | 32 |
| 9 | b | 6 | 21 | 36 |
| . | . | . | . | . |
| . | . | . | . | . |
| . | . | . | . | . |
| 12 | 3 | 18 | 33 | 48 |
| 38 | 7 | 22 | 37 | 52 |
| . | . | . | . | . |
| . | . | . | . | . |
| 270 | 1035 | 1050 | 1065 | 1080 |
| 271 | 1039 | 1054 | 1069 | b |
| . | . | . | . | . |
| . | . | . | . | . |
| 273 | 1047 | 1062 | 1077 | b |
| 274 | 1051 | 1066 | b | b |
| . | . | . | . | . |
| . | . | . | . | . |
| 277 | 1063 | 1078 | b | b |
| 278 | 1067 | b | b | b |
| . | . | . | . | . |
| . | . | . | . | . |
| 281 | 1079 | b | b. | b | lines. However, 16 lines apart would be an even multiple of the number of rows of spots projected from the array of emitting ends onto the screen and thus would not be effective in writing all lines of the frame. As shown in FIG. 33A, although not required, line L4 of the frame is preferably first written with the bottom row (RowD) of spots. Thus, in summary, lines L1–L4 all will be written after 12 horizontal scan passes have occurred, and the entire frame is written after 281 scan passes.

EXAMPLE 5

For Example 5, described in Table EX-5 and schematically shown in FIGS. 34A–34H we assume an effective row spacing of about 17

TABLE EX-5

Output Head Configuration (spot pattern)—Rows: 4  Spots/Row: 3
Corresponding Figure: FIG. 34
Vertical Adjustment: 4 lines
Effective Row Spacing (all rows): 17 lines Lines Written by Respective Rows of Emitting Ends

| Scan Pass | RowA | RowB | RowC | RowD |
|---|---|---|---|---|
| 1 | b | b | b | 4 |
| 2 | b | b | b | 8 |

TABLE EX-5-continued

Output Head Configuration (spot pattern)—Rows: 4  Spots/Row: 3
Corresponding Figure: FIG. 34
Vertical Adjustment: 4 lines
Effective Row Spacing (all rows): 17 lines Lines Written by Respective Rows of Emitting Ends

| Scan Pass | RowA | RowB | RowC | RowD |
|---|---|---|---|---|
| . | . | . | . | . |
| . | . | . | . | . |
| . | . | . | . | . |
| 5 | b | b | 3 | 20 |
| 6 | b | b | 7 | 24 |
| . | . | . | . | . |
| . | . | . | . | . |
| . | . | . | . | . |
| 9 | b | 2 | 19 | 36 |
| 10 | b | 6 | 23 | 40 |
| . | . | . | . | . |
| . | . | . | . | . |
| . | . | . | . | . |
| 13 | 1 | 18 | 35 | 52 |
| 14 | 5 | 22 | 39 | 56 |
| . | . | . | . | . |
| . | . | . | . | . |
| . | . | . | . | . |
| 270 | 1029 | 1046 | 1063 | 1080 |
| 271 | 1033 | 1050 | 1067 | b |
| . | . | . | . | . |
| . | . | . | . | . |
| 274 | 1045 | 1062 | 1079 | b |
| 275 | 1049 | 1066 | b | b |
| . | . | . | . | . |
| . | . | . | . | . |
| 278 | 1061 | 1078 | b | b |
| 279 | 1065 | b | b | b |
| . | . | . | . | . |
| . | . | . | . | . |
| 282 | 1077 | b | b | b | lines, but for the same reasons as for Example 4, not 16 lines apart. In FIG. 34A, although not required, line L4 of the frame is preferably first written with the bottom row RowD of the pattern of spots. It should be noted that in this Example 5, the lines are written in a 4,3,2,1 sequence, as opposed to the different order from Example 4 of 4,1,2,3. Thus, in summary, lines L1–L4 all will be written after 13 horizontal scan passes have occurred, and the entire frame is written after 282 scan passes.

EXAMPLE 6

For Example 6, described in Table EX-6 and schematically shown in FIGS. 35A–35P we assume an effective row spacing of about 9 lines, but for the same reasons as for Example 4, not 8 lines apart,

TABLE EX-6

Output Head Configuration (spot pattern)—Rows: 4  Spots/Row: 3
Corresponding Figure: FIG. 35
Vertical Adjustment: 4 lines
Effective Row Spacing (all rows): 9 lines Lines Written by Respective Rows of Emitting Ends

| Scan Pass | RowA | RowB | RowC | RowD |
|---|---|---|---|---|
| 1 | b | b | b | 4 |
| 2 | b | b | b | 8 |

TABLE EX-6-continued

Output Head Configuration (spot pattern)—Rows: 4  Spots/Row: 3
Corresponding Figure: FIG. 35
Vertical Adjustment: 4 lines
Effective Row Spacing (all rows): 9 lines Lines Written by Respective Rows of Emitting Ends

| Scan Pass | RowA | RowB | RowC | RowD |
|---|---|---|---|---|
| 3 | b | b | 3 | 12 |
| 4 | b | b | 7 | 16 |
| 5 | b | 2 | 11 | 20 |
| 6 | b | 6 | 15 | 24 |
| 7 | 1 | 10 | 19 | 28 |
| 8 | 5 | 14 | 23 | 32 |
| . | . | . | . | . |
| . | . | . | . | . |
| . | . | . | . | . |
| 270 | 1053 | 1062 | 1071 | 1080 |
| 271 | 1057 | 1066 | 1075 | b |
| 272 | 1061 | 1070 | 1079 | b |
| 273 | 1065 | 1074 | b | b |
| 274 | 1069 | 1078 | b | b |
| 275 | 1073 | b | b | b |
| 276 | 1077 | b | b | b | or as illustrated in Example 8, not 10 lines apart. It is anticipated that even with significant reductions in the size of optical fibers, and/or with some of our solutions to output head configurations described herein it is still likely that an effective row spacing of 9 lines is about the closest feasible even anticipating further developments in technology in the near future.

Again referring to FIG. 35A, although not required but preferred to obtain the minimum number of scan passes per frame, line L4 of the frame is preferably first written at scan pass s1 with the bottom row RowD of the pattern of spots projected by the lines L1 and L3, and indeed all odd numbered lines of dot locations of the frame, will not be written.

TABLE EX-7

Output Head Configuration (spot pattern)—Rows: 4  Spots/Row: 3
Corresponding Figure: FIG. 36
Vertical Adjustment: 4 lines
Effective Row Spacing(all rows): 11 lines Lines Written by Respective Rows of Emitting Ends

| Scan Pass | RowA | RowB | RowC | RowD |
|---|---|---|---|---|
| 1 | b | b | b | 4 |
| 2 | b | b | b | 8 |
| 3 | b | b | 1 | 12 |
| 4 | b | b | 5 | 16 |
| . | . | . | . | . |
| . | . | . | . | . |
| . | . | . | . | . |
| 6 | b | 2 | 13 | 24 |
| 7 | b | 6 | 17 | 28 |
| . | . | . | . | . |
| . | . | . | . | . |
| . | . | . | . | . |
| 9 | 3 | 14 | 25 | 36 |
| 10 | 7 | 18 | 29 | 40 |
| . | . | . | . | . |
| . | . | . | . | . |
| . | . | . | . | . |
| 270 | 1047 | 1058 | 1069 | 1080 |
| 271 | 1051 | 1062 | 1073 | b |
| 272 | 1055 | 1066 | 1077 | b |
| 273 | 1059 | 1070 | b | b |
| . | . | . | . | . |
| . | . | . | . | . |
| . | . | . | . | . |

TABLE EX-7-continued

Output Head Configuration (spot pattern)—Rows: 4 Spots/Row: 3
Corresponding Figure: FIG. 36
Vertical Adjustment: 4 lines
Effective Row Spacing(all rows): 11 lines

| | Lines Written by Respective Rows of Emitting Ends | | | |
|---|---|---|---|---|
| Scan Pass | RowA | RowB | RowC | RowD |
| 275 | 1067 | 1078 | b | b |
| 276 | 1071 | b | b | b |
| . | . | . | . | . |
| . | . | . | . | . |
| . | . | . | . | . |
| 278 | 1079 | b | b | b | emitting ends of the output head. Referring to FIGS. 35B–35H, lines L1–L4 will be written after 7 horizontal scan passes have occurred. Referring to FIGS. 35I–35P, all lines of the frame will be written after 276 scan passes.

EXAMPLE 7

For Example 7, described in Table EX-7 and schematically shown in FIGS. 36A–36P we assume an effective row spacing of about 11 lines, but for the same reasons as for Example 6, not 10 or 12 lines apart. In FIG. 36A, describing the lines written by the system of Example 7, although not required, line L4 of the frame is preferably first written with the bottom row RowD of the pattern of spots projected by the output head while RowC, RowB and RowA are blanked. Referring to FIGS. 36B–36H, lines L1–L4 will be written after 9 horizontal scan passes have occurred for the 11 line effective row spacing of this Example 7, contrasted with the 7 scans required to write lines L1–L4 in the 9 line effective row spacing of Example 6. Further, referring to FIGS. 36I–36P, for this Example 7, 278 scan passes are required to write a full 1920×1080 p frame, contrasted with 276 scan passes required to write a full frame for Example 6.

EXAMPLE 8

Example 8, described in Table EX-8 and schematically shown in FIGS. 37A–37H, illustrates the ineffectiveness of an effective row spacing of 10 lines. In FIG. 37, describing the lines written by the system of Example 8, line L4 of the frame is preferably first written with the bottom row RowD of the pattern of spots while RowC, RowB and RowA are blanked. As shown in FIG. 37 and demonstrated in Table EX-8, after 8 scan passes, and even after 12 scan passes, lines L1 and L3, and indeed all odd numbered lines of dot locations of the frame, will not be written.

TABLE EX-8

Output Head Configuration (spot pattern)—Rows: 4 Spots/Row: 3
Corresponding Figure: FIG. 37
Vertical Adjustment: 4 lines
Effective Row Spacing (all rows): 10 lines

| | Lines Written by Respective Rows of Emitting Ends | | | |
|---|---|---|---|---|
| Scan Pass | RowA | RowB | RowC | RowD |
| 1 | b | b | b | 4 |
| 2 | b | b | b | 8 |
| 3 | b | b | 2 | 12 |
| 4 | b | b | 6 | 16 |
| 5 | b | b | 10 | 20 |
| 6 | b | 4 | 14 | 24 |
| 7 | b | 8 | 18 | 28 |

TABLE EX-8-continued

Output Head Configuration (spot pattern)—Rows: 4 Spots/Row: 3
Corresponding Figure: FIG. 37
Vertical Adjustment: 4 lines
Effective Row Spacing (all rows): 10 lines

| | Lines Written by Respective Rows of Emitting Ends | | | |
|---|---|---|---|---|
| Scan Pass | RowA | RowB | RowC | RowD |
| 8 | 2 | 12 | 22 | 32 |
| 9 | 6 | 16 | 26 | 36 |
| 10 | 10 | 20 | 30 | 40 |
| 11 | 14 | 24 | 34 | 44 |
| 12 | 18 | 28 | 38 | 48 |

EXAMPLE 9

We have demonstrated that various effective row spacings for the emitting end configurations and spot patterns of the foregoing Examples 1–8 can be used. Now we show effective row spacings of 49 lines or more. For this Example 9, described in Table EX-9 and schematically shown in a preferred 1920×1080 p frame in FIGS. 38A–38H, we assume an effective row spot spacing of about 49 lines, but not 48 lines for reasons stated previously. As with previous examples, line L4 of the frame is preferably first written with the bottom row RowD of spots, corresponding to the top row RowD of emitting ends of the output head, and as shown in FIGS. 38A–38H an described in Table EX-9, lines L1–L4 will be written after 37 scan passes. For this Example 9, and as shown in Table EX-9, based on the assumed 1920×1080 p resolution, after the 270 scans required to move

TABLE EX-9

Output Head Configuration (spot pattern)—Rows: 4 Spots/Row: 3
Corresponding Figure: FIG. 38
Vertical Adjustment: 4 lines
Effective Row Spacing: 49 lines

| | Lines Written by Respective Rows of Emitting Ends | | | |
|---|---|---|---|---|
| Scan Pass | RowA | RowB | RowC | RowD |
| 1 | b | b | b | 4 |
| 2 | b | b | b | 8 |
| 3 | b | b | b | 12 |
| . | . | . | . | . |
| . | . | . | . | . |
| . | . | . | . | . |
| 13 | b | b | 3 | 52 |
| 14 | b | b | 7 | 56 |
| . | . | . | . | . |
| . | . | . | . | . |
| . | . | . | . | . |
| 25 | b | 2 | 51 | 100 |
| 26 | b | 6 | 55 | 104 |
| . | . | . | . | . |
| . | . | . | . | . |
| . | . | . | . | . |
| 37 | 1 | 50 | 99 | 148 |
| 38 | 5 | 54 | 103 | 152 |
| . | . | . | . | . |
| . | . | . | . | . |
| . | . | . | . | . |
| 270 | 933 | 982 | 1031 | 1080 |
| 271 | 937 | 986 | 1035 | b |
| . | . | . | . | . |
| . | . | . | . | . |
| . | . | . | . | . |
| 282 | 981 | 1030 | 1079 | b |

TABLE EX-9-continued

Output Head Configuration (spot pattern)—Rows: 4  Spots/Row: 3
Corresponding Figure: FIG. 38
Vertical Adjustment: 4 lines
Effective Row Spacing: 49 lines Lines Written by Respective Rows of Emitting Ends

| Scan Pass | RowA | RowB | RowC | RowD |
|---|---|---|---|---|
| 283 | 985 | 1034 | b | b |
| . | . | . | . | . |
| . | . | . | . | . |
| . | . | . | . | . |
| 294 | 1029 | 1078 | b | b |
| 295 | 1033 | b | b | b |
| . | . | . | . | . |
| . | . | . | . | . |
| . | . | . | . | . |
| 306 | 1077 | b | b | b | row RowD down to write line L1080, 36 additional scans will occur as row RowA is moved down the screen 12 to write line L1077.

EXAMPLES 10–27

The next examples (Examples 10–27) illustrate variations of emitting end (spot pattern) configurations of the output head from the 4×3 array described for Examples 1–9, in which FIGS. 39–78 and Tables EX-10 through EX-27 show and describe the reordering of the video signal required for a variety of different output head (pattern of spots) configurations. Unlike Examples 1–9, the following Examples 10–25 are not limited to a 4 row by 3 spots per row spot pattern or corresponding emitting end array, a 4 line vertical adjustment after each horizontal scan pass, a uniform distance between rows of emitting ends, the assumption of three emitting ends in each row emitting one of the three primary colors, or even vertical alignment of the rows.

For convenient reference as to the following examples, we continue to refer to the rows of the pattern of spots from top to bottom, e.g., rows RowA, RowB, RowC, RowD, RowE, for the 5×3 array. As with the previous examples, the lines of spots written by each respective row are denoted in the drawings by a row of letters corresponding to that row (e.g., AAA, BBB, CCC, DDD and EEE or AAAA, BBBB, CCCC, DDDD and EEEE). For all of the Examples 10–27, all system sections and components are the same as with the preferred embodiment of FIG. 1, except for the output head 58 configuration and resulting spot pattern, and the consequent different reordering performed by the controller section 100, or as specifically noted for the particular example concerned.

EXAMPLES 10–11

In the proposed commercial version of a theater laser projection system according to our invention, similar to the preferred embodiment described hereinbefore, a 4 row by 3 spots per row spot pattern is identified as the best compromise between the enhanced resolution available by dividing the number of lines per frame by four and other benefits during line scanning, and the increased cost and complexity of scanning four lines per scan pass. A next preferred embodiment, exemplified by Examples 10 and 11, is an output head having 9 fibers arranged in 3 rows of 3 emitting ends, producing a spot pattern of three vertically spaced apart rows of red, green and blue spots as shown in FIGS. 39 and 39S. Although the 3×3 spot pattern of Examples 10 and 11 requires 360 scan passes per frame, rather than 270 scan passes per frame for the 4×3 spot pattern examples, the expense of beam dividing optics, modulators, other components and perhaps lasers is reduced. Further, although approaching the practical limits of our preferred polygon mirror, for the preferred 1920×1080 p resolution, this output head configuration is also preferred.

Examples 10 and 11, as shown in FIGS. 40 and 41, respectively, and described in Tables EX-10 and EX-11, respectively, illustrate the reordering required for a 3 row by 3 emitting end per row output head configuration and spot pattern respectively shown in FIGS. 39 and 39S, wherein the vertical adjustment between scan passes is 3 lines of dot locations. As with most of the examples, for Examples 10–11 the vertical adjustment preferably equals the number of rows of emitting ends in the output head for these cases. Although we have not provided as many examples of the reordering required for this output head configuration as for the 4 row by 3 emitting end per row configuration in Examples 1–9, similar alternatives, and many others, can be deduced by extrapolating the two examples described herein.

TABLE EX-10

Output Head Configuration (spot pattern)—Rows: 3  Spots/Row: 3
Corresponding Figure: FIG. 40
Vertical Adjustment: 3 lines
Effective Row Spacing (all rows): 4 lines Lines Written by Respective Rows of Emitting Ends

| Scan Pass | RowA | RowB | RowC |
|---|---|---|---|
| 1 | b | b | 3 |
| 2 | b | 2 | 6 |
| 3 | 1 | 5 | 9 |
| 4 | 4 | 8 | 12 |
| . | . | . | . |
| . | . | . | . |
| . | . | . | . |
| 359 | 1069 | 1073 | 1077 |
| 360 | 1072 | 1076 | 1080 |
| 361 | 1075 | 1079 | b |
| 362 | 1078 | b | b |

EXAMPLE 10

For Example 10, shown in FIGS. 40A–40H and described in Table EX-10, we assume an effective row spacing of about 4 lines between RowA, RowB and RowC. Referring to FIG. 40A, at time t1, line L3 of the frame is preferably first written with the bottom row RowC of the pattern of spots projected on the screen by the emitting ends of the output head, while RowA and RowB are blanked. As shown in FIGS. 40B–40D, successive scan passes s2, s3 and s4 will write lines L1–L3, and as shown in FIGS. 40E–40H all lines of the frame will be written after 362 scan passes.

EXAMPLE 11

For Example 11, shown in FIG. 41A–41H and described in Table EX-11, we assume an effective row spacing of about 17 lines between

TABLE EX-11

Output Head Configuration (spot pattern)—Rows: 3 Spots/Row: 3
Corresponding Figure: FIG. 41
Vertical Adjustment: 3 lines
Effective Row Spacing (all rows): 17 lines Lines Written by Respective Rows of Emitting Ends

Figures 41A, 41B, 41C, 41D, 41E, 41F, 41G, 41H, 42, 42S:
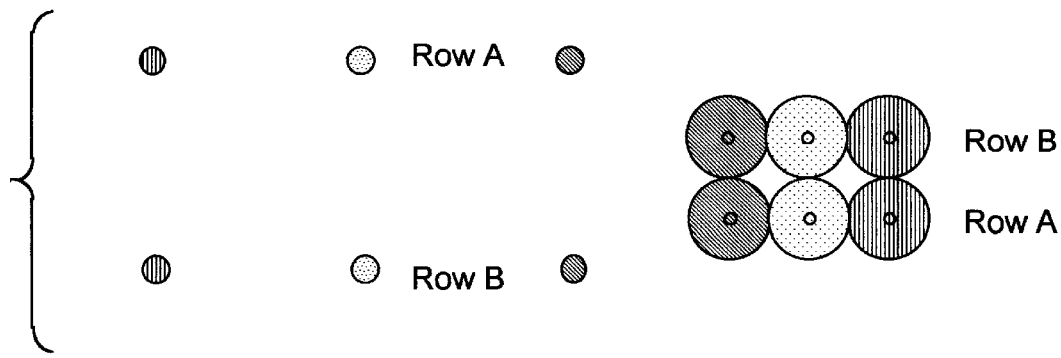
FIGS. 41A through 41H are time sequence diagrams for Example 11, illustrating line reordering for a 3×3 spot pattern similar to that of FIG. 39S having an effective row spacing of 17 lines and a vertical adjustment between scan passes of 3 lines.
FIG. 42 is a diagram for Examples 12 and 13, showing a 2 row by 3 emitting end per row array of an alternate output head for use in the system of FIG. 1.
FIG. 42S is a diagram of the pattern of spots projected on a screen using the array shown in FIG. 42.

| Scan Pass | RowA | RowB | RowC |
|---|---|---|---|
| 1 | b | b | 3 |
| 2 | b | b | 6 |
| . | . | . | . |
| . | . | . | . |
| . | . | . | . |
| 6 | b | 1 | 18 |
| 7 | b | 4 | 21 |
| . | . | . | . |
| . | . | . | . |
| . | . | . | . |
| 12 | 2 | 19 | 36 |
| 13 | 5 | 22 | 39 |
| . | . | . | . |
| . | . | . | . |
| . | . | . | . |
| 360 | 1046 | 1063 | 1080 |
| 361 | 1049 | 1066 | b |
| . | . | . | . |
| . | . | . | . |
| . | . | . | . |
| 365 | 1061 | 1078 | b |
| 366 | 1064 | b | b |
| . | . | . | . |
| . | . | . | . |
| . | . | . | . |
| 370 | 1076 | b | b |
| 371 | 1079 | b | b | each RowA, RowB and RowC. Referring to FIG. 41A, at time t1, line L3 of the frame is preferably first written with the bottom row RowC of the pattern of spots projected on the screen by the emitting ends of the output head, while RowA and RowB are blanked. As shown in FIGS. 41B–41D, lines L1–L3 will be written after 12 scan passes, and as shown in FIGS. 41E–41H all lines of the frame will be written after 371 scan passes. Note that with this odd number of rows of these Examples 10 and 11, an even effective row spacing is effective in writing all lines, whereas for the prior examples of an even number of rows, an even effective row spacing is not effective.

EXAMPLES 12–13

Examples 12 and 13 illustrate a two row by three emitting ends per row array of emitting ends, shown in FIG. 42, projecting a two row by three spots per row pattern of spots on the screen shown in FIG. 42S. This array in our preferred system may not be capable of the 1920×1080 p resolution we prefer, but such a spot pattern could be employed to advantage at lesser resolutions, or in different applications. In Examples 12 and 13, FIGS. 43A–43H and 44A–44H show, and Tables EX-12 and EX-13 respectively illustrate, the reordering required for a 2 row by 3 emitting end per row output head configuration wherein the vertical adjustment between scan passes is two lines, where as with most of the examples, the vertical adjustment equals the number of rows of emitting ends in the output head for these cases.

EXAMPLE 12

For Example 12, shown in FIGS. 43A–43H and described in Table EX-12, we assume an effective row spacing of about 3 lines between RowA and RowB. Referring to FIG. 43A, at scan pass s1 line L2 of the frame is preferably first written with the bottom row RowB of the pattern of spots projected on the screen by the emitting ends of the output head, while RowA is blanked. Referring to FIGS. 43B–43D, lines L1–L6 will be written after 4 scan passes, and as shown in

TABLE EX-12

Spot Pattern—Rows: 2 Spots/Row: 3
Corresponding Figure: FIG. 43
Vertical Adjustment: 2 lines
Effective Row Spacing: 3 lines Lines Written by Row

| Scan Pass | RowA | RowB |
|---|---|---|
| 1 | b | 2 |
| 2 | 1 | 4 |
| 3 | 3 | 6 |
| . | . | . |
| . | . | . |
| . | . | . |
| 539 | 1075 | 1078 |
| 540 | 1077 | 1080 |
| 541 | 1079 | b |

TABLE EX-13

Spot Pattern—Rows: 2 Spots/Row: 3
Corresponding Figure: FIG. 44
Vertical Adjustment: 2 lines
Effective Row Spacing: 9 lines Lines Written by Row

| Scan Pass | RowA | RowB |
|---|---|---|
| 1 | b | 2 |
| 2 | b | 4 |
| . | . | . |
| . | . | . |
| . | . | . |
| 4 | b | 8 |
| 5 | 1 | 10 |
| 6 | 3 | 12 |
| . | . | . |
| . | . | . |
| . | . | . |
| 539 | 1069 | 1078 |
| 540 | 1071 | 1080 |
| 541 | 1073 | b |
| . | . | . |
| . | . | . |
| . | . | . |
| 543 | 1077 | b |
| 544 | 1079 | b | in FIGS. 43E–43H all lines of the frame will be written in 541 scan passes.

EXAMPLE 13

For Example 13, shown in FIG. 44A–44H and described in Table EX-13, we assume an effective row spacing of about 9 lines between each RowA and RowB. Referring to FIG. 44A, at scan pass s1, line L2 of the frame is preferably first written with the bottom row RowB of the pattern of spots projected on the screen by the emitting ends of the output head, while RowA is blanked. Referring to FIGS. 44B–44D, lines L1–L2 will be written after 5 scan passes, and as shown in FIGS. 44E–44H all lines of the frame will be written in 544 scan passes.

EXAMPLES 14–15

Examples 14–15 illustrate the reordering required for a 4 row by 3 spots per row pattern of spots, similar to that of FIG. 28S, projected by an output head configuration wherein the effective row spacing is not uniform. It should be understood that an almost unlimited number of different output head emitting end configurations and patterns of spots are possible, the Examples 14–15 being merely intended to hint at the myriad possible configurations enabled by our invention.

EXAMPLE 14

Although a corresponding output head configuration is not included in the drawings, for Example 14, Table EX-14 describes and

TABLE EX-14

Output Head Configuration (spot pattern)—Rows: 4 Spots/Row: 3
Corresponding Figure: FIG. 45
Vertical Adjustment: 4 lines
Effective Row Spacing (RowA–RowB): 11 lines
(RowB–RowC): 10 lines
(RowC–RowD): 13 lines Lines Written by Respective Rows of Emitting Ends

| Scan Pass | RowA | RowB | RowC | RowD |
|---|---|---|---|---|
| 1 | b | b | b | 4 |
| 2 | b | b | b | 8 |
| . | . | . | . | . |
| . | . | . | . | . |
| . | . | . | . | . |
| 4 | b | b | 3 | 16 |
| 5 | b | b | 7 | 20 |
| 6 | b | 1 | 11 | 24 |
| 7 | b | 5 | 15 | 28 |
| . | . | . | . | . |
| . | . | . | . | . |
| . | . | . | . | . |
| 9 | 2 | 13 | 23 | 36 |
| 10 | 6 | 17 | 27 | 40 |
| . | . | . | . | . |
| . | . | . | . | . |
| . | . | . | . | . |
| 270 | 1046 | 1057 | 1067 | 1080 |
| 271 | 1050 | 1061 | 1071 | b |
| . | . | . | . | . |
| . | . | . | . | . |
| . | . | . | . | . |
| 273 | 1058 | 1069 | 1079 | b |
| 274 | 1062 | 1073 | b | b |
| 275 | 1666 | 1077 | b | b |
| 276 | 1070 | b | b | b |
| 277 | 1074 | b | b | b |
| 278 | 1078 | b | b | b |

FIGS. 45A–45H graphically illustrate, the reordering that is required for an effective row spacing of about 11 lines between RowA and RowB, of about 10 lines between RowB and RowC, and of about 13 lines between RowC and RowD with four line vertical adjustments. Referring to FIG. 45A, although not required, line L4 of the frame is preferably first written at scan pass s1 with the bottom row RowD of the pattern of spots. As shown in FIGS. 45B–45H, and described in Table EX-14, lines L1–L4 all will be written after 9 horizontal scans have occurred, and 278 scan passes will be required to write a complete frame.

EXAMPLE 15

Figure 46:
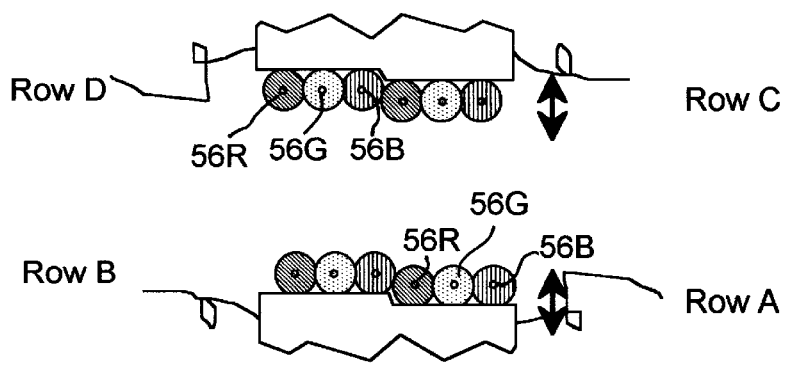
FIG. 46 is a diagram of a 4 row by 3 emitting end per row array of an alternate output head for use in the system of FIG. 1 according to Example 15.
Figure 46S:
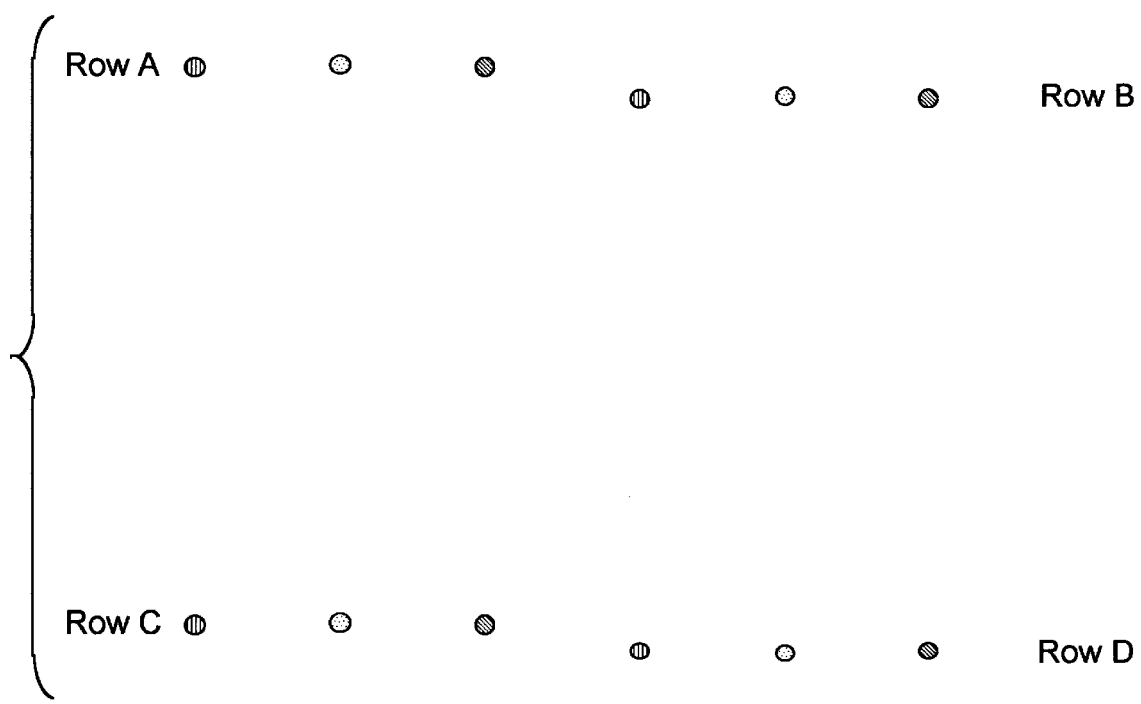
FIG. 46S is a diagram of the pattern of spots projected on a screen using the array shown in FIG. 44.
Figure 48A:
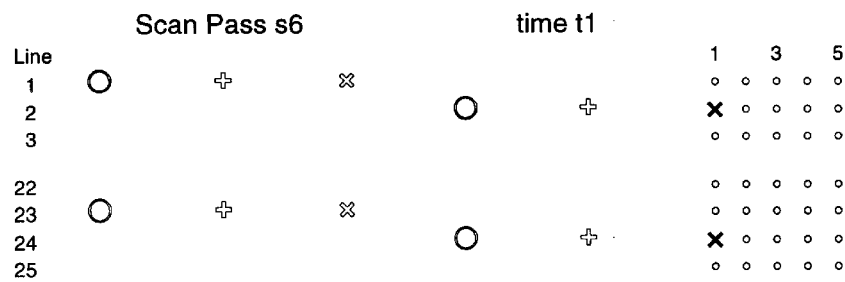
Figure 48B:
Figure 48C:
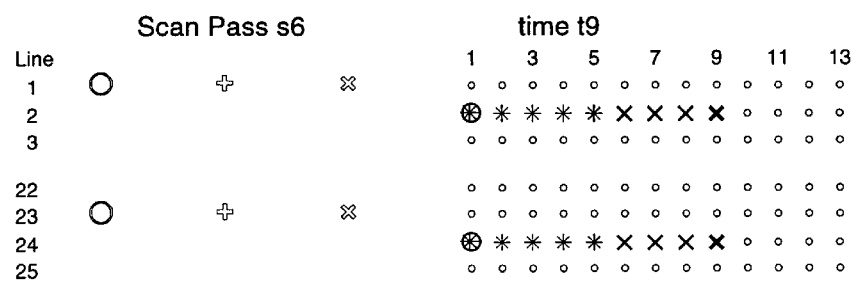
Figure 48D:
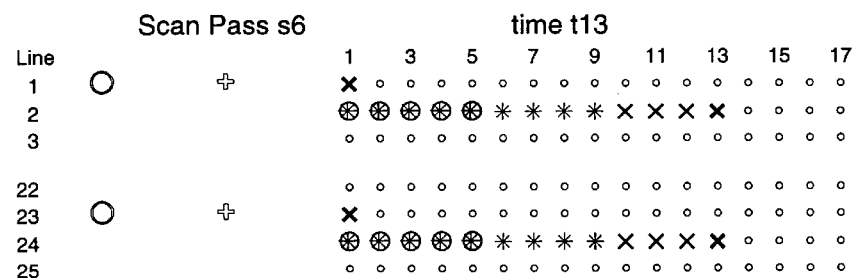
Figure 48E:
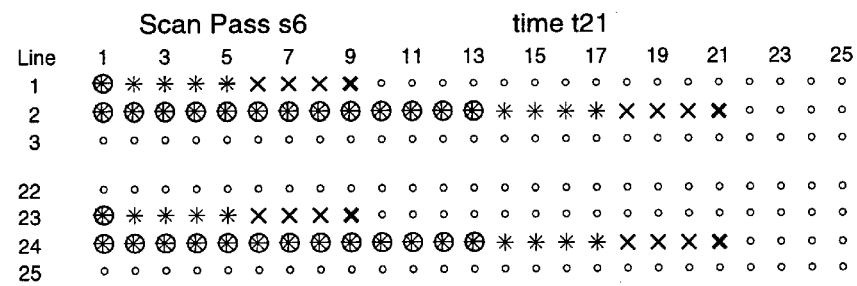

FIGS. 46 and 46S schematically show an alternate embodiment of the output head 858 wherein the optical fiber emitting ends 856 are set in two blocks 866 and 868, which are adjustable with respect to

TABLE EX-15A

Output Head Configuration (spot pattern)—Rows: 4 Spots/Row: 3
Corresponding Figure: FIGS. 46–48
Vertical Adjustment: 4 lines
Effective Row Spacing (RowA–RowB; RowC–RowD): 1 lines
(RowB–RowC): 21 lines Lines Written by Respective Rows of Emitting Ends

| Scan Pass | RowA | RowB | RowC | RowD |
|---|---|---|---|---|
| 1 | b | b | 3 | 4 |
| 2 | b | b | 7 | 8 |
| . | . | . | . | . |
| . | . | . | . | . |
| . | . | . | . | . |
| 6 | 1 | 2 | 23 | 24 |
| 7 | 5 | 6 | 27 | 28 |
| . | . | . | . | . |
| . | . | . | . | . |
| . | . | . | . | . |
| 270 | 1057 | 1058 | 1079 | 1080 |
| 271 | 1061 | 1062 | b | b |
| . | . | . | . | . |
| . | . | . | . | . |
| . | . | . | . | . |
| 274 | 1073 | 1074 | b | b |
| 275 | 1077 | 1078 | b | b |

TABLE EX-15B

Output Head Configuration (spot pattern)—Rows: 4  Spots/Row: 3
Corresponding Figures: FIGS. 46–48  Vertical Adjustment: 4 lines
SpotPattern: 2Head  EffectiveRowSpcng (RowA–RowB; RowC–RowD): 1 line
Effective Row Spacing (RowB–RowC): 21 lines
Scan Pass: 6   Blank = b   Spot Spacing w/I Row: 4 dots

| | RowA | | | RowB | | | RowC | | | RowD | | |
|---|---|---|---|---|---|---|---|---|---|---|---|---|
| | Blue | Grn | Red | Blue | Grn | Red | Blue | Grn | Red | Blue | Grn | Red |
| Line | time t1 | | | | | | Dot Locations | | | | | |
| 1 | b | b | b | | | | | | | | | |
| 2 | | | | b | b | 1 | | | | | | |

TABLE EX-15B-continued

Output Head Configuration (spot pattern)—Rows: 4  Spots/Row: 3
Corresponding Figures: FIGS. 46–48  Vertical Adjustment: 4 lines
SpotPattern: 2Head  EffectiveRowSpcng (RowA–RowB; RowC–RowD): 1 line
Effective Row Spacing (RowB–RowC): 21 lines
Scan Pass: 6  Blank = b  Spot Spacing w/I Row: 4 dots

| | RowA | | | RowB | | | RowC | | | RowD | | |
|---|---|---|---|---|---|---|---|---|---|---|---|---|
| | Blue | Grn | Red | Blue | Grn | Red | Blue | Grn | Red | Blue | Grn | Red |
| . | | | | | | | | | | | | |
| . | | | | | | | | | | | | |
| . | | | | | | | | | | | | |
| 23 | | | | | | | b | b | b | | | |
| 24 | | | | | | | | | | b | b | 1 |

| Line | time t2 | | | | | Dot Locations | | | | | | |
|---|---|---|---|---|---|---|---|---|---|---|---|---|
| 1 | b | b | b | | | | | | | | | |
| 2 | | | | b | b | 2 | | | | | | |
| . | | | | | | | | | | | | |
| . | | | | | | | | | | | | |
| . | | | | | | | | | | | | |
| 23 | | | | | | | b | b | b | | | |
| 24 | | | | | | | | | | b | b | 2 |

| Line | time t5 | | | | | Dot Locations | | | | | | |
|---|---|---|---|---|---|---|---|---|---|---|---|---|
| 1 | b | b | b | | | | | | | | | |
| 2 | | | | b | 1 | 5 | | | | | | |
| . | | | | | | | | | | | | |
| . | | | | | | | | | | | | |
| . | | | | | | | | | | | | |
| 23 | | | | | | | b | b | b | | | |
| 24 | | | | | | | | | | b | 1 | 5 |

| Line | time t11 | | | | | Dot Locations | | | | | | |
|---|---|---|---|---|---|---|---|---|---|---|---|---|
| 3 | b | b | 1 | | | | | | | | | |
| . | | | | | | | | | | | | |
| . | | | | | | | | | | | | |
| . | | | | | | | | | | | | |
| 6 | | | | 5 | 9 | 13 | | | | | | |
| . | | | | | | | | | | | | |
| . | | | | | | | | | | | | |
| . | | | | | | | | | | | | |
| 9 | | | | | | | b | b | 1 | | | |
| . | | | | | | | | | | | | |
| . | | | | | | | | | | | | |
| . | | | | | | | | | | | | |
| 12 | | | | | | | | | | 5 | 9 | 13 |

| Line | time t19 | | | | | Dot Locations | | | | | | |
|---|---|---|---|---|---|---|---|---|---|---|---|---|
| 3 | 1 | 5 | 9 | | | | | | | | | |
| . | | | | | | | | | | | | |
| . | | | | | | | | | | | | |
| . | | | | | | | | | | | | |
| 6 | | | | 13 | 17 | 21 | | | | | | |
| . | | | | | | | | | | | | |
| . | | | | | | | | | | | | |
| . | | | | | | | | | | | | |
| 9 | | | | | | | 1 | 5 | 9 | | | |
| . | | | | | | | | | | | | |
| . | | | | | | | | | | | | |
| . | | | | | | | | | | | | |
| 12 | | | | | | | | | | 13 | 17 | 21 | each other. One may adjust the rows in concert for facet error correction or separately to accommodate changes in throw distance.

TABLE EX-15C

Output Head Configuration (spot pattern)—Rows: 4  Spots/Row: 3
Corresponding Figures: FIGS. 46–48  Vertical Adjustment: 4 lines
SpotPattern: 2Head  EffectiveRowSpcng (RowA–RowB; RowC–RowD): 1 line
Effective Row Spacing (RowB–RowC): 21 lines
Scan Pass: 6  Blank = b  Spot Spacing w/I Row: 4 dots

| | RowA | | | RowB | | | RowC | | | RowD | | |
|---|---|---|---|---|---|---|---|---|---|---|---|---|
| | Blue | Grn | Red | Blue | Grn | Red | Blue | Grn | Red | Blue | Grn | Red |
| Line | time t1920 | | | | | Dot Locations | | | | | | |
| 1 | 1900 | 1904 | 1908 | | | | | | | | | |
| 2 | | | | 1912 | 1916 | 1920 | | | | | | |
| . | | | | | | | | | | | | |
| . | | | | | | | | | | | | |
| 23 | | | | | | | 1900 | 1904 | 1908 | | | |
| 24 | | | | | | | | | | 1912 | 1916 | 1920 |
| Line | time t1921 | | | | | Dot Locations | | | | | | |
| 1 | 1901 | 1905 | 1909 | | | | | | | | | |
| 2 | | | | 1913 | 1917 | b | | | | | | |
| . | | | | | | | | | | | | |
| . | | | | | | | | | | | | |
| 23 | | | | | | | 1901 | 1905 | 1909 | | | |
| 24 | | | | | | | | | | 1913 | 1917 | b |
| Line | time t1928 | | | | | Dot Locations | | | | | | |
| 1 | 1908 | 1912 | 1916 | | | | | | | | | |
| 2 | | | | 1920 | b | b | | | | | | |
| . | | | | | | | | | | | | |
| . | | | | | | | | | | | | |
| 23 | | | | | | | 1908 | 1912 | 1916 | | | |
| 24 | | | | | | | | | | 1920 | b | b |
| Line | time t1934 | | | | | Dot Locations | | | | | | |
| 1 | 1916 | 1920 | b | | | | | | | | | |
| 2 | | | | b | b | b | | | | | | |
| . | | | | | | | | | | | | |
| . | | | | | | | | | | | | |
| 23 | | | | | | | 1916 | 1920 | b | | | |
| 24 | | | | | | | | | | b | b | b |
| Line | time t1938 | | | | | Dot Locations | | | | | | |
| 1 | 1920 | b | b | | | | | | | | | |
| 2 | | | | b | b | b | | | | | | |
| . | | | | | | | | | | | | |
| . | | | | | | | | | | | | |
| 23 | | | | | | | 1920 | b | b | | | |
| 24 | | | | | | | | | | b | b | b |

The adjustment can be made with piezoelectric actuators, or manually adjustable fixtures.

For Example 15, Table EX-15 describes and FIGS. 47A–47H graphically illustrate the reordering that is required for the output head configuration shown in FIG. 46 producing the spot pattern shown in FIG. 46S for Example 15, having an effective row spacing of about 1 line between RowA and RowB and between RowC and RowD, and of about 21 lines between RowB and RowC. As shown in FIGS. 47A–47H and described in Table EX-15A, although not required, but as with Examples 1–9, line L4 of the frame is preferably first written with the bottom row RowD of the pattern of spots of FIG. 46S. Because RowC is effectively spaced 1 line above RowD, at scan pass s1, RowC will write line 3. Referring to FIG. 47D and Table EX-15A, at scan pass s6, RowD will write line L24, RowC will write line L23, RowB will write line L2 and RowA will write line L1. Thus, in summary, lines L1–L4 all will be written after 6 horizontal scans have occurred, and as shown in FIG. 47E–47H and described in Table EX-15A, 275 scan passes will be required to write a complete frame.

Tables EX-15B and EX-15C describe, and FIGS. 48A–48J show, the time combination of the different spot pattern shown in FIG. 46S, assuming a spacing between spots within rows of 3 dot locations. At time t1 during scan pass s6, dot locations 1 in lines L2 and L24 will be illuminated by the red spots of RowB and RowD while the green and blue spots of RowB and RowD, and all spots of RowA and RowC will be blanked. As shown by FIGS. 48B through 48E and described in Table EX-15B, for the remaining times t2–t11 of the illustrative scan pass s6, at time t11 all spots will illuminate dot locations at an appropriately modulated intensity (which may be zero). It should be noted that the color spots need not be in the same order for all rows, as will be described in more detail herein. FIGS. 48F–48J and Table EX-1C illustrate the timing of the dot illumination and the resulting overscan required to complete the line for times t1920–1940 at the end of scan pass s6 prior to initiating the next scan pass s7.

EXAMPLES 16–18

Figure 49:
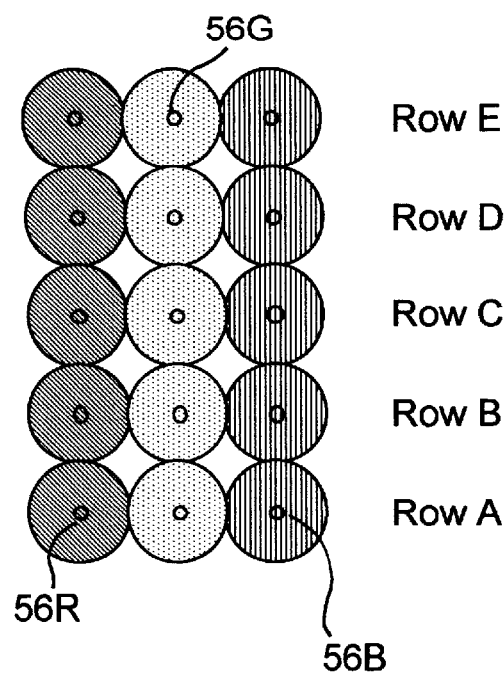
FIG. 49 is a diagram of a 5 row by 3 emitting end per row array of an alternate output head for use in the system of FIG. 1 according to Examples 16–18.
Figure 49S:
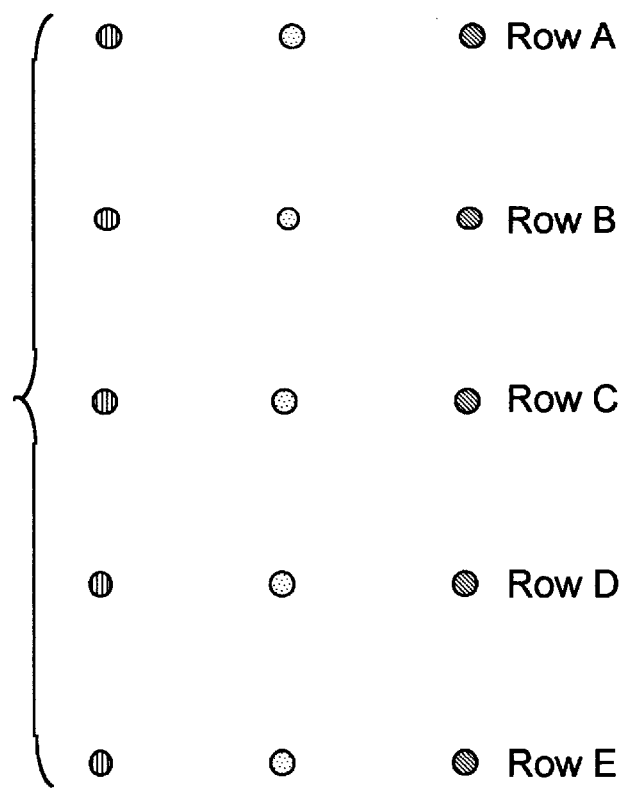
FIG. 49S is a diagram of the pattern of spots projected on a screen using the array shown in FIG. 49.

Examples 16–18 illustrate the reordering required for a 5 row by 3 emitting end per row output head configuration shown in FIG. 49 projecting the spot pattern shown in FIG. 49S, wherein the effective row spacing between rows of the pattern of spots projected by the emitting ends through the scanning section onto the screen is uniform. For these examples, we assume a vertical adjustment between horizontal scans of about 5 lines, where although not required for utilizing our invention, and with most of the foregoing examples, the vertical adjustment equals the number of rows of emitting ends in the output head for these cases. Although we have not provided as many examples of the reordering required for this output head configuration as for the 4 row by 3 emitting end per row configuration, similar examples can be deduced by extrapolating the examples herein.

EXAMPLE 16

For Example 16, Table EX-16 describes and FIGS. 50A–50J graphically illustrates, the reordering necessitated by an effective row spacing of about 6 lines between RowA, RowB, RowC, RowD and RowE. Although not required, at scan pass s1, line L5 of the frame is preferably first written with the bottom row RowE of the pattern of spots, while RowA, RowB, RowC and RowD are blanked. As shown in

EXAMPLE 17

Referring to FIG. 51 and Table EX-17 respectively graphically showing and describing the line reordering to accomodate a 24 line effective row spacing between rows of a 5 row by 3 spot per row pattern of spots projected by the emitting ends of a 5x3 output head array, although not required, at time t1, line l5 of the frame is preferably first written with the bottom row RowE, while RowA, RowB, RowC and RowD are blanked. Thus, for this Example 17 lines L1–L5 all will be written after 20 horizontal scan passes have occurred, in the order 5-1-2-3-4, unlike the 5-4-3-2-1 order of Example 16 shown in FIG. 50. In summary, the complete frame will be scanned after 235 scan passes.

TABLE EX-17

Output Head Configuration (spot pattern)—Rows: 5 Spots/Row: 3
Corresponding Figure: FIG. 49, 51
Vertical Adjustment: 5 lines
Effective Row Spacing (all rows): 24 lines Lines Written by Respective Rows of Emitting Ends

| Scan Pass | RowA | RowB | RowC | RowD | RowE |
|---|---|---|---|---|---|
| 1 | b | b | b | b | 5 |
| 2 | b | b | b | b | 10 |
| . | . | . | . | . | . |
| . | . | . | . | . | . |

TABLE EX-17-continued

Output Head Configuration (spot pattern)—Rows: 5 Spots/Row: 3
Corresponding Figure: FIG. 49, 51
Vertical Adjustment: 5 lines
Effective Row Spacing (all rows): 24 lines Lines Written by Respective Rows of Emitting Ends

| Scan Pass | RowA | RowB | RowC | RowD | RowE |
|---|---|---|---|---|---|
| 5 | b | b | b | 1 | 25 |
| 6 | b | b | b | 6 | 30 |
| . | . | . | . | . | . |
| . | . | . | . | . | . |
| 10 | b | b | 2 | 26 | 50 |
| 11 | b | b | 7 | 31 | 55 |
| . | . | . | . | . | . |
| . | . | . | . | . | . |
| 15 | b | 3 | 27 | 51 | 75 |
| 16 | b | 8 | 32 | 56 | 80 |
| . | . | . | . | . | . |
| . | . | . | . | . | . |
| 20 | 4 | 28 | 52 | 76 | 100 |
| 21 | 9 | 33 | 57 | 81 | 105 |
| . | . | . | . | . | . |
| . | . | . | . | . | . |
| 216 | 984 | 1008 | 1032 | 1056 | 1080 |
| 217 | 989 | 1013 | 1037 | 1061 | b |
| . | . | . | . | . | . |
| . | . | . | . | . | . |
| 220 | 1004 | 1028 | 1052 | 1076 | b |
| 221 | 1009 | 1033 | 1057 | b | b |
| . | . | . | . | . | . |
| . | . | . | . | . | . |
| 225 | 1029 | 1053 | 1077 | b | b |
| 226 | 1034 | 1058 | b | b | b |
| . | . | . | . | . | . |
| . | . | . | . | . | . |
| 230 | 1054 | 1078 | b | b | b |
| 231 | 1059 | b | b | b | b |
| . | . | . | . | . | . |
| . | . | . | . | . | . |
| 235 | 1079 | b | b | b | b |

FIGS. 50B–50E, lines L1–L4 all will be written after 5 horizontal scan passes have occurred, and as shown in FIGS. 50F–50J, 220 scan passes will be required to write a complete frame.

EXAMPLE 18

Referring to FIGS. 52A–52J and Table EX-18 respectively graphically showing and describing the line reordering to

TABLE EX-18

Output Head Configuration (spot pattern)—Rows: 5  Spots/Row: 3
Corresponding Figure: FIG. 52   Vertical Adjustment: 5 lines
Effective Row Spacing(RowA–RowB; RowD–RowE): 11 lines
(RowB–RowC–RowD): 36 lines Lines Written by Respective Rows of Emitting Ends

| Scan Pass | RowA | RowB | RowC | RowD | RowE |
|---|---|---|---|---|---|
| 1 | b | b | b | b | 5 |
| 2 | b | b | b | b | 10 |

TABLE EX-18-continued

Output Head Configuration (spot pattern)—Rows: 5  Spots/Row: 3
Corresponding Figure: FIG. 52  Vertical Adjustment: 5 lines
Effective Row Spacing(RowA–RowB; RowD–RowE): 11 lines
(RowB–RowC–RowD): 36 lines Lines Written by Respective Rows of Emitting Ends

| Scan Pass | RowA | RowB | RowC | RowD | RowE |
|---|---|---|---|---|---|
| 3 | b | b | b | 4 | 15 |
| 4 | b | b | b | 9 | 20 |
| . | . | . | . | . | . |
| . | . | . | . | . | . |
| . | . | . | . | . | . |
| 10 | b | b | 3 | 39 | 50 |
| 11 | b | b | 8 | 44 | 55 |
| . | . | . | . | . | . |
| . | . | . | . | . | . |
| . | . | . | . | . | . |
| 17 | b | 2 | 38 | 74 | 85 |
| 18 | b | 7 | 43 | 79 | 90 |
| 19 | 1 | 12 | 48 | 84 | 95 |
| . | . | . | . | . | . |
| . | . | . | . | . | . |
| . | . | . | . | . | . |
| 216 | 986 | 997 | 1033 | 1069 | 1080 |
| 217 | 991 | 1002 | 1038 | 1074 | b |
| 218 | 996 | 1007 | 1043 | 1079 | b |
| 219 | 1001 | 1012 | 1048 | b | b |
| . | . | . | . | . | . |
| . | . | . | . | . | . |
| . | . | . | . | . | . |
| 225 | 1031 | 1042 | 1078 | b | b |
| 226 | 1036 | 1047 | b | b | b |
| . | . | . | . | . | . |
| . | . | . | . | . | . |
| . | . | . | . | . | . |
| 232 | 1066 | 1077 | b | b | b |
| 233 | 1071 | b | b | b | b |
| 234 | 1076 | b | b | b | b | accommodate an 11-36-36-11 line effective row spacing of 11-36-36-11 lines between rows of a 5 row by 3 spot per row pattern of spots projected by the emitting ends of a 5×3 output head array. Although not required, at scan pass s1, line L5 of the frame is preferably first written with the bottom row RowE, while RowA, RowB, RowC and RowD are blanked. Thus, lines L1–L5 all will be written after 19 horizontal scan passes s19 have occurred, in the order 5-4-3-2-1. In summary, the complete frame will be scanned after 234 scan passes.

EXAMPLES 19–25

It should be understood that an almost unlimited number of different output head emitting end configurations are possible, including those already illustrated above for 2, 3, 4 and 5 row, and for more than five row arrays of the output head. However, of the myriad possibilities, several configurations are of particular interest, as described in connection with the following further examples.

EXAMPLE 19

Figure 53:
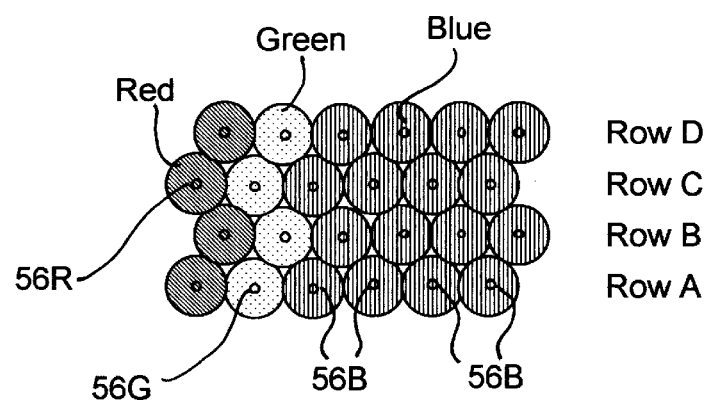
FIG. 53 is a diagram of a 4 row by 6 emitting ends per row array of an alternate output head for use in the system of FIG. 1 according to Example 19.
Figure 53S:
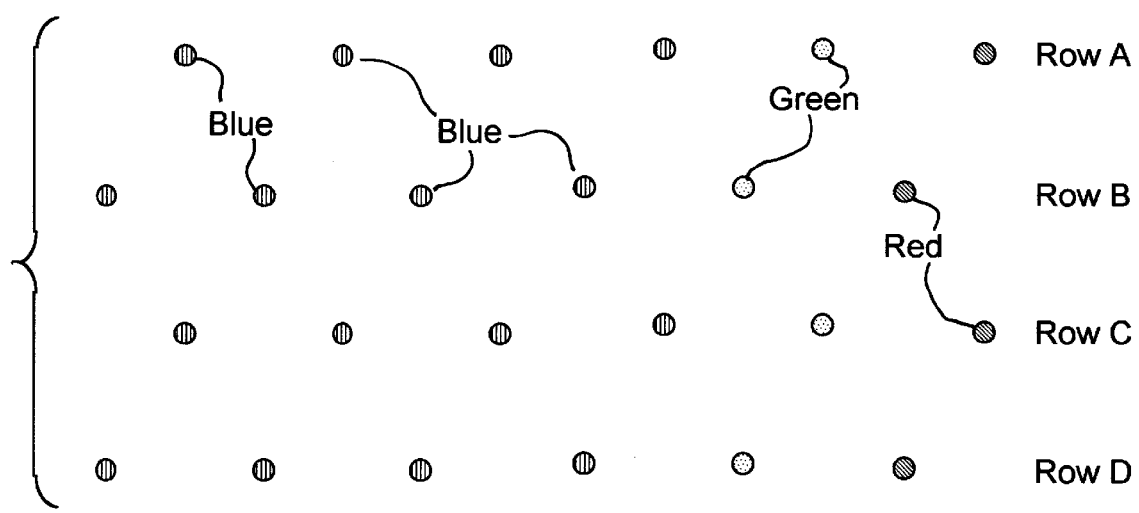
FIG. 53S is a diagram of the pattern of spots projected on a screen using the array shown in FIG. 53.
Figure 54A:
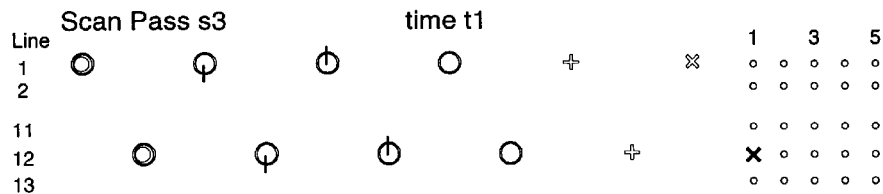
FIGS. 54A through 54F are time sequence diagrams for Example 19, illustrating the time shifting of spots of each primary color in RowA through RowD of a pattern of spots shown in FIG. 53S to form composite spots at dot locations at the beginning of scan pass s3.
Figure 54B:
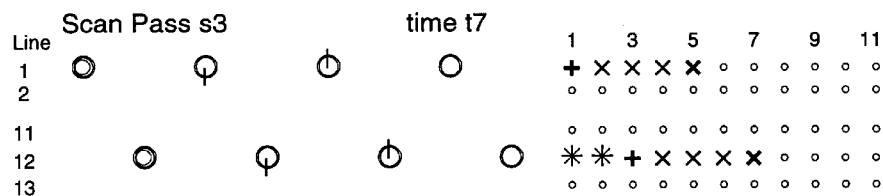
Figure 54C:
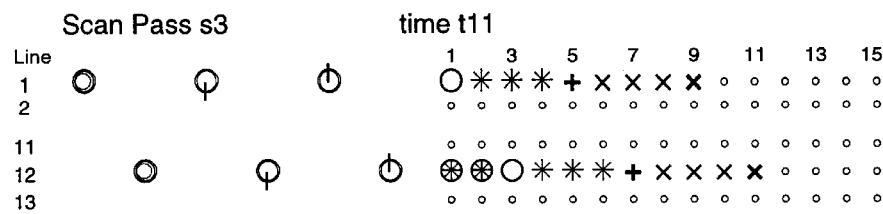
Figure 54D:
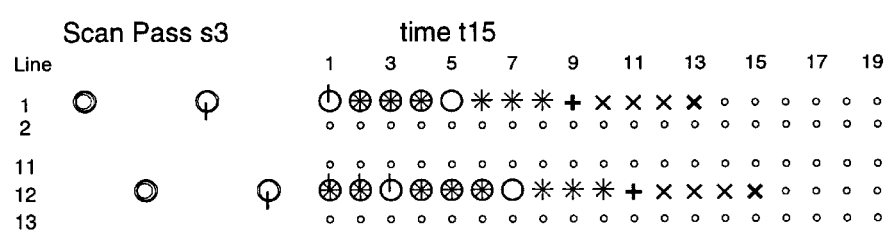
Figure 54E:
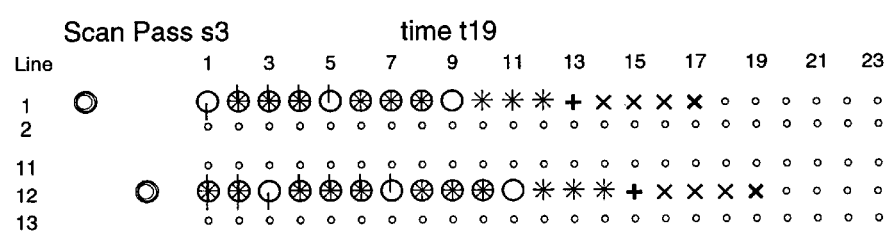
Figure 54F:
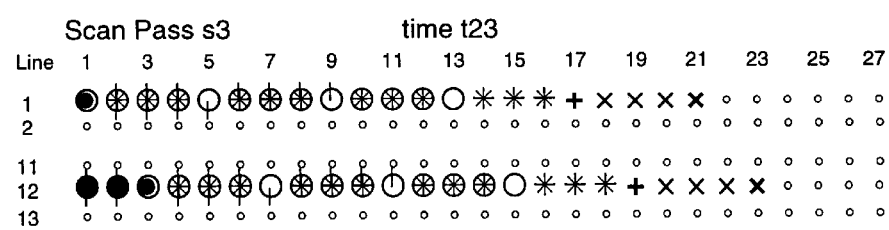
Figure 55A:
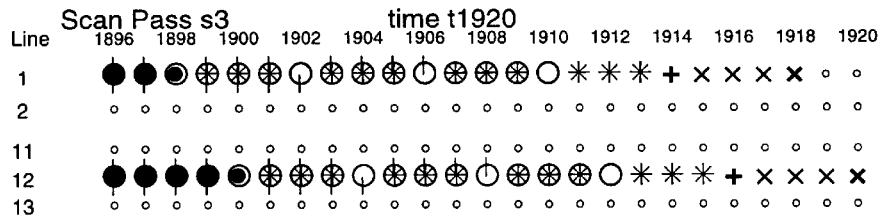
FIGS. 55A through 55F are time sequence diagrams for Example 19, illustrating the time shifting of spots of each primary color in RowA through RowD of a pattern of spots shown in FIG. 53S to form composite spots at dot locations at the end of scan pass s3.
Figure 55B:
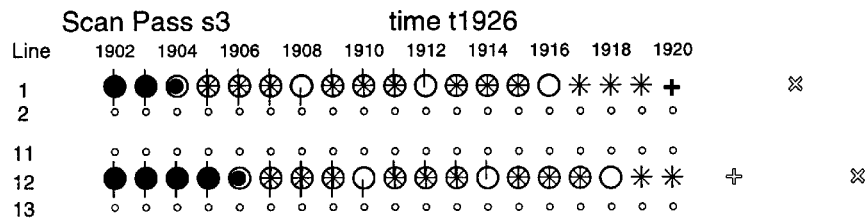
Figure 55C:
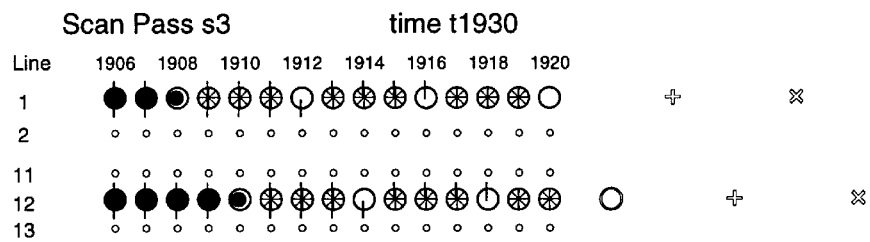
Figure 55D:
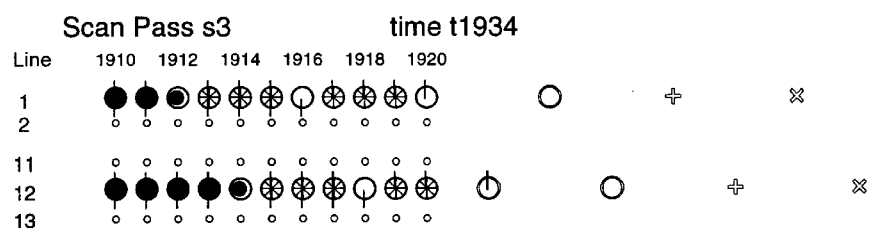
Figure 55E:
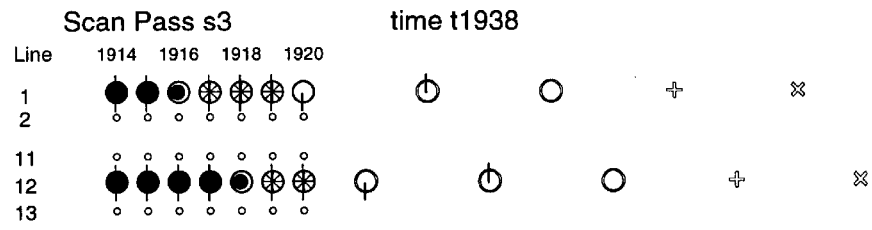
Figure 55F:
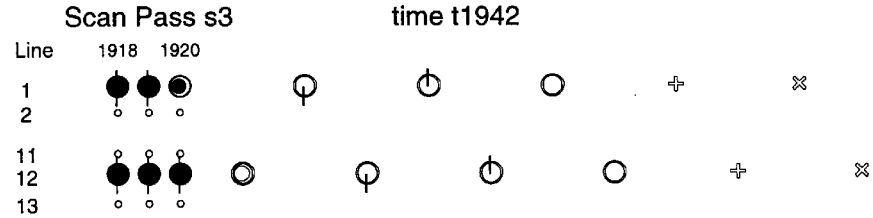
Figure 56:
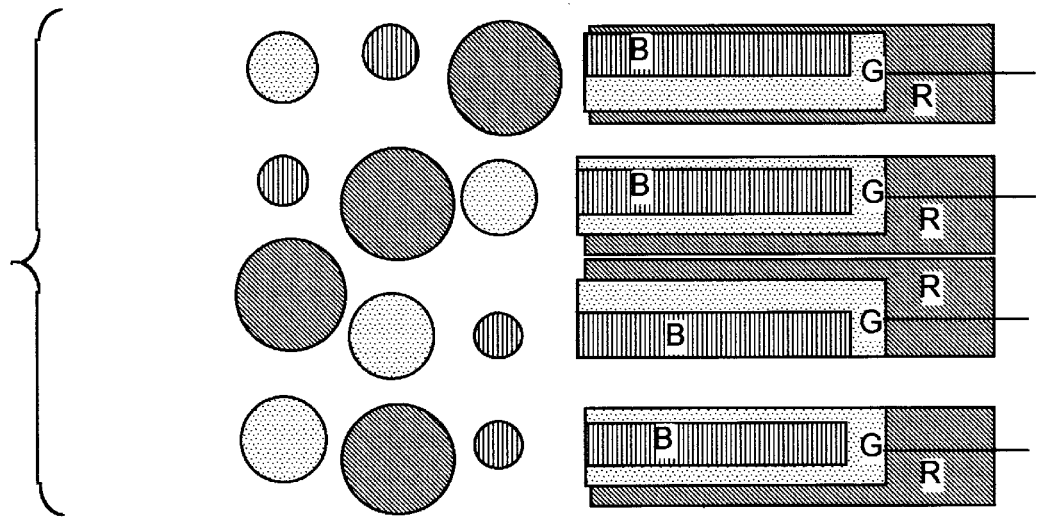
FIG. 56 is a diagram of the pattern of spots and the resulting lines of each color in each line projected on a screen by a 4 row by 3 emitting ends per row array of an alternate output head for use in the system of FIG. 1 according to Example 20, where the emitting ends, and therefore the pattern of spots, within each row are slightly misaligned along the horizontal axis.
Figure 57S:
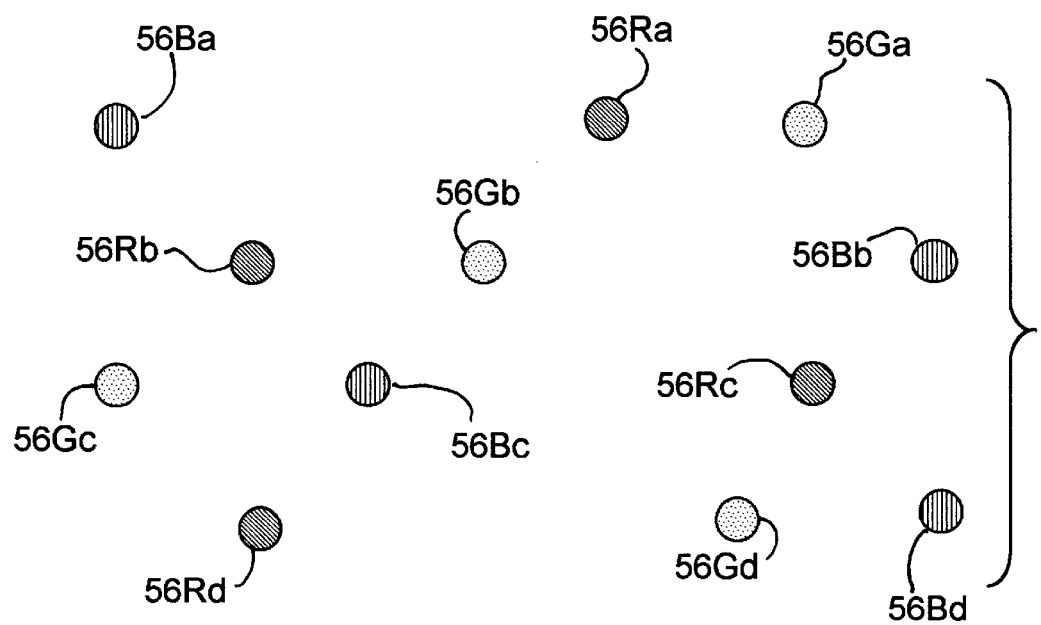
FIG. 57 is a diagram of the pattern of spots projected by a 4 row by 3 emitting ends per row array of another output head for use in the system of FIG. 1 according to Example 21, where the emitting ends, and therefore the pattern of spots, within each row are not uniformly horizontally spaced apart.

Example 19, shown in FIGS. 53, 53S, 54 and 55, and further described in Table EX-19, illustrates the reordering required for an output head configuration wherein each row has more than three emitting ends. The 4×6 output head array illustrated in Example 19 is schematically shown in FIG. 53 and the corresponding spot pattern is shown in FIG. 53S. FIG. 26 schematically shows a system configuration which may employ this head configuration of Example 19 to advantage. Instead of a system wherein a single laser for generating each of the primary colors is split into four beams for insertion into one of the fibers in each row as shown in FIG. 25, or where individual lasers are employed for the beams inserted into each fiber as shown in FIG. 27, in this embodiment shown in FIG. 25, a single laser is used to generate the red and green laser beams that are split with splitters into four red and four green beams, and four blue lasers are used for each row, or 16 blue lasers in total to generate the entire spot pattern of 4 rows of 6 spots per row shown in FIG. 53S. This may be necessary because at present levels of technology, while red and green lasers are available that are capable of producing adequate wattage of laser beams, blue lasers with sufficient power are not readily available, especially at commercially reasonable prices. A laser projection system according to our invention enables the convenient and efficient use of multiple lasers to scan each line of a frame with a particular color. It may be that multiple blue lasers for each line will be more economical, and produce better quality beams than four more powerful lasers, or a single very powerful laser that is split into four beams.

For this Example 19, we assume an effective row spacing of 11 lines, and because the line reordering is dependent on the number of rows, and is not affected by changing the number of emitting ends or spots per row, we refer to FIGS. 36A–36P and Table EX-7 for an illustration of line reordering for this Example 19.

As previously described, for this Example 19, as graphically shown in FIGS. 54A–54F and 55A–55F, and further described in Table EX-19, we assume a 4 row output head array having six emitting ends per row, including one emitting a red beam, one emitting a green beam, and four emitting blue beams. The beam from each emitting end in a row strikes each dot location on the screen in the spot pattern shown in FIG. 53S. Because the beams strike the screen within one microsecond (1 μs), the total power of the four blue beams emitted from a particular row of emitting ends directed to each dot location is visualized by the audience as though a single beam of the total power required is utilized, as in the system shown in FIG. 1. and the pattern of spots shown in FIGS. 5S or 28S. In assigning the color value from the lookup table, the controller section may either modulate the blue beams equally or unequally as desired to produce the desired aggregate color intensity specified in the video data at the corresponding dot location on the screen. It will be

TABLE EX-19

Output Head Configuration (spot pattern)—Rows: 4  Spots/Row: 6
Corresponding Figures: FIG. 53–55  Vertical Adjustment: 4 lines
Effective Row spacing within Row (all spots): 3 spots Left to Right Dot Locations Written by Respective Spots

| time t | blue-z● | blue-y◐ | blue-x◑ | blue-w○ | green+ | red× |
|---|---|---|---|---|---|---|
| 1 | b | b | b | b | b | 1 |
| 2 | b | b | b | b | b | 2 |
| . | . | . | . | . | . | . |
| . | . | . | . | . | . | . |
| . | . | . | . | . | . | . |
| 4 | b | b | b | b | 1 | 4 |
| 5 | b | b | b | b | 2 | 5 |
| . | . | . | . | . | . | . |
| . | . | . | . | . | . | . |
| . | . | . | . | . | . | . |
| 7 | b | b | b | 1 | 4 | 7 |
| 8 | b | b | b | 2 | 5 | 8 |

TABLE EX-19-continued

Output Head Configuration (spot pattern)—Rows: 4  Spots/Row: 6
Corresponding Figures: FIG. 53–55  Vertical Adjustment: 4 lines
Effective Row spacing within Row (all spots): 3 spots Left to Right Dot Locations Written by Respective Spots

| time t | blue-z● | blue-yQ | blue-x☉ | blue-w○ | green+ | red× |
|---|---|---|---|---|---|---|
| . | . | . | . | . | . | . |
| 10 | b | b | 1 | 4 | 7 | 10 |
| 11 | b | b | 2 | 5 | 8 | 11 |
| . | . | . | . | . | . | . |
| 13 | b | 1 | 4 | 7 | 10 | 13 |
| 14 | b | 2 | 5 | 8 | 11 | 14 |
| . | . | . | . | . | . | . |
| 16 | 1 | 4 | 7 | 10 | 13 | 16 |
| 17 | 2 | 5 | 8 | 11 | 14 | 17 |
| . | . | . | . | . | . | . |
| 1920 | 1905 | 1908 | 1911 | 1914 | 1917 | 1920 |
| 1921 | 1906 | 1909 | 1912 | 1915 | 1918 | b |
| . | . | . | . | . | . | . |
| 1923 | 1908 | 1911 | 1914 | 1917 | 1920 | b |
| 1924 | 1909 | 1912 | 1915 | 1918 | b | b |
| . | . | . | . | . | . | . |
| 1926 | 1911 | 1914 | 1917 | 1920 | b | b |
| 1927 | 1912 | 1915 | 1918 | b | b | b |
| . | . | . | . | . | . | . |
| 1929 | 1914 | 1917 | 1920 | b | b | b |
| 1930 | 1915 | 1918 | b | b | b | b |
| . | . | . | . | . | . | . |
| 1932 | 1917 | 1920 | b | b | b | b |
| 1933 | 1918 | b | b | b | b | b |
| . | . | . | . | . | . | . |
| 1935 | 1920 | b | b | b | b | b | understood that an unlimited number of blue beam power combinations could be employed to produce the desired blue color at the corresponding dot location.

In FIGS. 54A–54F and 55A–55F, the spots of the spot pattern formed by the emitting ends 156 of the fibers 142 in one horizontal row of the output head 158 are identified as follows: the red spot in each row is represented by "x"; the green spot in each row is represented by "+"; and the four blue spots corresponding to the blue-w, blue-x, blue-y and blue-z laser beams are each respectively represented by "603 ", "☉", "Q", and "●", respectively. The spots illuminated by the beams from the emitting ends in a row are assumed to be spaced apart more than one dot when projected on the screen. As with the distance between rows described below, the distance between emitting ends in each row is assumed for purposes of this exemplary embodiment to be such that the red, green and blue spots of each row projected on a screen are spaced apart three dots, i.e., when projected on the screen, the spots formed by the six beams emitted from the emitting ends have two dot locations between adjacent spots.

As shown in FIG. 54A–54F, when the polygon mirror facet 174 is in the desired position at a time s1 of the first scan by the bottom row of spots (RowD) of the pattern of spots the first dot location of the fourth line of the frame is written by the red x beam modulated for the value of the red color assigned to that pixel location in the video data, and the green and four blue beams, which if activated would write pixels to the left of the frame (shown with outlined symbols) are blanked by their respective modulators. Table EX-19 describes in tabular form the repositioning of the separate spots of the bottom row of spots at successive dot locations of the fourth line of the frame, as graphically shown in FIGS. 54A–54F and 55A–55F. It should be apparent from the illustration of FIGS. 53, 53S, 54A–54F and 55A–55F that with this method according to our invention, a beam of each red and green color modulated for the value of that pixel in the video data, and four separate beams of the blue color modulated for one quarter of the value of the same pixel in the video data, is projected for every dot in that line. The time between the sequential arrival of each of the color spots emitted from a row of the output head at a single dot location on the screen is on the order of one microsecond (1 μs), fast enough for the viewer to perceive the six spots of the six beams illuminating each dot location as the desired composite color corresponding to the color value for that same pixel location in the video data.

Referring to FIGS. 55A–55F, which diagram the end of the scan pass at the end of the line as described in the lower portion of Table EX-19, beginning at time 1920, the red x, green +, blue-w ○, blue-x ☉, blue-y Q and blue-z ● beams will write dots 1920, 1917, 1914, 1911, 1908 and 1905, respectively. After the blue-z ● beam writes dot 1920 at time t1935, all of the beams are blanked until the next facet of the polygon mirror is in position to begin the next horizontal scan, and the galvanometer mirror has adjusted vertically downward the desired number of lines on the screen to begin the next line. As noted previously in connection with FIGS. 16A–16J, in our preferred implementation the galvanometer mirror 84 may actually move continuously so that the image slants a minute amount, and the beams arrive four lines down at the start of the next line scan pass as if the galvanometer mirror 84 had moved all at once between lines.

EXAMPLES 20–21

Examples 20 and 21, shown in FIGS. 56 and FIGS. 57S, 58A–58F and 59A–59F, illustrate the pattern of spots shown in FIG. 5S projected by the output head configuration shown in FIG. 5, except that the red, green and blue beams are assigned to particular fibers and corresponding emitting ends to project spots of each color at particular positions in each row for the reasons described below.

EXAMPLE 20

In actual practice, it is most likely that small vertical variations, within acceptable tolerances, will result when the emitting ends of the fibers are mounted in the output head, such that individual fibers may not be positioned exactly in a line of a row, i.e., spaced more or less closely to other rows. Further, we have determined that when the beam emitted from a fiber end is projected on the screen with the simple achromat lens we prefer, the size of the spot, due primarily to the beam quality produced by the lasers available at this time, for each color will probably be different, such as the spot sizes shown in FIG. 56. In our preferred prototype embodiment, we have determined that the size of the red spot is roughly 4 mm in diameter, the size of the green spot is roughly 3.25 mm in diameter, and the size of the blue spot is roughly 2.6 mm in diameter. Because we believe the eye is most photoptically sensitive to the resolution of the spots in the green wavelengths, and because we prefer to employ as equal a spacing of the respective rows of the spot pattern as feasible, we prefer to select those fibers for transmitting the green wavelength beam having emitting ends in each row, and corresponding spots, that have the most even vertical spacing feasible. We further prefer to assign the red and blue wavelength beams to be transmitted by the remaining fibers in a particular row having emitting ends positioned so that the areas of each colored spot in a row of the spot pattern are most coincident, or correspond to the greatest extent, with the green spot in that row at each dot location on the screen when scanned, despite the slight misalignment of the emitting ends in a row, such as the arrangement shown in FIG. 56.

EXAMPLE 21

If manufacture of the output head can result in vertical alignment errors of emitting ends within rows, it follows that horizontal spacing errors or nonuniform spacing of emitting ends and resulting spots within a row, may also occur, possibly unique for each output head. Such nonuniform spacing is illustrated by the spot pattern shown in FIG. 57S, wherein the spots are respectively spaced substantially different distances apart. We prefer to account for this nonuniform spacing by delaying the timing of the modulation of the beam to be emitted from that emitting end such that the spot illuminates the desired dot location on the screen, as shown in FIGS. 58A–58F and 59A–59F, and described in Tables EX-21A and EX-21B. The timing of the projection of the spot at the appropriate intensity on a particular dot location within a line on the screen may be manipulated as with other examples herein. Because the horizontal error is the same for all scans and horizontal repositioning of the spot pattern, the necessary delay may be incorporated for each output head at the factory when calibrating the particular laser projection system concerned.

One should also consider that it is not necessary to use the same size fiber for each color, as assumed in previous examples herein. In our preferred fiber configuration, some fiber cores (but typically not the outer diameter of the cladding) are larger in diameter, thus being multimode, and others are smaller, closer, or more similar, to single mode. As noted above, most of the perception of resolution occurs in the green. Given potential losses in the process of inserting light into fibers 42, it may be advantageous to use single (or nearly single mode) fiber for the green beams,

TABLE EX-21A

Output Head Configuration (spot pattern)—Rows: 4   Spots/Row: 3
Corresponding Figures: FIGS. 57–58   Vertical Adjustment: 4 lines
Pattern of Spots: Log   Effective Row Spacing (all rows): 3 lines
Scan Pass: 3   Blank = b   Spot Spacing within Row: 8, 4 dots

| | RowA | | | RowB | | | RowC | | | RowD | | |
|---|---|---|---|---|---|---|---|---|---|---|---|---|
| | Blue | Red | Grn | Red | Grn | Blue | Grn | Blue | Red | Red | Grn | Blue |
| Line | time t1 | | | | | Dot Locations | | | | | | |
| 3 | b | b | b | | | | | | | | | |
| . | | | | | | | | | | | | |
| . | | | | | | | | | | | | |
| . | | | | | | | | | | | | |
| 6 | | | | b | b | 1 | | | | | | |
| . | | | | | | | | | | | | |
| . | | | | | | | | | | | | |
| . | | | | | | | | | | | | |
| 9 | | | | | | | b | b | b | | | |
| . | | | | | | | | | | | | |
| . | | | | | | | | | | | | |
| . | | | | | | | | | | | | |
| 12 | | | | | | | | | | b | b | 1 |
| Line | time t3 | | | | | Dot Locations | | | | | | |
| 3 | b | b | 1 | | | | | | | | | |
| . | | | | | | | | | | | | |
| . | | | | | | | | | | | | |
| . | | | | | | | | | | | | |
| 6 | | | | b | b | 3 | | | | | | |
| . | | | | | | | | | | | | |
| . | | | | | | | | | | | | |
| . | | | | | | | | | | | | |
| 9 | | | | | | | b | b | 1 | | | |
| . | | | | | | | | | | | | |
| . | | | | | | | | | | | | |
| . | | | | | | | | | | | | |
| 12 | | | | | | | | | | b | b | 3 |
| Line | time t5 | | | | | Dot Locations | | | | | | |
| 3 | b | b | 3 | | | | | | | | | |
| . | | | | | | | | | | | | |
| . | | | | | | | | | | | | |
| . | | | | | | | | | | | | |

TABLE EX-21A-continued

Output Head Configuration (spot pattern)—Rows: 4  Spots/Row: 3
Corresponding Figures: FIGS. 57–58  Vertical Adjustment: 4 lines
Pattern of Spots: Log  Effective Row Spacing (all rows): 3 lines
Scan Pass: 3  Blank = b  Spot Spacing within Row: 8, 4 dots

| Line | RowA Blue | RowA Red | RowA Grn | RowB Red | RowB Grn | RowB Blue | RowC Grn | RowC Blue | RowC Red | RowD Red | RowD Grn | RowD Blue |
|---|---|---|---|---|---|---|---|---|---|---|---|---|
| 6 | | | | b | b | 5 | | | | | | |
| . | | | | | | | | | | | | |
| . | | | | | | | | | | | | |
| . | | | | | | | | | | | | |
| 9 | | | | | | | b | b | 3 | | | |
| . | | | | | | | | | | | | |
| . | | | | | | | | | | | | |
| . | | | | | | | | | | | | |
| 12 | | | | | | | | | | b | 1 | 5 |

| Line | time t9 | | | | | | Dot Locations | | | | | |
|---|---|---|---|---|---|---|---|---|---|---|---|---|
| 3 | b | 3 | 7 | | | | | | | | | |
| . | | | | | | | | | | | | |
| . | | | | | | | | | | | | |
| . | | | | | | | | | | | | |
| 6 | | | | b | 1 | 9 | | | | | | |
| . | | | | | | | | | | | | |
| . | | | | | | | | | | | | |
| . | | | | | | | | | | | | |
| 9 | | | | | | | b | b | 7 | | | |
| . | | | | | | | | | | | | |
| . | | | | | | | | | | | | |
| . | | | | | | | | | | | | |
| 12 | | | | | | | | | | b | 5 | 9 |

| Line | time t15 | | | | | | Dot Locations | | | | | |
|---|---|---|---|---|---|---|---|---|---|---|---|---|
| 3 | 1 | 9 | 13 | | | | | | | | | |
| . | | | | | | | | | | | | |
| . | | | | | | | | | | | | |
| . | | | | | | | | | | | | |
| 6 | | | | 3 | 7 | 15 | | | | | | |
| . | | | | | | | | | | | | |
| . | | | | | | | | | | | | |
| . | | | | | | | | | | | | |
| 9 | | | | | | | 1 | 5 | 13 | | | |
| . | | | | | | | | | | | | |
| . | | | | | | | | | | | | |
| . | | | | | | | | | | | | |
| 12 | | | | | | | | | | 3 | 11 | 15 | albeit at some lesser insertion efficiency where the higher insertion losses are made up by having more powerful laser beams,

TABLE EX-21B

Output Head Configuration (spot pattern)—Rows: 4  Spots/Row: 3
Corresponding Figures: FIGS. 57–59  Vertical Adjustment: 4 lines
Pattern of Spots: Log  Effective Row Spacing (all rows): 3 lines
Scan Pass: 3  Blank = b  Spot Spacing within Row: 8, 4 dots

| Line | RowA Blue | RowA Red | RowA Grn | RowB Red | RowB Grn | RowB Blue | RowC Grn | RowC Blue | RowC Red | RowD Red | RowD Grn | RowD Blue |
|---|---|---|---|---|---|---|---|---|---|---|---|---|
| Line | time t1920 | | | | | | Dot Locations | | | | | |
| 3 | 1906 | 1914 | 1918 | | | | | | | | | |
| . | | | | | | | | | | | | |
| . | | | | | | | | | | | | |
| . | | | | | | | | | | | | |
| 6 | | | | 1908 | 1912 | 1920 | | | | | | |
| . | | | | | | | | | | | | |
| . | | | | | | | | | | | | |
| . | | | | | | | | | | | | |

TABLE EX-21B-continued

Output Head Configuration (spot pattern)—Rows: 4   Spots/Row: 3
Corresponding Figures: FIGS. 57–59   Vertical Adjustment: 4 lines
Pattern of Spots: Log   Effective Row Spacing (all rows): 3 lines
Scan Pass: 3   Blank = b   Spot Spacing within Row: 8, 4 dots

| | RowA | | | RowB | | | RowC | | | RowD | |
|---|---|---|---|---|---|---|---|---|---|---|---|
| | Blue | Red | Grn | Red | Grn | Blue | Grn | Blue | Red | Red | Grn | Blue |
| 9 | | | | | | | 1906 | 1910 | 1918 | | | |
| . | | | | | | | | | | | | |
| . | | | | | | | | | | | | |
| 12 | | | | | | | | | | 1908 | 1916 | 1920 |

| Line | time t1922 | | | | | Dot Locations | | | | | | |
|---|---|---|---|---|---|---|---|---|---|---|---|---|
| 3 | 1908 | 1916 | 1920 | | | | | | | | | |
| . | | | | | | | | | | | | |
| . | | | | | | | | | | | | |
| 6 | | | | 1910 | 1914 | b | | | | | | |
| . | | | | | | | | | | | | |
| . | | | | | | | | | | | | |
| 9 | | | | | | | 1908 | 1912 | 1920 | | | |
| . | | | | | | | | | | | | |
| . | | | | | | | | | | | | |
| 12 | | | | | | | | | | 1910 | 1918 | b |

| Line | time t1926 | | | | | Dot Locations | | | | | | |
|---|---|---|---|---|---|---|---|---|---|---|---|---|
| 3 | 1912 | 1920 | b | | | | | | | | | |
| . | | | | | | | | | | | | |
| . | | | | | | | | | | | | |
| 6 | | | | 1914 | 1918 | b | | | | | | |
| . | | | | | | | | | | | | |
| . | | | | | | | | | | | | |
| 9 | | | | | | | 1912 | 1916 | b | | | |
| . | | | | | | | | | | | | |
| . | | | | | | | | | | | | |
| 12 | | | | | | | | | | 1914 | b | b |

| Line | time t1930 | | | | | Dot Locations | | | | | | |
|---|---|---|---|---|---|---|---|---|---|---|---|---|
| 3 | 1916 | b | b | | | | | | | | | |
| . | | | | | | | | | | | | |
| . | | | | | | | | | | | | |
| 6 | | | | 1918 | b | b | | | | | | |
| . | | | | | | | | | | | | |
| . | | | | | | | | | | | | |
| 9 | | | | | | | 1916 | 1920 | b | | | |
| . | | | | | | | | | | | | |
| . | | | | | | | | | | | | |
| 12 | | | | | | | | | | 1918 | b | b |

| Line | time t1934 | | | | | Dot Locations | | | | | | |
|---|---|---|---|---|---|---|---|---|---|---|---|---|
| 3 | 1920 | b | b | | | | | | | | | |
| . | | | | | | | | | | | | |
| . | | | | | | | | | | | | |
| 6 | | | | b | b | b | | | | | | |
| . | | | | | | | | | | | | |
| . | | | | | | | | | | | | |
| 9 | | | | | | | 1920 | b | b | | | |
| . | | | | | | | | | | | | |
| . | | | | | | | | | | | | |
| 12 | | | | | | | | | | b | b | b | beams, and more multimode fibers having lower insertion losses to more efficiently relay the red and blue laser beams, to attain the greatest feasible resolution of the photoptically perceived green spots while maintaining necessary overall brightness.

EXAMPLE 22

Figure 60:
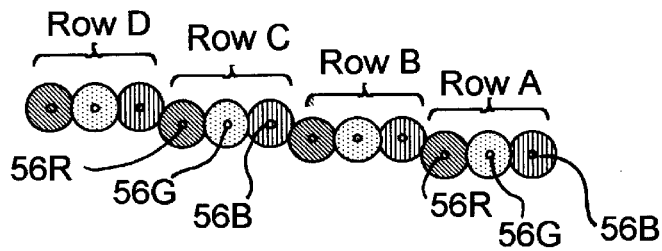
FIG. 60 is a diagram of a 4 row by 3 emitting ends per row array oriented in a step configuration, for use in the system of FIG. 1 according to Example 22.
Figure 60S:
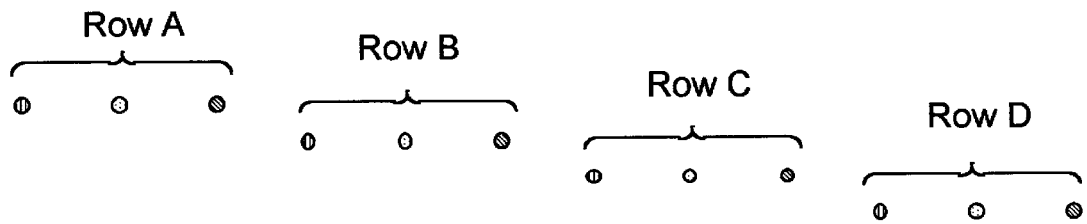
FIG. 60S is a diagram of the pattern of spots projected on a screen using the array shown in FIG. 60.

Example 22, shown in FIGS. 60, 60S, 61 and 62, and described in Tables EX-22A and EX-22B, illustrates an alternate output head configuration from that shown in FIG. 5 and in the other examples, wherein the rows of three emitting ends oriented substantially in vertical alignment in the prior embodiments of output heads are instead positioned out of vertical alignment, in a substantially stepped arrangement to produce the pattern of spots on the screen shown in FIG. 60S. The output head includes four groups of three emitting ends, with each group arranged in horizontal alignment. In this arrangement of the output head emitting ends, and therefore the pattern of spots, the colors assigned to each group or row are selected as for the preceding output head configurations. The reordering of the video pixel data for this Example 22 is graphically shown in FIGS. 61A–61E and 62A–62E, and described on a line and spot basis in Tables EX-22A and EX-22B. In this embodiment, the adjacent rows preferably have an effective row spacing of 1 line, that is the lines written during each scan pass are vertically adjacent. As with other examples, although not required, during a complete initial scan pass lines L1–L4 of the frame are preferably respectively written with rows RowA, RowB, RowC and RowD of the pattern of spots. Because of the orientation of the pattern of spots shown in FIG. 60S and the assumed left to right scanning of the spot pattern, the spots of RowD will each illuminate the dot locations of line 1 of the frame in right to left sequence at different times, followed by RowC, RowB and RowA. Tables EX-22A and EX-22B and FIGS. 61A–61E and 62A–62E describe the writing of the lines and dot locations of the lines for the pattern of spots of this Example 22. In the embodiment of this Example 22, it is not necessary to blank any rows at the top or bottom of the frame, as the effective line spacing is one. Reordering, or time combination, of the video pixel data, and blanking of the spots to the left and right of the frame at the beginning and end of each scan pass is still required, however, to a greater extent than shown in FIG. 16 above, because the width of the spot pattern is greater. For this Example 22, the horizontal spacing between spots produced by laser beams emitted from adjacent fiber emitting ends is assumed to be three dots on the screen, i.e., there are two dots between horizontally adjacent spots on the screen. We also assume an effective horizontal spot spacing between the ends of horizontally adjacent rows of three dots. We further assume a red, green, blue order of each row of emitting ends. It should be understood that these assumptions are merely for illustrative purposes, and that larger or smaller effective horizontal spot spacings and/or vertical row spacing may be required in actual practice, and that more or fewer emitting ends per row, and more or fewer rows of emitting ends, may be employed within the concept of our invention.

Thus, as shown in FIGS. 61A–61E and 62A–62E and Tables EX-22A and EX-22B, for a horizontal scan at scan pass time s1 scanning lines L1, L2, L3 and L4, at time t1 dot 1 of line L1 is written by the red spot of RowA, while the green and blue spots of RowA and all spots of RowB, RowC and RowD are blanked. The remaining illuminations of the dot locations of lines L1–L4 during scan pass s1 are described in Tables EX-22A and EX-22B.

The detailed description relating to FIGS. 61A–61E, and to Table EX-22A, illustrates the time combination required for the spot pattern shown in FIG. 60S at the beginning of the scan pass. As shown in FIGS. 62A–62F and described in Table EX-22B, similar writing of spots on dot locations at the end of the scan pass for lines L4, L3, L2 and L1, and blanking of spots in each RowD, RowC, RowB and RowA in the inverse order of that needed at the beginning of the scan pass, 1953 horizontal dot shifts of the spot pattern

TABLE EX-22A

Output Head Configuration (spot pattern)—Rows: 4    Spots/Row: 3
Corresponding Figures: FIGS. 60–62    Vertical Adjustment: 4 lines
Pattern of Spots: Step    Effective Row Spacing (all rows): 1 line
Scan Pass: 1    Blank = b    Spots betw Rows: 3    Spots Spacing w/I Row: 3

| | RowD | | | RowC | | | RowB | | | RowA | | |
|---|---|---|---|---|---|---|---|---|---|---|---|---|
| | Red | Grn | Blue | Red | Grn | Blue | Red | Grn | Blue | Red | Grn | Blue |
| Line | time t1 | | | | | | Dot Locations | | | | | |
| 1 | 1 | b | b | | | | | | | | | |
| 2 | | | | b | b | b | | | | | | |
| 3 | | | | | | | b | b | b | | | |
| 4 | | | | | | | | | | b | b | b |
| Line | time t7 | | | | | | Dot Locations | | | | | |
| 1 | 7 | 4 | 1 | | | | | | | | | |
| 2 | | | | b | b | b | | | | | | |
| 3 | | | | | | | b | b | b | | | |
| 4 | | | | | | | | | | b | b | b |
| Line | time t10 | | | | | | Dot Locations | | | | | |
| 1 | 10 | 7 | 4 | | | | | | | | | |
| 2 | | | | 1 | b | b | | | | | | |
| 3 | | | | | | | b | b | b | | | |
| 4 | | | | | | | | | | b | b | b |

TABLE EX-22A-continued

Output Head Configuration (spot pattern)—Rows: 4    Spots/Row: 3  
Corresponding Figures: FIGS. 60–62    Vertical Adjustment: 4 lines  
Pattern of Spots: Step    Effective Row Spacing (all rows): 1 line  
Scan Pass: 1    Blank = b    Spots betw Rows: 3    Spots Spacing w/I Row: 3

| | RowD | | | RowC | | | RowB | | | RowA | | |
|---|---|---|---|---|---|---|---|---|---|---|---|---|
| | Red | Grn | Blue | Red | Grn | Blue | Red | Grn | Blue | Red | Grn | Blue |
| Line | time t19 | | | | | | Dot Locations | | | | | |
| 1 | 19 | 16 | 13 | | | | | | | | | |
| 2 | | | | 10 | 7 | 4 | | | | | | |
| 3 | | | | | | | 1 | b | b | | | |
| 4 | | | | | | | | | | b | b | b |
| Line | time t28 | | | | | | Dot Locations | | | | | |
| 1 | 28 | 25 | 22 | | | | | | | | | |
| 2 | | | | 19 | 16 | 13 | | | | | | |
| 3 | | | | | | | 10 | 7 | 4 | | | |
| 4 | | | | | | | | | | 1 | b | b |
| Line | time t34 | | | | | | Dot Locations | | | | | |
| 1 | 34 | 31 | 28 | | | | | | | | | |
| 2 | | | | 25 | 22 | 19 | | | | | | |
| 3 | | | | | | | 16 | 13 | 10 | | | |
| 4 | | | | | | | | | | 7 | 4 | 1 |

TABLE EX-22B

Output Head Configuration (spot pattern)—Rows: 4    Spots/Row: 3  
Corresponding Figures: FIGS. 60–62    Vertical Adjustment: 4 lines  
Pattern of Spots: Step    Effective Row Spacing (all rows) : 1 line  
ScanPass: 1    Blank = b    Spots between Rows: 3    Spots spacing w/I Row: 3

| | RowD | | | RowC | | | RowB | | | RowA | | |
|---|---|---|---|---|---|---|---|---|---|---|---|---|
| | Red | Grn | Blue | Red | Grn | Blue | Red | Grn | Blue | Red | Grn | Blue |
| Line | time t1920 | | | | | | Dot Locations | | | | | |
| 1 | 1920 | 1917 | 1914 | | | | | | | | | |
| 2 | | | | 1911 | 1908 | 1905 | | | | | | |
| 3 | | | | | | | 1902 | 1899 | 1896 | | | |
| 4 | | | | | | | | | | 1893 | 1890 | 1887 |
| Line | time t1921 | | | | | | Dot Locations | | | | | |
| 1 | b | 1918 | 1915 | | | | | | | | | |
| 2 | | | | 1912 | 1909 | 1906 | | | | | | |
| 3 | | | | | | | 1903 | 1900 | 1897 | | | |
| 4 | | | | | | | | | | 1894 | 1891 | 1888 |
| Line | time t1929 | | | | | | Dot Locations | | | | | |
| 1 | b | b | b | | | | | | | | | |
| 2 | | | | 1920 | 1917 | 1914 | | | | | | |
| 3 | | | | | | | 1911 | 1908 | 1905 | | | |
| 4 | | | | | | | | | | 1902 | 1899 | 1896 |
| Line | time t1935 | | | | | | Dot Locations | | | | | |
| 1 | b | b | b | | | | | | | | | |
| 2 | | | | b | b | 1920 | | | | | | |
| 3 | | | | | | | 1917 | 1914 | 1911 | | | |
| 4 | | | | | | | | | | 1908 | 1905 | 1902 |
| Line | time t1944 | | | | | | Dot Locations | | | | | |
| 1 | b | b | b | | | | | | | | | |
| 2 | | | | b | b | b | | | | | | |
| 3 | | | | | | | b | b | 1920 | | | |
| 4 | | | | | | | | | | 1917 | 1904 | 1911 |

TABLE EX-22B-continued

Output Head Configuration (spot pattern)—Rows: 4    Spots/Row: 3
Corresponding Figures: FIGS. 60–62    Vertical Adjustment: 4 lines
Pattern of Spots: Step    Effective Row Spacing (all rows) : 1 line
ScanPass: 1    Blank = b    Spots between Rows: 3    Spots spacing w/I Row: 3

| | RowD | | | RowC | | | RowB | | | RowA | | |
|---|---|---|---|---|---|---|---|---|---|---|---|---|
| | Red | Grn | Blue | Red | Grn | Blue | Red | Grn | Blue | Red | Grn | Blue |
| Line | time t1953 | | | | | | Dot Locations | | | | | |
| 1 | b | b | b | | | | | | | | | |
| 2 | | | | b | b | b | | | | | | |
| 3 | | | | | | | b | b | b | | | |
| 4 | | | | | | | | | | b | b | 1920 | will be needed to complete the lines of the first horizontal scan pass, as shown in FIGS. 61A–61E and Table EX-22A. When the complete frame of 1080 lines is written, the galvanometer mirror retraces to the top of the frame, and the scanning of a new frame is begun. Of course, the number of configurations of this type of output head and resulting spot pattern are almost endless. The primary limitation of an output head having the type of spot pattern illustrated by this Example 22 is the overall width of the spot pattern reflected by the polygon mirror facet. Because the physical width of such a spot pattern may be larger at the polygon mirror facet than with the roughly rectangular array of FIG. 5, the facet may have to be wider to accommodate the wider beam pattern because of the vignetting problems previously addressed hereinbefore. However, this configuration has the advantage of reducing the horizontal scan passes per frame, and somewhat simplifying the timing of the input pixel data.

EXAMPLES 23–24

Figure 63:
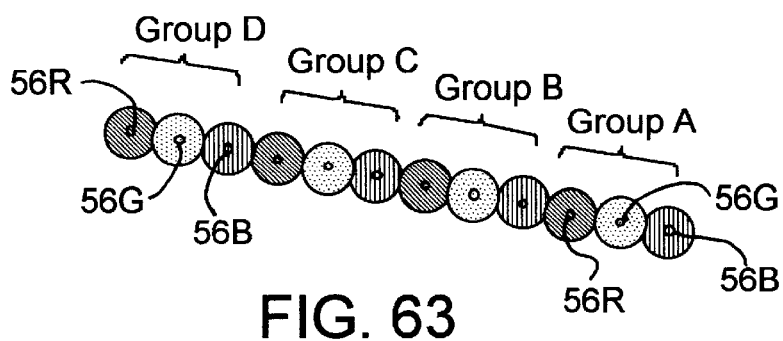
FIG. 63 is a diagram of a 12 emitting end linear array for use in the system of FIG. 1 according to Example 23.
Figure 63S:
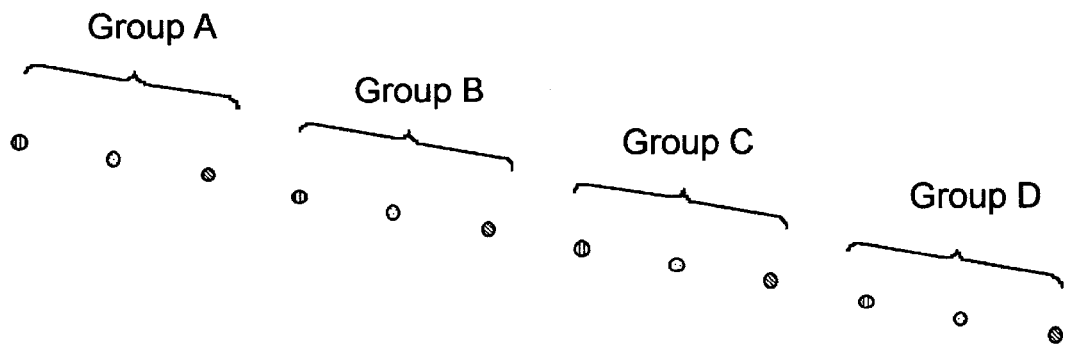
FIG. 63S is a diagram of the pattern of spots projected on a screen using the array shown in FIG. 63.
Figure 61A:
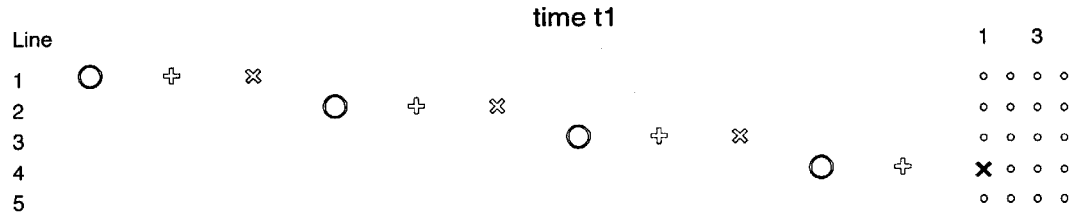
FIGS. 61A through 61E are time sequence diagrams for Example 22 illustrating the time shifting of spots of each primary color at the beginning of scan pass s1 for a pattern of spots shown in FIG. 60S.
Figure 61B:
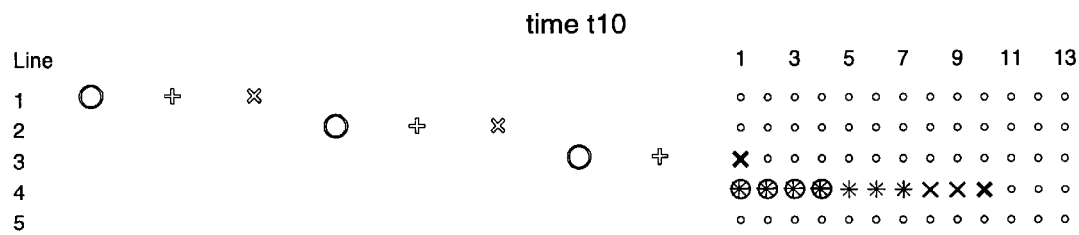
Figure 61C:
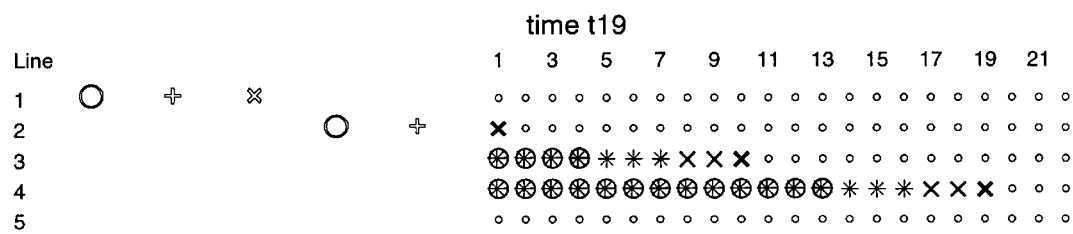
Figure 61D:
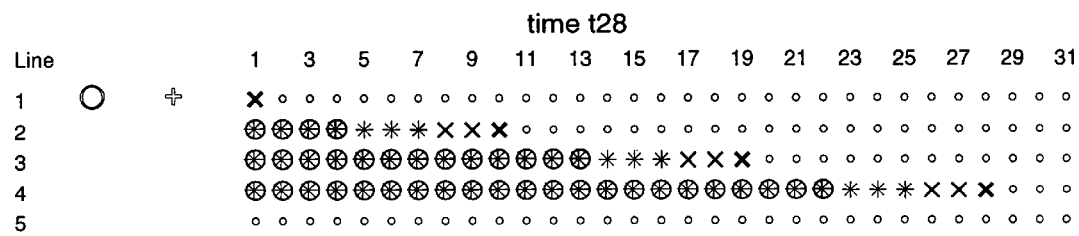
Figure 61E:
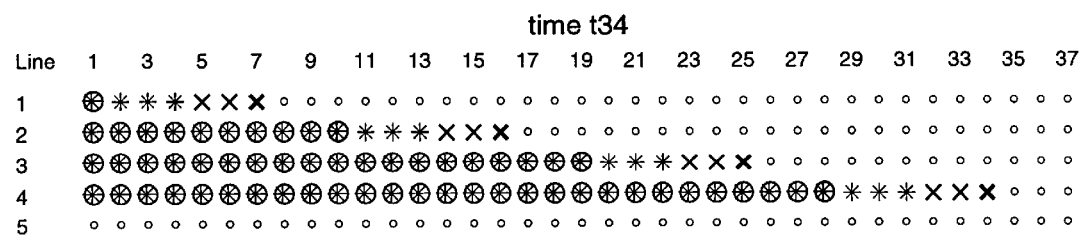
Figure 62A:
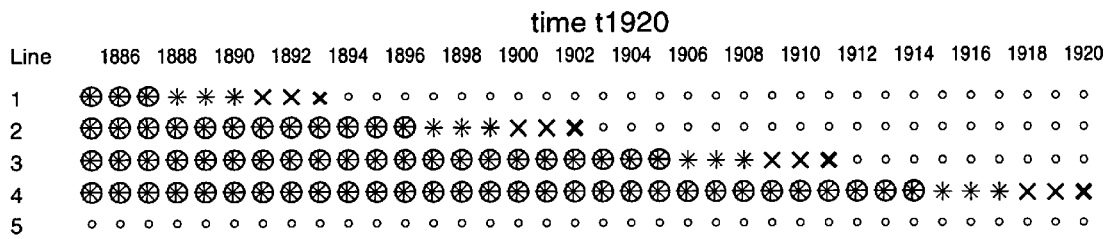
FIGS. 62A through 62E are time sequence diagrams for Example 22 illustrating the time shifting of spots of each primary color at the end of scan pass s1 for a pattern of spots shown in FIG. 60S.
Figure 62B:
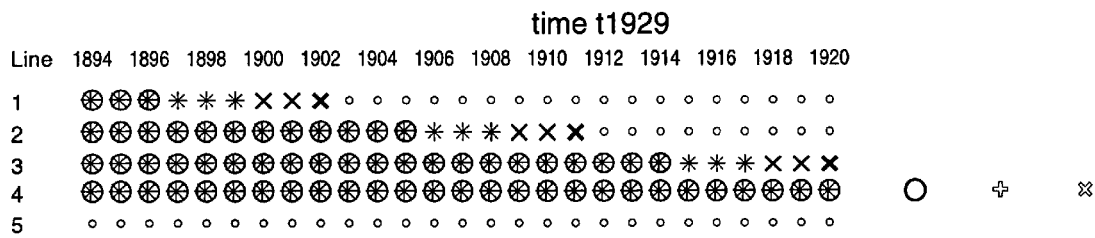
Figure 62C:
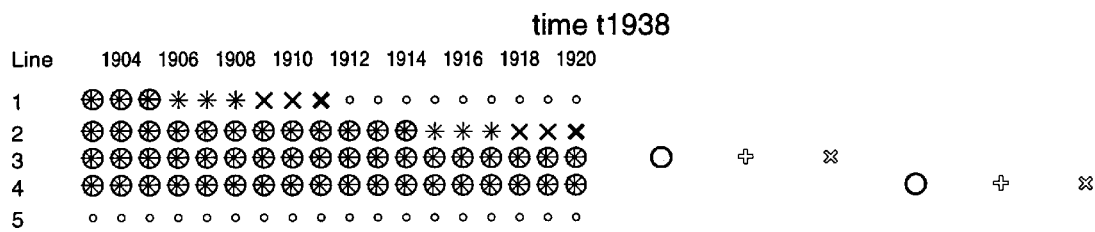
Figure 62D:
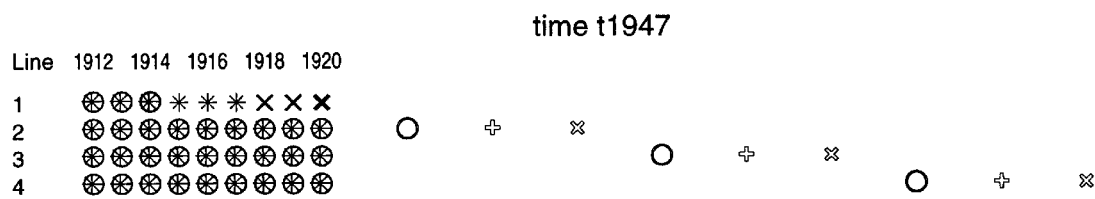
Figure 62E:
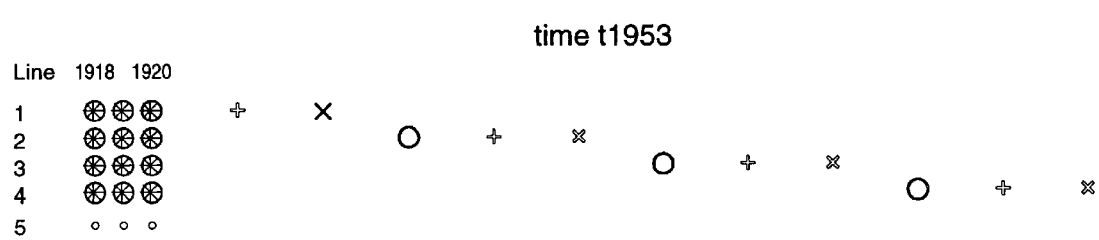
Figure 64:
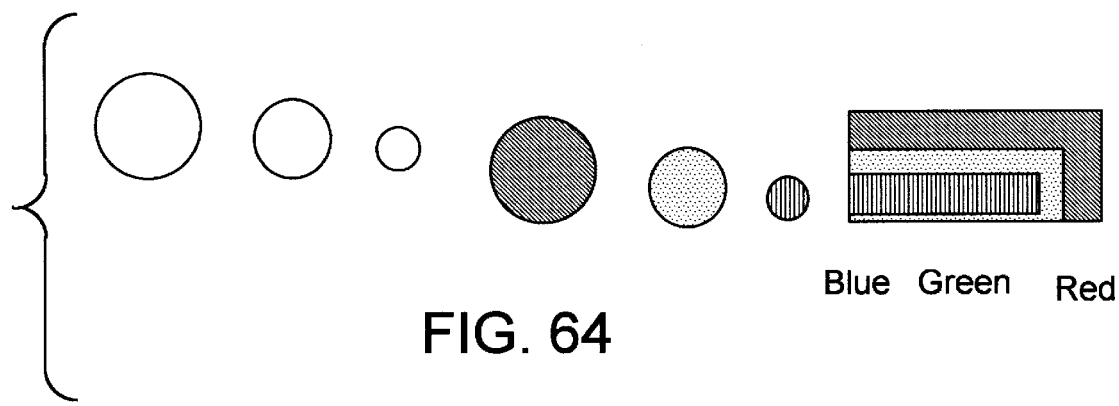
FIG. 64 is a diagram of a portion of the pattern of spots shown in FIG. 63S, showing the relative sizes of the spots of each color and the resulting overlapping of the lines of each color in each line.
Figure 65:
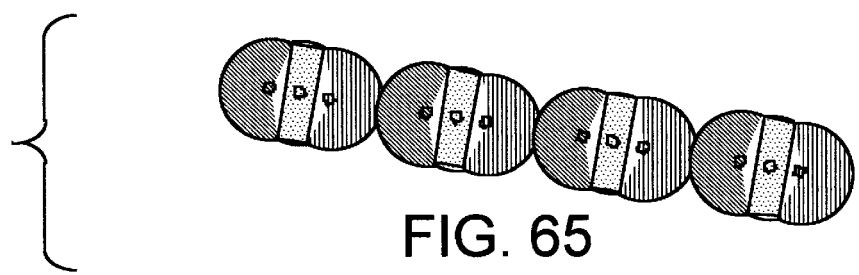
FIG. 65 is a diagram of a 12 emitting end linear array for use in the system of FIG. 1 according to Example 23, with the fibers within each RGB Group modified to space the emitting ends closer together.
Figure 65S:
FIG. 65S is a diagram of the pattern of spots projected on a screen using the array shown in FIG. 65.
Figure 66:
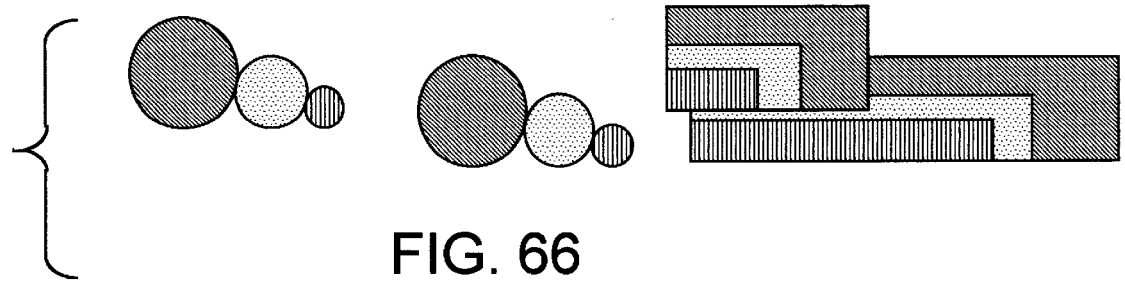
FIG. 66 is a diagram of a portion of the pattern of spots, and of the resulting overlapping of the lines of each color in each line, projected on a screen by linear spot pattern shown in FIG. 65S.

FIGS. 63, 63S, and 64, and FIGS. 65, 65S and 66, and corresponding Tables EX-23 and EX-24, respectively illustrate for Examples 23 and 24 alternate versions of the stepped array and pattern of spots described in FIGS. 60 and 60S for Example 22, wherein the linear array of emitting ends and the pattern of spots (FIGS. 63S and 65S) respectively projected by the arrays shown in FIGS. 63 and 65 are slanted somewhat with respect to the horizontal aspect of the frame projected on the screen to somewhat approximate the result of the stepped configuration of Example 22, but in a significantly more manufacturable flat or linear alignment. Although not required for these configurations, the exemplary spot patterns of these Examples 23 and 24 are preferably arranged in groups of spots of red, green and blue. For Examples 23 and 24 the groups of emitting ends and corresponding spots of the spot pattern are arranged in groups of red, green and blue spots, herein referred to as "RGB groups A, B, C and D", respectively. The RGB groups of spots shown in FIGS. 63S and 65S are not exactly horizontally aligned as shown in FIG. 60S, but the spots produced thereby do significantly, both physically and perceptually, overlap vertically as shown in FIGS. 64 and 66. Each such RGB group corresponds to a row of Example 22 above, having substantially the same line reordering and time combination within rows shown in FIGS. 61 and 62 of Example 22.

EXAMPLE 23

Of course, with the outboard red and blue spots of each RGB group not exactly horizontally aligned with the center green spots of their own RGB group, the edges of the color spots of one group may overlap one or more color spots of an adjacent group somewhat, as shown in FIG. 64. This overlap is not typically perceived since most of the resolution perception of an image occurs in the green, and even though the red and blue are not exactly coincident with the green spot of the respective RGB group, resolution doesn't noticeably suffer. Also, the maximum dimension of the array of fiber emitting ends is substantially greater than the 12 emitting ends configuration of the preceding examples, possibly causing some loss of focus of the spots on the screen 12, given that the beams emitted by the outside emitting ends of each RGB group enter the output lens 58 offset from the optical axis of the lens. In fact, given the typical size of our preferred optical fibers, the arrays and resulting spot patterns of Examples 22, 23 and 24 approach the maximum dimension feasible with the preferred achromat output lens 58.

By selecting different orders for the colors of the fibers within particular RGB Groups such as red-green-blue for one RGB Group and green-blue-red for another RGB Group, the perceived vertical position of the spots of each RGB group projected on the screen by the linear array will be effectively vertically spaced a line apart. It may be preferable to place green, the more photoptically perceived color, at the center of each RGB group. In other words, if the four green spots are at the middle of each RGB group, an appropriate slant or angle of the head will write four lines of green spots with an effective row spacing of one line (or more) on the screen, as shown for Example 22 and FIG. 61 and Tables EX-22A and EX-22B. As previously noted, the pattern of those spots and the extent of overlap is graphically shown in FIG. 64. Although it might seem that the omission of the discrete steps of the emitting end array and resulting spot pattern of Example 23 might not yield the effect shown in FIGS. 61 and 62 of Example 22, appropriate assignment of the colors to the appropriate emitting ends as described for this Example 23 should yield the appropriate composite spots at effective dot locations of each line on the screen that are perceptually equivalent to the dot locations illustrated in Example 22.

EXAMPLE 24

FIGS. 65 and 65S illustrate an alternate embodiment of the slanted configuration shown in FIGS. 63 and 63S, respectively, wherein the fibers, and therefore the spots of the spot pattern, are spaced closer together to minimize the effective spacing of spots within an RGB group and thereby reduce the portion of the red and blue spots that do not overlap the more photoptically perceived green spot. This fiber treatment may also be useful in array configurations other than those illustrated in this Example 24, both for the spacing of beams within horizontal rows and effective vertical spacing between rows, because the greater the spacing, the greater the overlap of beams that must be blanked at the top and bottom of the frame, and typically the more horizontal scan passes and/or the wider the facets of the polygon mirror to scan blanked beams outside the frame. Referring again to FIG. 65, the cladding of the fibers are shaved, skived or ground away to reduce the thickness of the cladding, or the distance between fiber centers, and therefore the effective horizontal spot spacing within each RGB group.

The output head configuration illustrated in FIG. 65 and the resulting spot pattern shown in FIG. 65S may enable the adjustment of the system to provide different effective row spacing, resolutions, throw distances and aspect ratios by altering the slant or angle of the rows with respect to the horizontal axis of the screen. It may be seen that as the angle of any of the rows of emitting ends, and consequently of the spot pattern, from horizontal is varied, the effective vertical row spacing on the screen is varied. The angle of the output array, or pattern of spots, may be manually adjustable, such as when calibrating the system at the factory, or at a particular location. Automatic, or dynamic, adjustment could also be accomplished during setup of the laser projection system at a new location, or as part of a portable system used at different locations, or to accommodate different aspect ratio and resolution requirements for the video image or for different video sources.

EXAMPLES 25–26

Figure 67:
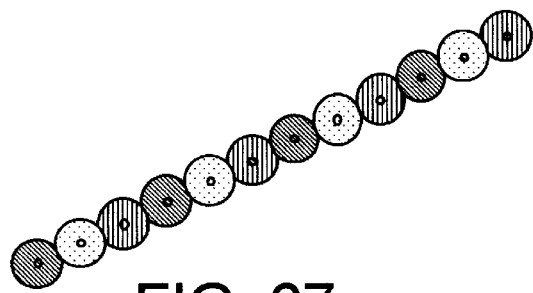
FIG. 67 is a diagram of a 12 emitting end linear array for use in the system of FIG. 1 according to Example 24 angled more from the horizontal aspect than the array of FIG. 63.
Figure 67S:
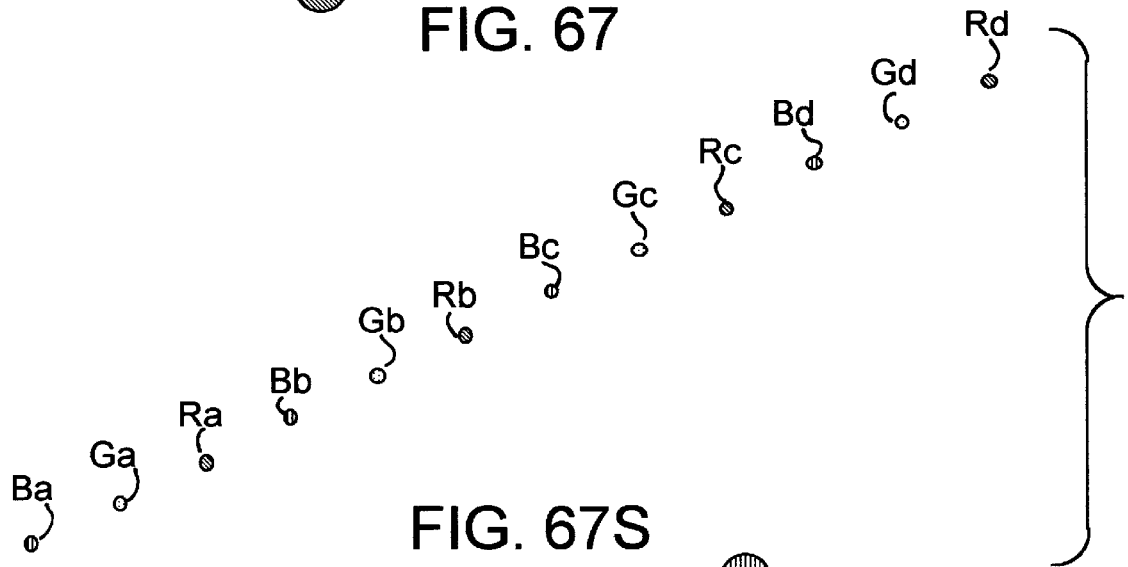
FIG. 67S is a diagram of the pattern of spots projected on a screen using the array shown in FIG. 67.
Figure 71:
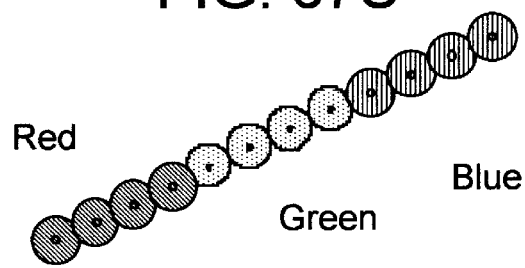
FIG. 71 is a diagram of a 12 emitting end linear array for use in the system of FIG. 1 according to Example 25 similar to that of FIG. 67 of Example 24, with a different assignment of colors to the fibers of the array.
Figure 71S:
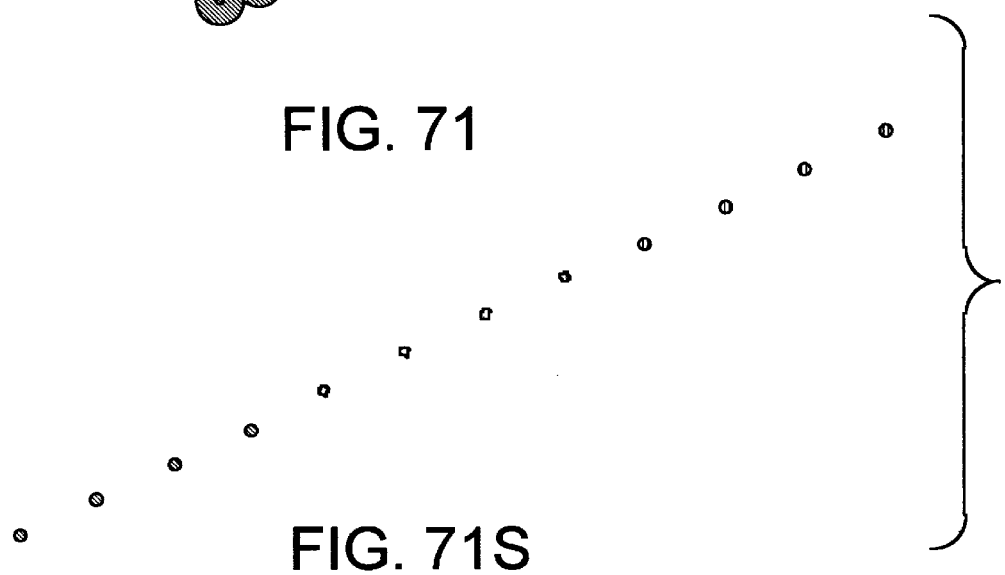
FIG. 71S is a diagram of the pattern of spots projected on a screen using the array shown in FIG. 71.

For Examples 25 and 26, FIGS. 67 and 71 show alternate output head emitting head configurations and FIGS. 67S and 71S show the corresponding alternate spot patterns similar to that of the linear array of Example 23 shown in FIGS. 63 and 63S, but angled more from horizontal so that each spot of the spot pattern projected on the screen is at an effective row spacing of 1 line.

The difference between Examples 25 and 26 resides in the assignment of colors of beams to the fibers. Example 25 employs red-green-blue groups, whereas Example 26 employs groups of colors, for example, red-red-red-red/green-green-green-green/blue-blue-blue-blue.

EXAMPLE 25

For this Example 25, a 12 spot pattern using a 12 emitting end output head array, we assume that red, green, blue beams are assigned to fibers in groups of three (as shown in FIGS. 67, 67S, and 68–70), a 4 line vertical adjustment equal to the number of groups of RGB emitting ends, and identify each of the twelve spots, from top to bottom of the spot pattern, as Ra, Ga, Ba, Rb, Gb, Bb, Rc, Gc, Bc, Rd, Gd and Bd, respectively. As shown in FIGS. 68A–68H and Table EX-25A, all lines of a frame will be scanned with spots of all three primary colors in 272 scan passes and lines L1–L4 of a frame will be scanned with spots of all three primary colors after initial scan passes s1, s2 and s3. FIGS. 69A–69C and 70A–70C show, and Tables EX-25A, EX-25B and EX-25C describe, the time delays necessary to scan each dot location in a line for scan pass s3,

TABLE EX-25B

Output Head Configuration (spot pattern)—Rows: 12  Spots/Row: 1
Corresponding Figures: FIGS. 67, 69  Vertical Adjustment: 4 lines
Pattern of Spots: Ramp  Effective Vertical Spot Spacing: 1 line
Scan Pass: 3  Blank = b  Effective Horizontal Spot Spacing: 3

| Line | Ra | Ga | Ba | Rb | Gb | Bb | Rc | Gc | Bc | Rd | Gd | Bd |
|------|----|----|----|----|----|----|----|----|----|----|----|----|
| | time t1 | | | | | Dot Locations | | | | | | |
| 1  | 1 | | | | | | | | | | | |
| 2  |   | b | | | | | | | | | | |
| 3  |   |   | b | | | | | | | | | |
| 4  |   |   |   | b | | | | | | | | |
| 5  |   |   |   |   | b | | | | | | | |
| 6  |   |   |   |   |   | b | | | | | | |
| 7  |   |   |   |   |   |   | b | | | | | |
| 8  |   |   |   |   |   |   |   | b | | | | |
| 9  |   |   |   |   |   |   |   |   | b | | | |
| 10 |   |   |   |   |   |   |   |   |   | b | | |
| 11 |   |   |   |   |   |   |   |   |   |   | b | |
| 12 |   |   |   |   |   |   |   |   |   |   |   | b |

TABLE EX-25A

Output Head Configuration (spot pattern)—Rows: 12  Spots/Row: 1
Corresponding Figure: FIGS. 67–70  Vertical Adjustment: 4 lines
Blank = b  Effective Vertical Spacing: 1 lines Lines Written by Respective Spots

| Scan Pass | Ra | Ga | Ba | Rb | Gb | Bb | Rc | Gc | Bc | Rd | Gd | Bd |
|-----------|------|------|------|------|------|------|------|------|------|------|------|------|
| 1   | b    | b    | b    | b    | b    | b    | b    | b    | 1    | 2    | 3    | 4    |
| 2   | b    | b    | b    | b    | 1    | 2    | 3    | 4    | 5    | 6    | 7    | 8    |
| 3   | 1    | 2    | 3    | 4    | 5    | 6    | 7    | 8    | 9    | 10   | 11   | 12   |
| 4   | 5    | 6    | 7    | 8    | 9    | 10   | 11   | 12   | 13   | 14   | 15   | 16   |
| .   | .    | .    | .    | .    | .    | .    | .    | .    | .    | .    | .    | .    |
| .   | .    | .    | .    | .    | .    | .    | .    | .    | .    | .    | .    | .    |
| .   | .    | .    | .    | .    | .    | .    | .    | .    | .    | .    | .    | .    |
| 269 | 1265 | 1266 | 1267 | 1268 | 1269 | 1270 | 1271 | 1272 | 1273 | 1274 | 1275 | 1276 |
| 270 | 1269 | 1270 | 1271 | 1272 | 1273 | 1274 | 1275 | 1276 | 1277 | 1278 | 1279 | 1280 |
| 271 | 1273 | 1274 | 1275 | 1276 | 1277 | 1278 | 1279 | 1280 | b    | b    | b    | b    |
| 272 | 1277 | 1278 | 1279 | 1280 | b    | b    | b    | b    | b    | b    | b    | b    |

TABLE EX-25B-continued

Output Head Configuration (spot pattern)—Rows: 12  Spots/Row: 1  
Corresponding Figures: FIGS. 67, 69  Vertical Adjustment: 4 lines  
Pattern of Spots: Ramp  Effective Vertical Spot Spacing: 1 line  
Scan Pass: 3  Blank = b  Effective Horizontal Spot Spacing: 3

| Line | Ra | Ga | Ba | Rb | Gb | Bb | Rc | Gc | Bc | Rd | Gd | Bd |
|---|---|---|---|---|---|---|---|---|---|---|---|---|
| time t16 | | | | | | Dot Locations | | | | | | |
| 1 | 16 | | | | | | | | | | | |
| 2 | | 13 | | | | | | | | | | |
| 3 | | | 10 | | | | | | | | | |
| 4 | | | | 7 | | | | | | | | |
| 5 | | | | | 4 | | | | | | | |
| 6 | | | | | | 1 | | | | | | |
| 7 | | | | | | | b | | | | | |
| 8 | | | | | | | | b | | | | |
| 9 | | | | | | | | | b | | | |
| 10 | | | | | | | | | | b | | |
| 11 | | | | | | | | | | | b | |
| 12 | | | | | | | | | | | | b |
| time t34 | | | | | | Dot Locations | | | | | | |
| 1 | 34 | | | | | | | | | | | |
| 2 | | 31 | | | | | | | | | | |
| 3 | | | 28 | | | | | | | | | |
| 4 | | | | 25 | | | | | | | | |
| 5 | | | | | 22 | | | | | | | |
| 6 | | | | | | 19 | | | | | | |
| 7 | | | | | | | 16 | | | | | |
| 8 | | | | | | | | 13 | | | | |
| 9 | | | | | | | | | 10 | | | |
| 10 | | | | | | | | | | 7 | | |
| 11 | | | | | | | | | | | 4 | |
| 12 | | | | | | | | | | | | 1 |

TABLE EX-25C

Output Head Configuration (spot pattern)—Rows: 12  Spots/Row: 1  
Corresponding Figures: FIGS. 67, 70  Vertical Adjustment: 4 lines  
Pattern of Spots: Ramp  Effective Vertical Spot Spacing: 1 line  
Scan Pass: 3  Blank = b  Effective Horizontal Spot Spacing: 3

| Line | Ra | Ga | Ba | Rb | Gb | Bb | Rc | Gc | Bc | Rd | Gd | Bd |
|---|---|---|---|---|---|---|---|---|---|---|---|---|
| time t1920 | | | | | | Dot Locations | | | | | | |
| 1 | 1920 | | | | | | | | | | | |
| 2 | | 1917 | | | | | | | | | | |
| 3 | | | 1914 | | | | | | | | | |
| 4 | | | | 1911 | | | | | | | | |
| 5 | | | | | 1908 | | | | | | | |
| 6 | | | | | | 1905 | | | | | | |
| 7 | | | | | | | 1902 | | | | | |
| 8 | | | | | | | | 1899 | | | | |
| 9 | | | | | | | | | 1896 | | | |
| 10 | | | | | | | | | | 1893 | | |
| 11 | | | | | | | | | | | 1890 | |
| 12 | | | | | | | | | | | | 1887 |
| time t1938 | | | | | | Dot Locations | | | | | | |
| 1 | b | | | | | | | | | | | |
| 2 | | b | | | | | | | | | | |
| 3 | | | b | | | | | | | | | |
| 4 | | | | b | | | | | | | | |
| 5 | | | | | b | | | | | | | |
| 6 | | | | | | b | | | | | | |
| 7 | | | | | | | 1920 | | | | | |
| 8 | | | | | | | | 1917 | | | | |
| 9 | | | | | | | | | 1914 | | | |
| 10 | | | | | | | | | | 1911 | | |
| 11 | | | | | | | | | | | 1908 | |
| 12 | | | | | | | | | | | | 1905 |
| time t1953 | | | | | | Dot Locations | | | | | | |
| 1 | b | | | | | | | | | | | |
| 2 | | b | | | | | | | | | | |
| 3 | | | b | | | | | | | | | |
| 4 | | | | b | | | | | | | | |
| 5 | | | | | b | | | | | | | |
| 6 | | | | | | b | | | | | | |
| 7 | | | | | | | b | | | | | |
| 8 | | | | | | | | b | | | | |
| 9 | | | | | | | | | b | | | |
| 10 | | | | | | | | | | b | | |
| 11 | | | | | | | | | | | b | |
| 12 | | | | | | | | | | | | 1920 | revealing the necessity of 1953 horizontal adjustments of the spots to complete each scan pass, or an overscan at one side of the frame of 33 dot locations.

EXAMPLE 26

For Example 26, FIG. 71 shows an alternate output head emitting head configuration, identical to that of the linear array of Example 25 shown in FIG. 67, but having a different assignment of fibers that produces a significant alternative to the RGB grouped array of emitting ends assignment and corresponding spot pattern of Example 25. As with Example 25, each spot of the spot pattern projected on the screen shown in FIG. 71S for this Example 26 is an effective row spacing of 1 line. For this Example 26, we assume that red, green,

TABLE EX-26A

Output Head Configuration (spot pattern)—Rows: 12   Spots/Row: 1
Corresponding Figure: FIGS. 71–74   Vertical Adjustment: 4 lines
Blank = b   Effective Vertical Spacing: 1 lines Lines Written by Respective Spots

| Scan Pass | Ra | Rb | Rc | Rd | Ga | Gb | Gc | Gd | Ba | Bb | Bc | Bd |
|---|---|---|---|---|---|---|---|---|---|---|---|---|
| 1 | b | b | b | b | b | b | b | b | 1 | 2 | 3 | 4 |
| 2 | b | b | b | b | 1 | 2 | 3 | 4 | 5 | 6 | 7 | 8 |
| 3 | 1 | 2 | 3 | 4 | 5 | 6 | 7 | 8 | 9 | 10 | 11 | 12 |
| 4 | 5 | 6 | 7 | 8 | 9 | 10 | 11 | 12 | 13 | 14 | 15 | 16 |
| . | . | . | . | . | . | . | . | . | . | . | . | . |
| . | . | . | . | . | . | . | . | . | . | . | . | . |
| 269 | 1265 | 1266 | 1267 | 1268 | 1269 | 1270 | 1271 | 1272 | 1273 | 1274 | 1275 | 1276 |
| 270 | 1269 | 1270 | 1271 | 1272 | 1273 | 1274 | 1275 | 1276 | 1277 | 1278 | 1279 | 1280 |
| 271 | 1273 | 1274 | 1275 | 1276 | 1277 | 1278 | 1279 | 1280 | b | b | b | b |
| 272 | 1277 | 1278 | 1279 | 1280 | b | b | b | b | b | b | b | b | blue beams are assigned to fibers in three groups of four fibers, the fibers of each group all having the same color (as shown in FIGS. 71, 71S and 72–74), a 4 line vertical adjustment equal to the number of groups of RGB emitting ends. In FIG. 72, as in FIG. 68 for Example 25, we identify the twelve spots, from top to bottom of the

TABLE EX-26B

Output Head Configuration (spot pattern)—Rows: 12   Spots/Row: 1
Corresponding Figures: FIGS. 71–74   Vertical Adjustment: 4 lines
Pattern of Spots: Ramp   Effective Vertical Spot Spacing: 1 line
Scan Pass: 3   Blank = b   Effective Horizontal Spot Spacing: 3 dots

| | Ra | Rb | Rc | Rd | Ga | Gb | Gc | Gd | Ba | Bb | Bc | Bd |
|---|---|---|---|---|---|---|---|---|---|---|---|---|
| Line | time t1 | | | | | Dot Locations | | | | | | |
| 1 | 1 | | | | | | | | | | | |
| 2 | | b | | | | | | | | | | |
| 3 | | | b | | | | | | | | | | |
| 4 | | | | b | | | | | | | | |
| 5 | | | | | b | | | | | | | |
| 6 | | | | | | b | | | | | | |
| 7 | | | | | | | b | | | | | |
| 8 | | | | | | | | b | | | | |
| 9 | | | | | | | | | b | | | |
| 10 | | | | | | | | | | b | | |
| 11 | | | | | | | | | | | b | |
| 12 | | | | | | | | | | | | b |
| Line | time t16 | | | | | Dot Locations | | | | | | |
| 1 | 16 | | | | | | | | | | | |
| 2 | | 13 | | | | | | | | | | |
| 3 | | | 10 | | | | | | | | | |
| 4 | | | | 7 | | | | | | | | |
| 5 | | | | | 4 | | | | | | | |
| 6 | | | | | | 1 | | | | | | |
| 7 | | | | | | | b | | | | | |
| 8 | | | | | | | | b | | | | |
| 9 | | | | | | | | | b | | | |

TABLE EX-26B-continued

Output Head Configuration (spot pattern)—Rows: 12   Spots/Row: 1
Corresponding Figures: FIGS. 71–74   Vertical Adjustment: 4 lines
Pattern of Spots: Ramp   Effective Vertical Spot Spacing: 1 line
Scan Pass: 3   Blank = b   Effective Horizontal Spot Spacing: 3 dots

| | Ra | Rb | Rc | Rd | Ga | Gb | Gc | Gd | Ba | Bb | Bc | Bd |
|---|---|---|---|---|---|---|---|---|---|---|---|---|
| 10 | | | | | | | | | | b | | |
| 11 | | | | | | | | | | | b | |
| 12 | | | | | | | | | | | | b |
| Line | time t34 | | | | | Dot Locations | | | | | | |
| 1 | 34 | | | | | | | | | | | |
| 2 | | 31 | | | | | | | | | | |
| 3 | | | 28 | | | | | | | | | |
| 4 | | | | 25 | | | | | | | | |
| 5 | | | | | 22 | | | | | | | |
| 6 | | | | | | 19 | | | | | | |
| 7 | | | | | | | 16 | | | | | |
| 8 | | | | | | | | 13 | | | | |
| 9 | | | | | | | | | 10 | | | |
| 10 | | | | | | | | | | 7 | | |
| 11 | | | | | | | | | | | 4 | |
| 12 | | | | | | | | | | | | 1 |

TABLE EX-26C

Output Head Configuration (spot pattern)—Rows: 12  Spots/Row: 1
Corresponding Figures: FIGS. 71–74  Vertical Adjustment: 4 lines
Pattern of Spots: Ramp  Effective Vertical Spot Spacing: 1 line
Scan Pass: 3  Blank = b  Effective Horizontal Spot Spacing: 3 dots

| Line | Ra | Rb | Rc | Rd | Ga | Gb | Gc | Gd | Ba | Bb | Bc | Bd |
|---|---|---|---|---|---|---|---|---|---|---|---|---|
| | time t1920 | | | | | Dot Locations | | | | | | |
| 1 | 1920 | | | | | | | | | | | |
| 2 | | 1917 | | | | | | | | | | |
| 3 | | | 1914 | | | | | | | | | |
| 4 | | | | 1911 | | | | | | | | |
| 5 | | | | | 1908 | | | | | | | |
| 6 | | | | | | 1905 | | | | | | |
| 7 | | | | | | | 1902 | | | | | |
| 8 | | | | | | | | 1899 | | | | |
| 9 | | | | | | | | | 1896 | | | |
| 10 | | | | | | | | | | 1893 | | |
| 11 | | | | | | | | | | | 1890 | |
| 12 | | | | | | | | | | | | 1887 |

| Line | Ra | Rb | Rc | Rd | Ga | Gb | Gc | Gd | Ba | Bb | Bc | Bd |
|---|---|---|---|---|---|---|---|---|---|---|---|---|
| | time t1938 | | | | | Dot Locations | | | | | | |
| 1 | b | | | | | | | | | | | |
| 2 | | b | | | | | | | | | | |
| 3 | | | b | | | | | | | | | |
| 4 | | | | b | | | | | | | | |
| 5 | | | | | b | | | | | | | |
| 6 | | | | | | b | | | | | | |
| 7 | | | | | | | 1920 | | | | | |
| 8 | | | | | | | | 1917 | | | | |
| 9 | | | | | | | | | 1914 | | | |
| 10 | | | | | | | | | | 1911 | | |
| 11 | | | | | | | | | | | 1908 | |
| 12 | | | | | | | | | | | | 1905 |

| Line | Ra | Rb | Rc | Rd | Ga | Gb | Gc | Gd | Ba | Bb | Bc | Bd |
|---|---|---|---|---|---|---|---|---|---|---|---|---|
| | time t1953 | | | | | Dot Locations | | | | | | |
| 1 | b | | | | | | | | | | | |
| 2 | | b | | | | | | | | | | |
| 3 | | | b | | | | | | | | | |
| 4 | | | | b | | | | | | | | |
| 5 | | | | | b | | | | | | | |
| 6 | | | | | | b | | | | | | |
| 7 | | | | | | | b | | | | | |
| 8 | | | | | | | | b | | | | |
| 9 | | | | | | | | | b | | | |
| 10 | | | | | | | | | | b | | |
| 11 | | | | | | | | | | | b | |
| 12 | | | | | | | | | | | | 1920 | spot pattern, as Ra, Rb, Rc, Rd, Ga, Gb, Gc, Gd, Ba, Bb, Bc and Bd, respectively. As shown in FIG. 72 and Table EX-26A, all lines of a frame will be scanned with spots of all three primary colors in 272 scan passes and lines L1–L4 of a frame will be scanned with spots of all three primary colors after initial scan passes s1, s2 and s3. FIGS. 73A–73J and 74A–74J show, and Tables EX-26B and EX-26C describe, the time delays or time combining necessary to scan each dot location in a line for scan pass s3, revealing the necessity of 1953 horizontal adjustments of the spots to complete each scan or an overscan at one side of the frame of 33 dot locations. The primary differences between Examples 25 and 26 and previous examples is that the line reordering for the video pixel data is substantially less complicated than for the preceding examples where all three primary colors are written in substantially the same line. For Examples 25 and 26, the pixel data needs not be reordered in the same way, and may simply be delayed for the necessary time until the line is written. In Examples 25 and 26, instead of placing the pixel data in the buffer in the reordered position corresponding to the line position so that each line can be written at a particular time out of order from the order in the video pixel data, a simple delay can be employed because the order in which the lines are written is not out of order, but only time shifted. The time combining delay within a line of dot locations is similar to that of prior examples, except it is combined with a delay of a number of scan passes, in Examples 25 and 26, four scan passes.

For the following further illustration of the differences between the reordering of Examples 25 and 26 and the prior examples, we assume the same configuration of Examples 25 and 26 and the configuration of the preferred embodiment, namely an effective row spacing of 5 lines as in FIG. 17. Thus, in a frame defined by the pixel data, at time 1 of scan pass s1, pixel location 1 in line 1 is scheduled to be written with red, green and blue values. In order to write dot location D1 in line L1 with the assumed 4×3 configuration, other lines of the frame must be written in the following order: lines L4, L8 & L3, L12 & L7 & L2, and then line L1 along with lines L16 & L11 & L6. With Examples 25 and 26, to write dot location D1 in line L1, red is written at the same time called for in the pixel data, at time t1 of scan pass s1, green is written at time t10 of scan pass s5, or delayed 4 lines and 9 dot shifts; and blue is written at time t19 of scan pass s9, or delayed 8 lines and 18 dot shifts.

While the pattern of spots projected on the screen by the linear array, whether it be that shown in Examples 23 and 24, or that shown in Examples 25 and 26, is aligned in a straight angled line with respect to horizontal, this array is in actuality a two-dimensional pattern of spots as it is swept in the sweep direction during the scan pass.

EXAMPLE 27

Figure 75:
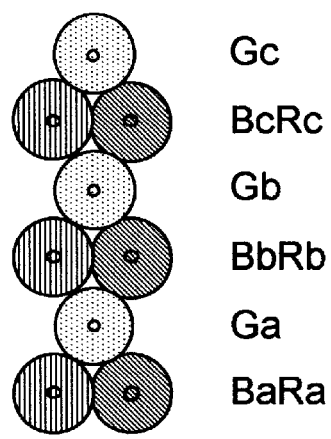
FIG. 75 is a diagram of a 9 emitting end "totem pole" array for use in the system of FIG. 1 according to Example 26.
Figure 75S:
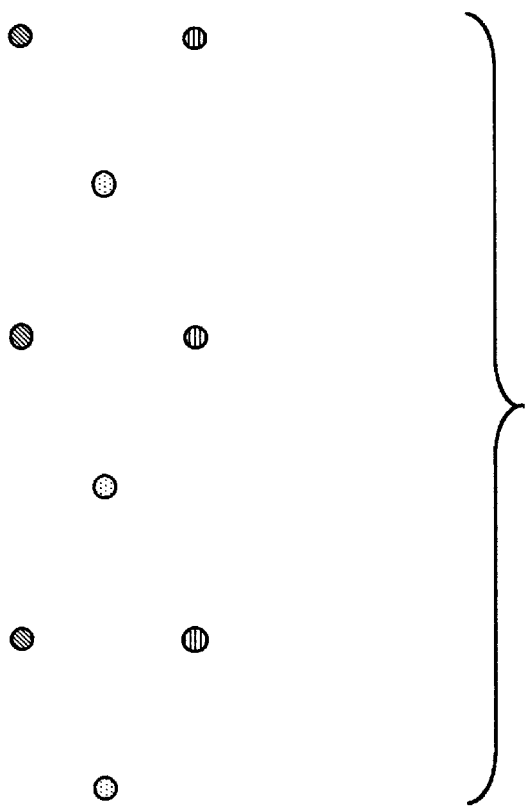
FIG. 75S is a diagram of the pattern of spots projected on a screen using the array shown in FIG. 75.

For Example 27, FIG. 75 shows an alternate output head emitting head configuration comprising three fibers of each color (referred to herein as the "totem pole" configuration), which is substantially a combination of the slanted linear arrays of Examples 25 and 26 shown in FIGS. 67 and 71, respectively, and the log configuration of FIG. 28, wherein two emitting ends are positioned in a row above (and below) a single emitting end. Preferably, the green beams are assigned to the row having a single fiber because the fiber may be a smaller single mode fiber, with the benefits previously discussed. For convenience, we refer to a contiguous 3 emitting end or spot group of red, green, blue colors as an RGB group (A, B, C), similar to the row designations used for Example 22. For this hybrid 6 row by two/one spot per row spot pattern on the screen of this Example 27, we assume a 3 line vertical adjustment equal to the number of RGB groups. We further identify each of the nine spots, from top to bottom of the spot pattern, as Ra, Ga, Ba, Rb, Gb, Bb, Rc, Gc, and

TABLE EX-27A

Output Head Configuration (spot pattern)—Rows: 8  Spots/Row: 2/1
Corresponding Figure: FIGS. 75–76  Vertical Adjustment: 3 lines
Blank = b  Effective Row Spacing (all spots): 4 lines

| | Lines Written by Respective Spot Groups | | | | | |
|---|---|---|---|---|---|---|
| Scan Pass | RaBa | Ga | RbBb | Gb | RcBc | Gc |
| 1 | b | b | b | b | b | 3 |
| 2 | b | b | b | b | 2 | 6 |
| 3 | b | b | b | 1 | 5 | 9 |
| 4 | b | b | b | 4 | 8 | 12 |
| 5 | b | b | 3 | 7 | 11 | 15 |
| 6 | b | 2 | 6 | 10 | 14 | 18 |
| 7 | 1 | 5 | 9 | 13 | 17 | 21 |
| 8 | 4 | 8 | 12 | 16 | 20 | 24 |
| . | . | . | . | . | . | . |
| . | . | . | . | . | . | . |
| . | . | . | . | . | . | . |
| 359 | 1057 | 1061 | 1065 | 1069 | 1073 | 1077 |
| 360 | 1060 | 1064 | 1068 | 1072 | 1076 | 1080 |
| 361 | 1063 | 1067 | 1071 | 1075 | 1079 | b |
| 362 | 1066 | 1070 | 1074 | 1078 | b | b |
| 363 | 1069 | 1073 | 1077 | b | b | b |
| 364 | 1072 | 1076 | 1080 | b | b | b |
| 365 | 1075 | 1079 | b | b | b | b |
| 366 | 1078 | b | b | b | b | b |

Bc, respectively. Spots that are blanked are indicated in outline, and the spots that currently illuminate a dot location are indicated in boldface. As shown in FIG. 76 and Table EX-27A, all lines of a frame will be scanned with spots of all three primary colors in 366 scan passes and lines L1–L3 of a frame will be scanned with spots of all three primary colors after initial scan passes s1–s7. FIGS. 77A–77D and 78A–78D show, and Tables EX-27B and EX-27C describe, the time delays necessary to scan each dot location in a line for scan pass s7, revealing the necessity of 1926 horizontal adjustments of the spots to complete each scan pass, or an overscan at each side of the frame of 6 dot locations.

TABLE EX-27B

Output Head Configuration (spot pattern)—Rows: 6  Spots/Row: 2/1
Corresponding Figures: FIGS. 75–78  Vertical Adjustment: 3 lines
Spot Pattern: Totem Pole  Effective Row Spacing (all rows): 4 line
Scan Pass: 7  Blank = b  Spots Spacing w/I Red-Blue Row: 6

| | Ra | Ba | Ga | Rb | Bb | Gb | Rc | Bc | Gc |
|---|---|---|---|---|---|---|---|---|---|
| Line | time t1 | | | | Dot Locations | | | | |
| 1 | b | 1 | | | | | | | |
| 3 | | | | | | | | | |
| 5 | | | | b | | | | | |
| 7 | | | | | | | | | |
| 9 | | | | | | b | 1 | | |
| 11 | | | | | | | | | |
| 13 | | | | | | | b | | |
| 15 | | | | | | | | | |
| 17 | | | | | | | | b | 1 |
| 19 | | | | | | | | | |
| 21 | | | | | | | | | b |

| Line | time t4 | | | | Dot Locations | | | | |
|---|---|---|---|---|---|---|---|---|---|
| 1 | 4 | b | | | | | | | |
| 3 | | | | | | | | | |
| 5 | | | | 1 | | | | | |
| 7 | | | | | | | | | |
| 9 | | | | | | 4 | b | | |
| 11 | | | | | | | | | |
| 13 | | | | | | | 1 | | |
| 15 | | | | | | | | | |
| 17 | | | | | | | | 4 | b |
| 19 | | | | | | | | | |
| 21 | | | | | | | | | 1 |

| Line | time t7 | | | | Dot Locations | | | | |
|---|---|---|---|---|---|---|---|---|---|
| 1 | 7 | 1 | | | | | | | |
| 3 | | | | | | | | | |
| 5 | | | | 4 | | | | | |
| 7 | | | | | | | | | |
| 9 | | | | | | 7 | 1 | | |
| 11 | | | | | | | | | |
| 13 | | | | | | | 4 | | |
| 15 | | | | | | | | | |
| 17 | | | | | | | | 7 | 1 |
| 19 | | | | | | | | | |
| 21 | | | | | | | | | 4 |

TABLE EX-27C

Output Head Configuration (spot pattern)—Rows: 6  Spots/Row: 2/1
Corresponding Figures: FIGS. 75–78  Vertical Adjustment: 4 lines
Spot Pattern: Totem Pole  Effective Row Spacing (all rows): 3 line
Scan Pass: 7  Blank = b  Spots Spacing w/I Red-Blue Row: 6

| | Ra | Ba | Ga | Rb | Bb | Gb | Rc | Bc | Gc |
|---|---|---|---|---|---|---|---|---|---|
| Line | time t1920 | | | | Dot Locations | | | | |
| 1 | 1920 | 1914 | | | | | | | |
| 3 | | | | | | | | | |
| 5 | | | | | | 1917 | | | |

TABLE EX-27C-continued

Output Head Configuration (spot pattern)—Rows: 6  Spots/Row: 2/1
Corresponding Figures: FIGS. 75–78    Vertical Adjustment: 4 lines
Spot Pattern: Totem Pole    Effective Row Spacing (all rows): 3 line
Scan Pass: 7    Blank = b    Spots Spacing w/I Red-Blue Row: 6

| | Ra | Ba | Ga | Rb | Bb | Gb | Rc | Bc | Gc |
|---|---|---|---|---|---|---|---|---|---|
| 7 | | | | | | | | | |
| 9 | | | | 1920 | 1914 | | | | |
| 11 | | | | | | | | | |
| 13 | | | | | | 1917 | | | |
| 15 | | | | | | | | | |
| 17 | | | | | | | 1920 | 1914 | |
| 19 | | | | | | | | | |
| 21 | | | | | | | | | 1917 |

| Line | time t1923 | | | Dot Locations | | | | | |
|---|---|---|---|---|---|---|---|---|---|
| 1 | b | 1917 | | | | | | | |
| 3 | | | | | | | | | |
| 5 | | | 1920 | | | | | | |
| 7 | | | | | | | | | |
| 9 | | | | b | 1917 | | | | |
| 11 | | | | | | | | | |
| 13 | | | | | | 1920 | | | |
| 15 | | | | | | | | | |
| 17 | | | | | | | b | 1917 | |
| 19 | | | | | | | | | |
| 21 | | | | | | | | | 1920 |

| Line | time t1926 | | | Dot Locations | | | | | |
|---|---|---|---|---|---|---|---|---|---|
| 1 | b | 1920 | | | | | | | |
| 3 | | | | | | | | | |
| 5 | | | b | | | | | | |
| 7 | | | | | | | | | |
| 9 | | | | b | 1920 | | | | |
| 11 | | | | | | | | | |
| 13 | | | | | | b | | | |
| 15 | | | | | | | | | |
| 17 | | | | | | | b | 1920 | |
| 19 | | | | | | | | | |
| 21 | | | | | | | | | b |

EXAMPLES 28–30

All of the preceding examples have assumed that the image is progressively scanned, that is, all of the lines are written in each vertical frame pass. Although progressive scanning is the preferred mode for laser projection, interlaced scanning is also facilitated by our invention, and may be necessary as a practical matter for interlaced image input data. As shown in the following three Examples 28–30, our invention facilitates the implementation of interlacing.

These Examples 28–30 are based on the preferred laser projection system of FIGS. 1 and 2, and use substantially the same output head configurations and corresponding spot patterns of the previous progressive scanning Examples. The interlaced scanning Examples 28–30 employ reordering of the input pixel data similar to that for the progressive scanning examples, but use different adjustments of the galvanometer mirror. While the prior examples assume the preferred standard HDTV resolution of 1920×1080 p at a refresh rate of 60 frames per second or better, the following Examples 28–30 assume an alternate HDTV resolution of 1920×1080 i, where 60 subframes are written per second, producing 30 interlaced complete frames per second. Although our examples illustrate interlacing using two subframes, it should be understood that more than two subframes could be employed. One possible interlacing would be to employ three subframes, with two sweep paths of other subframes between lines written during each sweep or scan pass of a subframe. The following examples illustrate three different ways of accomplishing interlacing with our invention.

EXAMPLE 28

For this Example 28, we assume a 12 spot pattern using a 12 emitting end output head in a ramp configuration projecting a pattern of spots such as shown in Example 25 and in FIGS. 67 and 67S. We further assume an effective row spacing of 2 lines, as opposed to the 1 line effective row spacing of Example 25. The ramp configuration of FIG. 67 facilitates adjustment of the effective row spacing from 1 line to 2 lines. The effective row spacing on the screen is changed by varying the angle of the ramp from horizontal, i.e., a larger angle than shown in FIG. 67 will produce a pattern of spots with a vertical effective row spacing twice that shown in FIG. 67S. Moreover, instead of the four line vertical adjustment of Example 25, we instead assume an eight line vertical adjustment between the initiation of each sweep during the scanning of each subframe. This is accomplished by slowing the mirror polygon to half the rate described for Example 25.

We further assume that the galvanometer is positioned at the beginning of the first of the pair of subframes to begin writing of the subframe so that the odd-numbered lines, i.e., 1, 3, 5, 7, 9, . . . , 1075, 1077, and 1079 are written, and the galvanometer is positioned at the beginning of the second of the pair of subframes to begin writing of the subframe so that the even-numbered lines, i.e., 2, 4, 6, 8, 10, . . . , 1076, 1078, and 1080 are written.

Referring to FIGS. 79A–79H and Table EX-28A, the reordering of the data for the first interlaced subframe, referred to as "Subframe A", of input data at the beginning and end of Subframe A is illustrated. It should be noted that the number of scan passes to write the first subframe is half that required to write a complete frame in progressive scanning of Example 25, namely 136 for interlaced versus 272 for progressive. Instead of beginning with writing line 4 of the frame as in the progressive scanning Example 25, Subframe A begins with writing line 7 of the frame, which is effectively the fourth line of Subframe A at an effective row spacing for the subframe of 1 line. The effective subframe row spacing of 1 subframe line is effective for the same basic reasons as outlined for the 1 line effective row spacing illustrated in FIGS. 68A–68J for Example 25. The reordering of the data for the

TABLE EX-28A

Output Head Configuration (spot pattern)—Rows: 12    Spots/Row: 1
Corresponding Fig: FIGS. 67, 79    Vertical Adjustment: 8 lines
Subframe: A    Blank = b    Effective Vertical Spacing: 2 lines

| Scan Pass | Ra | Ga | Ba | Rb | Gb | Bb | Rc | Gc | Bc | Rd | Gd | Bd |
|---|---|---|---|---|---|---|---|---|---|---|---|---|
| 1 | b | b | b | b | b | b | b | b | 1 | 3 | 5 | 7 |
| 2 | b | b | b | b | 1 | 3 | 5 | 7 | 9 | 11 | 13 | 15 |
| 3 | 1 | 3 | 5 | 7 | 9 | 11 | 13 | 15 | 17 | 19 | 21 | 23 |
| 4 | 9 | 11 | 13 | 15 | 17 | 19 | 21 | 23 | 25 | 27 | 29 | 31 |
| . | . | . | . | . | . | . | . | . | . | . | . | . |
| . | . | . | . | . | . | . | . | . | . | . | . | . |
| . | . | . | . | . | . | . | . | . | . | . | . | . |
| 134 | 1049 | 1051 | 1053 | 1055 | 1057 | 1059 | 1061 | 1063 | 1065 | 1067 | 1069 | 1071 |
| 135 | 1057 | 1059 | 1061 | 1063 | 1065 | 1067 | 1069 | 1071 | 1073 | 1075 | 1077 | 1079 |
| 136 | 1065 | 1067 | 1069 | 1071 | 1073 | 1075 | 1077 | 1079 | b | b | b | b |
| 137 | 1073 | 1075 | 1077 | 1079 | b | b | b | b | b | b | b | b | second subframe of a complete frame, referred to as "Subframe B", is illustrated in FIGS. 80A–80H and Table EX-28B. It should be noted that each subframe writes 540 lines of the 1080 lines of a complete frame, and that the two subframes interlaced will write the same number of scan passes as one frame of progressive scanning, albeit at half the frames per second. Given an interlaced source signal, this approach is uncomplicated, because the source material for a given subframe is completely written in one vertical sweep, and the only compensation for interlacing is the subsequent positioning of the galvanometer. In conventional interlaced images, the galvanometer would move half a subframe line distance further down to begin the even fields, but if for example we are adjusting 4 subframe lines at one time, the vertical difference in the sweep start is only ⅛ the distance moved down per scan pass. Thus a system according to our invention performing interlaced scanning with the output head configuration described will write 540 lines with a spot of each of the three selected colors on each of the two successive subframes, completing all 1080 lines in two vertical sweeps. The configuration in FIGS. 67 and 67S has a line spacing appropriate to 1080 lines per frame. For interlacing using this approach, one would increase the slant of the emitting end configuration shown in FIG. 67 such that the spacing would be appropriate to 540 lines per frame, with twice as much vertical distance between each subframe line.

EXAMPLE 29

In Example 29, our next preferred example, we show interlacing where the re-ordering for the subframes is handled differently. In this example, the head configuration is "bricks" as in FIGS. 5 and 5S or "logs" as in FIGS. 28 and 28S. Herein the subframes are not divided by odd-even lines, but divided by odd-even pass number. Referring to the prior Examples 1, 4, 5, 6, 7 and 9, and in particular to Example 6, at the beginning of the first horizontal pass in the first Subframe A, the galvanometer starts in a position to write those lines exactly as in the first pass in the prior

TABLE EX-28B

Output Head Configuration (spot pattern)—Rows: 12    Spots/Row: 1
Corresponding Fig: FIGS. 67, 80    Vertical Adjustment: 8 lines
Subframe: B    Blank = b    Effective Vertical Spacing: 2 lines

| Scan Pass | Ra | Ga | Ba | Rb | Gb | Bb | Rc | Gc | Bc | Rd | Gd | Bd |
|---|---|---|---|---|---|---|---|---|---|---|---|---|
| 1 | b | b | b | b | b | b | b | b | 2 | 4 | 6 | 8 |
| 2 | b | b | b | b | 2 | 4 | 6 | 8 | 10 | 12 | 14 | 16 |
| 3 | 2 | 4 | 6 | 8 | 10 | 12 | 14 | 16 | 18 | 20 | 22 | 24 |
| 4 | 10 | 12 | 14 | 16 | 18 | 20 | 22 | 24 | 26 | 28 | 30 | 32 |
| . | . | . | . | . | . | . | . | . | . | . | . | . |
| . | . | . | . | . | . | . | . | . | . | . | . | . |
| . | . | . | . | . | . | . | . | . | . | . | . | . |
| 134 | 1050 | 1052 | 1054 | 1056 | 1058 | 1060 | 1062 | 1064 | 1066 | 1068 | 1070 | 1072 |
| 135 | 1058 | 1060 | 1062 | 1064 | 1066 | 1068 | 1070 | 1072 | 1074 | 1076 | 1078 | 1080 |
| 136 | 1066 | 1068 | 1070 | 1072 | 1074 | 1076 | 1078 | 1080 | b | b | b | b |
| 137 | 1074 | 1076 | 1078 | 1080 | b | b | b | b | b | b | b | b | examples. For the next pass, the galvanometer has moved down 8 full

TABLE EX-29A

Output Head Configuration (spot pattern)—Rows: 4  Spots/Row: 3
Corresponding Figure: FIG. 81  Vertical Adjustment: 8 lines
Subframe: A  Effective Row Spacing (all rows): 9 lines Lines Written by Respective Rows of Emitting Ends

| Scan Pass | RowA | RowB | RowC | RowD |
|---|---|---|---|---|
| 1 | b | b | b | 4 |
| 2 | b | b | 3 | 12 |
| 3 | b | 2 | 11 | 20 |
| 4 | 1 | 10 | 19 | 28 |
| 5 | 9 | 18 | 27 | 36 |
| . | . | . | . | . |
| . | . | . | . | . |
| . | . | . | . | . |
| 134 | 1041 | 1050 | 1059 | 1068 |
| 135 | 1049 | 1058 | 1067 | 1076 |
| 136 | 1057 | 1066 | 1075 | b |
| 137 | 1065 | 1074 | b | b |
| 138 | 1073 | b | b | b | frame lines, rather than 4 lines of the prior Examples, and on the next pass writes those lines written by the third pass in the referenced Examples. Thus all the lines appropriate to the odd numbered passes are successively written, as shown in Table 29A and FIGS. 81A–81H for the first Subframe A of the frame being written.

For the first pass of the next Subframe B, the galvanometer is positioned 4 full frame lines lower at the beginning of the first scan pass than the initial scan pass of Subframe A. This first scan pass of Subframe B corresponds to the second scan pass of the progressively scanned frame of Example 6, as shown in Table EX-6A. At the beginning of the next scan pass of Subframe B, the galvanometer has been adjusted down eight lines from the beginning of the first scan pass, and so forth. For each subframe, the process ends when half the number of passes is made when compared with the referenced examples. For this interlacing process, however, the reordering of the data is more complex. This is in part because if a standard interlaced input signal is employed, the interlacing of

TABLE EX-29B

Output Head Configuration (spot pattern)—Rows: 4  Spots/Row: 3
Corresponding Figure: FIG. 82  Vertical Adjustment: 8 lines
Subframe: B  Effective Row Spacing (all rows): 9 lines Lines Written by Respective Rows of Emitting Ends

| Scan Pass | RowA | RowB | RowC | RowD |
|---|---|---|---|---|
| 1 | b | b | b | 8 |
| 2 | b | b | 7 | 16 |
| 3 | b | 6 | 15 | 24 |
| 4 | 5 | 14 | 23 | 32 |
| 5 | 13 | 22 | 31 | 40 |
| . | . | . | . | . |
| . | . | . | . | . |
| . | . | . | . | . |
| 134 | 1045 | 1054 | 1063 | 1072 |
| 135 | 1053 | 1062 | 1071 | 1080 |
| 136 | 1061 | 1070 | 1079 | b |
| 137 | 1069 | 1078 | b | b |
| 138 | 1077 | b | b | b | the two subframes must be reordered to be written in the order specified for this Example 29.

EXAMPLE 30

For this Example 30, we assume a 12 spot pattern using a 12 emitting end output head in a four row by three emitting ends per row array, with red, green and blue beams assigned to the three fibers in each row, such as shown in FIGS. 5 and 5S and in FIGS. 28 and 28S. Unlike Example 29, however, this type of interlacing employs an adjustment of the effective row spacing similar to that of Example 28, wherein the effective row spacing is substantially doubled, and odd and even lines written during successive subframes.

Unlike Example 28, the effective row spacing of the brick or log pattern output head configuration of this Example 30 cannot be as easily adjusted as with the ramp configuration of Example 28. Further, an effective row spacing of 10 lines is required, as opposed to the 9 lines effective row spacing of Examples 6 and 29. As with Examples 28 and 29, an eight full frame line vertical adjustment is assumed between the initiation of each sweep during the scanning of each subframe, to effectively write the odd-numbered lines, i.e., 1, 3, 5, 7, 9, . . ., 1075, 1077, and 1079 during Subframe A, and the even-numbered lines, i.e., 2, 4, 6, 8, 10, 1076, 1078, and 1080 during Subframe B.

Referring to FIGS. 83A–83H and Table EX-30A, the reordering of the input data at the beginning and end of Subframe A is

TABLE EX-30A

Output Head Configuration (spot pattern)—Rows: 4  Spots/Row: 3
Corresponding Figure: FIG. 83  Vertical Adjustment: 8 lines
Subframe: A  Effective Row Spacing (all rows): 10 lines Lines Written by Respective Rows of Emitting Ends

| Scan Pass | RowA | RowB | RowC | RowD |
|---|---|---|---|---|
| 1 | b | b | b | 7 |
| 2 | b | b | 5 | 15 |
| 3 | b | 3 | 13 | 23 |
| 4 | 1 | 11 | 21 | 31 |
| 5 | 9 | 19 | 29 | 39 |
| . | . | . | . | . |
| . | . | . | . | . |
| . | . | . | . | . |
| 135 | 1049 | 1059 | 1069 | 1079 |
| 136 | 1057 | 1067 | 1077 | b |
| 137 | 1065 | 1075 | b | b |
| 138 | 1073 | b | b | b | illustrated. As with Example 29, the number of scan passes to write the first Subframe A is half that required to write a complete frame in progressive scanning of Example 6, namely 138 for interlaced versus 276 for progressive. Instead of beginning with writing line 4 of the frame as in the progressive scanning Example 6, Subframe A begins with writing line 7 of the frame, which is effectively line 4 of the subframe at an effective row line spacing for the subframe of 5 lines. This explains why an effective row spacing of ten complete frame lines that is ineffective for progressive scanning is effective for interlaced scanning. The effective subframe row spacing of 5 subframe lines is effective for the same basic reasons as outlined for the five line effective row spacing illustrated in FIGS. 17A–17J for the first example of line reordering discussed herein.

The reordering of the data for the second subframe of a complete frame, referred to as "Subframe B", is illustrated in FIGS. 84A–84H and Table EX-30B. It should be noted that each subframe writes 540 lines of the 1080 lines of a complete frame, and that the two subframes interlaced will write the same number of scan passes as one frame of progressive scanning, albeit at half the frames per second.

If the same projection system is employed for both interlaced and progressive scanned image data, the effective row spacing of nine lines of a complete frame cannot be effectively halved for the appropriate subframe effective row spacing, which would be 4½ subframe lines.

TABLE EX-30B

Output Head Configuration (spot pattern)—Rows: 4  Spots/Row: 3
Corresponding Figure: FIG. 84  Vertical Adjustment: 8 lines
Subframe: B  Effective Row Spacing (all rows): 10 lines Lines Written by Respective Rows of Emitting Ends

| Scan Pass | RowA | RowB | RowC | RowD |
|---|---|---|---|---|
| 1 | b | b | b | 8 |
| 2 | b | b | 6 | 16 |
| 3 | b | 4 | 14 | 24 |
| 4 | 2 | 12 | 22 | 32 |
| 5 | 12 | 20 | 30 | 40 |
| . | . | . | . | . |
| . | . | . | . | . |
| . | . | . | . | . |
| 135 | 1050 | 1060 | 1070 | 1080 |
| 136 | 1058 | 1068 | 1078 | b |
| 137 | 1066 | 1076 | b | b |
| 138 | 1074 | b | b | b |

This is because we cannot divide an odd line spacing by two, given that for four simultaneous lines no even spacing works under the assumed conditions stated above. We must adjust the new modified line spacing, so that it scans an appropriate odd number of lines apart. This can be done, as described previously, by either changing the spacing of the lines by varying the galvanometer sweep distance, or moving the output head nearer or further from the screen.

To summarize these three examples, interlacing can be accomplished in a number of different ways, a wider variety than when only one line is being written per pass. Any of a number of interlacing processes may be selected within the present invention.

EXAMPLE 31

Figure 86:
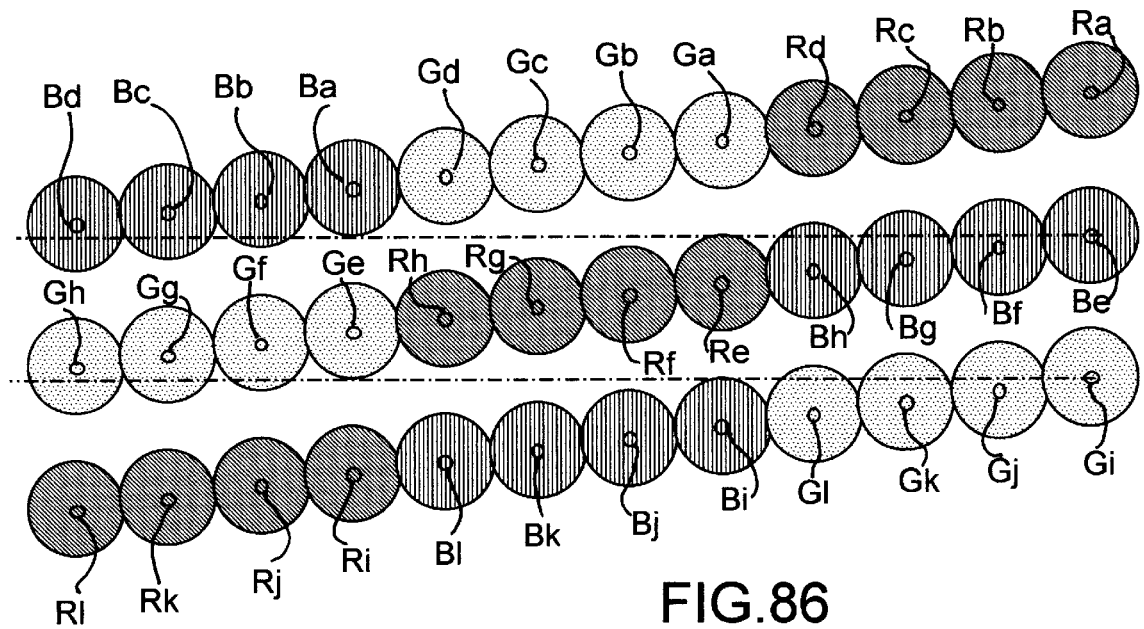
FIG. 86 is a diagram of a 36 emitting end linear array for use in the system of FIG. 1 according to Example 31 employing three rows of the array of Example 26 and FIG. 71.

FIG. 86 illustrates an extension of the ramp principle shown in Examples 25 and 26, wherein an array of 36 fibers arranged in a configuration of three rows of ramp configuration emitting ends. The slant or angle of the rows is selected to achieve an effective spot spacing of 1 line between the spots in each row projected by the array. Moreover, the distance between each row is selected to provide an effective spacing of 1 line between the spots projected by the beams emitted from the emitting ends at the opposite ends of adjacent rows. For this Example 31, the colors of the laser beams assigned to each fiber within each row are arranged in RRRR-GGGG-BBBB groups as in Example 26. A variety of arrangements of emitting ends within rows can be employed, including an arrangement such as in Example 25, so long as each column of emitting ends within the fiber output head is assigned one each of red, green and blue laser beams.

The resultant line reordering necessary to progressively scan a 1920×1080 p image on the screen is similar to that of Example 26 illustrated in FIGS. 72A–72H and Table EX-26. The writing of successive dot locations within lines during each scan pass for each row of ramped emitting ends would be similar to that of Tables

TABLE EX-31A

Output Head Configuration (spot pattern)—Rows: 36  Spots/Row: 1
Corresponding Figure: FIGS. 86, 87  Vertical Adjustment: 12 lines
Blank = b  Effective Vertical Spacing: 1 lines Lines Written by Respective Spots

| Scan Pass | Gi / Be / Ra | Gj / Bf / Rb | Gk / Bg / Rc | Gl / Bh / Rd | Bi / Re / Ga | Bj / Rf / Gb | Bk / Rg / Gc | Bl / Rh / Gd | Ri / Ge / Ba | Rj / Gf / Bb | Rk / Gg / Bc | Rl / Gh / Bd |
|---|---|---|---|---|---|---|---|---|---|---|---|---|
| 1 | b | b | b | b | b | b | b | b | b | b | b | b |
|  | b | b | b | b | b | b | b | b | b | b | b | b |
|  | 1 | 2 | 3 | 4 | 5 | 6 | 7 | 8 | 9 | 10 | 11 | 12 |
| 2 | b | b | b | b | b | b | b | b | b | b | b | b |
|  | 1 | 2 | 3 | 4 | 5 | 6 | 7 | 8 | 9 | 10 | 11 | 12 |
|  | 13 | 14 | 15 | 16 | 17 | 18 | 19 | 20 | 21 | 22 | 23 | 24 |
| 3 | 1 | 2 | 3 | 4 | 5 | 6 | 7 | 8 | 9 | 10 | 11 | 12 |
|  | 13 | 14 | 15 | 16 | 17 | 18 | 19 | 20 | 21 | 22 | 23 | 24 |
|  | 25 | 26 | 27 | 28 | 29 | 30 | 31 | 32 | 33 | 34 | 35 | 36 |
| 4 | 13 | 14 | 15 | 16 | 17 | 18 | 19 | 20 | 21 | 22 | 23 | 24 |
|  | 25 | 26 | 27 | 28 | 29 | 30 | 31 | 32 | 33 | 34 | 35 | 36 |
|  | 37 | 38 | 39 | 40 | 41 | 42 | 43 | 44 | 45 | 46 | 47 | 48 |
| . | . | . | . | . | . | . | . | . | . | . | . | . |
| . | . | . | . | . | . | . | . | . | . | . | . | . |
| 90 | 1245 | 1246 | 1247 | 1248 | 1249 | 1250 | 1251 | 1252 | 1253 | 1254 | 1255 | 1256 |
|  | 1257 | 1258 | 1259 | 1260 | 1261 | 1262 | 1263 | 1264 | 1265 | 1266 | 1267 | 1268 |
|  | 1269 | 1270 | 1271 | 1272 | 1273 | 1274 | 1275 | 1276 | 1277 | 1278 | 1279 | 1280 |
| 91 | 1257 | 1258 | 1259 | 1260 | 1261 | 1262 | 1263 | 1264 | 1265 | 1266 | 1267 | 1268 |
|  | 1269 | 1270 | 1271 | 1272 | 1273 | 1274 | 1275 | 1276 | 1277 | 1278 | 1279 | 1280 |
|  | b | b | b | b | b | b | b | b | b | b | b | b |
| 92 | 1269 | 1270 | 1271 | 1272 | 1273 | 1274 | 1275 | 1276 | 1277 | 1278 | 1279 | 1280 |
|  | b | b | b | b | b | b | b | b | b | b | b | b |
|  | b | b | b | b | b | b | b | b | b | b | b | b |

TABLE EX-31B

Output Head Configuration (spot pattern)—Rows: 36    Spots/Row: 1  
Corresponding Figures: FIGS. 86, 87    Vertical Adjustment: 12 lines  
Pattern of Spots: MultiRamp    EffectiveVerticalSpotSpacing: 1 line  
Scan Pass: 3    Blank = b    EffectiveHorizontalSpotSpacing: 3 dots

| Line | Gi Be Ra | Gj Bf Rb | Gk Bg Rc | Gl Bh Rd | Bi Re Ga | Bj Rf Gb | Bk Rg Gc | Bl Rh Gd | Ri Ge Ba | Rj Gf Bb | Rk Gg Bc | Rl Gh Bd |
|---|---|---|---|---|---|---|---|---|---|---|---|---|
| | | | | | | time t1 | | Dot Locations | | | | |
| 1 | | | | | | | | | | | | 1 |
| 2 | | | | | | | | | | | b | |
| 3 | | | | | | | | | | b | | |
| 4 | | | | | | | | | b | | | |
| 5 | | | | | | | | b | | | | |
| 6 | | | | | | | b | | | | | |
| 7 | | | | | | b | | | | | | |
| 8 | | | | | b | | | | | | | |
| 9 | | | | b | | | | | | | | |
| 10 | | | | b | | | | | | | | |
| 11 | | | b | | | | | | | | | |
| 12 | b | | | | | | | | | | | |
| 13 | | | | | | | | | | | | 1 |
| 14 | | | | | | | | | | | b | |
| 15 | | | | | | | | | | b | | |
| 16 | | | | | | | | | b | | | |
| 17 | | | | | | | | b | | | | |
| 18 | | | | | | | b | | | | | |
| 19 | | | | | | b | | | | | | |
| 20 | | | | | b | | | | | | | |
| 21 | | | | b | | | | | | | | |
| 22 | | | b | | | | | | | | | |
| 23 | | | b | | | | | | | | | |
| 24 | b | | | | | | | | | | | |
| 25 | | | | | | | | | | | | 1 |
| 26 | | | | | | | | | | | b | |
| 27 | | | | | | | | | | b | | |
| 28 | | | | | | | | | b | | | |
| 29 | | | | | | | | b | | | | |
| 30 | | | | | | | b | | | | | |
| 31 | | | | | | b | | | | | | |
| 32 | | | | | b | | | | | | | |
| 33 | | | | b | | | | | | | | |
| 34 | | | b | | | | | | | | | |
| 35 | | b | | | | | | | | | | |
| 36 | b | | | | | | | | | | | |

TABLE EX-31C

Output Head Configuration (spot pattern)—Rows: 36    Spots/Row: 1  
Corresponding Figures: FIGS. 86, 87    Vertical Adjustment: 12 lines  
Pattern of Spots: MultiRamp    EffectiveVerticalSpotSpacing: 1 line  
Scan Pass: 3    Blank = b    EffectiveHorizontalSpotSpacing: 3 dots

| Line | Gi Be Ra | Gj Bf Rb | Gk Bg Rc | Gl Bh Rd | Bi Re Ga | Bj Rf Gb | Bk Rg Gc | Bl Rh Gd | Ri Ge Ba | Rj Gf Bb | Rk Gg Bc | Rl Gh Bd |
|---|---|---|---|---|---|---|---|---|---|---|---|---|
| | | | | | | time t16 | | Dot Locations | | | | |
| 1 | | | | | | | | | | | | 16 |
| 2 | | | | | | | | | | | 13 | |
| 3 | | | | | | | | | | 10 | | |
| 4 | | | | | | | | | 7 | | | |
| 5 | | | | | | | | 4 | | | | |
| 6 | | | | | | | 1 | | | | | |
| 7 | | | | | | b | | | | | | |
| 8 | | | | | b | | | | | | | |
| 9 | | | | b | | | | | | | | |
| 10 | | | b | | | | | | | | | |
| 11 | | b | | | | | | | | | | |
| 12 | b | | | | | | | | | | | |
| 13 | | | | | | | | | | | | 16 |
| 14 | | | | | | | | | | | 13 | |
| 15 | | | | | | | | | | 10 | | |
| 16 | | | | | | | | | 7 | | | |
| 17 | | | | | | | | 4 | | | | |

TABLE EX-31C-continued

Output Head Configuration (spot pattern)—Rows: 36    Spots/Row: 1  
Corresponding Figures: FIGS. 86, 87    Vertical Adjustment: 12 lines  
Pattern of Spots: MultiRamp    EffectiveVerticalSpotSpacing: 1 line  
Scan Pass: 3    Blank = b    EffectiveHorizontalSpotSpacing: 3 dots

| Line | Gi Be Ra | Gj Bf Rb | Gk Bg Rc | Gl Bh Rd | Bi Re Ga | Bj Rf Gb | Bk Rg Gc | Bl Rh Gd | Ri Ge Ba | Rj Gf Bb | Rk Gg Bc | Rl Gh Bd |
|---|---|---|---|---|---|---|---|---|---|---|---|---|
| | | | | | | time t16 | | Dot Locations | | | | |
| 18 | | | | | | | 1 | | | | | |
| 19 | | | | | | b | | | | | | |
| 20 | | | | | b | | | | | | | |
| 21 | | | | b | | | | | | | | |
| 22 | | | b | | | | | | | | | |
| 23 | | b | | | | | | | | | | |
| 24 | b | | | | | | | | | | | |
| 25 | | | | | | | | | | | | 16 |
| 26 | | | | | | | | | | | 13 | |
| 27 | | | | | | | | | | 10 | | |
| 28 | | | | | | | | | 7 | | | |
| 29 | | | | | | | | 4 | | | | |
| 30 | | | | | | | 1 | | | | | |
| 31 | | | | | | b | | | | | | |
| 32 | | | | | b | | | | | | | |
| 33 | | | | b | | | | | | | | |
| 34 | | | b | | | | | | | | | |
| 35 | | b | | | | | | | | | | |
| 36 | b | | | | | | | | | | | |

TABLE EX-31D

Output Head Configuration (spot pattern)—Rows: 36    Spots/Row: 1  
Corresponding Figures: FIGS. 86, 87    Vertical Adjustment: 12 lines  
Pattern of Spots: MultiRamp    EffectiveVerticalSpotSpacing: 1 line  
Scan Pass: 3    Blank = b    EffectiveHorizontalSpotSpacing: 3 dots

| Line | Gi Be Ra | Gj Bf Rb | Gk Bg Rc | Gl Bh Rd | Bi Re Ga | Bj Rf Gb | Bk Rg Gc | Bl Rh Gd | Ri Ge Ba | Rj Gf Bb | Rk Gg Bc | Rl Gh Bd |
|---|---|---|---|---|---|---|---|---|---|---|---|---|
| | | | | | | time t34 | | Dot Locations | | | | |
| 1 | | | | | | | | | | | | 34 |
| 2 | | | | | | | | | | | 31 | |
| 3 | | | | | | | | | | 28 | | |
| 4 | | | | | | | | | 25 | | | |
| 5 | | | | | | | | 22 | | | | |
| 6 | | | | | | | 19 | | | | | |
| 7 | | | | | | 16 | | | | | | |
| 8 | | | | | 13 | | | | | | | |
| 9 | | | | 10 | | | | | | | | |
| 10 | | | 7 | | | | | | | | | |
| 11 | | 4 | | | | | | | | | | |
| 12 | 1 | | | | | | | | | | | |
| 13 | | | | | | | | | | | | 34 |
| 14 | | | | | | | | | | | 31 | |
| 15 | | | | | | | | | | 28 | | |
| 16 | | | | | | | | | 25 | | | |
| 17 | | | | | | | | 22 | | | | |
| 18 | | | | | | | 19 | | | | | |
| 19 | | | | | | 16 | | | | | | |
| 20 | | | | | 13 | | | | | | | |
| 21 | | | | 10 | | | | | | | | |
| 22 | | | 7 | | | | | | | | | |
| 23 | | 4 | | | | | | | | | | |
| 24 | 1 | | | | | | | | | | | |
| 25 | | | | | | | | | | | | 34 |
| 26 | | | | | | | | | | | 31 | |
| 27 | | | | | | | | | | 28 | | |
| 28 | | | | | | | | | 25 | | | |
| 29 | | | | | | | | 22 | | | | |
| 30 | | | | | | | 19 | | | | | |
| 31 | | | | | | 16 | | | | | | |
| 32 | | | | | 13 | | | | | | | |
| 33 | | | | 10 | | | | | | | | |
| 34 | | | 7 | | | | | | | | | |

TABLE EX-31D-continued

Output Head Configuration (spot pattern)—Rows: 36  Spots/Row: 1
Corresponding Figures: FIGS. 86, 87  Vertical Adjustment: 12 lines
Pattern of Spots: MultiRamp  EffectiveVerticalSpotSpacing: 1 line
Scan Pass: 3  Blank = b  EffectiveHorizontalSpotSpacing: 3 dots

| Line | time t34 | | | | | | | Dot Locations | | | | |
|---|---|---|---|---|---|---|---|---|---|---|---|---|
| | Gi | Gj | Gk | Gl | Bi | Bj | Bk | Bl | Ri | Rj | Rk | Rl |
| | Be | Bf | Bg | Bh | Re | Rf | Rg | Rh | Ge | Gf | Gg | Gh |
| | Ra | Rb | Rc | Rd | Ga | Gb | Gc | Gd | Ba | Bb | Bc | Bd |
| 35 | 4 | | | | | | | | | | | |
| 36 | 1 | | | | | | | | | | | |

EX-26B and EX-26C, except for a slightly different line reordering and time combination. For clarity, Table EX-31B, EX-31C and EX31-D are included herein reflecting three different times at the beginning of scan pass 3, it being presumed that the end of the scan pass illustrated for Example 26 in Table EX-26C will be apparent from a comparison of Tables EX-26B and EX-31B through EX-31D.

The order of the assignment of colors within a row may not be the same as within any other row in order to write each dot location with all three colors, as shown in Table EX-31 and FIGS. 87A–87H. It will be apparent after the teachings of the 4×3 brick and log, and the 12×1 ramp emitting end configurations above that the configuration of this Example 31 has aspects of each. A primary advantage of this configuration and resulting spot pattern on the screen is the ability to drastically reduce the speed and/or size of the polygon mirror or other horizontal scanning component because the number of scan passes has been cut by a factor of about three to 92 scan passes per progressively scanned frame.

This configuration also allows for much bigger aggregate power levels to be conveyed to the screen, thus permitting this system to be used for still larger screen sizes. Further, maintaining the speed of the mirror polygon with this head configuration would allow the achievement of higher resolution levels within the restrictions of current technology and components.

Practical Output Head Configurations

Figure 88:
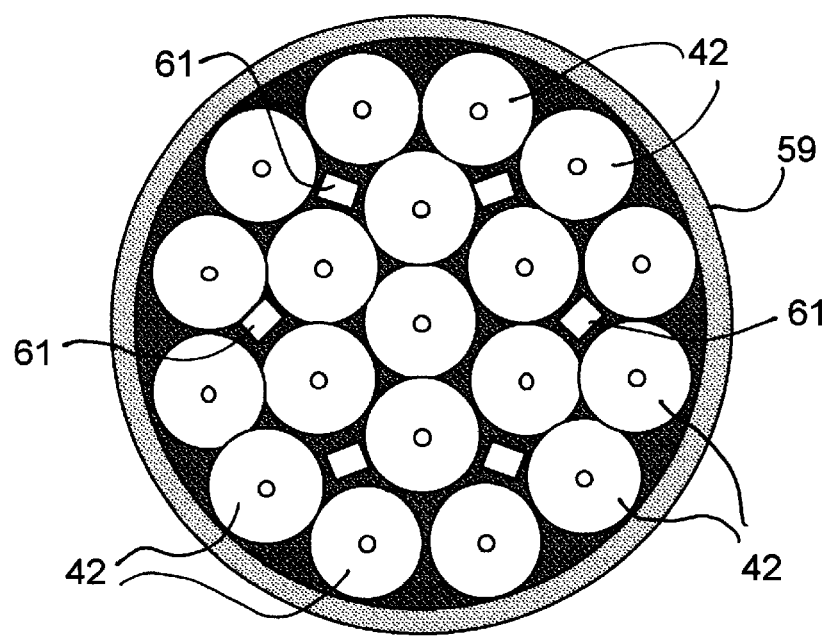
FIG. 88 is a diagram of a fiber bundle and constraining envelope, with fibers assigned laser beams to form the array of FIG. 28.
Figure 89:
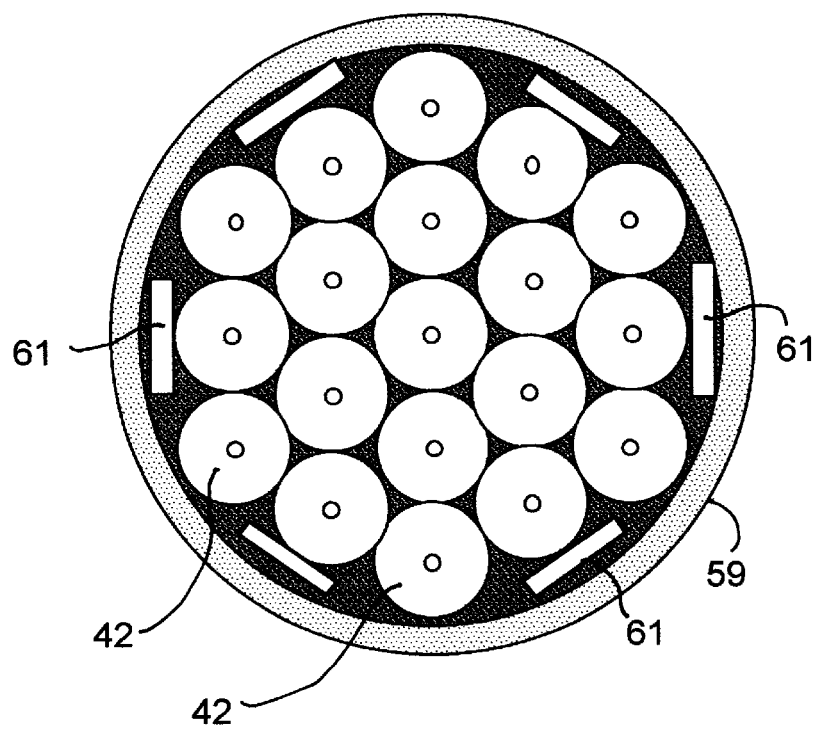
FIG. 89 is a diagram of a fiber bundle and constraining envelope with spacers to form a different bundle arrangement.

FIGS. 88 and 89 show the emitting end arrays resulting from a practical output head manufacturing technique, wherein a bundle of optical fibers 42 is bound together within the output head 58 by an encircling strap or tube 59, such as shrinkable tubing. This constraining, preferably flexible, envelope forces the round fibers 42 into a reasonably predictable close packing arrangement, such as shown in FIGS. 88 and 89. The relative positions of the fibers 42 in a bundle may be changed by modifying the number of fibers in the bundle and moving spacers 61, as shown in FIGS. 88 and 89. The configuration of the bundle shown in FIG. 88 has slightly less overall diameter, but when forced with spacers 61 into the configuration of the bundle shown in FIG. 89, a more useful pattern emerges.

Figure 92:
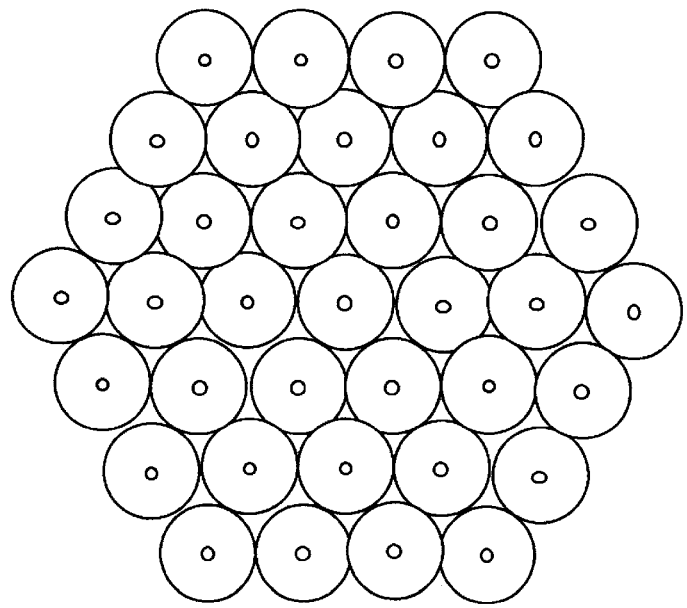
FIG. 92 is a diagram of a fiber bundle similar to that of FIG. 88, but having additional fibers, with fibers assigned laser beams to form a larger array of emitting ends producing a larger spot pattern.
Figure 90:
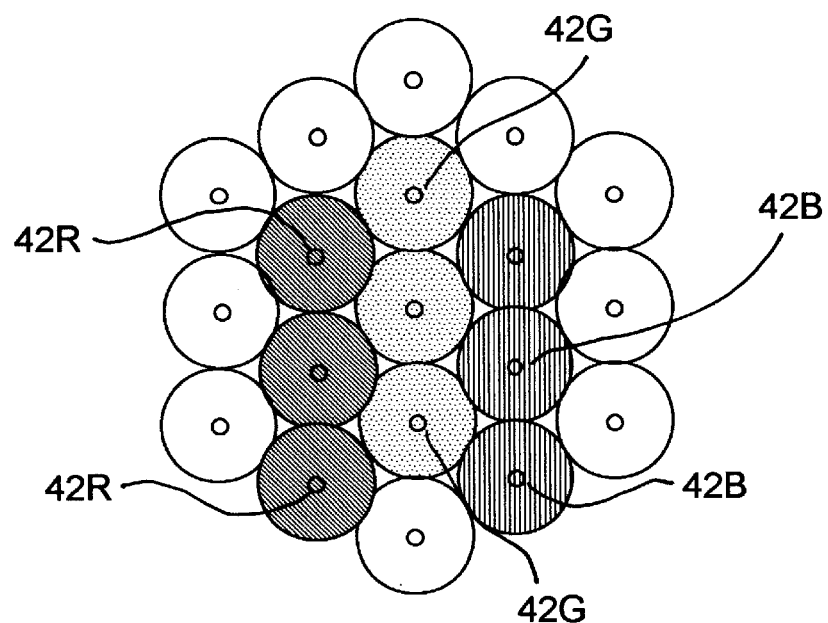
FIG. 90 is a diagram of the fiber bundle of FIG. 88, with fibers assigned laser beams to form an array producing a desired spot pattern.
Figure 91:
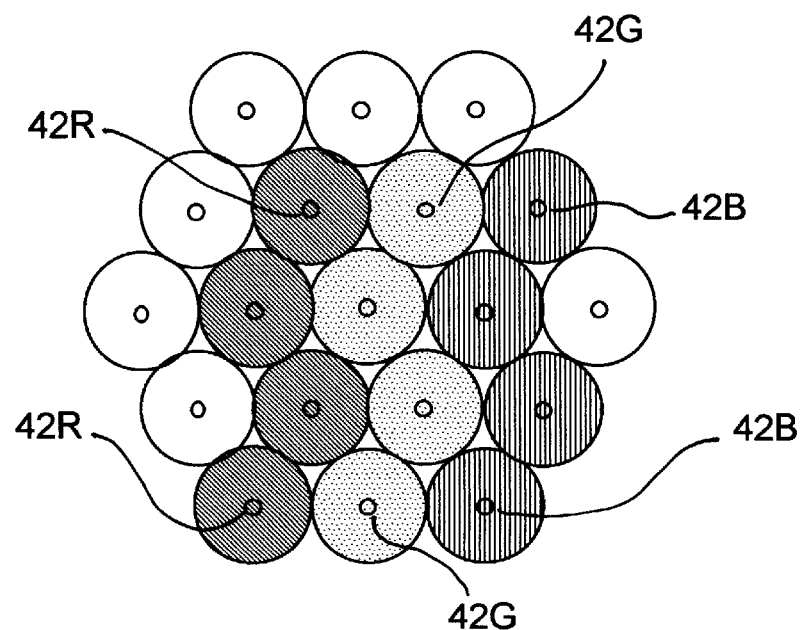
FIG. 91 is a diagram of the fiber bundle of FIG. 88, with fibers assigned laser beams to form a different array to produce another desired spot pattern.

For example, referring to FIG. 89, it may be seen that 7 fibers comprise the group of fibers at the center and inner circle of fibers in the bundle, and 12 fibers comprise the outer circle of fibers 42. This arrangement aligns the fibers substantially in rows, permitting assignment of colored laser beams to fibers 42 as shown in FIG. 90. The output head could also be rotated 90° or some other angle and the assignment of fibers might then be as shown in FIG. 91. As shown in FIGS. 90 and 91, the laser beams may be assigned to those fibers of the total array that will produce the desired pattern of spots. FIG. 92 illustrates the increased number of possible arrays possible with larger bundles of more fibers. Because of the combination of time combining and reordering of spots within rows and between rows, our invention facilitates the use of a multitude of different fiber configurations that may result from the bundling of more fibers than are required.

Although particular embodiments of the invention have been shown, it is not intended that the invention be limited thereby, instead the scope of the present invention is intended to be limited by the appended claims.

We claim:

1. A method for projecting an image onto a viewing surface, comprising the steps of:
    emitting at least three separately modulated light beams from at least one light source;
    sweeping the light beams to substantially illuminate at least three lines of locations on the viewing surface; thereafter
    sweeping the light beams to substantially overwrite at least one line of locations on the viewing surface illuminated by at least one other of said light beams during at least one other sweeping step.

2. The method of claim 1 wherein the emitting step further comprises emitting at least two of the light beams at substantially different wavelengths and exhibiting a desired perceived composite color at locations on the viewing surface that are illuminated during different sweeping steps by at least two different light beams of substantially different wavelengths.

3. A method for projecting a frame of an image onto a viewing surface, comprising the steps of:
    emitting at least three modulated light beams;
    directing the light beams to substantially simultaneously illuminate different locations on the viewing surface;
    sweeping the light beams during each of a preponderance of scan passes during the projection of such frame in a sweep direction to substantially illuminate lines of apparent locations along each of at least three desired sweep paths on the viewing surface; and
    overwriting a substantial portion of a preponderance of the sweep paths written during the projection of such frame with at least one other of such light beams during at least one other sweeping step.

4. The method of claim 3 wherein the emitting step further comprises emitting at least two of the light beams of substantially different wavelengths and the overwriting step further comprises exhibiting a desired perceived composite color at given apparent locations along sweep paths on the viewing surface that are each illuminated by the at least two light beams of substantially different wavelengths during different sweeping steps.

5. The method of claim 3 wherein the emitting step further comprises emitting at least two of the light beams at substantially the same wavelength, and the overwriting step further comprises exhibiting a desired increased perceived intensity at such same wavelength at given apparent locations along sweep paths on the viewing surface that are each illuminated by the at least two light beams of substantially the same wavelength during different sweeping steps.

6. The method of claim 5 wherein the emitting step further comprises emitting at least two of the light beams at substantially different wavelengths and the overwriting step further comprises illuminating each of a preponderance of the apparent locations along given sweep paths on the viewing surface with two or more light beams of substantially different wavelengths during different sweeping steps, thereby exhibiting a desired perceived composite color at such apparent locations.

7. The method of claim 4 or 6 wherein at least two of the different wavelengths each approximate one of the primary colors.

8. The method of claim 3 wherein the overwriting step further comprises illuminating each line of apparent locations most proximate a given sweep path of such preponderance of sweep paths with different light beams than any light beam illuminating such given sweep path.

9. The method of claim 3, 4, 5, 6 or 8, wherein the moving step further comprises moving the light beams in the direction transverse of the desired sweep paths substantially continuously during the projection of such frame.

10. The method of claim 3, 4, 5, 6 or 8, further comprising the step of emitting each light beam from an optical fiber.

11. A method for projecting an image onto a viewing surface, comprising the steps of:
sweeping at least three rows of separately modulated light beams having at least one light beam per row in a sweep direction along three substantially parallel desired sweep paths on a viewing surface, and
moving the rows of light beams in a frame direction transverse of the sweep direction; then
repeating the sweeping and moving steps a desired number of times at a desired rate until a desired number of different sweep paths have been swept by such rows of light beams to write a frame within a desired frame period, wherein during at least one sweeping step at least one of the rows of light beams substantially overwrites the sweep path swept by another of said rows of light beams during another sweeping step.

12. A method for projecting an image onto a viewing surface, comprising the steps of:
sweeping at least three rows of separately modulated light beams having one light beam per row in a sweep direction along three substantially parallel desired sweep paths on a viewing surface, and
moving the rows of light beams in a frame direction transverse of the sweep direction; then
repeating the sweeping and moving steps a desired number of times at a desired rate until a desired number of different sweep paths have been swept by such rows of light beams to write a frame within a desired frame period, wherein during at least one sweeping step at least one of the rows of light beams substantially overwrites the sweep path swept by another of said rows of light beams during another sweeping step.

13. The method of claim 11 or 12 wherein at least two of the light beams are of substantially different wavelengths and a desired perceived composite color is formed at each of a plurality of locations on the viewing surface that are illuminated during different sweeping steps by at least two of the light beams of substantially different wavelengths.

14. A method for projecting a frame of an image onto a viewing surface, comprising the steps of:
directing at least three light beams to substantially simultaneously illuminate different apparent locations on the viewing surface;
sweeping the light beams during each of a preponderance of scan passes during the projection of said frame to substantially simultaneously illuminate at least three sweep paths along desired lines of apparent locations of such frame on the viewing surface associated with such image frame, and
moving the light beams in a direction substantially transverse to the sweep paths; such that a substantial portion of each of a preponderance of the sweep paths written during the projection of said frame is substantially overwritten by at least one other of said light beams during at least one other scan pass.

15. The method of claim 14 wherein the emitting step further comprises emitting at least two of the light beams at substantially different wavelengths and the moving step further comprises exhibiting a desired perceived composite color at given apparent locations along sweep paths on the viewing surface that are each illuminated by the at least two light beams of substantially different wavelengths during different sweeping steps.

16. The method of claim 14 wherein the emitting step further comprises emitting at least two of the light beams at substantially the same wavelength, and the moving step further comprises exhibiting a desired increased perceived intensity at such same wavelength at given apparent locations along sweep paths on the viewing surface that are each illuminated by the at least two light beams of substantially the same wavelength during different sweeping steps.

17. The method of claim 16 wherein the emitting step further comprises emitting at least two of the light beams at substantially different wavelengths and the moving step further comprises exhibiting a desired perceived composite color at given apparent locations along sweep paths on the viewing surface that are each illuminated by the at least two light beams of substantially different wavelengths during different sweeping steps.

18. The method of claim 15 or 17 wherein at least two of the different wavelengths each approximate one of the primary colors.

19. The method of claim 14 wherein the moving step further comprises moving the light beams such that each line of apparent locations most proximate any given sweep path of such preponderance of sweep paths is illuminated with different light beams than any light beam illuminating such given sweep path.

20. The method of claim 14 wherein during a plurality of such sweeping steps, the locations illuminated on the viewing surface are substantially aligned along a line that is substantially non-perpendicular to the sweep paths.

21. The method of claim 20 wherein adjusting the time at which the illumination of the path is initiated to position the beginning of the path at a desired location.

22. The method of claim 14, 15, 16, 17, 19 or 20, wherein the moving step further comprises moving the light beams in the direction transverse of the desired sweep paths substantially continuously during the projection of such frame.

23. The method of claim 14, 15, 16, 17, 19 or 20, wherein each light beam is emitted from an optical fiber.

24. A method for projecting an image onto a viewing surface, comprising the steps of:
emitting at least two rows of substantially parallel light beams having at least one light beam per row;
sweeping the rows of light beams in a sweep direction substantially along at least two scan lines of a planned frame on the viewing surface, and
moving the rows of light beams in a frame direction transverse of the sweep direction a desired number of scan lines; and
repeating the sweeping and moving steps a desired number of times at a desired rate until all of the scan lines of a frame are swept within a desired frame period, wherein during each of a preponderance of the sweeping steps at least one of the rows of light beams substantially overwrites the sweep path swept by at least one other of said rows of light beams of a substantially different wavelength during at least one other sweeping step.

25. A method for projecting an image onto a viewing surface, comprising the steps of:

emitting at least four rows of modulated light beams, wherein each row of light beams has one light beam, and such rows comprise at least two groups of rows, with each group of rows including at least two light beams and each light beam within each group having a different wavelength;

sweeping the rows of light beams in a sweep direction substantially along at least four scan lines of a plurality of scan lines of a planned frame on the viewing surface, and moving the rows of light beams in a frame direction transverse of the sweep direction; and repeating the sweeping and moving steps a desired number of times at a desired rate until all of the scan lines of such frame are swept within a desired frame period, wherein during each of a preponderance of such sweeping steps during such frame period at least one of the rows of light beams substantially overwrites the sweep path swept by at least one other of said light beams during at least one other sweeping step, and wherein the emitting step further comprises emitting at least two of the light beams at substantially different wavelengths, and exhibiting a desired perceived composite color at locations on the viewing surface that are illuminated by both of the light beams having substantially different wavelengths.

26. A method for projecting a frame of an image onto a viewing surface, comprising the steps of:

directing at least four modulated light beams to form at least four corresponding rows of spots on the viewing surface, wherein each of such spots is of one of at least two different selected wavelengths;

sweeping all spots of each row along one of at least three sweep paths substantially corresponding to lines of apparent locations on the viewing surface during each of a substantial number of scan passes during the projection of such frame, wherein such rows are arranged in two or more groups of rows with the rows of each group swept along lines of apparent locations most proximate each other and each of such groups includes at least one spot of each of such different selected wavelengths, and moving the rows of spots transverse of the sweep paths; and repeating the sweeping and moving steps a desired number of times at a desired rate until a desired number of different sweep paths have been swept by such rows of spots to write such frame within a desired frame period, such that during each of a preponderance of such sweeping steps at least one of the rows of spots substantially overwrites the sweep path swept by at least one other of said rows of spots during at least one other sweeping step, wherein the wavelengths of such spots are selected so that when apparent locations are overwritten at desired intensities by two or more spots of at least two of such different selected wavelengths, desired perceived composite color spots are formed substantially at such apparent locations.

27. The method of claim 26 wherein at least one of such corresponding rows of spots on the viewing surface includes only one spot.

28. The method of claim 26 wherein at least one of such corresponding rows of spots on the viewing surface includes at least two spots.

29. The method of claim 26 wherein each group includes the same number of spots of the same corresponding different selected wavelengths.

30. The method of claim 26 wherein at least two of the light beams within each group are of substantially the same wavelength.

31. The method of claim 26 wherein all of the light beams within each group are of substantially different wavelengths.

32. The method of claim 26, 29, 30 or 31, wherein each of the selected wavelengths approximates one of the primary colors.

33. The method of claim 26, 29, 30 or 31, wherein the selected wavelengths are capable at selected intensities of forming composite spots at locations on the viewing surface within a desired color space.

34. The method of claim 26, 27 or 28 further comprising the step of illuminating each line of apparent locations most proximate a given sweep path of such preponderance of sweep paths with different light beams than any light beam illuminating such given sweep path.

35. A method for projecting a frame of an image onto a viewing surface, comprising the steps of:

directing at least four modulated light beams to form at least four corresponding rows of spots on the viewing surface, wherein each of such spots is of one of at least two different selected wavelengths;

sweeping all spots of each row along one of at least three sweep paths substantially corresponding to lines of apparent locations on the viewing surface during each of a substantial number of scan passes during the projection of such frame, wherein such rows are arranged in two or more groups of rows with the rows of each group swept along lines of apparent locations most proximate each other and each of such groups includes spots of one of such different selected wavelengths and the wavelength of each group is different, and moving the rows of spots transverse of the sweep paths; and repeating the sweeping and moving steps a desired number of times at a desired rate until a desired number of different sweep paths have been swept by such rows of spots to write such frame within a desired frame period, such that during each of a preponderance of such sweeping steps at least one of the rows of spots substantially overwrites the sweep path swept by at least one other of said rows of spots during at least one other sweeping step, wherein the wavelengths of such groups are selected so that when apparent locations are overwritten at desired intensities by spots of two or more groups, desired perceived composite color spots are formed substantially at such apparent locations.

36. The method of claim 35 wherein at least one of such corresponding rows of spots on the viewing surface includes only one spot.

37. The method of claim 35 wherein at least one of such corresponding rows of spots on the viewing surface includes at least two spots.

38. The method of claim 35 wherein each group includes the same number of spots.

39. The method of claim 35 or 38, wherein each of the selected wavelengths approximates one of the primary colors.

40. The method of claim 35 or 38, wherein the selected wavelengths are capable at selected intensities of forming composite spots at locations on the viewing surface within a desired color space.

41. A method for projecting a frame of a video image onto a screen comprising the steps of:
producing at least three light beams;
individually modulating said beams to correspond beam intensity to input data;
inserting each of said beams into an optical fiber associated with each beam;
transmitting said beams within the fibers;
emitting said beams from emitting ends of the fibers;
sweeping said beams in a first direction to illuminate at least three lines of locations on the screen; and
moving said beams in a second direction transverse of the first direction, wherein a preponderance of the lines of locations illuminated by the light beams during the projection of such frame are each substantially overwritten by at least two other of said light beams during at least two other sweeping steps.

42. A method for projecting a frame of a video image onto a screen comprising the steps of:
producing at least three light beams;
individually modulating said beams to correspond beam intensity to input data;
inserting each of said beams into an optical fiber associated with each beam;
transmitting said beams within the fibers;
emitting said beams from emitting ends of the fibers;
sweeping the beams in a first direction to illuminate at least three lines of apparent locations on a screen; and
moving the beams in a second direction transverse of the first direction such that a substantial portion of each of such lines written during the projection of such frame is substantially overwritten by at least two other of said light beams during at least two other sweeping steps.

43. A method of projecting a frame of an image onto a viewing surface, such image frame having lines of apparent locations extending from one edge of the frame to an other edge of the frame, and such lines of apparent locations arrayed in a direction transverse of such lines to fill the frame from an additional edge to another additional edge,. comprising the steps of:
receiving input data having intensity and color values for pixels of a pixel frame;
arranging the input data to associate such intensity and color values of such pixel frame to such apparent locations of the image frame;
sweeping at least three beams of light modulated in accordance with the color and intensity values for such associated apparent locations substantially along at least three paths of such apparent locations from one edge of the image frame to the other edge of the image frame, and
adjusting the light beams in a direction transverse to the swept paths; and
repeating the sweeping and adjusting steps until the lines of apparent locations of the entire image frame are swept by such beams from an additional edge to a further additional edge, and with at least one beam traversing lines of apparent locations from before or at the additional edge to at or beyond the further additional edge.

44. The method of claim 43 further comprising the step of illuminating each line of apparent locations most proximate a given sweep path of such preponderance of sweep paths with different light beams than any light beam illuminating such given sweep path.

45. The method of claim 43 wherein the light beam overwriting the sweep path swept by another light beam has a substantially different wavelength than the light beam having previously swept the sweep path.

46. The method of claim 43 wherein the directing step further comprises directing at least four of such light beams to form at least four of such corresponding rows of spots, with such rows arranged in two or more groups of rows and with the spots of the rows of each such group being swept along lines of apparent locations most proximate each other during said sweeping steps, wherein each of such spots is of one of at least two different selected wavelengths, such wavelengths being selected so that when apparent locations are overwritten at desired intensities by two or more spots of at least two of such different selected wavelengths, desired perceived composite color spots are formed substantially at such apparent locations, and wherein each of such groups includes at least one spot of each of such different selected wavelengths.

47. The method of claim 46 wherein the spots of each group include the same number of spots of the same corresponding different selected wavelengths.

48. The method of claim 47 wherein at least two of the light beams within each group are of substantially the same wavelength.

49. The method of claim 46 wherein all of the light beams within each group are of substantially different wavelengths.

50. The method of claim 46, 47, 48 or 49, wherein each of the selected wavelengths approximates one of the primary colors.

51. The method of claim 46, 47, 48 or 49, wherein the selected wavelengths are capable at selected intensities of forming composite spots at locations on the viewing surface within a desired color space.

52. The method of claim 43 wherein the directing step further comprises directing at least four of such light beams to form at least four of such corresponding rows of spots, with such rows arranged in two or more groups of rows and with the spots of the rows of each such group being swept along lines of apparent locations most proximate each other during said sweeping steps, wherein each of such spots is of one of at least two different selected wavelengths, such wavelengths being selected so that when apparent locations are overwritten at desired intensities by two or more spots of at least two of such different selected wavelengths, desired perceived composite color spots are formed substantially at such apparent locations, and the spots of each of such groups are of the same wavelength, and the wavelength of each group is different.

53. The method of claim 52 wherein the spots of each group includes the same number of spots.

54. The method of claim 52 or 53, wherein each of the selected wavelengths approximates one of the primary colors.

55. The method of claim 52 or 53, wherein the selected wavelengths are capable at selected intensities of forming composite spots at locations on the viewing surface within a desired color space.

56. A system for projecting a frame of an image onto a viewing surface, comprising:
at least three modulated light beams;
a scanner positioned to direct the light beams to substantially simultaneously illuminate separate locations on the viewing surface, said scanner adapted to sweep the light beams to substantially illuminate lines of apparent locations along at least three desired paths on the viewing surface during a number of scan passes needed to write such frame, the light beams positioned in an array such that as said scanner sweeps the light beams along the desired paths on the viewing surface during each of a preponderance of such scan passes, at least one of said light beams overwrites a substantial portion of locations along one of the desired paths on the viewing surface previously illuminated by another of said light beams during another scan pass.

57. The system of claim 56 wherein at least two of the light beams are of different wavelengths, such that each of the locations on the viewing surface overwritten by two or more light beams of such different wavelengths during such different scan passes exhibits a desired perceived composite color.

58. A system for projecting a frame of an image onto a viewing surface, comprising:
   at least three modulated light beams; and
   a scanner positioned to direct the light beams to substantially simultaneously illuminate different apparent locations on the viewing surface,
   said scanner being adapted to sweep the light beams to substantially illuminate lines of apparent locations along each of at least three desired sweep paths on the viewing surface during each of a preponderance of scan passes during the projection of such frame, such that a substantial portion of each of a preponderance of the lines of apparent locations of said frame is substantially overwritten by at least one other of said light beams during at least one other scan pass.

59. The system of claim 58 wherein at least two of the light beams are each of different wavelengths, such that each line of apparent locations on the viewing surface substantially overwritten by two or more light beams having such different wavelengths exhibits a desired perceived composite color.

60. The system of claim 58 wherein said scanner is further adapted to move the light beams transverse of the sweep paths to illuminate different lines of apparent locations on the viewing surface during different scan passes.

61. The system of claim 58 or 60 wherein a substantial portion of each of a preponderance of the lines of apparent locations of said frame is substantially overwritten by at least two other of said light beams during at least two other scan passes.

62. The system of claim 58 or 60 wherein said scanner is further adapted such that during each of such preponderance of scan passes at least one of such light beams illuminates a line of apparent locations adjacent to lines of apparent locations that were illuminated by at least one other of such light beams during other scan passes.

63. The system of claim 58 or 60 wherein the lines of apparent locations on the viewing surface illuminated by the sweep paths during such preponderance of scan passes are spaced one line of apparent locations apart.

64. The system of claim 58 or 60 wherein each light beam forms a spot on the viewing surface, and the light beams and said scanner are arranged such that during a plurality of scan passes the spots are substantially aligned along a line that is substantially non-perpendicular to the scan paths on the viewing surface.

65. The system of claim 64, wherein the lines of apparent locations on the viewing surface illuminated during each of such plurality of scan passes are spaced one line of apparent locations apart.

66. The system of claim 64 wherein the light beam forming each spot is swept substantially along a different line of apparent locations on the viewing surface.

67. The system of claim 66, wherein the lines of apparent locations on the viewing surface illuminated during each of such plurality of scan passes are spaced one line of apparent locations apart.

68. The system of claim 58 or 60 wherein for each of a preponderance of given sweep paths of such frame, each line of apparent locations of such frame that is most proximate to such given sweep path is not substantially illuminated by the same light beams that illuminate such given sweep path during the projection of such frame.

69. A system for projecting an image onto a viewing surface, comprising:
   a source of at least three modulated light beams;
   a scanner positioned to direct the light beams to illuminate a pattern of spots on the viewing surface, said scanner including
   a line scanning component adapted to substantially simultaneously sweep the light beams in a sweep direction to move the pattern of spots along at least three different lines of locations on the viewing surface during each of a number of scan passes required to write a frame of such image, and
   a frame scanning component adapted to move the light beams in a direction transverse of the sweep direction such that each spot of the pattern of spots sweeps a different line of locations on the viewing surface during a preponderance of such scan passes; and
   the source of light beams is configured such that when swept by said scanner along the lines of locations on the viewing surface during each of a preponderance of such scan passes, at least one spot substantially overwrites the same locations on the viewing surface illuminated by at least one other of the light beams during at least one other of such scan passes.

70. The system of claim 69 wherein at least two of the light beams are of different wavelengths, such that each of the locations on the viewing surface overwritten by two or more spots of such different wavelengths during such different scan passes exhibits a desired perceived composite color.

71. The system of claim 69, further comprising:
   an input signal having intensity and color values for specified locations on the viewing surface, said input signal arranged in a succession of frames, each frame being a matrix of pixels ordered to be written in a succession of lines from one edge of the frame to an opposite edge of the frame, with each line written in a succession of pixels from a different edge of the frame to another opposite edge of the frame; and
   a controller adapted to initiate the illumination of a location on the viewing surface by sending a modulation signal to the modulator for a selected light beam, said controller further adapted to rearrange the input signal for each frame to correspond the pixel value of the input signal to the desired intensity of the light beam directed to the corresponding location on the screen at a desired time.

72. The system claimed in claim 70 wherein said controller is further adapted to cause the illumination of a location along the desired path with a light beam of an intensity to produce a spot corresponding to the intensity and color value of the input signal, and to cause the illumination of the same location with an other light beam deflected along the same desired path during a different scan pass.

73. A system for projecting a frame of an image onto a viewing surface, comprising:
- at least three modulated light beams;
- a scanner positioned to direct the light beams to substantially simultaneously illuminate a pattern of spots on the viewing surface, said scanner including
  - a line scanning portion adapted to sweep the pattern of spots along at least three different desired sweep paths to substantially illuminate corresponding lines of apparent locations on the viewing surface during a scan pass, and
  - a frame scanning portion adapted to move the pattern of spots in a direction substantially transverse of the sweep paths such that the desired sweep paths are written at different places on the viewing surface during different scan passes, wherein a substantial portion of each of a preponderance of the lines of apparent locations of said frame written during a preponderance of such scan passes is substantially overwritten by at least one other light beam during at least one other scan pass.

74. The system of claim 73 wherein a substantial portion of each line of apparent locations of such frame written during each of a preponderance of such scan passes is substantially overwritten by at least two other of said light beams during at least two other scan passes.

75. The system of claim 73 wherein said scanner is further adapted such that during each of such preponderance of scan passes at least one given line of apparent locations illuminated during such scan pass is between two lines of apparent locations adjacent to such given line that were illuminated during other scan passes.

76. The system of claim 73 or 74, wherein at least two of the light beams are each of different wavelengths, such that each line of apparent locations on the viewing surface substantially overwritten by two or more light beams having such different wavelengths exhibits a desired perceived composite color.

77. The system of claim 73 wherein the lines of apparent locations written during a plurality of scan passes are spaced one line of apparent locations apart on the viewing surface.

78. The system of claim 77 wherein the light beams and said scanner are arranged such that during a plurality of scan passes the spots of the pattern of spots are substantially aligned along a line that is substantially non-perpendicular to the scan paths on the viewing surface.

79. The system of claim 72, wherein for each of a preponderance of given sweep paths of such frame, each line of apparent locations of such frame that is most proximate to such given sweep path is not substantially illuminated by any light beam that illuminates such given sweep path during the projection of such frame.

80. A system for projecting a frame of an image onto a viewing surface, comprising:
- a source of modulated light beams;
- a scanner positioned to simultaneously direct the light beams to illuminate a pattern of spots arranged in at least three rows of at least three spots per row on the viewing surface, said scanner including
  - a line scanning component adapted to simultaneously sweep the plurality of light beams in a sweep direction to sweep each row of spots of the pattern of spots along a different line of desired apparent locations on the viewing surface during each of a plurality of scan passes, and
  - a frame scanning component adapted to adjust the light beams in a direction transverse of the line direction such that each row of spots sweeps a sweep path substantially along a different line of apparent locations on the viewing surface during a plurality of such scan passes; and
- the source of said light beams and said scanner being configured such that during each of a preponderance of such scan passes during the projection of said frame at least one of the rows of light beams illuminates a line of apparent locations between lines of apparent locations adjacent to such given line that were illuminated by different rows of light beams during other scan passes.

81. The system of claim 79 wherein at least two of the light beams of at least one row are of substantially different wavelengths.

82. The system of claim 79 wherein the pattern of spots is arranged in at least three rows of at least four spots per row.

83. The system of claim 82 wherein at least two of the light beams of at least one row are of substantially different wavelengths.

84. The system of claim 80, 81, 82 or 83 wherein at least two of the light beams of at least one row are of substantially the same wavelength.

85. The system claimed in claim 80 wherein said scanner is further adapted to cause the illumination of at least one apparent location along the sweep path with two or more spots during the same scan pass.

86. A system for projecting a frame of an image onto a viewing surface, such image frame having lines of apparent locations extending from one edge of the frame to an other edge of the frame, and such lines of apparent locations arrayed in a direction transverse of such lines to fill the frame from an additional edge to another additional edge, comprising:
- at least three modulated light beams; and
- a scanner positioned to direct the light beams to form spots on the viewing surface, said scanner including
  - a line scanning portion adapted to sweep the spots substantially from before or at one edge of the frame to at or beyond another edge of the frame along at least three sweep paths substantially corresponding to such lines of desired apparent locations during each of a preponderance of scan passes during the illumination of such frame, and
  - a frame scanning portion adapted to move the spots in a frame direction substantially transverse of the lines of apparent locations such that at least one of such spots moves from before or at a different edge of the frame to at or beyond another different edge of such frame.

87. The system of claim 86 wherein the spots swept along sweep paths during a plurality of scan passes on the viewing surface are spaced one line of apparent locations apart.

88. The system of claim 87 wherein the light beams and said scanner are arranged such that during a plurality of scan passes the spots are substantially aligned along a line that is substantially non-perpendicular to the scan paths on the viewing surface.

89. The system of claim 86 wherein said scanner is further adapted to cause the illumination of at least one apparent location along the sweep path with two or more spots during different scan passes.

90. The system claimed in claim 89 wherein said scanner is further adapted to cause the illumination of at least one apparent location along the sweep path with two or more spots during the same scan pass.

91. The system claimed in claim 86, 87, 89 or 90, further comprising input data having intensity and color values for pixels of a pixel frame, wherein each of a preponderance of such desired apparent locations is substantially illuminated with two or more of such spots during the same or different scan passes to form a desired perceived composite color spot associated with the input pixel data.

92. The system of claim 91, wherein each of said composite spots corresponds to the input pixel data for one or more of such pixels associated with one or more of said apparent locations.

93. The system of claim 91 further comprising:
a controller adapted to initiate the substantial illumination of such apparent locations on the viewing surface by sending modulation signals to the modulators for selected light beams;
said controller further adapted to rearrange the input data of such pixel frame to initiate such illumination of the apparent locations on the viewing surface at the desired times to form such desired perceived composite color spots associated with the intensity and color value of the input data.

94. The system of claim 93 wherein the light beams and said scanner are arranged such that during a plurality of scan passes the spots of the pattern of spots are substantially aligned along a line that is substantially non-perpendicular to the scan paths on the viewing surface.

95. The system of claim 94 wherein said controller is further adapted to initiate the illumination of each sweep path when the scanner has moved the light beams to illuminate the apparent location of such sweep path most proximate such one edge of the frame.

96. A system for projecting a frame of an image onto a viewing surface, comprising:
at least three modulated light beams;
a scanner adapted to sweep the light beams in a line direction to substantially simultaneously illuminate at least three sweep paths on the viewing surface during a scan pass and adapted to adjust the position of the light beams in a frame direction transverse of the sweep paths during a sequence of scan passes;
the light beams being positioned in an array such that as said scanner sweeps the light beams along the sweep paths on the viewing surface, at least one light beam overwrites a substantial portion of a location on the viewing surface previously illuminated by another light beam during a different scan pass;
a controller adapted to receive input data having intensity and color values for pixels of a pixel frame, said controller further adapted to rearrange the input data to illuminate each location of each such sweep path with a light beam modulated to project a spot having an intensity and color value corresponding to the values of the pixel data for such location on the viewing surface; and
at least two of the light beams being of substantially different selected wavelengths, such that the locations on the viewing surface successively overwritten by such spots of different wavelengths exhibit desired perceived composite color spots associated with the input data for such location.

97. The system of claim 96 wherein the spot of each row of the pattern of spots swept along sweep paths during a plurality of scan passes on the viewing surface are spaced one line of apparent locations apart.

98. The system of claim 97 wherein the light beams and said scanner are arranged such that during a plurality of scan passes the spots are substantially aligned along a line that is substantially non-perpendicular to the scan paths on the viewing surface.

99. The system of claim 58, 60, 73, 86 or 96 wherein at least four of said light beams are arranged in two or more groups of at least two light beams swept along different lines of apparent locations most proximate each other during such preponderance of scan passes, with each of the light beams being of one of at least two different selected wavelengths, the wavelengths being selected so that when apparent locations of such frame are overwritten at desired intensities by two or more spots of at least two of such different selected wavelengths, desired perceived composite color spots are formed substantially at such apparent locations, and each group includes light beams of each of such different selected wavelengths.

100. The system of claim 99 wherein the effective row spacing of all the sweep paths swept by the light beams of each group is one.

101. The system of claim 99 wherein all of the light beams within each group are of substantially different wavelengths.

102. The system of claim 99 wherein each group includes the same number of spots of the same corresponding different selected wavelengths.

103. The system of claim 102 wherein all of the light beams within each group are of substantially different wavelengths.

104. The system of claim 102 wherein at least two of the light beams within each group are of substantially the same wavelength.

105. The system of claim 99, 100, 101, 102, 103 or 104, wherein each of the selected wavelengths approximates one of the primary colors.

106. The system of claim 58, 60, 73, 86 or 96 wherein at least four of said light beams are arranged in two or more groups of at least two light beams swept along different lines of apparent locations most proximate each other during such preponderance of scan passes, with each light beam being of one of at least two different selected wavelengths, the wavelengths being selected so that when apparent locations of such frame are overwritten at desired intensities by two or more spots of at least two of such different selected wavelengths, desired perceived composite color spots are formed substantially at such apparent locations, and the spots of each of such groups are of the same wavelength, and the wavelength of each group is different.

107. The system of claim 106 wherein the effective row spacing of all the sweep paths swept by the light beams of such groups is one.

108. The system of claim 106 wherein the spots of each group includes the same number of spots.

109. The system of claim 106 wherein each of the selected wavelengths approximates one of the primary colors.

110. The system of claim 106 wherein each of such groups includes at least three of said beams.

111. The system of claim 58, 60, 64, 73, 86 or 96, wherein at least three of the light beams are arranged in at least three rows of one light beam per row.

112. The system of claim 111 wherein the effective row spacing of two or more of such rows is one.

113. The system of claim 111 wherein the effective row spacing of two or more of such rows is not one.

114. The system of claim 111, wherein the light beams and said scanner are arranged such that during a plurality of scan passes the spots of the pattern of spots are substantially aligned along a line that is substantially non-perpendicular to the scan paths on the viewing surface.

115. The system of claim 58, 60, 73, 86 or 96 wherein at least three of said light beams are arranged such that when swept by said scanner during each of said preponderance of scan passes, each of at least three of said sweep paths is swept by only one of such light beams and said light beams are grouped in one group of at least three light beams swept along adjacent lines of apparent locations.

116. The system of claim 58, 60, 73, 86 or 96, wherein twelve of the light beams are arranged in twelve rows of one light beam per row.

117. The system of claim 116 wherein the effective row spacing of the sweep paths swept by all light beams is one.

118. The system of claim 73, 80, 82, 84, 86 or 96, wherein the movement of said spots by said scanner in the direction transverse of the sweep direction is substantially continuous.

119. The system of claim 58, 60, 73, 80, 82, 84, 86 or 96, wherein the scanner is a continuous raster scanner.

120. The system of claim 58, 60, 73, 86 or 96, wherein at least two of the light beams are of substantially the same wavelength.

121. The system of claim 58, 60, 73, 80, 82, 84, 86 or 96, wherein at least two of the light beams are of substantially different wavelengths.

122. The system of claim 121 wherein at least two of the different wavelengths each approximate one of the primary colors.

123. The system of claim 58, 73, 80, 84, 86 or 96, further comprising:
 at least three optical fibers, each fiber adapted to emit one of said modulated light beams from an emitting end of each of said fibers.

124. The system of claim 123 wherein said emitting ends are substantially aligned along a line that is substantially non-perpendicular to the direction in which the scanner sweeps the emitted light beams.

125. The system of claim 124 wherein the spot formed by each of such light beams is in a different line of apparent locations on the viewing surface.

126. The system of claim 124 wherein the lines of apparent locations on the viewing surface illuminated during each of such plurality of scan passes are spaced one line of apparent locations apart.

127. The system of claim 123 further comprising twelve emitting ends.

128. The system of claim 123 further comprising a focusing optic positioned between the emitting ends and the scanner.

129. The system of claim 128 wherein said focusing optic causes the light beams to be substantially parallel.

130. The system of claim 128 wherein said focusing optic focuses the light beams through said scanner in a pattern of spots on the viewing surface corresponding to the configuration of the emitting ends.

131. The system of claim 58, 60, 73, 86 or 96 further comprising at least four light beams, and said scanner is adapted to sweep at least four spots of the pattern of spots along at least three sweep paths during each of a plurality of scan passes such that at least two of such beams substantially illuminate one sweep path and at least two other of such beams each substantially illuminates at least one other sweep path.

132. The system of claim 131 wherein at least two of the light beams illuminating substantially the same sweep path during each of such plurality of scan passes are of substantially the same wavelength.

133. The system of claim 131 wherein at least two of the light beams illuminating substantially the same sweep path during each of such plurality of scan passes are of substantially different wavelengths.

134. A system for projecting an image onto a viewing surface, comprising:
 at least one optical fiber each adapted to emit a light beam at an emitting end of said fiber;
 a scanner having at least two reflective surfaces, each reflective surface being orientable to sweep the light beam to different desired locations along each of a plurality of desired paths on the viewing surface at different times during the projection of the frame; and
 a corrector mounted to move the position of one or more of the emitting ends with respect to the scanner to correct for relative misalignment of the reflective surfaces.

135. A system for projecting an image onto a viewing surface, comprising:
 at least one optical fiber each adapted to emit a light beam at an emitting end of said fiber;
 a scanner having at least two reflective surfaces, each reflective surface being orientable to sweep the light beam to different desired locations along each of a plurality of desired paths on the viewing surface at different times during the projection of the frame;
 at least one focusing optic positioned in the paths of the light beams between the emitting ends and the scanner; and
 a corrector mounted to move the position of at least one said focusing optic with respect to the scanner to correct for relative misalignment of the reflective surfaces.

136. The system of claim 135 wherein the system further comprises:
 said scanner including a rotating body having a plurality of facets positioned thereon such that as each facet successively sweeps through the path of the emitted modulated light beam the beam will be directed along the successive corresponding desired sweep paths on the viewing surface.

137. The system of claim 136 wherein said corrector further includes
 a detection light beam oriented so as to be directed from each facet as the facet is swept through the detection light beam;
 a sensor positioned to detect the detection light beam directed from the facet to determine the extent of the misalignment of the facet from the desired orientation; and
 an actuator adapted to move the focusing optic a sufficient distance to correct the misalignment detected by the sensor.

138. The system of claim 135, 136 or 137, further comprising:
 a single focusing optic positioned in the paths of the light beams between the emitting ends and the scanner.

139. The system of claim 135, 136 or 137 wherein the corrector is mounted to move the positions of the emitting ends and the focusing optic with respect to the scanner.

140. The system of claim 139 wherein the emitting ends and the focusing optic are mounted to be moved together as a single assembly.

141. A system for projecting an image onto a viewing surface, comprising:
 at least one modulated light beam;
 at least one optical fiber having an emitting end adapted to emit the at least one modulated light beam;

a scanner positioned substantially in the path of the emitted modulated beam, said scanner being movable to different orientations, each of which will direct the modulated light beam to illuminate the viewing surface along a sweep path, at least one of said orientations of said scanner being misaligned such that the corresponding sweep path on the viewing surface will be mispositioned with respect to the desired sweep path on the viewing surface; and a corrector adapted to move the emitting end of the optical fiber with respect to the scanner to correct for such relative misalignment of the scanner orientation.

142. The system of claim 141 wherein the system further comprises:

said scanner including a rotating body having a plurality of facets positioned thereon such that as each facet successively sweeps through the path of the emitted modulated light beam the beam will be directed along successive corresponding desired sweep paths on the viewing surface.

143. The system of claim 142 wherein said corrector further includes a detection light beam oriented so as to be directed from each facet as the facet is swept through the detection light beam;

a sensor positioned to detect the detection light beam directed from the facet to determine the extent of the misalignment of the facet from the desired orientation; and an actuator adapted to move the emitting end a sufficient distance to correct the misalignment detected by the sensor.

144. The system of claim 141, 142 or 143, further comprising:

at least one focusing optic positioned in the path of the light beam between the emitting end and the scanner wherein the emitting end and the focusing optic are mounted to be moved together as a single assembly.

145. A system for projecting an image onto a viewing surface, comprising:

at least two modulated light beams;

at least two optical fibers, each optical fiber having an emitting end adapted to emit at least one of the modulated light beams;

a scanner positioned substantially in the path of the emitted modulated beams, said scanner being movable to different orientations, each of which will direct the modulated light beams to illuminate the viewing surface along different sweep paths, at least one of said orientations of said scanner being misaligned such that the corresponding sweep path on the viewing surface will be mispositioned with respect to the desired sweep path on the viewing surface;

at least one focusing optic positioned in the paths of the light beams between the emitting ends and the scanner; and a corrector adapted to move the emitting ends of the optical fibers and the at least one focusing optic with respect to the scanner to correct for such relative misalignment of the scanner orientation.

146. The system of claim 145 wherein the system further comprises:

said scanner including a rotating body having a plurality of facets positioned thereon such that as each facet successively sweeps through the path of the emitted modulated light beam the beam will be directed along the successive corresponding desired sweep paths on the viewing surface.

147. The system of claim 146 wherein said corrector further includes a detection light beam oriented so as to be directed from each facet as the facet is swept through the detection light beam;

a sensor positioned to detect the detection light beam directed from the facet to determine the extent of the misalignment of the facet from the desired orientation; and an actuator adapted to move the emitting ends and focusing optic sufficient distances to correct the misalignment detected by the sensor.

148. The system of claim 147 wherein the emitting ends and the focusing optic are mounted to be moved together as a single assembly.

149. The system of claim 137, 143 or 147 further comprising:

the detection light beam and the sensor being oriented such that the detection light beam is directed from the facet that is currently in position to direct the modulated light beam to the viewing surface.

150. A system for projecting an image onto a viewing surface, comprising:

a plurality of modulated light beams;

a plurality of optical fibers, each fiber being adapted to emit at least one of the light beams from an emitting end thereof;

a line scanner and a frame scanner, the line scanner including a rotating body having a plurality of facets, each facet being positioned on said rotating body to sweep the light beams emitted from the emitting ends of said fibers to illuminate at least one desired sweep path on the viewing surface as the facet sweeps through the path of the beams during each of a plurality of scan passes, and the frame scanner being adapted to adjust the light beams in a direction transverse of the desired sweep paths on the viewing surface such that a plurality of different desired sweep paths are illuminated on the viewing surface during the projection of the frame;

at least one of the facets of the line scanner having a different alignment when rotated to the same relative location as another of said facets such that the path illuminated by the light beams swept by such facet will not begin at the desired location on the viewing surface; and a corrector adapted to move the emitting ends of the fibers such that the light beams swept by each facet will begin at the desired location on the viewing surface.

151. The system of claim 137, 143, 147 or 150 wherein the actuator is a piezo-electric crystal.

152. A method for projecting an image onto a viewing surface, comprising the steps of:

emitting at least two light beams from at least two optical fibers;

directing the emitted beams during each of at least two scan passes with one of at least two orientations of a scanner to illuminate a desired path on the viewing surface; and moving the emitting ends with respect to the scanner to correct for misalignment of at least one of the orientations of such scanner with respect to at least one other orientation of such scanner.

153. The method of claim 152 further comprising the steps of:

directing the emitted beams with at least one focusing optic onto one of the least two facets of a scanner during each of at least two scan passes; and moving the focusing optic with respect to the scanner to correct for misalignment of at least one of the facets with respect to at least one other facet of such scanner.

154. The method of claim 153 further comprising the step of:

moving the focusing optic and the emitting ends together with respect to the scanner to correct for such misalignment of at least one of the facets with respect to at least one other facet of such scanner.

155. A method for p rojecting an image onto a viewing surface, comprising the steps of:

emitting at least two light beams from at least two optical fibers;

directing the emitted beams with at least one focusing optic onto one of at least two facets of a scanner during each of at least two scan passes;

sweeping the directed beams along desired paths on the viewing surface with one of such facets during each of such scan passes; and moving the focusing optic with respect to the scanner to correct for misalignment of at least one of the facets with respect to at least one other facet of such scanner.

156. The method of calim 155 further comprising the step of:

moving the emitting ends with respect to the scanner to correct for misalignment of at least one of the facets of such scanner with respect to at least one other facet of such scanner.

157. A method for projecting an image onto a viewing surface, comprising the steps of:

emitting at least two light beams from at least two optical fibers;

sweeping each of a plurality of facets of successively through a detecting light beam oriented to be deflected from such facet;

directing the emitted beams during each of a least two scan passes with one of such plurality of facets of a scanner to illuminate a desired path on the viewing surface;

detecting misdirection of such detecting light beam corresponding to misalignment of at least one of such facets with respect to at least one other such facet; and moving the emitting ends with respect to the scanner to correct for such detected misalignment of such facet.

158. The method of claim 157 further comprising the steps of:

directing the emitted beams with at least one focusing optic onto one of such facets during each of at least two scan passes; and moving the focusing optic with respect to the scanner to correct for such detected misalignment of at least one of the facets with respect to at least one other facet of such scanner.

159. The method of claim 158 further comprising the step of:

moving the at least one focusing optic and the emitting ends together with respect to the scanner to correct for such misalignment of at least one of the facets with respect to at least one other facet of such scanner.

160. The method of claim 1 or 2 further comprising the step of sweeping the light beams to substantially overwrite at least one line of locations on the viewing surface illuminated by at least two other of said light beams during at least two other sweeping steps.

161. The method of claim 11 or 12 wherein during at least one sweeping step at least one of the rows of light beams substantially overwrites the sweep path swept by others of said rows of light beams during at least tow other sweeping steps.

162. The method of claim 24 wherein during at least one sweeping step at least one of the rows of light beams substantially overwrites the sweep path swept by other rows of said light beams during at least two other sweeping steps.

163. The method of claim 41 or 42 where in a desired perceived composite color is formed at each of a plurality of locations on the viewing surface that are illuminated during different sweeping steps by at least two of the light beams of substantially different wavelengths.

164. The system of claim 56 wherein during at least one scan pass at least one of the light beams substantially overwrites the desired path swept by at least two other of said light beams during at least two other scan passes.

165. The system of claim 69 wherein during at least one scan pass at least one of the spots substantially overwrites the locations illuminated by at least two other of said spots during at least two other scan passes.

* * * * *